(12) United States Patent
Conflitti et al.

(10) Patent No.: US 12,442,931 B2
(45) Date of Patent: Oct. 14, 2025

(54) MODERNIZED GLOBAL NAVIGATION SATELLITE SYSTEM (GNSS) RECEIVERS AND COMMERCIALLY VIABLE CONSUMER GRADE GNSS RECEIVERS

(71) Applicant: oneNav, Inc., Sunnyvale, CA (US)

(72) Inventors: Paul A. Conflitti, Ashland, OR (US); Paul McBurney, Palo Alto, CA (US); Mark Moeglein, Ashland, OR (US); Gregory Turetzky, San Jose, CA (US); Norman Krasner, Redwood City, CA (US); Anthony Tsangaropoulos, Redwood City, CA (US)

(73) Assignee: oneNav, Inc., Sunnyvale, CA (US)

( * ) Notice: Subject to any disclaimer, the term of this patent is extended or adjusted under 35 U.S.C. 154(b) by 244 days.

(21) Appl. No.: 18/195,907

(22) Filed: May 10, 2023

(65) Prior Publication Data

US 2023/0288574 A1    Sep. 14, 2023

Related U.S. Application Data

(63) Continuation of application No. 17/068,659, filed on Oct. 12, 2020, now Pat. No. 11,686,855.

(60) Provisional application No. 62/915,510, filed on Oct. 15, 2019.

(51) Int. Cl.
*G01S 19/37* (2010.01)
*G01S 19/30* (2010.01)
*G01S 19/36* (2010.01)
*H04B 1/709* (2011.01)

(52) U.S. Cl.
CPC ............ *G01S 19/37* (2013.01); *G01S 19/30* (2013.01); *G01S 19/36* (2013.01); *H04B 1/709* (2013.01); *H04B 2201/70715* (2013.01)

(58) Field of Classification Search
CPC .......... G01S 19/37; G01S 19/30; G01S 19/36
USPC ..................................... 342/357.25
See application file for complete search history.

(56) References Cited

U.S. PATENT DOCUMENTS

| | | | |
|---|---|---|---|
| 4,998,111 | A | 3/1991 | Ma et al. |
| 5,663,734 | A | 9/1997 | Krasner |
| 5,781,156 | A | 7/1998 | Krasner |
| 5,812,087 | A | 9/1998 | Krasner |
| 6,009,118 | A | 12/1999 | Tiemann et al. |
| 6,591,230 | B1 | 7/2003 | Ding et al. |

(Continued)

FOREIGN PATENT DOCUMENTS

| | | |
|---|---|---|
| CN | 102565822 B | 7/2012 |
| CN | 104678411 A | 6/2015 |

(Continued)

OTHER PUBLICATIONS

Extended European Search Report from related European Application No. 20877653.4, mailed on Jun. 30, 2023, 15 pages.

(Continued)

*Primary Examiner* — Harry K Liu
(74) *Attorney, Agent, or Firm* — WOMBLE BOND DICKINSON (US) LLP

(57) ABSTRACT

GNSS receivers and systems within such receivers use improvements to reduce memory usage while providing sufficient processing resources to receive and acquire and track E5 band GNSS signals directly (without attempting in one embodiment to receive L1 GNSS signals). Other aspects are also described.

31 Claims, 50 Drawing Sheets

(56) References Cited

U.S. PATENT DOCUMENTS

| | | | |
|---|---|---|---|
| 6,724,807 | B1 | 4/2004 | Krasner et al. |
| 6,909,738 | B2 | 6/2005 | Akopian et al. |
| 7,447,259 | B2 | 11/2008 | Betz et al. |
| 7,522,100 | B2 | 4/2009 | Yang et al. |
| 7,830,993 | B2 | 11/2010 | Riley et al. |
| 7,990,315 | B2 | 8/2011 | Chen et al. |
| 8,279,910 | B2 | 10/2012 | Grover et al. |
| 8,306,154 | B2 | 11/2012 | Ruegamer et al. |
| 8,401,546 | B2 | 3/2013 | Landry et al. |
| 8,520,719 | B2 | 8/2013 | Conflitti |
| 8,611,397 | B2 | 12/2013 | Norman et al. |
| 8,665,149 | B2 | 3/2014 | Joo |
| 8,717,237 | B2 | 5/2014 | Vollath |
| 8,824,361 | B2 | 9/2014 | Rügamer et al. |
| 9,014,653 | B2 | 4/2015 | Madadi et al. |
| 9,515,697 | B2 | 12/2016 | Raasakka et al. |
| 2006/0133463 | A1 | 6/2006 | Pietila et al. |
| 2007/0195867 | A1 | 8/2007 | Betz et al. |
| 2009/0103656 | A1 | 4/2009 | Chen |
| 2009/0213006 | A1 | 8/2009 | Nayyar et al. |
| 2010/0210206 | A1 | 8/2010 | Young |
| 2010/0253578 | A1 | 10/2010 | Mantovani |
| 2015/0156038 | A1 | 6/2015 | Van Nee et al. |
| 2015/0204981 | A1 | 7/2015 | Kong |
| 2016/0245923 | A1 | 8/2016 | Badke |
| 2017/0350985 | A1 | 12/2017 | Agee |
| 2019/0120971 | A1 | 4/2019 | Lennen |

FOREIGN PATENT DOCUMENTS

| | | | | |
|---|---|---|---|---|
| CN | 105204044 | A | 12/2015 | |
| CN | 106526632 | A | 3/2017 | |
| CN | 106814374 | A | 6/2017 | |
| CN | 109581440 | A | 4/2019 | |
| EP | 1644753 | B1 | 12/2007 | |
| EP | 2028762 | A1 | 2/2009 | |
| EP | 1829232 | | 5/2014 | |
| EP | 3101445 | A1 | 12/2016 | |
| EP | 3413089 | B1 * | 10/2019 | ............. G01S 19/29 |
| KR | 101809271 | B1 | 12/2017 | |
| WO | 03104969 | A2 | 12/2003 | |
| WO | WO-2019219218 | A1 * | 11/2019 | ............. G01S 19/22 |
| WO | 2020125839 | A1 | 6/2020 | |

OTHER PUBLICATIONS

First Office Action from related Taiwan Application No. 109135794, mailed on Jun. 18, 2024, 13 pages including translation.

Marco Pini, Enea Viviani, Letizia Lo Presti. "GPS L5 Signal Acquisition Exploiting Neumann-Hoffman Code Transitions", Proceedings of the 2010 International Technical Meeting of The Institute of Navigation, Jan. 25-27, 2010, pp. 765-772, Catamaran Resort Hotel, San Diego, CA.

Hegarty, C., M. Tran, and A. J., Van Dierendonck. "Acquisition Algorithms for the GPS L5 Signal", Proceeding of ION GPS/GNSS 2003, Sep. 2003, Portland, OR, pp. 165-177.

Bo Zheng and Gerard Lachapelle. "Acquisition Schemes for a GPS L5 Software Receiver", Proceedings of the 17th International Technical Meeting of the Satellite Division of The Institute of Navigation (ION GNSS 2004), Long Beach, CA, Sep. 2004, pp. 1035-1040.

Tu Thi-Thanh Nguyen and Tung Hai Ta. "A robust acquisition architecture for GPS safety-of-life L5 Signal", 7th International Conference on Signal Processing and Communication Systems (ICSPCS), Carrara, VIC, Australia, Dec. 16-18, 2013, pp. 1-8.

Choi Seung Hyun, et al. "Acquisition and tracking schemes for a GPS L5 receiver", 2008 International Conference on Control, Automation and Systems, Oct. 14-17, 2008, pp. 2214-2217.

Andrew Dempster. "Correlators for L2C: Some Considerations", Inside GNSS, Oct. 2006, pp. 32-37.

Lionel Ries, Christophe Macabiau, Olivier Nouvel, Quentin Jeandel, Willy Vigneau, Vincent Calmettes, Jean-Luc Issler. "A software receiver for GPS-IIF L5 signal", HAL Id: hal-01021711https://hal-enac.archives-ouvertes.fr/hal-01021711 submitted Oct. 30, 2014.

Surendran Konavattam Shanmugam. "New Enhanced Sensitivity Detection Techniques for GPS L1 C/A and Modernized Signal Acquisition", A Dissertation Submitted to the Faculty of Graduate Studies in Partial Fulfillment of the Requirements for the Degree of Doctor of Philosophy, Calgary, Alberta, Jan. 2008.

Christophe Macabiau, Lionel Ries, Frédéric Bastide, Jean-Luc Issler. "GPS L5 receiver implementation issues", On GPS/GNSS 2003, 16th International Technical Meeting of the Satellite Division of TheInstitute of Navigation, Sep. 2003, Portland, United States. pp 153-164.

Jérôme Leclère, René Landry and Cyril Botteron. "Comparison of L1 and L5 Bands GNSS Signals Acquisition", Sensors (2018). This article is an open access article distributed under the terms and conditions of the Creative Commons Attribution (CC BY) license (http://creativecommons.org/licenses/by/4.0/).

Jérôme Leclère, René Landry. "Galileo E5 signal acquisition using intermediate coherent integration time", Presentation in INC 2018, Nov. 12-15, 2018, Mercure, Bristol Grand Hotel, Bristol, UK.

PCT International Search Report and Written Opinion of the International Searching Authority for PCT/US20/55416, mailed Mar. 4, 2021, 16 pages.

PCT International Preliminary Report on Patentability for PCT/US2020/055416, mailed Apr. 28, 2022, 13 pages.

M. Naimul Hasan, Sudhir Aggarwal, Qun Jane Gu, Xiaoguang Liu. "Tunable N-Path RF Front-end Filter with an Adaptive Integrated Notch for FDD/Co-Existence", 2014, 4 pages.

Nagaraj C. Shivaramaiah, Andrew G. Dempster. "An Analysis of Galileo E5 Signal Acquisition Strategies", Mar. 2008, 11 pages.

Herman Toho Diessongo, Heike Bock, Torben Schuler, Stefan Junker, Anthony Kiroe. "Exploiting the Galileo E5 Wideband Signal for Improved Single-Frequency Precise Positioning", Sep./Oct. 2012, pp. 64-73.

"European GNSS (Galileo) Open Service", European Union 2015, OS SIS ICD, Issue 1.2, Nov. 2015, 86 pages.

Marc-Antoine Fortin, Rene Landry Jr. Implementation Strategies for a Universal Acquisition and Tracking Channel Applied to Real GNSS Signals, Sensors 2016, 16, 624, Published May 2, 2016, 26 pages.

Z Qian, C. Lu, M. An, and R Tolimieri. "Self-Sorting in-Place FFT Algorithm with Minimum Working Space", IEEE Transactions on Signal Processing, vol. 42, No. 10, Oct. 1994, pp. 2835-2836.

D. Borio, C. O'Driscoll and G. Lachapelle. "Composite GNSS Signal Acquisition over Multiple Code Periods," in IEEE Transactions on Aerospace and Electronic Systems, vol. 46, No. 1, pp. 193-206, Jan. 2010, doi: 10.1109/TAES.2010.5417156.

First Office Action from Chinese Patent Application No. 201510736211.6 dated Mar. 2, 2017, 10 pages. This translated office action is from the prosecution file for CN105204044 which is also cited herein.

First Office Action from Chinese Patent Application No. 201811545894.7 dated May 28, 2020, 11 pages. This translated office action is from the prosecution file for CN109581440 which is also cited herein.

B. Kim and S.-H. Kong. "Design of FFT-Based TDCC for GNSS Acquisition," in IEEE Transactions on Wireless Communications, vol. 13, No. 5, pp. 2798-2808, May 2014, doi: 10.1109/TWC.2014.040714.131884.

Y. Moon et al. "A 26mW dual-mode RF receiver for GPS/Galileo with L1/L1F and L5/E5a bands," 2008 International SoC Design Conference, 2008, pp. 1-421-1-424, doi: 10.1109/SOCDC.2008.4815662.

F. Van Diggelen. "Who's Your Daddy? Why GPS Will Continue to Dominate Consumer GNSS," InsideGNSS, Mar./Apr. 2014, pp. 30-41.

China National Intellectual Property Administration, Notification to Grant Patent Right for Invention from related Chinese Patent Application No. 202080071834.5 mailed on May 26, 2025, 5 pages.

Weihua, Mou. "Study on Key Techniques of Software Process for GNSS Signal", dissertation, Graduate School of National Univer-

(56) References Cited

OTHER PUBLICATIONS sity of Defense Technology, Changsha, Hunan, P.R.China, Nov. 2017, 141 pages. * Submitted in two parts due to file size limitations .*.

* cited by examiner

Note: For code spectrum generation, the Baseband Sample Memory is replaced by 4 GNSS code generators.

Hypothesis Memory Configured for Coherent
Integration in Precise Time Mode
(configurable time slots)

MODERNIZED GLOBAL NAVIGATION SATELLITE SYSTEM (GNSS) RECEIVERS AND COMMERCIALLY VIABLE CONSUMER GRADE GNSS RECEIVERS

CROSS-REFERENCE TO RELATED APPLICATIONS

This application is a continuation of U.S. patent application Ser. No. 17/068,659, filed on Oct. 12, 2020, which claims the benefit of U.S. Provisional Patent Application No. 62/915,510, filed on Oct. 15, 2019, which applications are incorporated herein by reference.

BACKGROUND

This disclosure relates to the field of Global Navigation Satellite Systems (GNSS) and in particular, this disclosure in one embodiment relates to GNSS receivers that use a modern L5 signal in the L5 frequency band. There are numerous GNSS systems that are available, including the United States' GPS (Global Positioning System), GLONASS, Galileo, Beidou, and regional systems that exist or may be deployed in the future. The United States' GPS system was initially available in only the L1 frequency band. Now, the United States' GPS system includes GNSS signals in the L5 band, and the Galileo system includes modernized GNSS signals (such as E5A and E5B) in the L5 band centered at 1191.79 MHz. The modernized GNSS signals in the L5 band provide certain advantages relative to GNSS signals in the L1 band, and some of the advantages are described below. However, the acquisition in a GNSS receiver of L5 band GNSS signals directly without the prior acquisition of L1 GNSS signals in the GNSS receiver has been considered too difficult and thus conventional GNSS receivers employ a technique in which the L1 GNSS signals are acquired first, and this acquisition provides information, such as time information and Doppler estimates, that is used to acquire GNSS signals in the E5 band. Thus, conventional GNSS receivers that support GNSS L5 signals use a radiofrequency front end that receives both L5 and L1 signals; this means there is a duplication of radiofrequency components in these GNSS receivers. Moreover, the conventional receivers must store and use pseudorandom noise (PRN) codes for both L1 and L5 GNSS signals.

SUMMARY OF THE DESCRIPTION

The various aspects described herein provide improvements that can allow a GNSS receiver to directly receive, acquire, process and use only L5 band GNSS signals in the GNSS receiver with greater sensitivity and reliability than by acquiring at narrowband L1, although in some embodiments these improvements can be used in conventional receivers that receive and process L5 band GNSS signals and one or more additional GNSS bands such as the L1 GPS band. These aspects can be implemented in various embodiments that can include GNSS receivers or portions of GNSS receivers or data processing systems (such as smartphones) containing such receivers or portions of such receivers and can include methods performed by such devices (e.g., GNSS receivers, etc.) and can include non-transitory machine readable media storing computer program instructions which when executed by a data processing system cause the data processing system to perform the one or more methods described herein.

One aspect of this disclosure relates to direct acquisition of L5 band GNSS signals. In other words, in this aspect, a GNSS receiver directly acquires L5 band GNSS signals without attempting to acquire time and frequency information from L1 band GNSS signals. The terms "direct acquisition" and "directly acquiring" are intended to mean that the GNSS receiver receives L5 band GNSS signals and acquires those signals to obtain time and frequency information derived from those signals without acquiring time and frequency information from L1 band GNSS signals. While cellular telephone assistance data (for time or phase locking for frequency as described in prior Snaptrack patents) may be used in the GNSS receiver, L1 band GNSS signals are not acquired and not used for a GNSS receiver that directly acquires L5 band GNSS signals. Thus, the GNSS receiver, when it directly acquires L5 band GNSS signals, acquires the L5 band GNSS signals to obtain time and frequency information from those signals without having the benefit of previously acquiring L1 band GNSS signals and without having the benefit of obtaining time or frequency information from L1 band GNSS signals.

Another aspect of this disclosure relates to sharing a cache memory between a set of one or more application processors (APs) and a GNSS processing system (or the sharing of other memory between the GNSS processing system and other processors on an SOC or integrated circuit). This aspect provides a solution for the often excessive memory requirements of acquiring L5 GNSS signals, particularly with methods that use discrete Fourier transform (DFT) computations. The one or more application processors (or other processors) and the GNSS processing system can be implemented together in a single monolithic integrated circuit (IC) on a single semiconductor substrate that can be referred to as a system on a chip (SOC) and the cache memory can also be on the same integrated circuit. In this aspect, the application processors (or other processors) share their cache memory (or other memory) with at least an acquisition engine (AE) of the GNSS processing system. This sharing can be limited, in one embodiment, to those situations in which the acquisition engine is initially acquiring GNSS signals (for example, a start with or without assistance data from a cellular telephone network). A portion of the cache memory, which can be L1 (level 1) or L2 (level 2) SRAM cache of the one or more application processors or other memory used by other processing systems, can be allocated to the acquisition engine for the acquisition phase, in response to a request for location data (such as a latitude and longitude) from an application program such as a map application or other application. The allocation may be prioritized or not by an operating system (OS) of the system or firmware on an IC depending on the location request; if the request for location is from a low priority background daemon application, then the allocation may be temporarily deferred until sufficient free memory in the cache memory is available. On the other hand, if the location request is from a map application that is the foreground application (and hence the display of the device shows the user interface of the map application to a user) then the allocation is prioritized. The portion to be allocated in one embodiment can be identified by determining which pages in the cache memory are not dirty and are stored in a backing store such as main DRAM or better yet non-volatile memory (such as flash memory). Such pages (e.g., not dirty and stored in a backing store) can be flushed/deleted immediately from the cache memory (or other memory) and then allocated to the AE for use in storing one or more of (for example): hypothesis data or generated GNSS PRN codes and/or their code spectrums from a DFT.

A method according to his sharing aspect can include the following operations implemented in a GNSS receiver: receiving, from one or more application processors on an integrated circuit a request to generate location data through use of a GNSS processing system on the integrated circuit, the GNSS processing system including an acquisition engine (AE) that is configured to acquire a plurality of GNSS signals, each of the GNSS signals transmitted from one of a constellation of GNSS space vehicles (SVs); identifying a portion of a cache memory (or other memory) on the integrated circuit and allocating, in response to the request to generate location data, the portion for use by the acquisition engine while the one or more application processors (or other processor(s)) are allocated a remaining portion of the cache memory (or other memory), the allocating performed by an operating system that executes on the one or more application processors or by firmware on the IC; and storing, by the acquisition engine or the one or more application processors, data related to GNSS signal acquisition processing in the allocated portion. The method in one embodiment can use static random access memory (SRAM) as the cache memory (or other memory) on the integrated circuit, and the acquisition engine can include ASIC (application specific integrated circuit) hardware logic for performing fast Fourier transform (FFT) operations such as discrete Fourier transform (DFT) operations using a decimation in time method and also using a decimation in frequency method. In one embodiment, the method can further include the operation of deallocating the allocated portion after the GNSS processing system begins to track GNSS signals that have been acquired from at least three (3) GNSS SVs, the deallocating occurring in response to acquiring, before a tracking phase, the GNSS signals from the at least three GNSS SVs. In one embodiment, the GNSS processing system includes a dedicated memory that is separate from the cache memory (or other memory) and is dedicated for use by the GNSS processing system. In one embodiment, a memory controller, coupled to the cache memory (or other memory), can include a first port controller to control access to the allocated portion for the acquisition engine and a second port controller to control access to the remaining portion of the cache memory (or other memory). In one embodiment, the acquisition engine performs an acquisition of GNSS signals from GNSS SVs and the acquisition comprises determining primary code phase and frequencies of received GNSS signals containing pseudo-random noise (PRN) codes to enable tracking of the GNSS signals to produce, as a result of the tracking, pseudoranges to the GNSS SVs. In one embodiment of the method, the allocated portion is to store one or more of: (1) pseudorandom noise codes of GNSS SVs or (2) hypotheses of identifiers of potentially acquired GNSS signals and hypotheses of their frequencies. In one embodiment of this method, the one or more application processors can generate, prior to an acquisition phase beginning, GNSS PRN codes and/or their code spectrums from DFTs for at least GNSS SVs that are in view of the system; in one implementation of this embodiment, these PRN codes and/or their code spectrums from DFTs can be generated and used immediately without storing these codes or alternatively these PRN codes and/or their code spectrums from DFTs can be generated and stored temporarily while being used during the acquisition and tracking phase. In one alternative embodiment, the one or more application processors can generate the GNSS PRN codes (or their code spectrums or both) and store them in the system's DRAM memory and then copy those codes into the cache memory (or other memory) prior to the beginning of the acquisition phase or in response to a request for location. In one embodiment, in order to conserve memory, the system can generate GNSS PRN codes and/or their code spectrums from DFTs for only healthy GNSS SVs that are in view.

In one embodiment, a system according to this sharing aspect can include the following components: a set of one or more application processors configured to execute an operating system (OS) and one or more application programs, the set of one or more application processors implemented in an integrated circuit; a set of one or more buses coupled to the set of one or more application processors, the one or more buses on the integrated circuit; a cache memory (or other memory) on the integrated circuit and coupled to the set of one or more buses and coupled to the set of one or more application processors to store data for use by the operating system or for use by the one or more application programs and other memory, such as high bandwidth modem memory or other memory used by one or more processors that are not in the set of one or more application processors, may also be on the IC and coupled to the one or more buses; a bus interface coupled to the set of one or more buses, the bus interface to couple the set of one or more application processors to dynamic random access memory (DRAM) which is external to the integrated circuit; a GNSS processing system implemented on the integrated circuit, the GNSS processing system comprising an acquisition engine (AE) and a tracking engine (TE), the GNSS processing system coupled to the cache memory (or other memory) through the one or more buses; and a memory controller coupled to the cache memory (or other memory) and to the set of one or more application processors and to the GNSS processing system, the memory controller to allocate a portion of the cache memory (or other memory) for use by the AE in response to one or more instructions from the operating system (or other software components) in order to allow GNSS signals to be acquired. In one embodiment, the cache memory can include static random access memory (SRAM) and the AE can include ASIC hardware logic for performing discrete Fourier transform operations using both a decimation in time method and a decimation in frequency method. In one embodiment, the memory controller can include a first port controller to control reading from and writing to the portion for the AE and a second port controller to control reading from and writing to a remaining portion of the cache memory (or other memory). In one embodiment, the memory controller can deallocate the portion of the cache memory (or other memory) used by the AE after the GNSS processing system begins to track GNSS signals that have been acquired from at least three GNSS SVs (but before a location data, such as a latitude and a longitude, is determined).

Another aspect that can help to alleviate memory usage in an L5 band GNSS receiver is the on-demand generation of GNSS PRN codes and/or their code spectrums from DFTs that are used to correlate to received GNSS signals during the acquisition phase. This on demand generation can produce GNSS PRN codes and/or their code spectrums from DFTs during the acquisition and tracking phases in one embodiment. For example, in one embodiment these codes can be generated but not stored during both the acquisition and tracking phases; in an alternative embodiment, the codes can be generated on the fly and on-demand and stored during both the acquisition and tracking phases, and once a location is determined these codes are no longer stored. In one embodiment, the codes and the code spectrums are generated before each correlation operation, once every 1 ms for every channel, and then the memory is overwritten for the next channel. There is no storage of codes or spectrums, just 1 memory that is temporarily reused. For example, with 24 channels being acquired the codes for the 24 channels are regenerated 24 times every 1 ms. It is temporarily stored in memory for the first stage of DFT performed during the frequency domain correlation algorithm.

Another aspect of this disclosure relates to an acquisition correlator that uses array processing. This array processing architecture can initially arrange the digitized GNSS sample data in, for example, rows in an array, where the rows are arranged in time in a baseband sample memory. DFT operations on the data can produce an output which can then be processed by inverse DFT operations without having to rotate or reformat or rearrange or transpose the data in the array prior to the inverse DFT operations. The data can be arranged such that each ALU in a set of multiple ALUs processes one row or one column in the array, thereby breaking the processing into discrete pieces that can be processed by each of the DFT ALUs such that each row or column can be computed in an atomic processing operation in one or a few processing clock cycles by a single DFT ALU which in one embodiment perform multiple DFT operations once instructed to do so. The baseband sample memory can be implemented in a circular buffer that contains the array of ordered data. In one embodiment, the processing operations can be DFT in place computations such that a row (or column) of input data is retrieved from memory and processed (using a DFT) and the output from this processing is then stored back in the same memory location as the input data (thus writing over the input data in those memory locations).

In one embodiment that can use an array processing architecture, a system for processing GNSS signals can include the following components: a radiofrequency analog to digital converter (ADC) to generate a digital representation of received GNSS signals; a baseband sample memory to store the digital representation of the received GNSS signals as digitized GNSS sample data in N2 rows (e.g., 1024 rows in one embodiment or 512 rows in another embodiment) and N1 columns (e.g., 20 columns in one embodiment or 40 columns in another embodiment), the array being stored in a row order in the baseband sample memory, and the row order containing the digitized GNSS sample data that was received over a time period (that includes a first time period and a second time period) such that a first row in the row order contains digitized GNSS sample data received during the first time period and a second row, which follows the first row in the row order, contains digitized GNSS sample data received during the second time period that follows, in time, the first time period, wherein the baseband sample memory is coupled to the RF ADC; and a set of arithmetic logic units (ALUs) configured to perform discrete Fourier transform (DFT) operations, the set of ALUs being coupled to the baseband sample memory and being configured to perform, in parallel and concurrently in time, N1 DFTs, wherein each of the N1 DFTs contains N2 points in the DFT and the outputs of the N1 DFTs are stored in a partial sample array, and wherein the set of ALUs are configured to then perform N2 DFTs, each of the N2 DFTs containing N1 points from the partial sample array, the N2 DFTs providing an output stored in a DFT result array that is arranged in column order. In one embodiment, the baseband sample memory is configured as a circular memory buffer that stores the digitized GNSS sample data. In one embodiment, the N1 DFTs use the same operations and same program control instructions for the set of ALUs to operate on different data. In one embodiment, the N2 DFTs are performed consecutively over time. In one embodiment, the circular sample memory buffer stores more than one frame of pseudorandom GNSS signals which is more than one millisecond. In one embodiment, the N1 DFTs and the N2 DFTs use a decimation in time method, and N1 is one of the integer values: 5, 10 or 20 or 40. In another embodiment, N2 is set such that N1×N2=20480 (or N1×N2 is greater than 20480). In one embodiment, a change from the row order to a column order avoids a reordering or transposition algorithm, and the change is produced by a combination of the N1 DFTs followed by the N2 DFTs that are configured to produce this change. In one embodiment, a GNSS code generator is configured to generate a GNSS codes spectrum, and the set of ALUs perform a set of DFTs on the GNSS PRN codes to provide a codes spectrum result data stored in a code spectrum memory in a column order. In one embodiment, the baseband sample spectrums are stored in special/dedicated memory, and recalculated every 1 ms, and the code spectrum is stored in general purpose variable memory and overwritten for every channel of every ms. In one embodiment, the set of ALUs can be configured to multiply the code spectrum result data by the sample output stored in the DFT result array to produce a product array. In one embodiment, the set of ALUs can be configured to perform an inverse DFT on the product array using a decimation in frequency method. In one embodiment, the inverse DFT can comprise: (1) in a first stage, N2 DFTs with conjugated inputs, each of the N2 DFTs containing N1 points, and (2) in a second stage that follows the first stage, N1 DFTs, each of the N1 DFTs containing N2 points. In one embodiment, the baseband sample memory can be a dual port memory allowing different processors or processes to simultaneously access different portions of the baseband sample memory. In one embodiment, the GNSS code generator can repeatedly generate a pseudorandom noise code for each GNSS SV in view every millisecond when it is needed during an acquisition phase and does not store a generated pseudorandom noise code (and/or its code spectrum from DFTs) after it is used, and the generated pseudorandom noise code can be used to generate the GNSS code spectrum. In one embodiment, the GNSS code spectrum is aligned in place in memory in both frequency and phase to match code phase and frequency shift hypotheses associated with the received GNSS signals. In one embodiment, this alignment can be performed by CORDIC hardware.

One or more embodiments of GNSS receivers described herein can perform one of the following methods that use a sequence of DFTs. In one embodiment, a method can include the following operations:

receiving GNSS signals;
    digitizing the received GNSS signals and providing an output, from an analog to digital converter (ADC), of GNSS sample data which includes at least one of (1) GNSS sideband A sample data for a received GNSS signal and (2) GNSS sideband B sample data for the received GNSS signal;
    computing at least one of (1) a first set of DFTs of the GNSS sideband A sample data to provide a first set of results and (2) a second set of DFTs of the GNSS sideband B sample data to provide a second set of results;

computing at least one of (1) a third set of DFTs of GNSS sideband A primary PRN code data which is adjusted for code Doppler and carrier Doppler prior to the third set of DFTs, the GNSS sideband A primary PRN code data including at least one of two components in the GNSS sideband A, the third set of DFTs providing a third set of results and (2) a fourth set of DFTs of GNSS sideband B primary PRN code data which is adjusted for code Doppler and carrier Doppler prior to the fourth set of DFTs, the GNSS sideband B primary PRN code data including at least one of two components in the GNSS sideband B, the fourth set of DFTs providing a fourth set of results;

computing at least one of (1) a first set of correlations using a DFT of the complex conjugate of a product of the first set of results and the complex conjugate of the third set of results to provide a fifth set of results and (2) a second set of correlations using a DFT of the complex conjugate of a product of the second set of results and the complex conjugate of the fourth set of results to provide a sixth set of results; and integrating at least one of (1) the fifth set of results with at least one prior sum for the GNSS sideband A and (2) the sixth set of results with at least one prior sum for the GNSS sideband B, wherein the integrating includes at least one of (1) storing at least one new sum for GNSS sideband A components in a single hypothesis memory and (2) storing at least one new sum for GNSS sideband B components in the single hypothesis memory.

One implementation of this method can be summarized as ("case 1"):

1. computing FFT of a sideband A sample;
2. computing FFT of a sideband B sample;
3. computing FFT of at least one sideband A component primary code adjusted for code Doppler and carrier Doppler (e.g. a range of potential Dopplers to be searched);
4. computing FFT of at least one sideband B component primary code adjusted for code Doppler and carrier Doppler;
5. computing correlations with inverse FFT (IFFT) of the product of (a) the computed FFT from 1 (FFT of sideband A sample) and (b) the computed FFT from 3 (FFT of sideband A component);
6. computing correlations with IFFT of the product of (a) the computed FFT from 2 and (b) the computed FFT from 4.

This implementation can provide several advantages. For example, this implementation can have very few FFTs on the received sideband samples and can reduce or eliminate large data transfers normally required to move precomputed GNSS sample spectrums from memory (e.g. DRAM or non-volatile memory) to the frequency domain correlator array processor. The frequency domain correlation engine can be very efficient by re-using the engine at a reasonable clock speed while requiring a low or small memory footprint. For example, the frequency domain correlation engine can compute the primary codes and their spectrums (e.g., in operations 3 and 4 in summarized "Case 1" above) in place within the engine in a pipeline architecture described herein. Further, applying the code Doppler compensation and the carrier Doppler compensation to the in place generated codes (e.g., in operations 3 and 4 in summarized "Case 1" above) reduces the input (received) sample FFTs and also improves code Doppler accuracy.

There are numerous combinations and permutations of this implementation for acquisition of, for example, L5 GNSS signals. These combinations and permutations however can be less efficient than "Case 1" above because they require (relative to "Case 1") faster processing clocks and/or more memory or because they have less acquisition sensitivity or require a longer time to acquire signals for a given signal strength. The use of the six (6) operations in "Case 1" can be retained but with permutations based on one or more of: (1) where and how code and carrier compensation are performed, for example: (a) carrier Doppler compensation can be a "wipe-off" of the received GNSS samples or an up-multiply on the locally generated (or precomputed) PRN code samples; or (b) code Doppler adjustments can be applied on the received GNSS samples ("input samples") or the locally generated (or precompute) PRN code samples by a complex multiplication of code spectrums (see, e.g., Appendix 3) or by compensating the post correlation results and their integration in memory (see Appendix 1); (2) whether the code spectrums are locally generated in place in the acquisition engine (AE) or are precomputed and loaded into the AE based upon GNSS SVs in view; or (3) alternative hardware architectures (instead of decimation in time FFT and decimation in frequency FFT in sequence) such as parallel FFT kernels or higher radix kernels to reduce the number of processing clocks per FFT. The following 6 permutations are examples of the possible permutations.

Case 2 (switch code and carrier Doppler to samples: requires more input sample FFTs)

1. FFT of Sideband A adjusted for code and carrier Doppler
2. FFT of Sideband B adjusted for code and carrier Doppler
3. FFT of at least one A component primary code
4. FFT of at least one B component primary code
5. Correlations with IFFT of 1 and 3 products integrated into a single hypothesis memory
6. Correlations with IFFT of 2 and 4 products integrated into a single hypothesis memory Case 2B (same as 2 with pre-computed code spectrums: requires more memory and data bandwidth)

1. FFT of Sideband A adjusted for code and carrier Doppler
2. FFT of Sideband B adjusted for code and carrier Doppler
3. Obtain precomputed FFT of at least one A component primary code
4. Obtain precomputed FFT of at least one B component primary code
5. Correlations with IFFT of 1 and 3 products integrated into a single hypothesis memory
6. Correlations with IFFT of 2 and 4 products integrated into a single hypothesis memory Case 3 (same as 2 with code Doppler compensation post correlation)

1. FFT of Sideband A adjusted for carrier Doppler
2. FFT of Sideband B adjusted for carrier Doppler
3. FFT of at least one A component primary code
4. FFT of at least one B component primary code
5. Correlations with IFFT of 1 and 3 products adjusted for code Doppler integrated into a single hypothesis memory
6. Correlations with IFFT of 2 and 4 products adjusted for code Doppler integrated into a single hypothesis memory Case 3B (same as 3 but with pre-computed code spectrums)

1. FFT of Sideband A adjusted for carrier Doppler
2. FFT of Sideband B adjusted for carrier Doppler 3. Obtain precomputed FFT of at least one A component primary code
4. Obtain precomputed FFT of at least one B component primary code
5. Correlations with IFFT of 1 and 3 products adjusted for code Doppler integrated into a single hypothesis memory
6. Correlations with IFFT of 2 and 4 products adjusted for code Doppler integrated into a single hypothesis memory The following set of cases use the method described in the Appendix 1 that compute the FFTs of input sample sideband sample each msec at a number of frequencies like 0,200,400, 600, 800 and then the sample sideband A or B spectrum is approximated by choosing the closet sub kHz FFT and then shifting by +/−N samples to obtain a super kHz compensation. For example, 2450 Hz uses the 400 Hz FFT and shifts this FFT by +2 samples to get a combined 400 Hz+2 kHz Doppler compensation.

Case 4 (like method described in the Appendix 1)
1. At least one FFT chosen from a set of sideband A sample FFTs adjusted for carrier Doppler at set of frequencies that cover a one k-Hz range, the one FFT shifted by N samples to produce an approximate carrier Doppler
2. At least one FFT chosen from a set of sideband B sample FFTs adjusted for carrier Doppler at set of frequencies that cover a one k-Hz range, the one FFT shifted by N samples to produce an approximate carrier Doppler
3. FFT of at least one A component primary code adjusted for code Doppler
4. FFT of at least one B component primary code adjusted for code Doppler
5. Correlations with IFFT of 1 and 3 products integrated into a single hypothesis memory
6. Correlations with IFFT of 2 and 4 products integrated into a single hypothesis memory Case 4A (like method 4 but with pre-computed code spectrums and code Doppler post correlation)
1. At least one FFT chosen from a set of sideband A sample FFTs adjusted for carrier Doppler at set of frequencies that cover a one k-Hz range, the one FFT shifted by N samples to produce an approximate carrier Doppler
2. At least one FFT chosen from a set of sideband B sample FFTs adjusted for carrier Doppler at set of frequencies that cover a one k-Hz range, the one FFT shifted by N samples to produce an approximate carrier Doppler
3. Obtain precomputed FFT of at least one A component primary code
4. Obtain precomputed FFT of at least one B component primary code
5. Correlations with IFFT of 1 and 3 products adjusted for code Doppler integrated into a single hypothesis memory
6. Correlations with IFFT of 2 and 4 products adjusted for code Doppler integrated into a single hypothesis memory In some of the embodiments described herein, adjustments or compensations are made for one of or both of code Doppler and carrier Doppler. These adjustments can be performed independently and at different stages as described herein. Code Doppler adjustment is an adjustment to a locally generated code (or a precomputed code) or to a received GNSS sample code to adjust for Doppler effects on the code such as a primary GNSS PRN code; for example, during a search or acquisition phase multiple possible code Doppler adjustments can be made on the locally generated code or to the received GNSS sample code to search for and acquire a GNSS signal that has been effected by Doppler effects. Carrier Doppler adjustment is an adjustment to adjust for Doppler effects on a carrier frequency of a signal. The carrier Doppler is the observed frequency offset from the transmit frequency due to relative motion between the satellite and receiver and the offsets from nominal of the satellite and receiver oscillators. Code Doppler is the shift in the received code phase over time that is coherent with the carrier Doppler. At L5 there are 115 carrier cycles per code chips. Thus, the code Doppler in chips/second is the carrier Doppler divided by 115. So for a carrier Doppler of 4321 Hz, the received code phase will move 37.57 chips in one second. In order to receive weak signals, it is necessary to correlate the received signals against the receiver's replica signal for multiple primary code frames. This requires that each incoming code phase hypothesis must be shifted in accordance with the carrier Doppler hypothesis. This shift is referred to as the code Doppler.

Another aspect of the disclosure involves the use of the primary and/or secondary code in E5 GNSS signals from one GNSS SV to derive code phase data or time data based on those GNSS signals and to then use that information to make estimates about code phases for other GNSS signals from other GNSS SVs to acquire code phases for the other GNSS signals from the other GNSS SVs. In this aspect, the GNSS receiver can employ a processing epoch that can be less than the 1 ms GNSS PRN code epoch and can be offset from the 1 ms GNSS PRN code epoch, and the GNSS receiver can use that processing to attempt to coherently integrate prior to acquiring the code phases for the other GNSS signals; for example, the GNSS processing system in the GNSS receiver can retrieve, every 0.25 milliseconds, a full 1 millisecond (ms) of digitized GNSS sample data from a circular memory buffer and perform a set of DFTs and inverse DFTs on the retrieved data to coherently integrate for each frequency bin and then repeat this VFFDC process on the next processing epoch, with each processing epoch being 0.25 milliseconds or some other fraction of a code epoch that is, in one embodiment, 1 ms long. This can allow the GNSS receiver to use the 1 millisecond data from the circular buffer repeatedly over multiple processing epochs to attempt to coherently integrate the other GNSS signals using the information obtained by previously acquiring the primary or secondary code phase of at least one of the GNSS signals. In this example, satellite codes are searched in alignment with the approximate time bin in which they are expected to be received, such that sub-millisecond coherent cancellation losses due to phase reversals associated with the secondary code are reduced. In another embodiment, the receiver clock may already be sufficiently accurate (much less than 1 ms of error) and an a priori position may be sufficiently well-known to allow for processing of all GNSS signals in this precise-time acquisition mode.

Another aspect of this disclosure involves the use of only a subset of the two or four components of the GNSS signals (a selected component) to first acquire that subset (such as only one of the four components) during coarse time acquisition and then acquire the remaining components. In one embodiment, this selected component is selected based on a lowest probability of signal change due to sign or phase reversals due to the coding scheme used in that selected component. In the case of Galileo's E5 GNSS signals, the E5BI component has the lowest probability of signal change due to sign or phase reversals and thus can be used as the selected component to perform a coarse or precise time acquisition before attempting to acquire and/or track the remaining components in the Galileo GNSS signals. This use of only a subset of the components can be done initially when beginning an acquisition (such as a coarse time acquisition) or as a fallback mode of operation after a conventional acquisition has failed or as a method to acquire a stronger satellite more quickly as the number of correlations is reduced, allowing a portion of a GNSS acquisition engine to search a large frequency space for many SVs more quickly and with lower power than if more GNSS signal components are employed.

Another aspect of this disclosure involves the mitigation of the impact of interference from certain known strong interferers such as the aeronautical radio navigation (ARN) signals that are commonly present around, for example, airports or military bases. The ARN signals, such as signals from a tactical air navigation system (DME/TACAN), are often strong pulsed signals that are well above a noise floor while GNSS signals are normally below the noise floor. Moreover, the ARN signals can cause interference with GNSS in the L5 band. This interference in one embodiment can be mitigated by detecting a signal source above the noise floor (for example, detecting a signal that is above a predetermined threshold which can be several dB above a noise floor) and then removing the signal in the frequency domain. The interfering signal can be identified during the signal acquisition phase using the DFT array processing that is described herein, and then the interfering signal can be processed through an FIR (Finite Impulse Response) filter to remove the interfering signal before time domain correlation processing. Alternatively, the frequencies with strong interference can be observed in the input data spectrums as the spectrum of the inputs samples is performed every msec and at each of the upper and lower sidebands. Another aspect of this disclosure involves the mitigation of the impact of interference from certain known interferers by narrowing the processing bandwidth of the radio receiver, focusing on one of the two sidebands E5a or E5b depending on the location of the interferer. Once the general interference frequency location is determined using DFT array processing detection or other methods, various analog and mixed-signal techniques can be employed to reduce the effects of interference prior to quantization. In one case, the radio filtering can narrow the effective radio bandwidth from 52 MHz to 26 MHz or smaller. Although this may introduce a small performance penalty, it allows the receiver to operate with larger interference margin. In another case, a configurable notch can be placed at an effective frequency location during the IF band-pass filtering of the radio architectures of FIGS. 4D, 4F and 4J. Furthermore a notch can also be placed at an effective frequency location during the low pass filtering of the architectures shown in FIGS. 4B, 4D, 4F. In yet another case, the IF frequency and/or the sampling frequency of the radio architecture of FIG. 4J can be modified so that the frequency plan immunity to aliased interference in improved.

Another aspect of this disclosure relates to methods to reduce memory usage by calculating but not storing outputs from certain DFTs. This method can reduce the size of the integration or hypothesis memory by eliminating storage of selected outputs from the DFT computations. In one embodiment, the outputs are evaluated to determine whether to save the outputs. This can be employed when the DFT methods are used to perform the correlations. In this case, the DFT produces correlation results at all the code hypotheses over one millisecond. In case the epoch location uncertainty is far less a millisecond, the full range, then only a portion around the estimated location needs to be integrated and saved.

The aspects and embodiments described herein can include non-transitory machine readable media that store executable computer program instructions that when executed can cause one or more data processing systems to perform the methods described herein when the computer program instructions are executed by the one or more data processing systems. The instructions can be stored in non-volatile memory such as flash memory or dynamic random access memory which is volatile or other forms of memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present disclosure is illustrated by way of example and not limitation in the figures of the accompanying drawings, in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
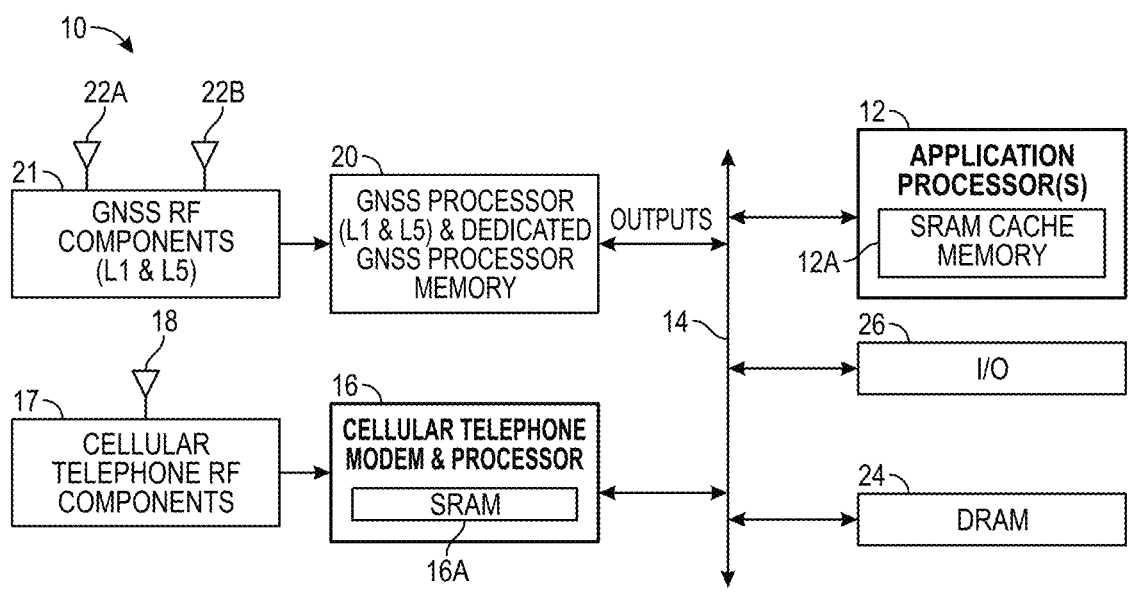
FIG. 1 is a block diagram which shows an example of a data processing system which includes a GNSS processor and one or more application processors.

One aspect of the embodiments described herein relates to the sharing of cache memory between one or more application processors and a GNSS processing system. Before describing these sharing embodiments, a description of a prior architecture in the prior art will be provided with reference to FIG. 1. FIG. 1 shows a system 10 that includes one or more application processors 12 and a GNSS processor 20 that are coupled through a bus 14 which is also coupled to system main memory which is the dynamic random access memory (DRAM) 24. The system 10 includes one or more input/output (110) devices 26 such as, for example, one or more touchscreens, speakers, microphones, and one or more sensors such as cameras, face detect sensors, etc. The system 10 also includes a cellular telephone modem and processor 16 which can include its own cache memory which can be SRAM 16A. The cellular telephone modem and processor 16 is coupled to the cellular telephone RF components 17 to receive cellular telephone signals through the antenna 18. The GNSS processor 20 is configured to receive and process GNSS signals in both the L1 and L5 bands. Moreover, the GNSS radiofrequency (RF) components 21 are configured to receive GNSS signals in both the L1 and L5 bands through the antennas 22A and 22B, and the GNSS RF components 21 include one or more RF mixers and RF to intermediate frequency downconverters and do include an RF local oscillator. These GNSS signals are processed by the GNSS processor 20 which includes its own dedicated processor memory as part of the GNSS processor 20. The GNSS processor does not use or share the cache memory 12A which is used by the one or more application processors 12 using techniques known in the art for utilizing a cache memory. The GNSS processor receives and processes GNSS signals and provides location outputs, such as latitude and longitude outputs, to the one or more application processors 12 through the bus 14. The GNSS processor receives and processes the GNSS signals without utilizing the cache memory 12A and requires two separate GNSS antennas 22A and 22B and two separate GNSS RF paths starting at the two GNSS antennas 22A and 22B.

Figure 2:
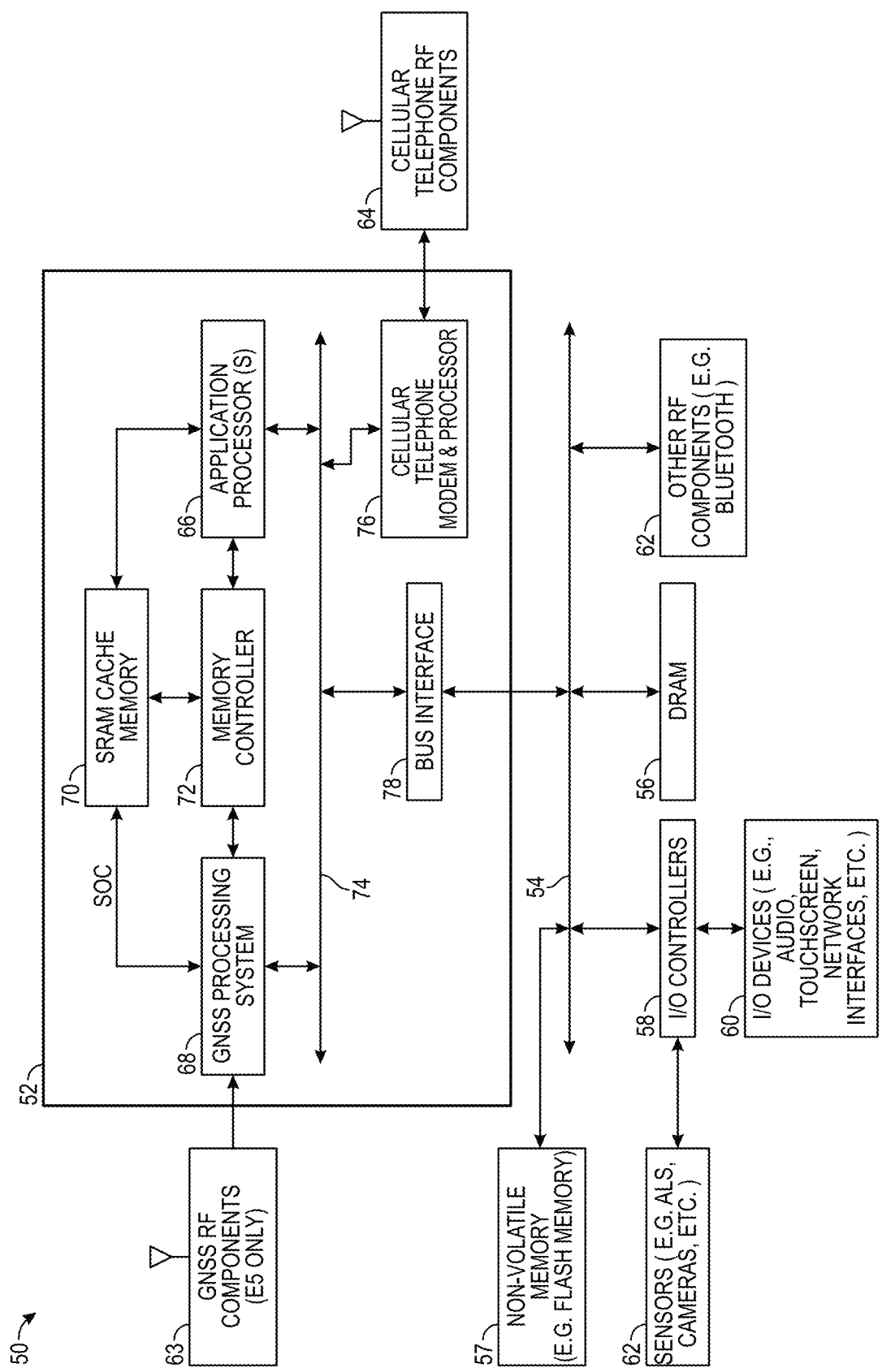
FIG. 2 is a block diagram that shows an example of an embodiment which includes a GNSS processing system and one or more application processors and a cache memory.
Figure 3:
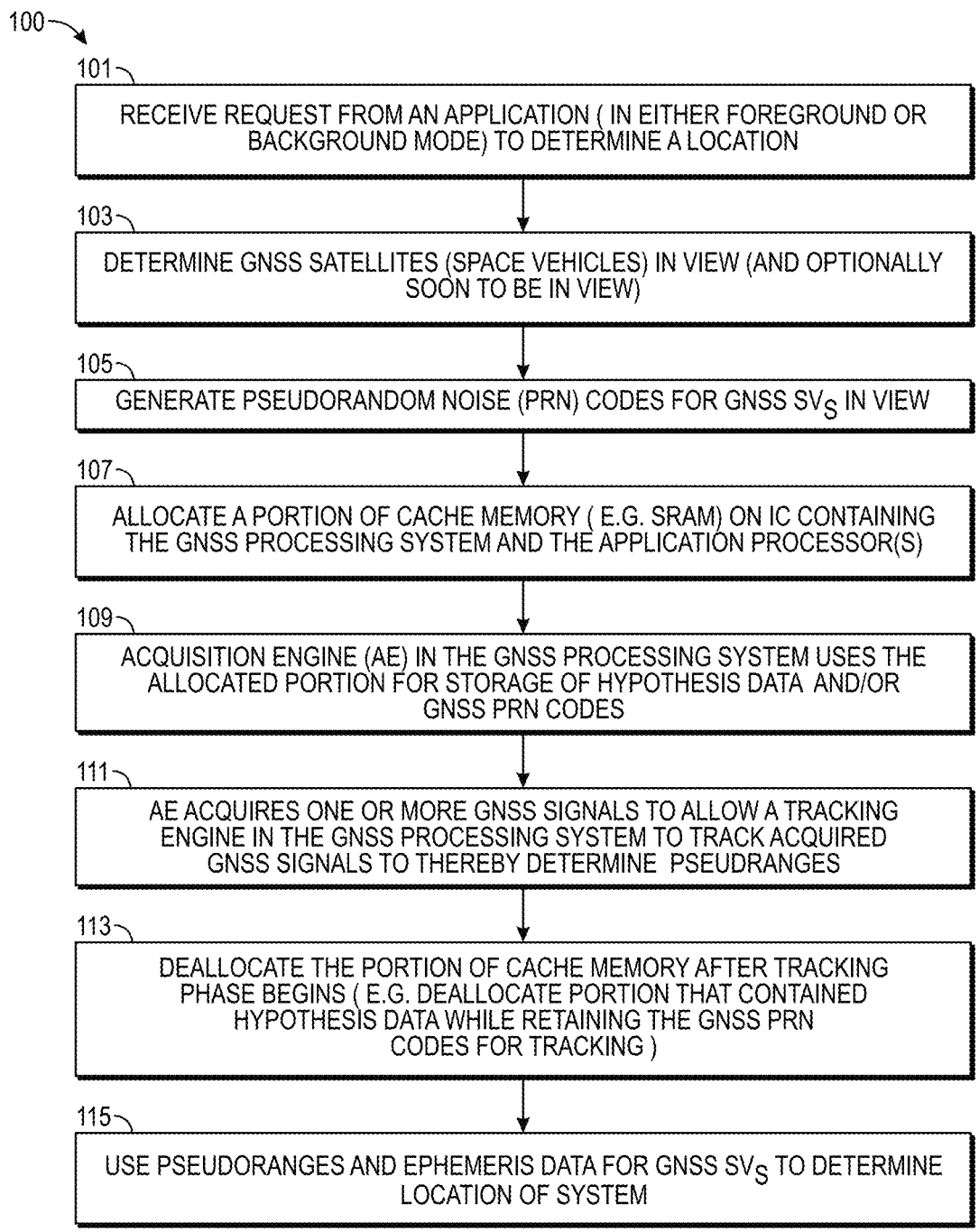
FIG. 3 is a flowchart which illustrates a method according to one embodiment for sharing a cache memory between one or more application processors and a GNSS processor.

FIG. 2 shows an example of a system in which the cache memory in the system is shared between one or more application processors and a GNSS processing system. The system 50 shown in FIG. 2 includes a system-on-a-chip (SOC) 52 that includes one or more application processors 66 and a cache memory 70 and a GNSS processing system 68. In one embodiment, the SOC 52 can be a single monolithic semiconductor device embodied in the substrate of an integrated circuit that includes all of the components shown within the perimeter of the SOC 52 as shown in FIG. 2. The SOC 52 can include a memory controller 72 which controls access to the cache memory 70 (or other memory) which is coupled to both the one or more application processors 66 and to the GNSS processing system 68. Thus the memory controller 72 can arbitrate usage of the cache memory 70 to allow the GNSS processing system 68 and the one or more application processors 66 to both use the cache memory which in one embodiment can be implemented as SRAM memory. In one embodiment, the memory controller 72 can allocate one portion of the cache memory 70 for use by the GNSS processing system and allow the remaining portion of the cache memory 70 to be used by the one or more application processors 66. In one embodiment, the cache memory 70 can be used to store program code or program instructions as well as data which is operated on by the processing systems. As further described below, when the acquisition engine of the GNSS processing system 68 is acquiring GNSS signals, the acquisition engine can use the cache memory to store, for example, hypotheses in hypothesis memory used during the acquisition phase or can use the cache memory 70 to store generated PRN codes (and/or their code spectrums from DFTs) for the GNSS signals. The GNSS processing system 68 can be coupled to the one or more application processors 66 through the bus 74. The one or more application processors 66 and the GNSS processing system 68 can also be coupled to the cellular telephone modem and processor 76 through the bus 74. In one embodiment, the bus 74 is a set of buses on the SOC 52. The SOC 52 also includes a bus interface 78 which allows the SOC 52 to be coupled to a system bus 54 which is exterior to the SOC 52. There are several other components which are exterior to the SOC 52, and they include the GNSS radiofrequency components 63 which in the example shown in FIG. 2 are configured to operate only in the L5 wideband (WB) band to receive and process only L5 wideband (WB) GNSS signals in the embodiment shown in FIG. 2. The terms or phrases L5 WB band or L5 WB signals or L5 WB GNSS are meant to include or refer to the modernized GNSS signals and modernized GNSS systems (e.g., constellations of SVs and receivers) that operate at a modernized frequency band centered at 1191.795 MHz and have a chipping rate of 10.23 MHz or significantly higher than the legacy chipping rate or GPS L1 of 1.023 MHz and these modernized GNSS systems include, for example, the US L5 GPS system, the European E5 Galileo system, the Chinese Beidou/Compass B2 system, Glonass K2, and QZSS. The cellular telephone modem and processor 76 is coupled to a cellular telephone radio frequency component 64 to receive cellular telephone signals and to transmit cellular telephone signals. The DRAM 56 is coupled to the bus 54 and can store user data and application programs and an operating system. In addition, the system 50 can also include nonvolatile memory 57, such as flash memory, which is in addition to the DRAM 56. The nonvolatile memory 57 can store user data and application programs and the operating system for the system 50. The system 50 can also include various input/output devices which can be interfaced with the remainder of the system through one or more I/O controllers 58. The input/output devices can include one or more sensors 62 and other input/output devices 60. For example, the sensor may include one or more of a 3-axis accelerometer, 3-axis gyro, ambient light sensor (ALS), barometric pressure sensor, magnetometer, one or more cameras, etc. In addition, the system 50 can include other radiofrequency components 62 such as Bluetooth, Wi-Fi, etc. A method for operating system 50 will now be provided while referring to FIG. 3.

The system 50 in operation 101 (shown in FIG. 3) can receive a request from an application to determine a location. This request can be either from a foreground application or from a background application. For example, a map application which is in the foreground and therefore displaying a user interface of a map to the user requests a location, and this request can cause the GNSS processing system 68 to be activated. Alternatively, a daemon background process can make a request for a location. The nature of the request can determine a priority for the memory controller 72 in determining how and when allocate a portion of the cache memory 70 for use by the GNSS processing system 68. For example, a foreground application request for a location can make the allocation of a portion of the cache memory 70 for use by the GNSS processing system 68 a high priority task causing the portion to be allocated as quickly as possible in some embodiments. Alternatively, a background application request for a location can make the allocation of a portion of the cache memory 70 by the memory controller 72 a deferred process or task, giving the memory controller 72 more time to allocate a portion of the cache memory 70.

In operation 103, the GNSS processing system 68 can receive assistance data from, for example, the cellular telephone modem and processor 76. In one embodiment, a satellite almanac or other data source about satellites in view over a period of time can be received by the system 50 and stored for later use by the GNSS processing system 68. Based upon the satellites or space vehicles (SVs) that are in view (from, for example a received satellite almanac), the GNSS processing system 68 can generate pseudorandom noise (PRN) codes and/or their code spectrums from DFTs (e.g. see code spectrum memory 263 in FIG. 6) for those GNSS SVs in view in operation 105. In one embodiment, the GNSS processing system 68 can generate on-demand these codes and use these codes without storing them during the acquisition and tracking phases for processing GNSS signals. In another embodiment, the GNSS processing system 68 can generate on-demand these codes and/or their code spectrums from DFTs (e.g. see code spectrum memory 263 in FIG. 6) and use these codes and/or their code spectrums from DFTs (e.g. see code spectrum memory 263 in FIG. 6) but also store them during the acquisition and tracking phases for processing GNSS signals, but as soon the tracking phase is finished these codes are no longer stored. In one embodiment, the code spectrum (generated from the GNSS PRN codes of GNSS SVs in view) can be generated but not stored (beyond about 1 millisecond) and the code spectrum can be repeatedly generated again and again for every millisecond (ms) of the GNSS sample data that is received and stored (in, for example, a circular memory buffer); thus in a first ms, a code spectrum is generated by applying a code Doppler (e.g. time shift) and a carrier frequency Doppler adjustment (see, for example, FIG. 6 and FIG. 9D) to the generated GNSS primary PRN code prior to the DFTs (by, for example, DFT ALUs 261) and then in a second ms (the next millisecond after the first ms) a new code spectrum is generated. A benefit of applying the code Doppler and carrier frequency adjustment prior to generating the code spectrum (through, for example, the DFT ALUs 261 in FIG. 6) is that the code spectrum cannot be precomputed or even used on subsequent milliseconds because the code Doppler rate for E5 GNSS signals is high and thus the code Doppler should be shifted for each millisecond interval to maintain high correlation. In one embodiment, the code Doppler shifted code spectrums can be stored for short periods of time if memory is available to reduce use of computational resources. The on-demand generation of these codes (which continues until a location data is determined) without long-term storage or without any storage can reduce the amount of memory used by the GNSS processing system 68. Similarly, the sharing of the cache memory 70 with the one or more application processor 66 can also reduce the usage of memory by the GNSS processing system 68. In operation 107, a portion of the cache memory, such as SRAM memory, on the integrated circuit containing the GNSS processing system and the one or more application processors can be allocated by, for example the memory controller 72. This can then allow the acquisition engine in the GNSS processing system 68 to use the allocated portion during at least the acquisition phase.

The acquisition phase typically involves determining the frequencies and primary code phases of acquired PRN codes and the identifiers of the satellites that have transmitted those acquired PRN codes. The PRN codes are acquired when a correlation operation indicates a match between a locally generated PRN code and a received PRN code. In one embodiment, in operation 109, the acquisition engine in the GNSS processing system uses the allocated portion for storage of hypothesis data and/or GNSS PRN codes. Then in operation 111, the acquisition engine acquires one or more GNSS signals to allow a tracking engine in the GNSS processing system to track acquired GNSS signals to thereby determine pseudoranges to the GNSS SVs that have transmitted the GNSS signals that have been acquired by the acquisition engine. In one embodiment, in operation 113, the portion of the cache memory can be deallocated after the tracking phase begins. For example, the memory controller 72 can deallocate the portion that contained the hypothesis data while retaining the GNSS PRN codes and/or their code spectrums from DFTs (e.g. see description of code spectrum memory 263 below) for tracking if they are stored in the cache memory. In an embodiment in which the PRN codes and/or their code spectrums from DFTs (e.g. see description of code spectrum memory 263 below) are not stored but rather are generated on the fly during use, then the deallocation of the portion of the cache memory used by the acquisition engine can be a complete deallocation freeing up the cache memory 70 for use by the one or more application processor 66. Then in operation 115, the GNSS processing system 68 can derive pseudoranges and can use the pseudoranges and ephemeris data for the GNSS SVs to determine location data for the system, such as system 50.

In one embodiment, the GNSS processing system 68 can include a dedicated memory that is separate from the cache memory 70 and is dedicated for use by the GNSS processing system. In one embodiment, the memory controller 72 can include a first port controller to control reading from and writing to the portion for the acquisition engine and a second port controller to control reading from and writing to a remaining portion of the cache memory 70. In one embodiment, the generation of GNSS PRN codes and/or their code spectrums from DFTs can be performed only for healthy GNSS SVs that are in view at the time of the request for location data (based upon, for example, information about SV health and about SVs in view in a received satellite almanac). This selective generation of GNSS PRN codes and/or their code spectrums from DFTs without saving the codes (in memory outside of registers and buffers in the pipeline processing logic) after the tracking phase or during the acquisition and tracking phases can reduce memory usage by the GNSS processing system. The pipeline processing logic can include registers and buffers that store the codes and code spectrum momentarily during one or a few clock cycles. In one embodiment, the GNSS processing system 68 can use the array processing architecture described below, such as the architecture shown in FIGS. 6, 7, 8, and 9 to provide additional reduction in memory usage by the GNSS processing system by, for example, using in place DFT algorithms.

In one embodiment, the operating system (or processor firmware) can perform the allocation of the portion of the cache memory for the GNSS processing system based upon information (which can be referred to as metadata) about the data stored in the cache memory. For example, this metadata can indicate whether or not the data stored in the cache memory, prior to the allocation of a portion of the cache memory for use by the acquisition engine, is "dirty" (e.g., it has been changed while stored in the cache memory) or whether it already exists in storage in a backing store such as in nonvolatile storage (e.g., flash memory) or even DRAM memory. For example, if the cache memory, prior to the allocation of a portion of the cache memory for use by the acquisition engine, is storing computer program instructions or code that is already stored in nonvolatile storage and these computer program instructions have not been modified while it is within the cache memory, then that portion of the cache memory can be allocated to the acquisition engine without having to write the data in the portion out to DRAM memory or out to nonvolatile storage. This can allow the operating system (or processor firmware) to quickly flush a portion of the cache memory so that it can be quickly allocated for use by the acquisition engine of the GNSS processing system. In the example shown in FIG. 2, the GNSS processing system shares a memory (e.g. cache memory 70) with one or more application processors (APs);

in an alternative embodiment, the GNSS processing system can share other memory with other processing systems (e.g. one or more other processors) that are on the IC. In this alternative embodiment, the GNSS processing system shares the other memory and does not use or share the one or more AP's cache memory. The other memory and the GNSS processing system and the other processing systems can be all on the same IC (e.g. an SOC that also includes the one or more APs and the one or more AP's cache memory). The other processing systems can be one or more modem processor(s) or graphics processor(s) or codec(s) that use the other memory that is separate from the cache memory used by the one or more APs, and this separate, (on-chip) other memory can also be two-port ("dual port") memories that support high bandwidth data access (both reading and writing). A memory controller can, as described herein, arbitrate access to the other memory when both the GNSS processing system and the other processing system(s) are seeking concurrent access to the other memory. In one implementation of this alternative embodiment, the other memory can be processor local storage of one or more of the other processing systems, and these one or more of the other processing systems use their processor local storage exclusively except when the GNSS processing system needs to use that processor local storage.

Figure 4:
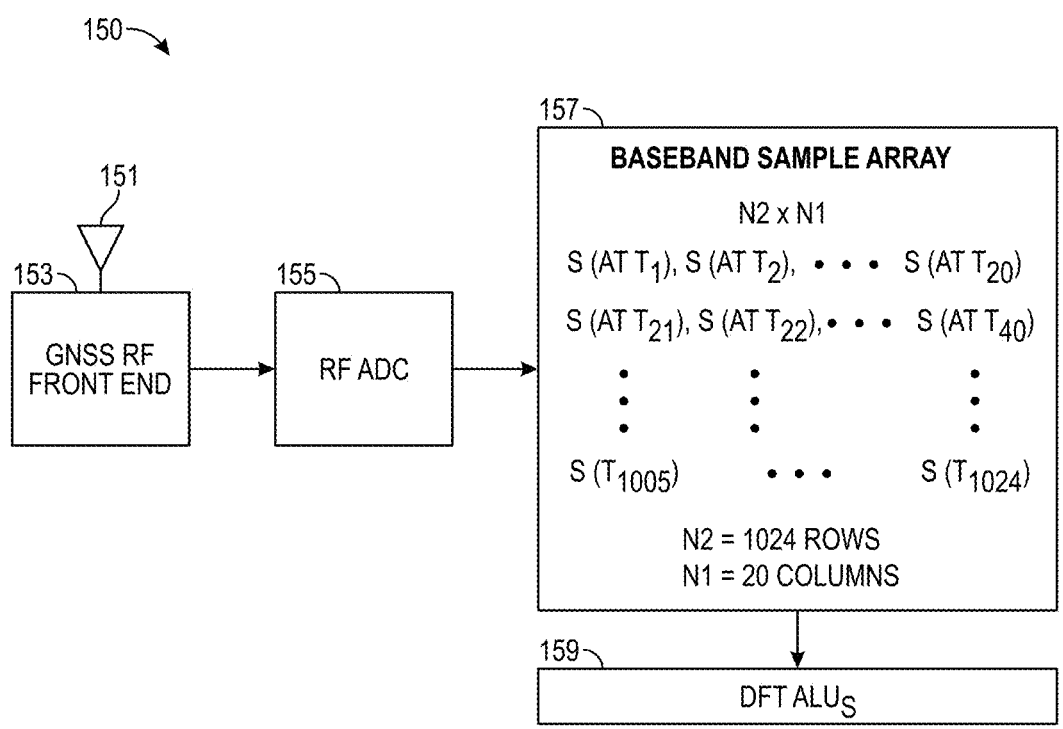
FIG. 4 shows an example of a front-end of a GNSS receiver which digitizes received GNSS signals according to one embodiment.

Another aspect of this disclosure involves the use of an array processing architecture with DFTs to acquire and track GNSS signals from, for example, E5 GNSS SVs. This aspect is shown in FIGS. 4, 5A, 5B, 6, 7, 8, 9A-9D, and 10 and will now be described with reference to those figures. FIG. 4 shows an example of a portion 150 of a GNSS receiver that receives GNSS signals and stores them in a two dimensional (2D) baseband sample array after an analog-to-digital conversion. The GNSS receiver can include a GNSS radiofrequency (RF) front end 153 which receives GNSS signals through an antenna 151 that is coupled to the GNSS RF front-end 153. In one embodiment, the GNSS RF front end 153 receives only L5 WB GNSS signals.

Figure 12:
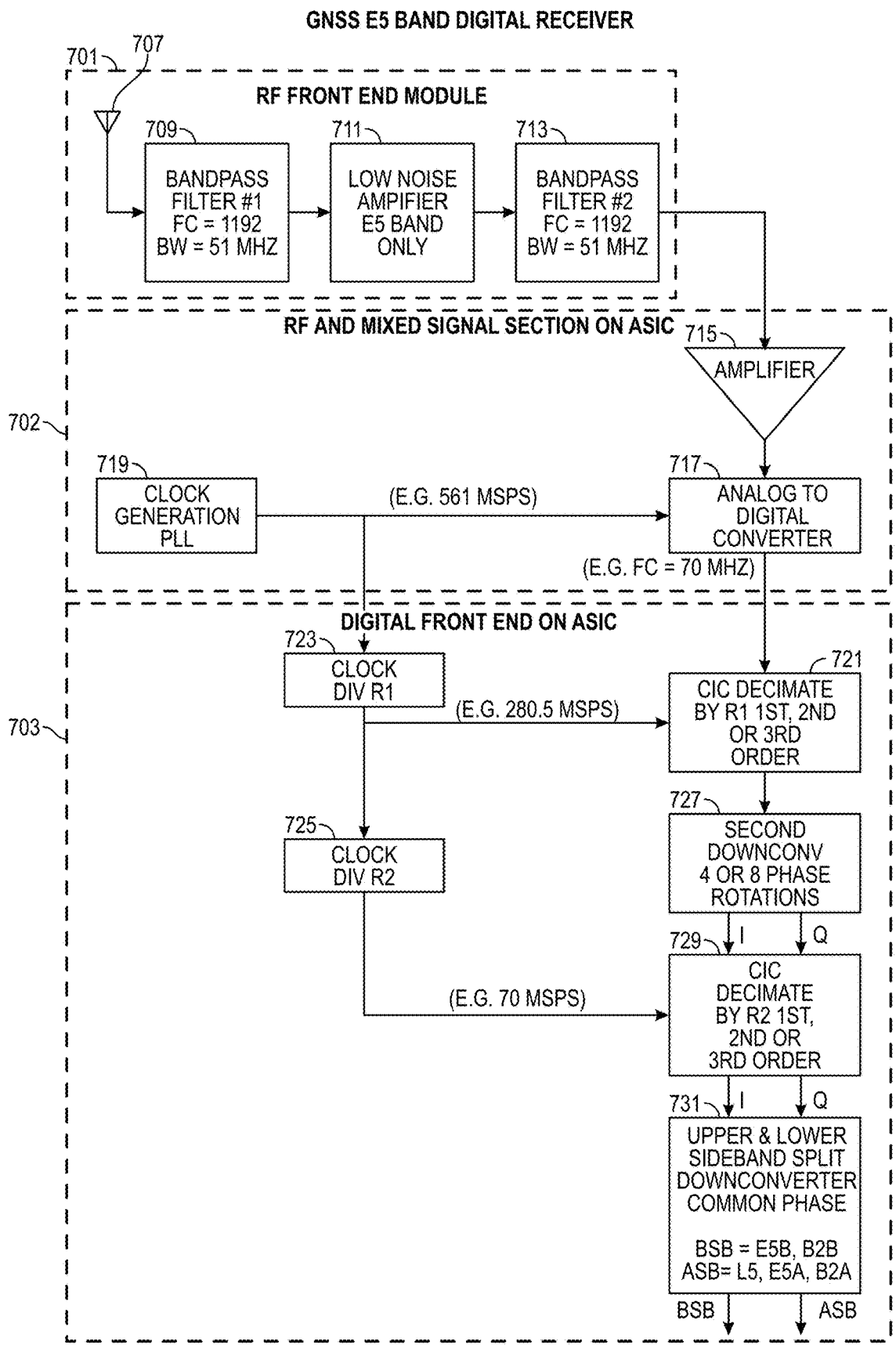
FIG. 12 shows an example, in block diagram form of an L5 WB band only GNSS receiver.

FIG. 12 shows an example of the components and architecture which can be used in one embodiment of the GNSS radio receiver 153. As shown in FIG. 12, the GNSS receiver includes an RF front end module 701, an RF and mixed signal section 702, and a digital front end 703 that can be both integrated in an ASIC (which can be part of the SOC 52); the RF front end module 701 can be separate from the ASIC that contains the digital front end 703 and possibly the RF and mixed signal section 702. The RF front end module 701 can be implemented in an RF integrated circuit (IC) that is coupled to a GNSS antenna 707 that is tuned to receive L5 WB GNSS signals; the GNSS antenna 707 is normally off chip and thus not on the RF IC. The GNSS antenna 707 receives the GNSS signals and provides those signals to a bandpass filter 709 that is configured to pass signals centered at 1192 MHz with a bandpass bandwidth of 51 MHz, and thus GNSS signals between about 1166.5 MHz and 1217.5 MHz pass through the bandpass filter 709. The output of bandpass filter 709 is coupled to LNA 711 to provide the bandpass filtered GNSS signals to LNA 711. In one embodiment, the GNSS antenna 707 is tuned to receive only L5 WB GNSS frequency signals. The RF front end module can include a low noise amplifier (LNA) 711 that is tuned for only the L5 WB frequency band and thus is optimized to receive that L5 WB band and no other LNA to receive other GNSS signals (e.g. L1 GPS) is present in the GNSS receiver shown in FIG. 12. The output of the LNA 711 can be filtered by a band pass filter 713 and the output from that filter 713 is amplified in amplifier 715 on the ASIC that contains the RF and mixed signal section 702 and then an ADC 717 converter generates the digitized GNSS sample data that is then processed to generate, in one embodiment, two streams of digitized GNSS sample data: one for GNSS sideband A and the other for GNSS sideband B. The clock generation phase lock loop 719 and the clock dividers 723 and 725 generate clock signals used by the ADC 717 and by the CIC decimators 721 and 729 to generate digitized GNSS sample data for up to four GNSS signal components (e.g. E5AI, E5AQ, E5BI, and E5BQ). The downconverter 727 separates the I and Q signals, and the sideband split downconverter 731 separates the upper sideband from the lower sideband to provide the GNSS sample data be stored in a baseband sample memory such as baseband sample memory 253 in FIG. 6. In one embodiment of the GNSS receiver shown in FIG. 12, the GNSS receiver has a direct connection from an LNA (e.g. LNA 711) through one or more filters (e.g. bandpass filter 713) and/or one or more gain stages (e.g. amplifier 715) to the analog to digital converter (ADC 717), and this GNSS receiver has no RF mixers, and thus there are no RF mixers in the RF front end module 701 and no RF mixers in the digital front end 703. Moreover, this GNSS receiver has no RF reference local oscillator (e.g., no phase lock loop) and there is no down conversion (in frequency) in the RF signal path prior to the ADC (e.g. ADC 717). In conventional GNSS receivers, an RF local oscillator and one or more RF mixers are used to perform RF down conversion in the RF signal path prior to the ADC.

Referring back to FIG. 4, the output from the GNSS RF front end 153 can be provided to a radio frequency (RF) analog-to-digital converter (ADC) 155 which can generate digitized GNSS sample data from the digitized GNSS signals. The output from the RF ADC 155 can be stored in one embodiment in a baseband sample array, such as the baseband sample array 157 shown in FIG. 4. In one embodiment, the baseband sample array 157 can have N2 or more rows and N1 columns to provide an N2 by N1 array (N2×N1). The number of samples in the array can be configured such that they satisfy the Nyquist criteria for providing a sufficient number of samples. If in one embodiment N1=20 and N2=1024, then there are 20,480 samples over time (e.g., 1 millisecond or slightly more than 1 ms such as 1.05 ms) which can satisfy the Nyquist criteria. The RF ADC 155 is configured to repeatedly, over time, receive and convert analog samples from the GNSS RF front end 153 into digitized GNSS samples that are stored in the array 157. For example, the RF ADC can repeatedly convert samples of GNSS signals and cause them to be stored in the array 157. In one embodiment, the array 157 can be implemented as a circular memory buffer that stores the digitized samples; the circular memory buffer, as is known in the art, can use a write pointer to indicate the next write location into the array and a read pointer to indicate the next read location. The write pointer is used when the ADC 155 provides an output to be stored into the circular buffer, and the read pointer is used when the ALUs read the next set of inputs for processing. The array 157 can provide data to a set of arithmetic logic units (ALUs) 159 that are configured to perform DFTs and inverse DFTs to provide acquisition and, in one embodiment, tracking of GNSS signals, and FIGS. 6, 7, 8, and 9 show an embodiment for the ALUs 159. Prior to describing these ALUs 159, a method for using this array processing architecture will now be provided while referring to FIGS. 5A and 5B. The method shown in FIGS. 5A and 5B can use the array processing architecture shown in FIG. 6.

Figure 5A:
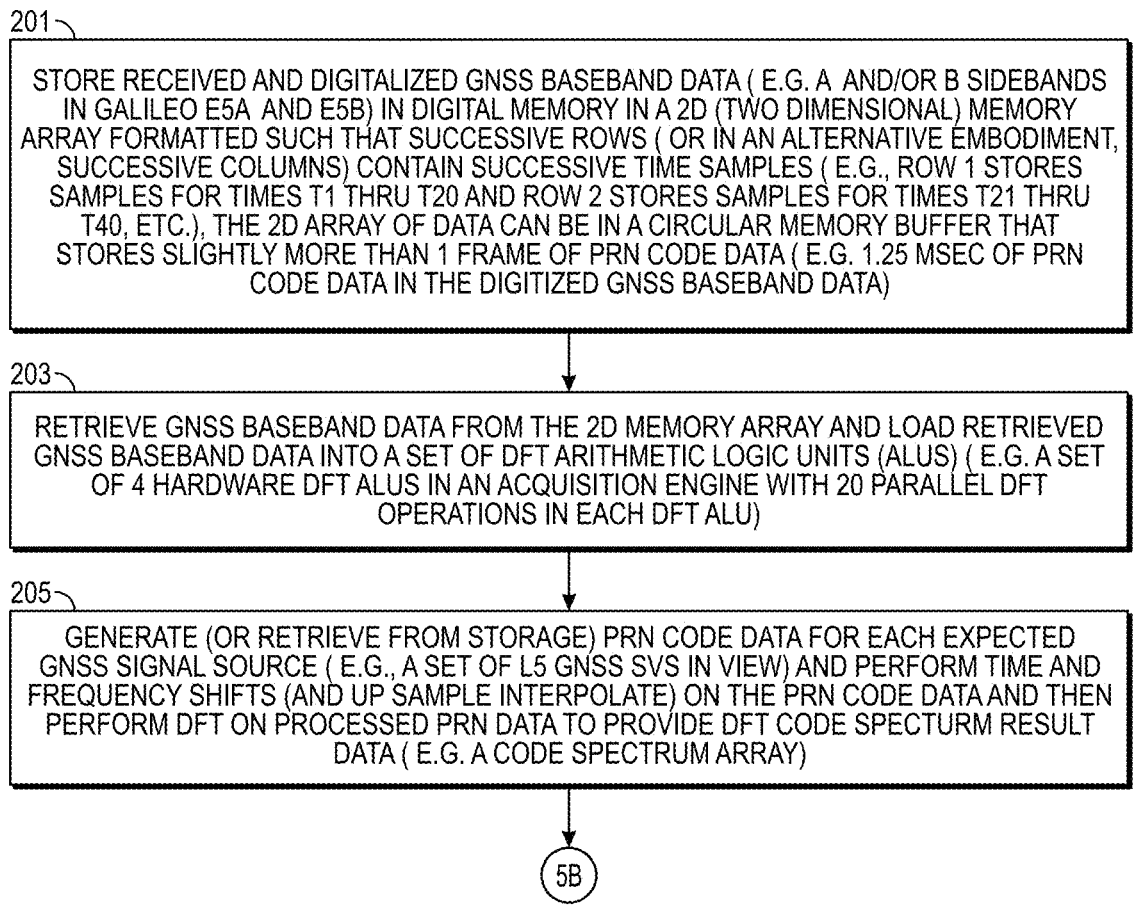
FIGS. 5A and 5B show an example of a method according to one embodiment which uses array processing with DFTs.

In operation 201 shown in FIG. 5A, the digitized GNSS sample data is stored in a two-dimensional memory array which can be a circular buffer (such as the memory 253 in FIG. 6) containing slightly more than one 1-millisecond frame of GNSS signal data such as 1.05 or 1.25 milliseconds of GNSS signal data. One frame of E5 GNSS PRN code data in the GNSS signal is 1.0 milliseconds in length. The additional memory beyond one millisecond can be determined by the time needed to compute the spectrums (via DFTs) of the input data before the data is overwritten. Thus, a faster DFT means a shorter additional time beyond one millisecond is sufficient. In one embodiment, the data in the memory array is formatted such that successive rows contain successive time samples. For example, the first row can contain samples through time periods t1 to t20 and the second row can contain samples through time periods t21 to t40. The array 157 shown in FIG. 4 shows an example of such an array which can, in one embodiment, be stored in the baseband sample memory 253 in FIG. 6. The purpose of these optimizations is to minimize, in one embodiment, the number of clocks needed to perform the correlation process implemented using frequency domain operations: that is, that the inverse DFT of the product of the input sample DFT times the complex conjugate of the code samples adjusted for the carrier frequency produces the correlation of the input samples at all the possible code hypotheses at the carrier frequency hypothesis. This single step as defined here is referred to as the very fast frequency domain correlation (VFFDC) which is a form of frequency domain correlation (FDC). Optimizing the flow of data through these operations reduces the number of clock periods required to perform the correlation. The advantage being that for a given system clock, the number of carrier frequency estimates or hypotheses that can be checked in one millisecond is increased. Also, reducing the clocks means that the system timing requirements can be relaxed, allowing a more reliable chip design, or a design than can operate at a lower voltage to reduce power consumption, or a faster clock to achieve more throughput. Alternatively, a method of performing FDC can be employed that requires more clocks, but then a higher clock frequency is required. The clocks required to perform FDC can be reduced by using a matrix configuration (such as array 157) whereby the output of the sample and code spectrums is ordered so that the clocks required to perform the IDFT of the complex conjugate of the product can be reduced. Then in operation 203, a GNSS processing system, such as the GNSS processing system shown in FIG. 6 or the GNSS processing system 68 shown in FIG. 2, can retrieve the GNSS baseband data from the two-dimensional memory array and load the retrieved GNSS baseband data into a set of DFT ALUs. For example, the set of DFT ALUs can be a set of four ASIC hardware DFT ALUs in an acquisition engine, where each of the DFT ALUs can perform 20 parallel DFT operations in each DFT ALU in response to a single program instruction. In one embodiment, the set of DFT ALUs can be the DFT ALUs 255 shown in FIG. 6. In operation 205, the GNSS processing system can generate PRN code data (or alternatively retrieve from storage such PRN code data) and/or their code spectrums from DFTs for each expected GNSS signal source such as for each set of E5 or L5 or B2 GNSS SVs that are known to be in view. Once the PRN code data is generated it can be shifted in time and shifted by frequency and also up sample interpolated (e.g., padding the last bit in the code by adding a zero) to generate code data that is operated on by a set of DFTs (using for example DFT ALUs 261 in FIG. 6) to generate code spectrum data which can be stored in a code spectrum array (such as the code spectrum memory 263 shown in FIG. 6). In one embodiment, operation 205 can be performed by the code generator 259 which generates the code array data that can then be processed by the DFT ALUs 261 shown in FIG. 6 to generate the code spectrum array (in column order) stored temporarily in the code spectrum memory 263.

It should be noted that the code Doppler on E5-band signals is much faster than the code Doppler in the L1 band. This code Doppler is the carrier Doppler scaled by the ratio of the carrier cycles to code chips. At L1, there are 1540 carrier cycles per code chip. At L5 for example, there are 116 carrier cycles per code chip. Thus, the number of code chips at L5 is 13.28 times faster, meaning that the correlation in the E5-band requires a faster update of the code phase to accommodate consistent correlation over consecutive frames of the PRN codes. This means it is not normally possible to pre calculate this effect. An alternative solution is apply the code Doppler effect on the correlation results prior to adding to the hypothesis memory. The storage address can be shifted to account for the code Doppler, but this leads to some loss as the shift is quantized to the number of hypotheses, usually around 2 hypotheses per code chip. Thus, applying the code Doppler to the generated codes prior to generating the code spectrum is preferable. Another optimization is to up-multiply the carrier Doppler onto the generated codes to match the carrier information in the input samples. In this way, the DFT of the input samples need only be performed once per millisecond, for each sideband and or center band, and the same input spectrum can be used for all the correlations in that millisecond.

Figure 5B:
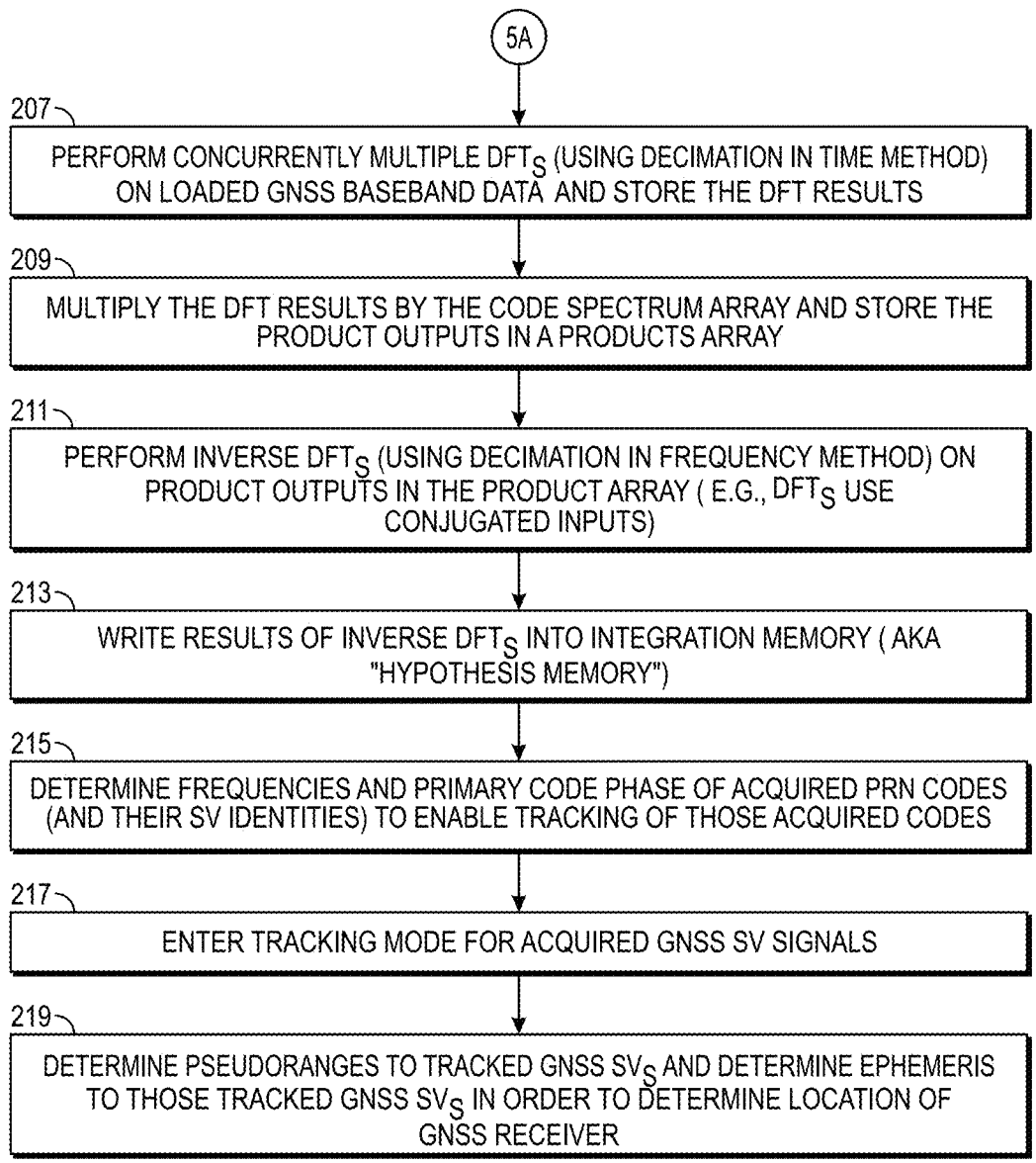
Figure 6:
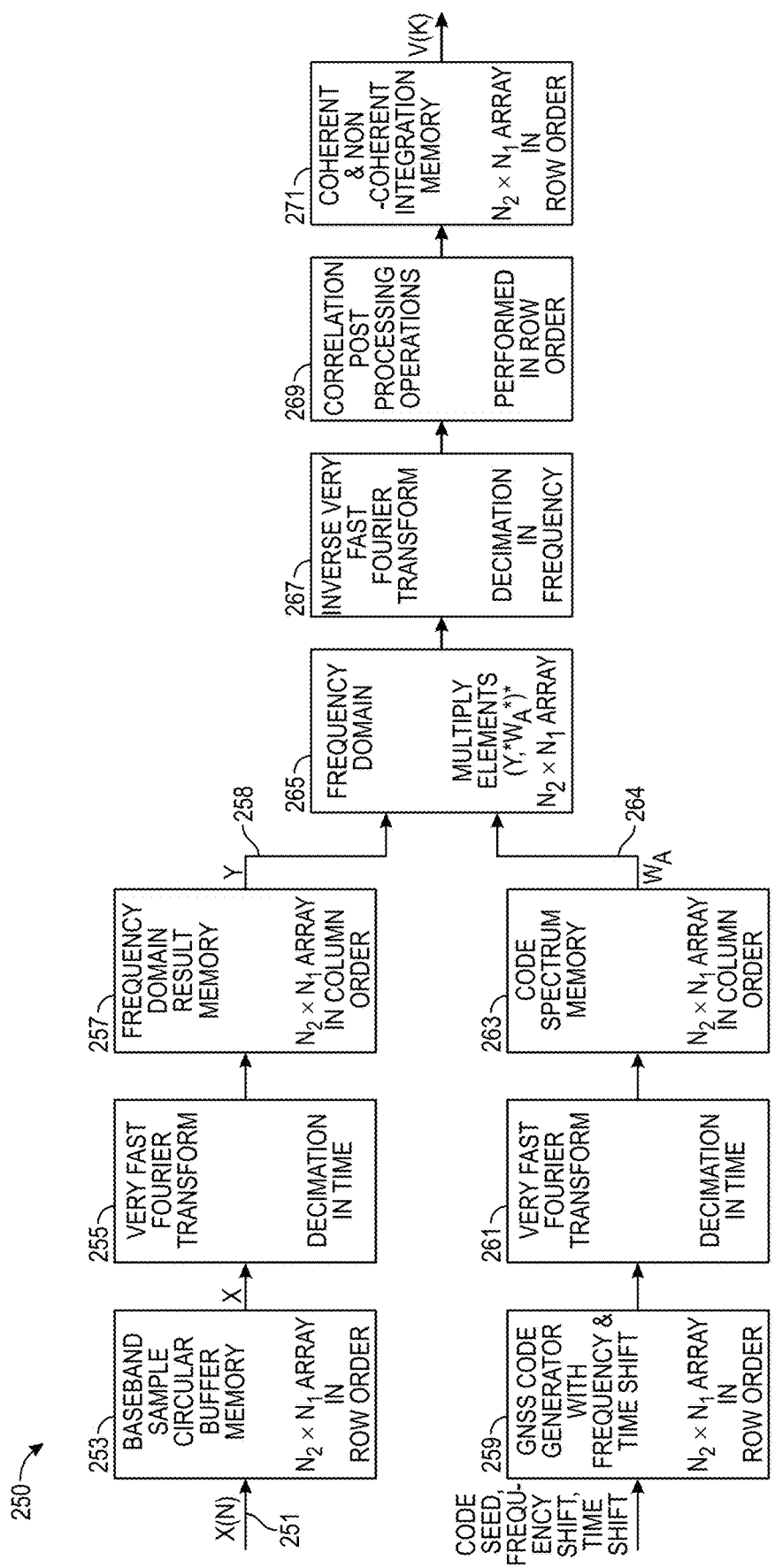
FIG. 6 is a block diagram which illustrates a frequency domain correlator architecture that uses array processing according to one embodiment.

In operation 207 a set of DFT ALUs, such as the DFT ALUs 255 shown in FIG. 6, can perform concurrently multiple DFTs, using a decimation in time method, on the loaded GNSS baseband data and store the results in a frequency domain result memory, such as the memory 257 shown in FIG. 6. In the example shown in FIG. 6, operation 207 performed by the DFT ALUs 255 results in an array which is arranged in a column order stored in the memory 257, and the data in this memory 257 can be retrieved to provide an output 258 shown in FIG. 6. The output 258 in operation 209 can be multiplied by the code spectrum stored in the code spectrum memory such as the code spectrum memory 263; in the example shown in FIG. 6, the multiplier 265 performs this multiplication of operation 209 and produces a product array of data. Then in operation 211 a set of inverse DFTs can be performed using a decimation in frequency method on the data in the product array, and these DFTs can use conjugated inputs to produce the inverse DFTs. In one embodiment, the inverse DFT ALUs 267 shown in FIG. 6 can perform operation 211, and the output from the inverse DFT ALUs 267 can be processed in a correlation post processing operator 269 shown in FIG. 6 and then stored in operation 213 in a memory which can be referred to as an integration memory (such as memory 271 shown in FIG. 6) which in one embodiment can store hypothesis data during the acquisition phase. In one embodiment, this integration memory can be in a portion of cache memory (e.g., cache memory 70) allocated for use by the acquisition engine of the GNSS processing system that includes the array correlator in FIG. 6. The GNSS processing system can then perform operation 215 by determining frequencies of acquired PRN codes which identify the GNSS SVs that have transmitted the acquired PRN codes. Once it is confirmed that GNSS signals have been acquired from a particular GNSS SV then operation 217 can be performed for each GNSS SV's signals that has been acquired by entering the tracking mode for those acquired GNSS signals. In one embodiment, tracking mode can use conventional correlators or other techniques such as DFTs to determine pseudoranges to acquired and tracked GNSS SVs. This is shown as operation 219 in FIG. 5B. The GNSS processing system can then use the determined pseudoranges to derive a location of the GNSS receiver by using the pseudoranges with ephemeris data to the tracked GNSS SVs to derive the location (e.g., a latitude and a longitude of the GNSS receiver) as is known in the art.

Figure 7:
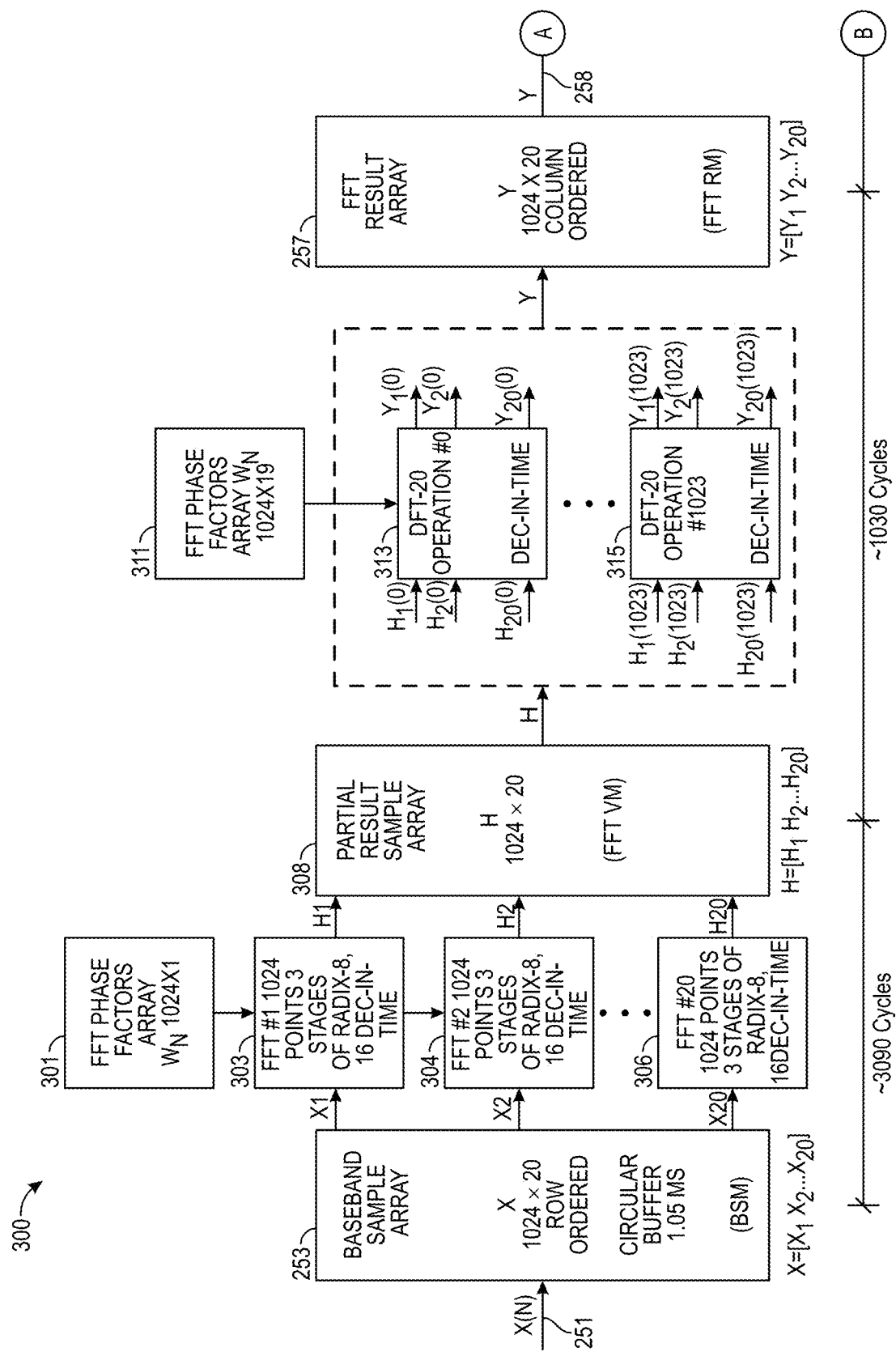
FIG. 7 shows, in block diagram form, an example of processing components to perform array processing according to one embodiment.

FIG. 6 shows an example of a fast frequency domain correlator architecture which can perform the method shown in FIGS. 5A and 5B. The memory 253 can be a circular buffer memory which stores N2 by N1 samples of digitized GNSS signals. In one embodiment, memory 253 can be two circular memory buffers storing 1.05 or 1.25 ms of GNSS sample data; one of these circular memory buffers can store the GNSS sideband A sample data and the other can store the GNSS sideband B sample data. The two different sidebands can be separated and then store using the following method. To get the upper sideband (e.g. E5B or B2B), the GNSS sample data is digitally carrier shifted down (for the sampler centered at 1191.795 MHz) by for example 15.345 MHz (and hence will now represent information in the sample data originally at 1207.14 MHz) and then the shifted sample data is filtered by a low pass filter to capture +/−10.23 MHz of bandwidth of data and then the filtered sample data is decimated from a wideband sample to a lower sample rate for processing in the pipeline shown in FIG. 6. To get the lower sideband (e.g., E5A or B2A or L5 or QZSS), the GNSS sample data is digitally carrier shifted up (for the samples centered at 1191.795 MHz) by for example 15.345 MHz (and hence will now represent information in the sample data originally at 1176.45 MHz) and then the shifted data is filtered by a low pass filter (LPF) to capture +/−10.23 Hz of bandwidth of data and then the filtered data is decimated from a wideband sample to a lower sample rate for processing in the pipeline shown in FIG. 6. The DFT ALUs 255 retrieve data from the memory 253 and perform a set of DFTs in the DFT ALUs 255; FIG. 7 shows an example of the components within the DFT ALUs 255. In the example shown in FIG. 7, there are two stages of DFTs. The first stage uses N1 DTFs, each of which operates on 1024 points based upon inputs which include a phase factor inputs from the array 301 and the input of the data from the memory 253 which can be similar to the data shown in the array 157 in FIG. 4. The input to this array is the input 251 which can be provided by, for example, an analog-to-digital converter such as the RF ADC 155 shown in FIG. 4. FIG. 7 shows a set of 20 DFT operations three of which are shown as operations 303, 304, and 306. The result of these operations can be stored in a partial result sample array 308 which in turn provides an output that is used as an input to the second stage in which there are N2 DFTs; these N2 DFT operations include the two operations 313 and 315 shown in FIG. 7. One of the inputs to these N2 DFTs is a set of phase factors from an array 311. The output from these DFTs operations in the second stage shown in FIG. 7 is stored in an FFT result array 257, and the data is stored in a column order which is reversed from the row order in which the data is stored in the memory 253. This reversal allows for the data to be prepared for the inverse DFTs operations, such as those operations performed by the inverse DFT ALUs 267 without having to transpose or otherwise reformat the data.

Figure 8:
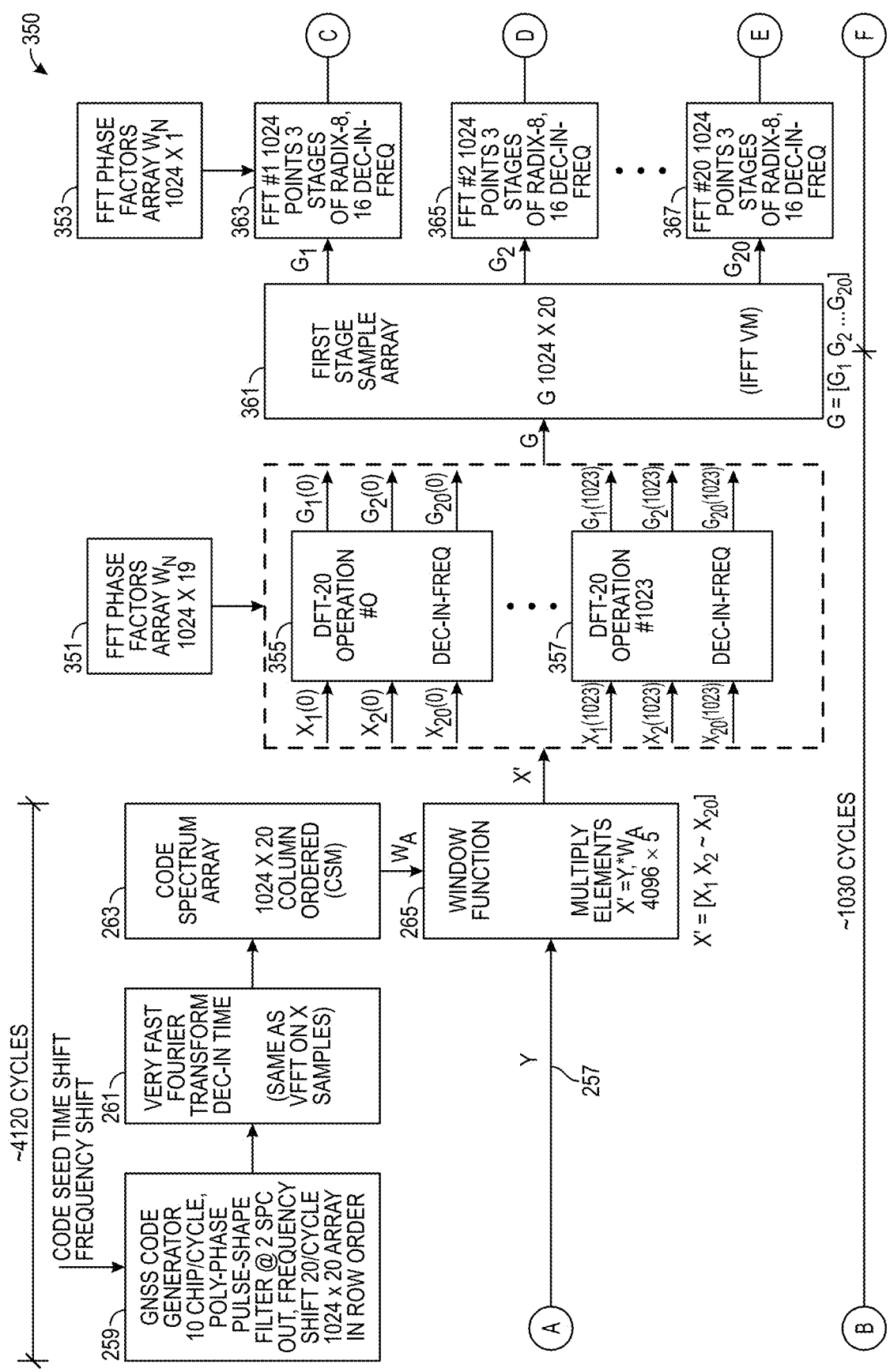
FIG. 8 shows, in block diagram form, an example of further processing components to perform array processing according to one embodiment.
Figure 8:
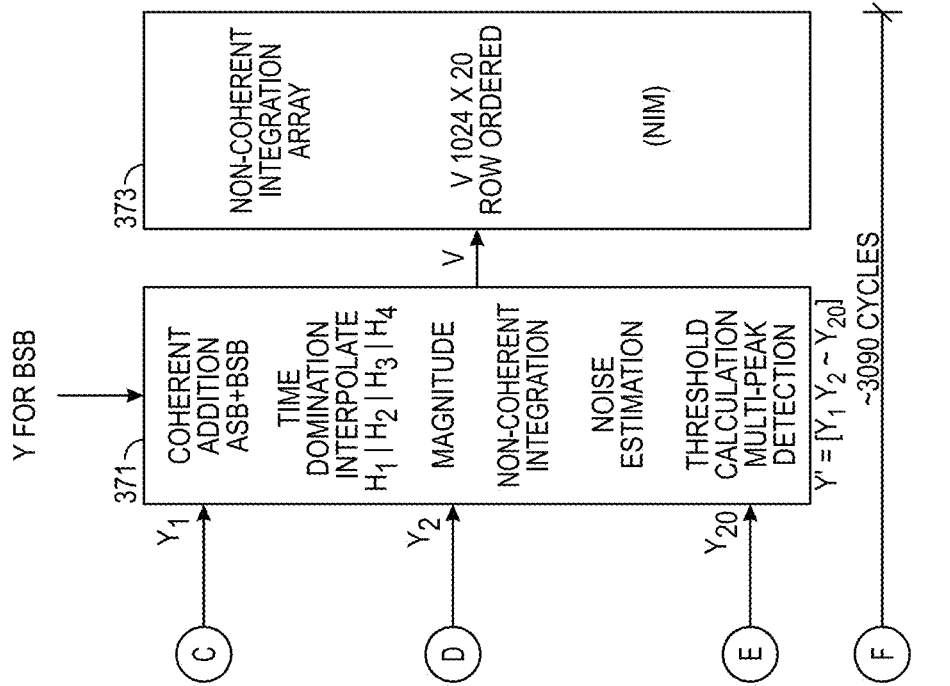

FIG. 8 shows an embodiment of the inverse DFT ALUs 267. In the example shown in FIG. 8, the inverse DFT ALUs can include two stages of DFT operations that receive data from the product array from the multiplier 265. The first stage can include N2 DFT operations which use data from the product array generated by multiplier 265 (with conjugated inputs) and also use phase factors from a phase factor array 351 to generate outputs which can be stored in a first stage sample array 361. Each of the N2 DFT operations in FIG. 8 is performed on 20 points of data. FIG. 8 shows two of the DFT operations 355 and 357 of the total of N2 DFT operations. The second stage of DFT operations uses, in the example shown in FIG. 8, N1 DFT operations each of which operates on N2 points; FIG. 8 shows three of these operations 363, 365, and 367, each of which receive a column of data from the first stage sample array 361. These DFT operations in the second stage also receive a phase factor input from the phase factor array 353, and these DFT operations in the second stage produce 20 outputs that can be post processed in post processor 371 shown in FIG. 8. The result of the post processing can be stored in the integration array 373 which can be the same as the integration memory 271 shown in FIG. 6. The phase factors from arrays 301 and 311 (in FIG. 7) and arrays 351 and 353 (in FIG. 8) specify the amount of phase shift required for each radix—20/16/8 DFT on each stage of the FFT. These phase shift amounts are used for the decomposition, in one embodiment, of a 20480 point DFT into multiple stages of radix—20/16/8 DFTs, which is the basis of an FFT implementation of a DFT. The phase factors are also referred to as "twiddle factors" of an FFT.

Figure 9A:
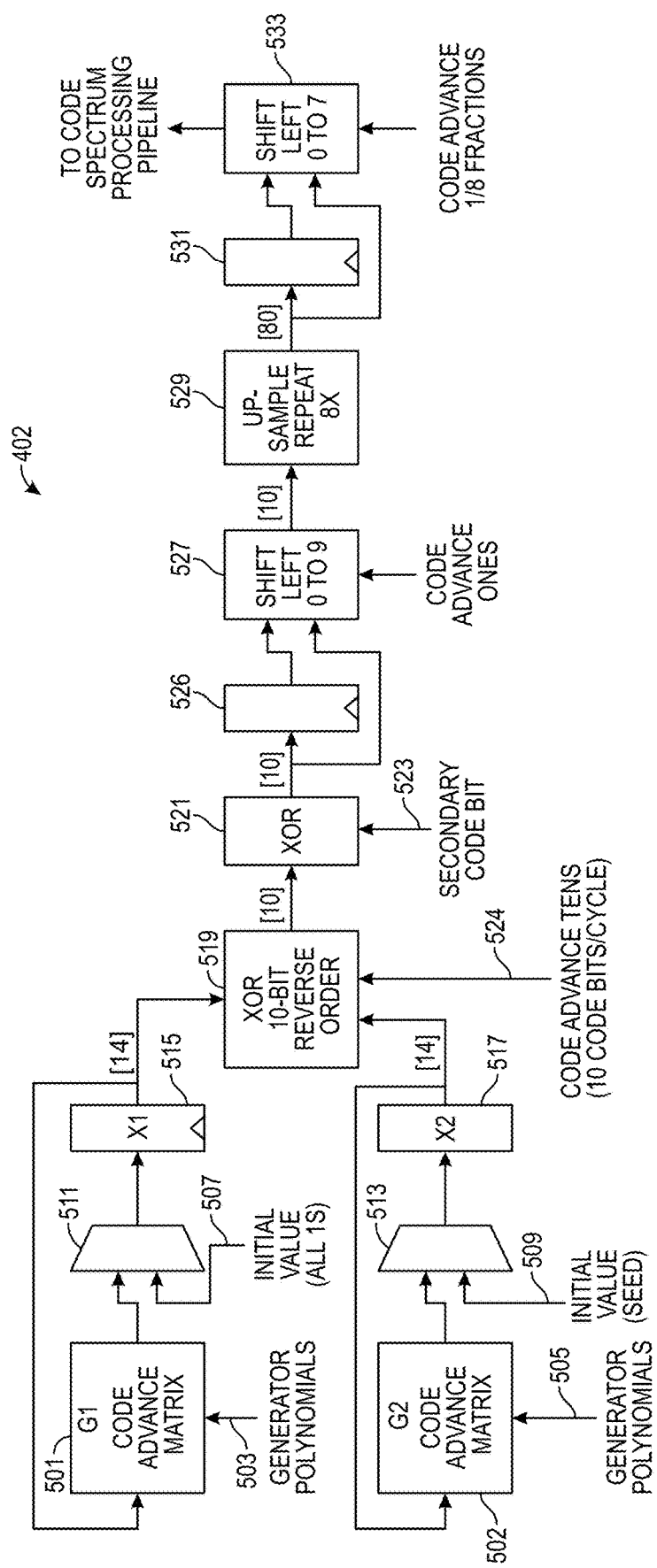
FIGS. 9A, 9B, 9C and 9D show an example of processing components and a method that can be used to generate a PRN code spectrum for use in the array processing architecture shown in FIGS. 6, 7, and 8.
Figure 9B:
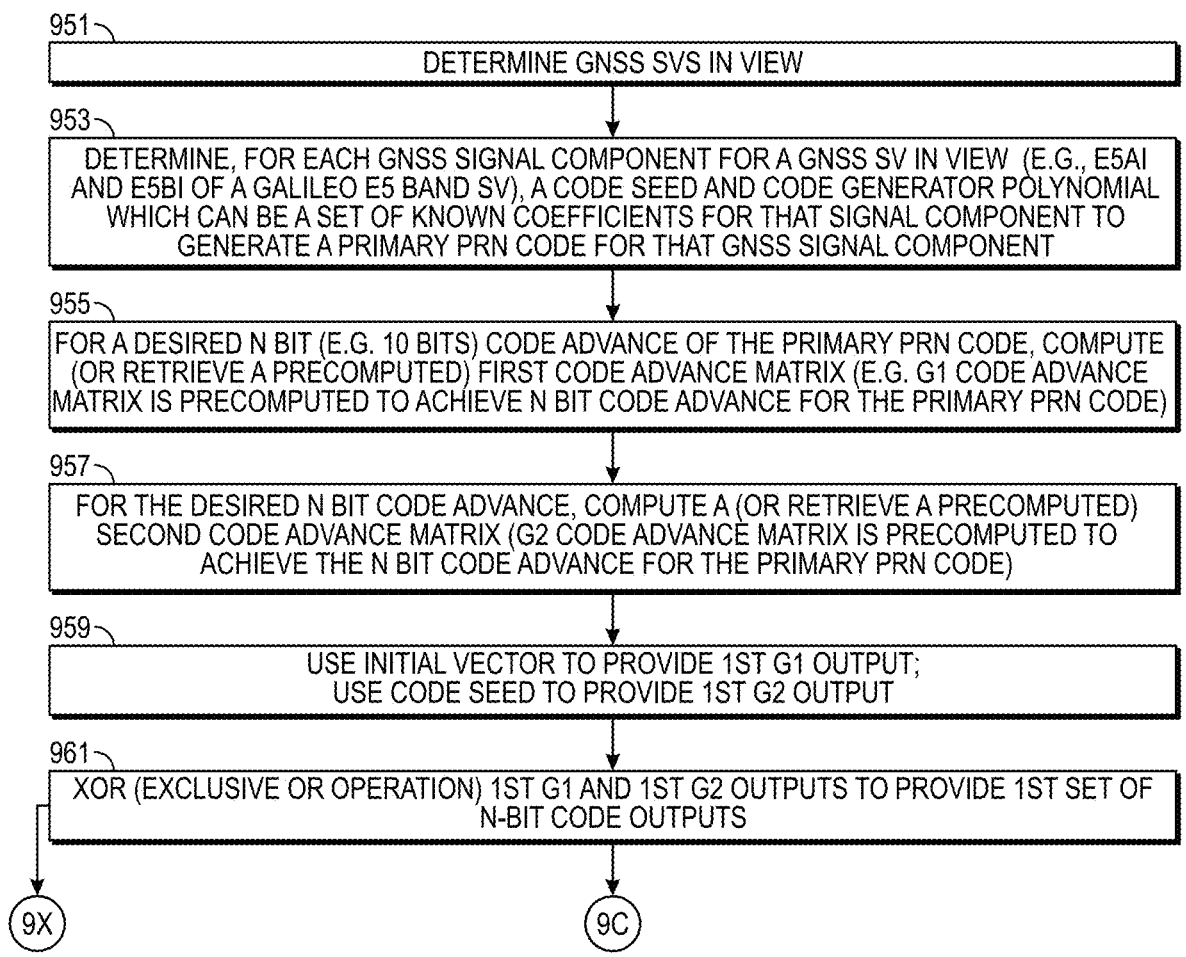
Figure 9C:
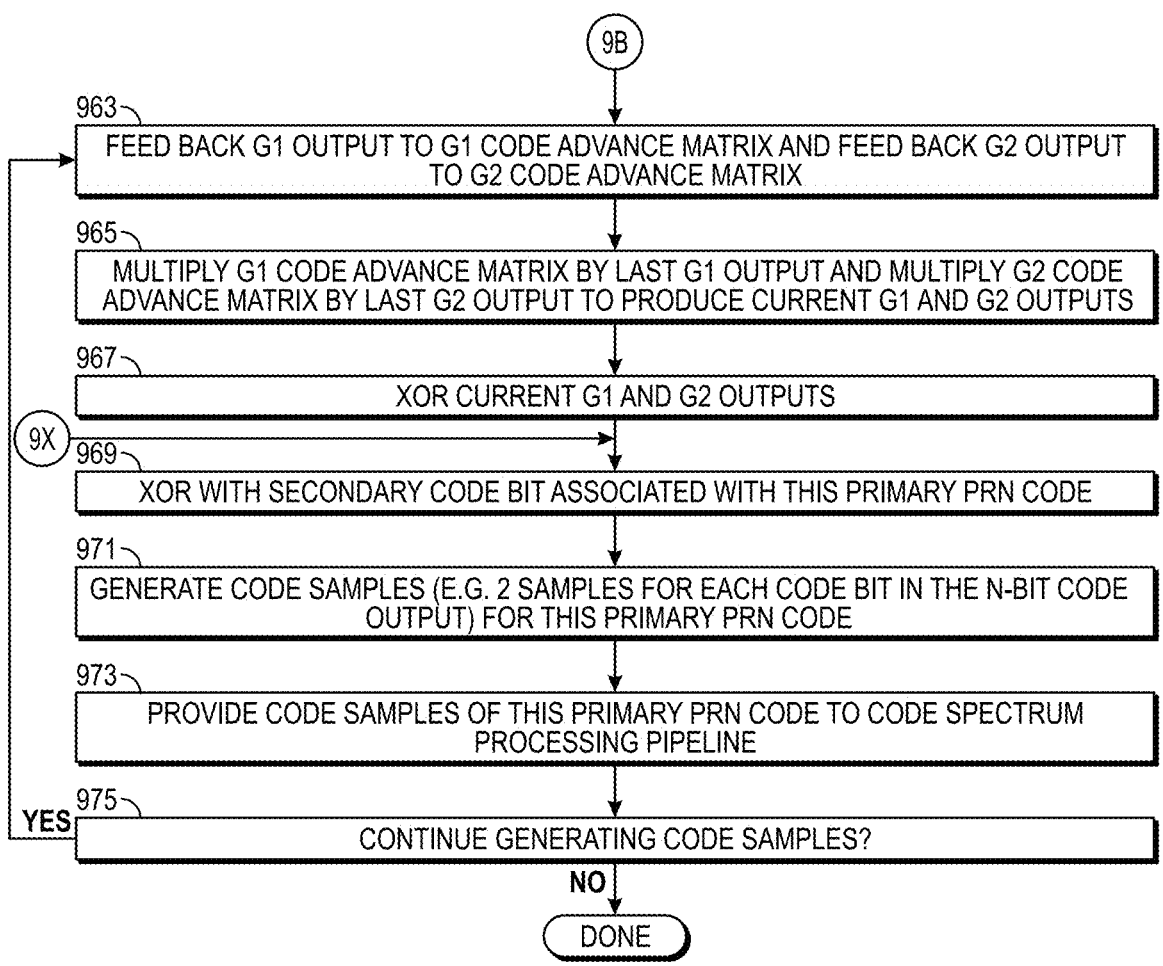
Figure 9D:
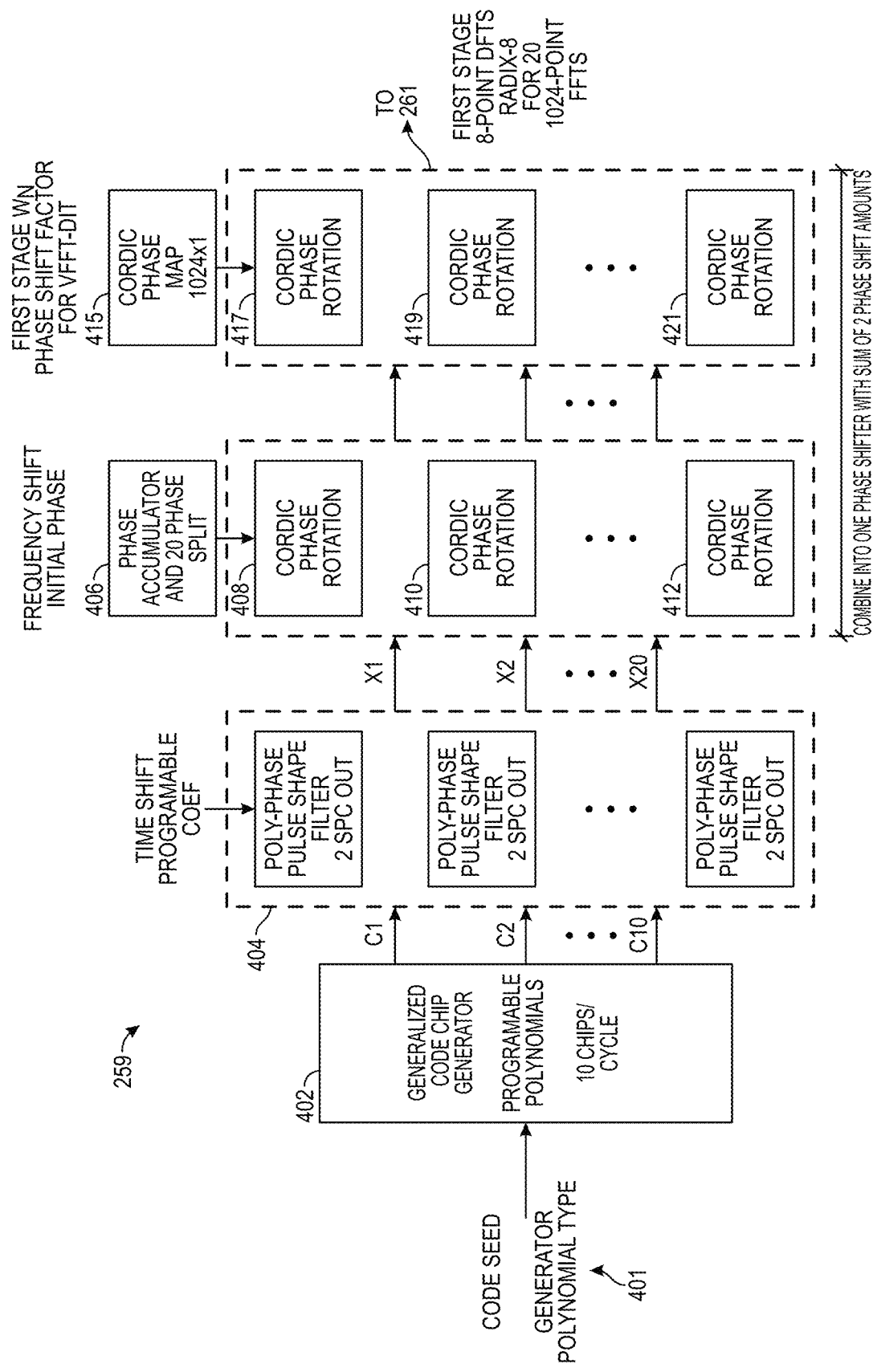

FIGS. 9A, 9B, 9C, and 9D show an example of a spectrum code generator (and portions thereof) which can generate the spectrum code which is stored in code spectrum memory, such as code spectrum memory 263 in FIGS. 6 and 8. In one embodiment, the code generator 259 and the DFT ALUs 261 shown in FIG. 9D can generate PRN codes and/or their code spectrum from DFTs for only the GNSS SVs that are in view on demand and on the fly while the GNSS processing system is acquiring and tracking these GNSS SVs without storing (beyond momentary storage for a few clock cycles in registers and buffers in the processing pipeline) the generated PRN codes and/or their code spectrum from DFTs; this can improve memory usage by the GNSS processing system by reducing the amount of memory required to operate the GNSS processing system. In an alternative embodiment, the spectrum code generator can generate the PRN codes and/or their code spectrum from DFTs for only the GNSS SVs that are in view on demand but store those codes during the acquisition and tracking phases until one or more locations, such as one or more latitude and longitude values, are determined. Thereafter, the PRN codes and/or their code spectrum from DFTs can be deleted from storage to allow other uses of the storage. In one embodiment, as shown in FIG. 9D the code spectrum generator 259 can use a polynomial type generator 402 (shown in FIG. 9A) to generate the PRN codes from a code seed 401 for each GNSS SV that is in view. Then a set of programmable coefficients can be used to time shift the generated PRN codes in the time shifter 404 (based upon those coefficients) and then the generated and time shifted PRN codes can then be frequency shifted by a frequency shifter that can use CORDIC phase rotations, 3 of which are shown as CORDIC phase rotation 408, 410, and 412. The phase rotations can be based on a programmable phase split input 406. Then a further set of CORDIC phase rotations, including phase rotations 417, 419, and 421, can produce an output that is then processed with DFT operations (performed by DFT ALUs 261 in FIG. 6 in one embodiment) that are the same as the DFT operations performed on the digitized GNSS sample data. The result of the DFT operations (performed by DFT ALUs 261 in FIG. 6 in one embodiment) is then stored in one embodiment in the code spectrum memory, such as code spectrum memory 263 shown in FIG. 6.

One embodiment of the polynomial type generator 402 is shown in FIG. 9A. This embodiment can be used to perform the method shown in FIGS. 9B and 9C. This generator 402 includes two computed (or precomputed) code advance matrices 501 and 502 retrieved, for example, from a lookup table if precomputed. For example, for each of the four components of the Galileo E5A and E5B signals, there is a corresponding code seed and primary code polynomial data; this information is well known in the art and published in the ICD of the source of the GNSS's constellation. The generator 402 can generate more than 2 bits of primary PRN code bits in a single clock cycle by using the computed code advance matrices 501 and 502; see operations 955 and 957 in FIG. 9B. As shown in FIG. 9A, the computed code advance matrix 501 includes a first input to receive generator polynomials 503, which can be the primary code polynomial data for a given GNSS constellation and a given GNSS signal component, and includes a second input to receive a value fed back from register 515 and includes an output that is a first input to multiplexer (MUX) 511. A second input 507 to the MUX 511 is a constant initial value of all 1's (14 bits, each set to the value of 1 in one embodiment); this second input 507 is used only on the initial output from register 515, and thereafter the MUX 511 selects the first input (to MUX 511) as the output from the MUX 511, and that output is stored in register 515 (which can be a clocked register) so that on the next clock cycle, the last output from the MUX 511 is fed back to the second input of the code advance matrix 501 and is also provided as a first input to XOR logic gate 519. The output from MUX 511 that is fed back to the second input (of code advance matrix 501) is multiplied by the constant values (derived from the generator polynomials 503) in the code advance matrix 501 to generate the next output from the code advance matrix 501, and that next output passes through MUX 511 and is stored in register 515; this process of feeding back the output from register 515 and performing a matrix multiplication of that output and the constant values in the code advance matrix 501 is repeated on each clock cycle (or alternatively in a set of a few clock cycles) to generate N bits of primary PRN codes, in each clock cycle, for the given GNSS constellation (e.g. Galileo E5) and the given GNSS signal component (e.g. E5AI). In one embodiment, N can be greater than 2, such 10 or 14 bits. Thus, the generator 402 can rapidly generate many (e.g. N) bits of primary GNSS PRN codes in one clock cycle or a few clock cycles. In the example shown in FIG. 9A, 14 bits are generated at the output from register 515, but only the last 10 bits are used by XOR logic gate 519 (which performs an exclusive OR logic operation). The code advance matrix 502 is used in a manner that is similar to the use of code advance matrix 501. The code advance matrix 501 and the code advance matrix 502 are (in one embodiment) precomputed to, for a given GNSS constellation and GNSS signal component and a given seed for a GNSS SV in the given constellation, generate (at the output of XOR logic gate 519) the next N bits (an "advance" of N bits) of the primary GNSS PRN code for that GNSS signal component from that GNSS SV based upon the values in the matrix and the prior output from the registers 515 and 517. The Matlab appendix includes an example, in the well known form of Matlab code, of a code generator 402 that can create and use these precomputed code advance matrices. In one embodiment, the precomputed code advance matrices can be precomputed (or computed at run time) by multiplying an original matrix containing the primary polynomial data N times to provide N bits of advance in the PRN code for each clock cycle. For example, if an advance of N=3 is desired, then the original matrix ("A") is multiplied 3 times (A*A*A) to provide a code advance matrix for N=3 bits of output of the next 3 bits in the PRN code. As shown in FIG. 9A, the computed code advance matrix 502 includes a first input to receive generator polynomials 505, which can be primary code polynomial data for a given GNSS constellation and a given GNSS signal component, and includes a second input to receive a value fed back from register 517 and includes an output that is a first input to the MUX 513. A second input 509 to the MUX 513 is a seed value for a corresponding GNSS SV in the given GNSS constellation. This seed value is used only on the initial output from multiplexer 513 and from the register 517 and thereafter MUX 513 selects the first input (to MUX 513) as the output of the MUX 513, and that output is stored in register 517 (which can be a clocked register) so that on the next clock cycle, the last output from MUX 513 is fed back to the second input of code advance matrix 502 and is also provided as a second input to the XOR logic gate 519. The output from MUX 513 that is fed back to the second input (of code advance matrix 502) is multiplied (in a matrix multiplication operation) by the precomputed values in the code advance matrix 502 to generate the next output from that code advance matrix 502, and that next output passes through MUX 513 and is stored in register 517. The outputs from registers 515 and 517, on each clock cycle, are exclusively OR'd by XOR logic gate 519 to give 10 new bits (i.e. 10 bit advance of the PRN code); the 14 bit output is truncated to give the 10 new bits in the current clock cycle. Code advance tens 524 can select the truncation. Then, XOR logic gate 521 performs an exclusive OR operation on the output from XOR logic gate 519 and the secondary code bit 523 of the given GNSS signal component from a given GNSS SV to "wipe" or "remove" the secondary code from the code generated at the output of XOR logic gate 519. The shift left logic 527, the up sample logic block 529 and the shift left logic 533, along with registers 526 and 531, further process the generated primary PRN code to provide code samples that can be "aligned" with received GNSS samples at a particular sample rate so that the sample rates match and can be aligned. The shift logic can be used to shift or move to different parts of the PRN code. The output from shift left logic 533 is provided to time shifter 404 in the code spectrum processing pipeline shown in FIG. 9D.

FIGS. 9B and 9C show a method for operating the code generator 402. In operation 951, a GNSS processing system determines the GNSS SVs in view from, for example, conventional assistance data such as a recently downloaded version of a GNSS satellite almanac or from ephemeris data in the form of equations. In one embodiment, the GNSS SVs in view can be limited to only L5 WB GNSS SVs such as one or more of the Galileo E5 GNSS constellation, the US L5 GNSS constellation, and the Chinese Beidou/Compass B2 constellation. Then in operation 953, the GNSS processing system can determine, for each GNSS signal component from a GNSS SV in view (e.g., E5AI and E5BI of a Galileo E5 GNSS SV) a code seed and a code generator polynomial which can be a set of known coefficients for that signal component in order to generate a primary PRN code for that GNSS signal component. Then in operation 955, a G1 code advance matrix is computed (or was precomputed and is retrieved from a lookup table in non-volatile memory), and in operation 957, a G2 code advance matrix is computed (or was precomputed and is retrieved from a lookup table in non-volatile memory). In one embodiment, each of the G1 and G2 code advance matrices are precomputed by multiplying an original matrix of primary code polynomial data N times, where N represents a desired number of code bits to generate. For example, if the amount of code "advance" is 10 bits of primary PRN code data then the original matrix is multiplied (by itself) ten times to create a 10 bit code advance matrix. The amount of code "advance" is the number of bits, in one embodiment, of primary PRN code data that is generated in one clock cycle, so if N=10, then the code generator generates 10 new bits of the primary PRN code data for each clock cycle. After the G1 and G2 code advance matrices are retrieved (if precomputed) or computed, then the method can continue in operation 959. In operation 959, the system uses the initial vector (all 1's) to provide the first G1 output (so the first G1 output is the initial vector of all 1's) and the system uses the code seed to provide the first G2 output (so the first G2 output is the code seed); in operation 961, the system performs an exclusive OR operation on the first G1 output and the first G2 output to provide the first set of N-bit PRN code data. After operation 961, the first set of N-bit PRN code data is processed in operations 969, 971, and 973 (as processing proceeds via 9X from operation 961 to operation 969 as shown in FIGS. 9B and 9C) and all subsequent sets of N-bit PRN code advances are generated in the loop of operations 963, 965, 967, 969, 971, 973 and 975. In operation 963, the G1 output (e.g. from register 515 in FIG. 9A) is fed back to the G1 code advance matrix and the G2 output (e.g. from register 517 in FIG. 9A) is fed back to the G2 code advance matrix. Then in operation 965, the last G1 output (e.g. from register 515) and the G1 code advance matrix are multiplied to generate the next G1 output and the last G2 output (e.g. from register 517) and the G2 code advance matrix are multiplied to generate the next G2 output. In operation 967, the G1 and G2 outputs are exclusively OR'd (e.g. in XOR logic gate 519 in FIG. 9A). In operation 969, the code output from XOR logic gate 519 is exclusively OR'd (e.g. in XOR logic gate 521) with the expected secondary code bit (e.g. secondary code bit 523) in order to wipe or remove the secondary code from the code output. Then in operations 971 and 973 code samples are generated and provided to the remainder code spectrum processing pipeline. These operations prepare the code samples so that their sample rate can match the sample rate of received GNSS sample data. Operation 975 determines whether to continue generating the GNSS primary PRN code data. In one embodiment, when tracking of all needed GNSS signals is completed, then generation of PRN code data can be terminated, but if such tracking is needed then the process continues in the loop of operations 963-975.

Figure 10:
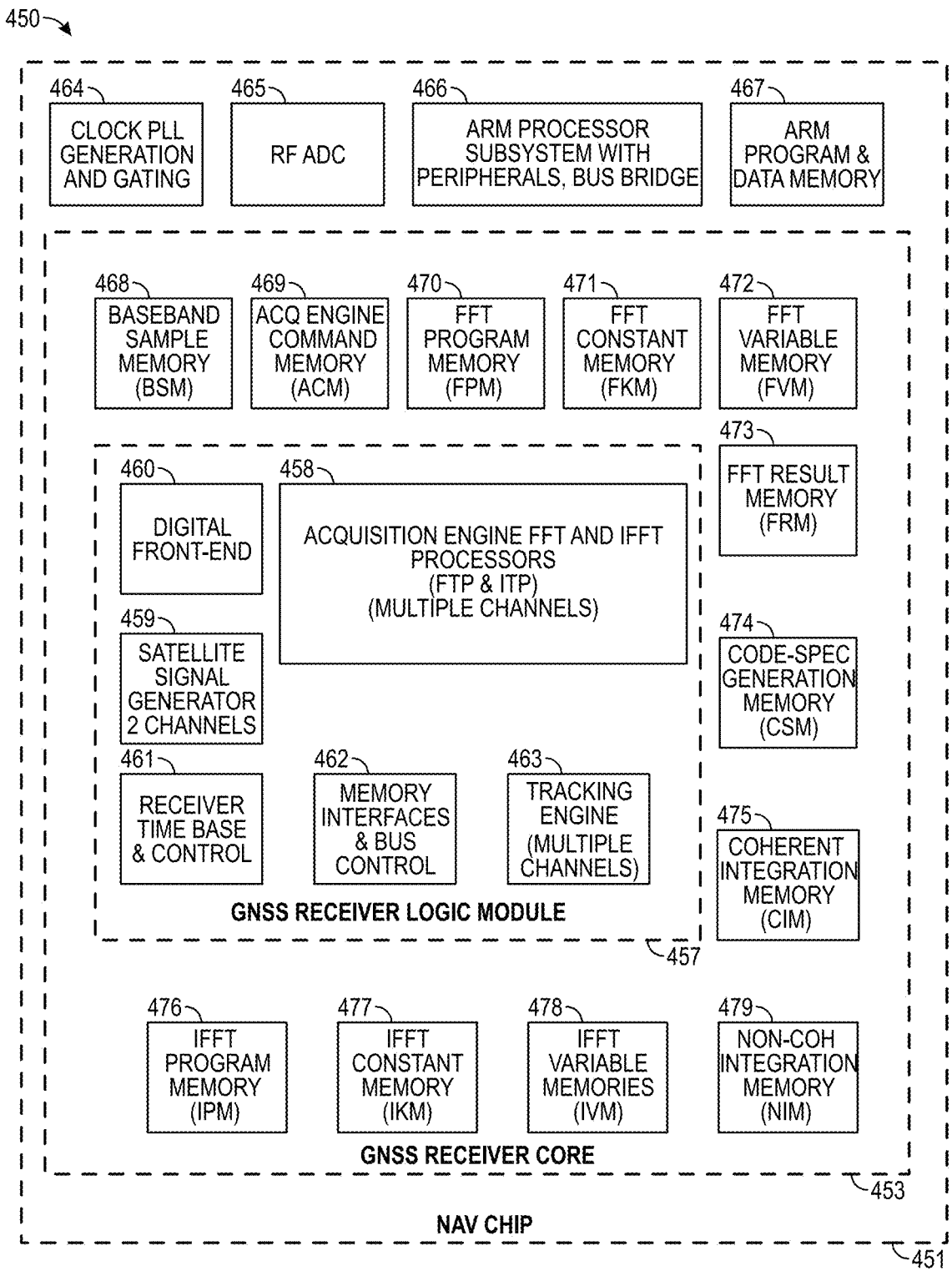
FIG. 10 shows an example of components which can be used in one embodiment of a GNSS receiver.

FIG. 10 shows an example of a GNSS processing system which can be used to perform the methods described herein or which can be used implement the systems described herein. The GNSS processing system 450 can be implemented on its own integrated circuit such as a navigation chip 451 or be part of a system on a chip architecture that is part of a larger system such as a smartphone or tablet computer etc. The GNSS processing system 450 can include processing logic such as an ARM processor 466 which uses ARM program and data memory 467 to control the operations of the GNSS processing system 450. Further, the GNSS processing system 450 can include an RF ADC 465 that can be similar to the RF ADC 155 shown in FIG. 4. The GNSS processing system 450 can also include clock phase locked loop generation and gating circuitry 464 to generate clocks using phase lock loops and for other operations in the GNSS processing system 450. The GNSS processing system 450 can include both logic modules and memory in order to perform the acquisition and tracking processes described herein. For example, logic module 457 can include an acquisition engine 458 which can include a set of DFT and inverse DFT processors or ALUs to perform the DFT operations described herein. In addition, the logic module 457 can include a digital front end 460 which can be in all digital E5 GNSS front-end providing processing both before and after the RF ADC 465. The logic module 457 can also include a plurality of satellite signal generators such as the satellite signal generator 459 which generates GNSS PRN codes for GNSS satellites (SVs) in view based upon assistance data that can be received, for example, from a cellular data communication network. The logic module 457 can also include a timebase and control module 461 and a memory interface and bus control module 462 to allow the GNSS processing system to couple to one or more application processors. The logic module 457 can be coupled to one or more memories to store various data in various data structures including, for example the baseband sample memory 468, the acquisition engine command memory 469, the FFT program memory 470, the FFT constant memory 471, the FFT variable memory 472, the FFT result memory 473, code spectrum generation memory 474, the coherent integration memory 475, the IFFT memory 476, the IFFT memory 477, the IFFT variable memories 478, and the non-coherent integration memory 479. These memories can be used with the logic module 457 to perform the operations described herein. It will be appreciated that alternative architectures may use different processors and memory arrangements than shown in FIG. 10.

In another embodiment, the clocks required to perform the DFT operation is reduced by performing multiple kernel operations in parallel. For example if the sample rate is chosen to be $2^N$, for example, N=14, then the DFT can be implemented with a radix 4 kernal that has 7 stages. 4 samples are processed in place each step of each stage. Assuming only dual port memory, with one read and write per cycles, the clocks required is 4*4096 per stage and with 7 stages is 114,688 clocks. The VFFDC shown in FIG. 6 can achieve a DFT in around 4096 clocks. To achieve similar performance, 32 kernals could be implemented in parallel so that a stage could complete in 512 clocks, and 7 stages would be complete after 3584 clocks. However, this approach would require the ability to reach 32 input sample in a parallel. Thus, the advantage of the VFFDC is that it can achieve a low clock rate with only reading 10 memories in parallel. Another embodiment is to use a four times higher clock rate, and then only require 8 kernals in parallel, which reduces the parallel memory reading requirement to 8 inputs/outputs per clock. The advantage of the VFFDC is that is maintains both a low clock rate and low parallel memory read/write configuration. Such an optimization should allow low power consumption as the system can operate at a low clock speed and enable reliable timing at low voltage.

The VFFDC implements in one embodiment a processing chain that has the lowest memory requirements. Each millisecond, there are two DFTs on the input sample, one for each of the upper and lower sidebands of E5. Then for each component of each satellite signal (4 for E5, 2 for L5, and 4 for the future B2), there is one DFT that includes the effect of the code Doppler and carrier frequency, so that it is not necessary to apply a different DFT on the input samples to remove the carrier frequency hypothesis. Then there is another DFT to implement the inverse DFT of the products of the input and code spectrums. Thus, the total number of DFTs per millisecond is 2+2*N channels*M components where the first 2 is the original input DFTs and the second 2 is to make the code spectrum and IDFT of the spectrum products. For 22 channels with up to 4 components per channel, this is 2+2*(22*4)=178 DFTs per millisecond. In case the code spectrum DFTs are precomputed, then the input samples must be unique for each frequency of each PRN. In that case, the number of DFTs is (2*M*N)=176 for M=4 and N=22. However, this requires a memory to store the code spectrums. Such a system will also need a method to generate the code Doppler after each IFFT and before updating the hypothesis memory. Thus, even though the alternative is nearly the same number of DFTS, it requires additional memory and could have higher power consumption to move the code spectrum DFTs into the AE every msec. For example, at 20480 hypotheses per msec, it would require a bus rate of 22 channels*4 components*2 bytes for I,Q of code spectrum*20480 hypotheses*8 bits per byte 28 Mbit per msec=28 Gbit per second. Such a configuration would be nearly impossible to implement. Thus, the compute in place capability make the system realizable.

Another optimization to reduce system memory is to allow all four components of the E5-band signals like Galileo E5, and the future B2 to be processed into a single hypothesis memory for long integration to overcome weak signals due to either high system loss in cell phones and or high loss due to foliage or user body attenuation of the signal. The public domain interface control documents for B2 only describe the lower sideband, but other technical papers suggest that the upper sideband signal structure will be available late 2019 or after. Thus, GPS L5 with only one sideband will have only two components whereas E5 and B2 will have 4 components: two on each of an upper and lower sideband.

Figure 11:
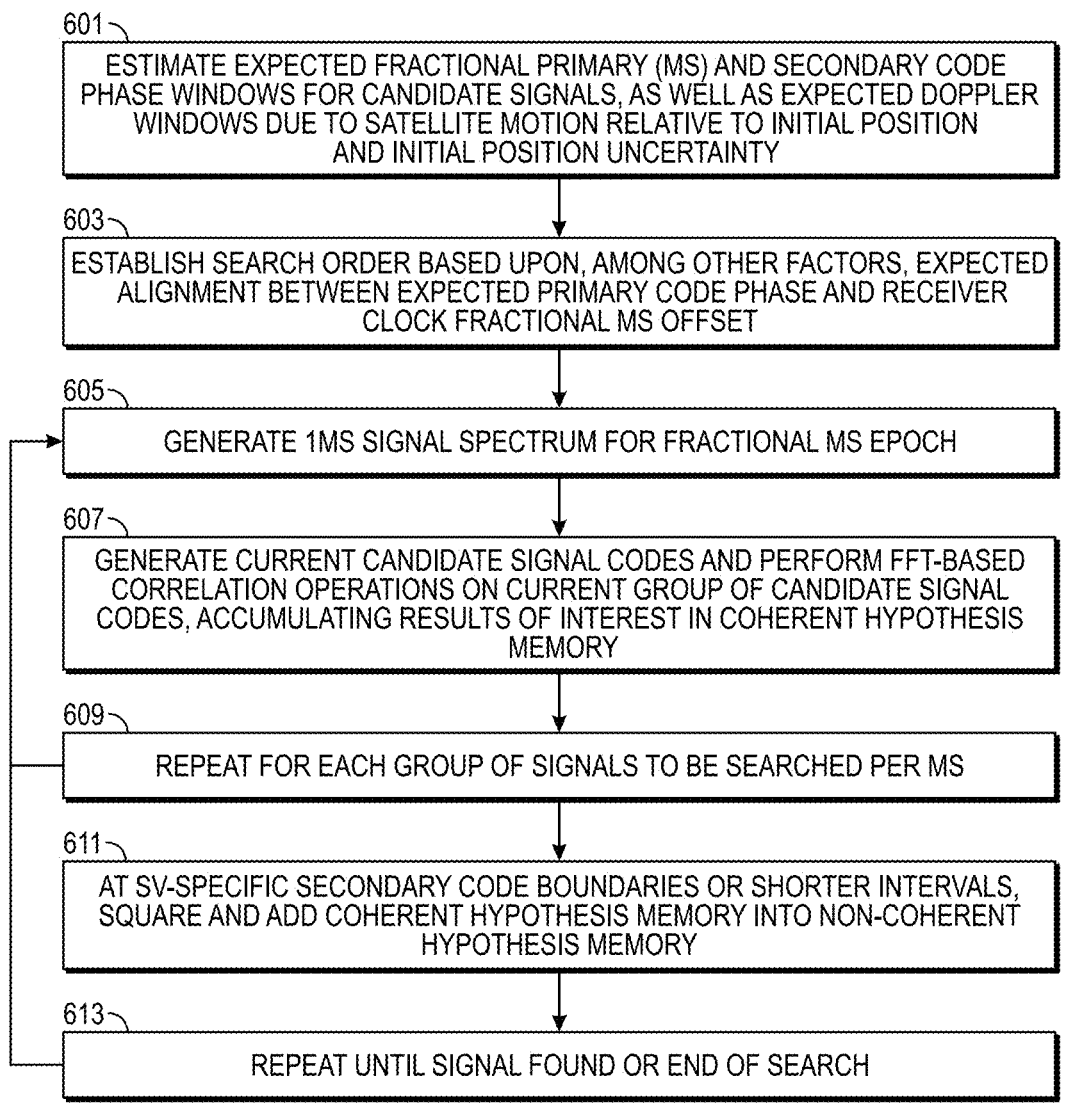
FIG. 11 is a flowchart that shows a method according to one embodiment.

The primary challenge in coherently integrating the sum of each millisecond code correlation is in reducing cancellation losses due to the phase reversals at the 1 ms epoch. In cases where the received signal primary code phase can be estimated to on the order of 0.5 ms or less, it is possible to at least partially align the received signal spectrum in time with the estimated code phase, such that sub-millisecond cancellations are avoided. FIG. 11 shows an embodiment that can provide precise time coherent integration.

Estimating expected fractional primary (ms-long) code phase for candidate signals requires, in one embodiment, knowledge of both precise time and initial position. Precise time may be derived from the secondary code phase of a first received signal or it may be derived from a source of fine time, which is already well known in the art. This estimation can be operation 601 in FIG. 11.

Once primary code phase uncertainty is reduced to well under 1 ms, the sub-millisecond cancellation problem can be resolved by at least partially aligning the received 1 ms signal epoch with the time the code from each SV is expected to be received. This means that a plurality of received signal spectrums must be computed every millisecond, staggered in time to match the primary code spectrums and thus reducing the level of sub-ms coherent cancellation.

The search order can establish which SVs, their signal components and Doppler bins will be searched at each fractional phase offset. This is shown as operation 603 in FIG. 11. Because long coherent integration produces greater sensitivity, the E5Aq and E5Bq pilot signals may be preferentially used, due to their 100 ms long secondary codes and no data bit reversals. In one embodiment, E5Ai and E5Bi may also be used in cases where the navigation message symbols are predicted and removed, thus eliminating or reducing their respective coherent cancellation losses. It should be noted that while the primary code phases of all signals are expected to be uniformly distributed across the millisecond, there will likely be cases where the only processing slot available for a given signal is sub-optimal. Regardless, it will always be possible to avoid the worst-case, where the first 1½ ms of signal would cancel the second in cases of a secondary code bit reversal.

In one embodiment of the present invention, M 1 ms signal spectrums would be computed per millisecond, each offset by 1/M ms. For example, if M=4, then every 0.25 ms, a full 1 ms (or more) of received and digitized GNSS sample data would be processed by FFT correlations (e.g. using the VFFDC architecture shown in FIG. 6), so in this case the processing epochs are separated by and offset (one to the next) by 0.25 ms and the received GNSS sample data is also offset by 0.25 ms. In this example a first processing epoch at relative time 0.0 ms would process FFT correlations on 1 ms of GNSS sample data generated in operation 605. The correlations are shown as operation 607 in FIG. 11. A second processing epoch at relative time 0.25 ms would process FFT correlation (operation 607) using 1 ms of GNSS sample data that ends at the relative time 0.25 (operation 605) and is offset from the prior 1 ms of GNSS sample data by 0.25 ms. A third processing epoch at relative time 0.5 ms would process FFT correlations (607) using 1 ms of GNSS sample data that ends at the relative time 0.5 ms (operation 605) and is offset from the prior 1 ms by 0.25 ms. Thus operations 605, 607 and 609 are repeated four times during a 1 ms time interval. In an alternative, more sensitive, embodiment, the signal spectrums would be computed to align as closely as possible with each expected satellite code phase.

As in the case of coarse-time mode, candidate signal codes (received GNSS sample data) and their associated spectra must be generated and aligned each millisecond and correlated with signal spectra using VFFDC, or similar FFT-based.

As these resultant correlations are produced they must be summed, with the phase reversals associated with the secondary code removed, in coherent hypothesis memory specific to each SV frequency band and frequency bin. This is shown as operation 607. This process requires that the full 1 ms correlation be computed, even though there is much less than 1 ms of code phase uncertainty. However, only that fraction of the full PN code that is likely to contain a correlation peak must be stored in hypothesis memory.

At secondary code epoch boundaries, or in some cases even more often, the coherent hypothesis memory must be summed non-coherently into non-coherent hypothesis memory, which mirrors the coherent hypothesis memory but contains only magnitude information and can therefore be kept in half as much memory. This is shown as operation 611.

The process in FIG. 11 continues in operation 613 (by looping back to operation 605) until a correlation peak rises above the noise floor. Once the correlation peak rises above the noise floor with sufficient confidence, the search results are reported and the acquisition search for the particular SV of interest may be discontinued, making way for the next SV in the search order for its fractional code phase. The search may also time out after a preset time interval and a search failure may be reported.

FIG. 11 shows an example of a method about how satellite codes can be searched in alignment with the approximate time bin in which they are expected to be received such that submillisecond coherent cancellation losses due to phase reversals can be reduced. This search can be performed based upon an initial set of information that can include, in one embodiment at least two of: (1) a code phase of a received primary or secondary code signal from at least one GNSS SV; (2) an estimated GNSS time based on one or more sources of time, the estimated GNSS time uncertainty being estimated (e.g., based on the known accuracy of the source) or known to be within less than +/−0.5 milliseconds of actual GNSS time; and (3) an approximate location of the GNSS receiver. Using this initial set, operation 601 in FIG. 11 can be performed. In effect, this initial set gives the system an estimate of GNSS time to enable acquisition using GNSS time.

Figure 13:
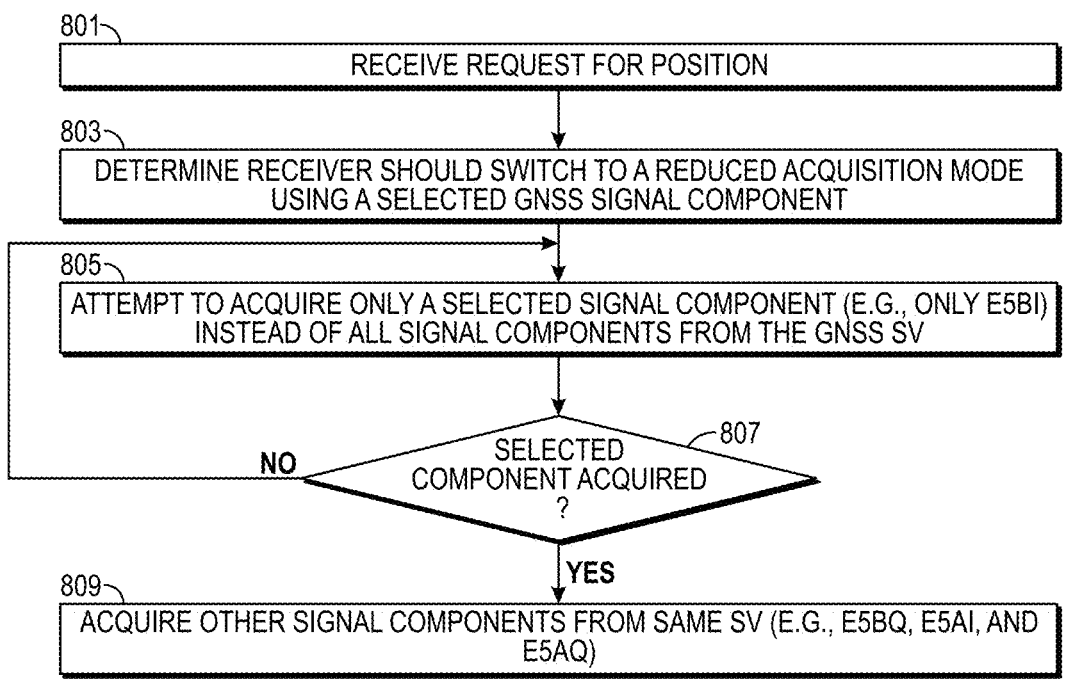
FIG. 13 shows an example of an embodiment that uses a selected signal in a set of GNSS signal components to initially acquire GNSS signals in certain cases.

Another aspect of this disclosure involves the use of only a subset of the two or four components of the GNSS signals (a selected component) to first acquire that subset (such as only one of the four components) during coarse time acquisition and then acquire the remaining components. In one embodiment, this selected component is selected based on a lowest probability of signal change due to sign or phase reversals due to the coding scheme used in that selected component. In the case of Galileo's E5 GNSS signals, the E5BI component has the lowest probability of signal change due to sign or phase reversals (see the appendix for a detailed explanation of various probabilities for different signal components) and thus can be used as the selected component to perform a coarse or precise time acquisition before attempting to acquire and/or track the remaining components in the Galileo GNSS signals. FIG. 13 shows an embodiment of a method that uses this aspect which uses only a subset of components. The method can begin in operation 801 shown in FIG. 13; in operation 801 a GNSS processing system in a GNSS receiver receives a request, such as a request from an application processing system, for position information. In operation 803, the GNSS processing system determines a need or desire to switch to a reduced acquisition mode; this need or desire may result from a failure of a conventional acquisition which attempted to acquire a full set of GNSS signal components from a set of GNSS SVs in view of the GNSS receiver. For example, the GNSS may fail, within a predetermined period of time, to acquire the E5AI and E5AQ signal components from several SVs in the Galileo constellation. This failure can trigger the GNSS processing system to switch to a reduced acquisition mode in which it will attempt to acquire, in an initial acquisition phase, only the selected component from each SV in a set of SVs in view. In operation 805, the GNSS processing system attempts to acquire only the selected component; in one embodiment, this is the E5BI signal component, and the GNSS processing system can attempt to acquire this signal component from several GNSS SVs. If, in operation 807, the GNSS processing determines that the selected component has not yet been acquired, then the processing system can revert back to operation 805 to continue to attempt to acquire the selected component. If, in operation 807, the GNSS processing determines that the selected component(s) have been acquired, then the GNSS processing system can proceed to operation 809 to acquire other components from the same SVs; for example, the GNSS processing system in operation 809 can attempt to acquire the other signal components, such as E5BQ, E5AI, and E5AQ from the same SVs. In operation 809, the GNSS processing system can use time and phase information acquired from the acquisition of the selected component from each SV to facilitate the acquisition of the other signal components. The method shown in FIG. 13 can also be used as a method to acquire a stronger satellite more quickly as the number of correlations is reduced, allowing a portion of a GNSS acquisition engine to search a large frequency space for many SVs more quickly and with lower power than if more GNSS signal components are employed.

Modernized GNSS signals in the L5 frequency band are susceptible to interference from aeronautical radio navigation (ARN) signals that are often near, for example, airports or military bases. This interference can be mitigated using one or more embodiments described herein, such as the embodiments illustrated in FIGS. 15A and 15 B.

Figure 15A:
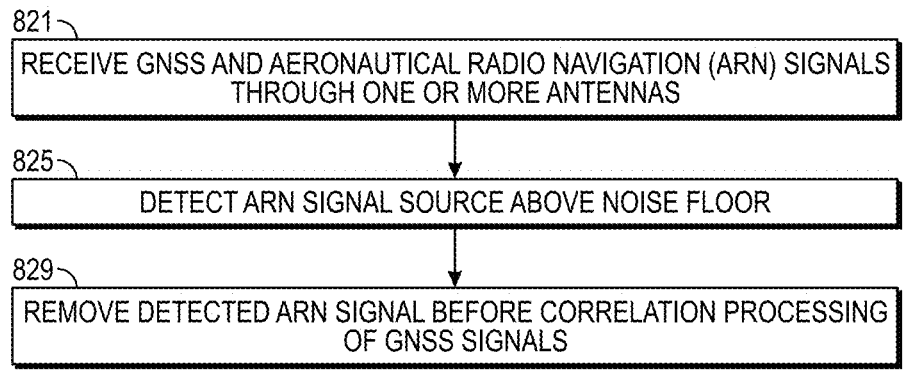
FIG. 15A is a flowchart that shows a method according to one embodiment to mitigate interference, such as ARN interference.

In the embodiment shown in FIG. 15A, a GNSS receiver can receive, in operation 821, both GNSS signals in the L5 frequency band and ARN signals. Generally, the GNSS receiver can include hardware that can measure signal levels, such as signal strength levels, and these measured signal levels can be compared, in operation 825, to a predetermined noise floor. This predetermined noise floor can be fixed over time or dynamically adjusted over time, but in most instances, the GNSS signals from GNSS SVs will be below the noise floor. The noise floor can be set based on known signals strengths of GNSS signal relative to known signal strengths of ARN signals. ARN signals will, when the GNSS receiver is near a source of ARN signals (e.g., the receiver is near an airport), generally be above the noise floor. Thus, operation 825 can be used detect the presence of ARN signals by comparing the received signals to the noise floor. In one embodiment, a predetermined threshold above the noise floor can be used so that the ARN signals must exceed the predetermined threshold (that is above the noise floor) before operation 829 is used to remove ARN signals. In one embodiment, the ARN signals can be detected during the signal acquisition phase using the DFT array processing techniques described herein; in this embodiment, operation 829 can be invoked when the ARN signals are detected in the frequency domain. When the ARN signals are detected above the noise floor (or the ARN signals are detected in the frequency domain), a GNSS processing system in the GNSS receiver can, in operation 829, remove the ARN signals before correlation processing of the GNSS signals. In one embodiment, the ARN signals can be removed by a finite impulse response filter; the finite impulse response filter can receive the signals containing both GNSS signals and ARN signals and provide a filtered output containing the GNSS signals (with a significantly reduced amount of ARN signals in the output). In another embodiment, a configurable notch filter used in an intermediate frequency (IF) bandpass filtering operation (e.g., in the receiver architectures shown in FIG. 4D, 4F, or 4J) can be used to filter out the ARN signals before GNSS correlation processing.

Figure 15B:
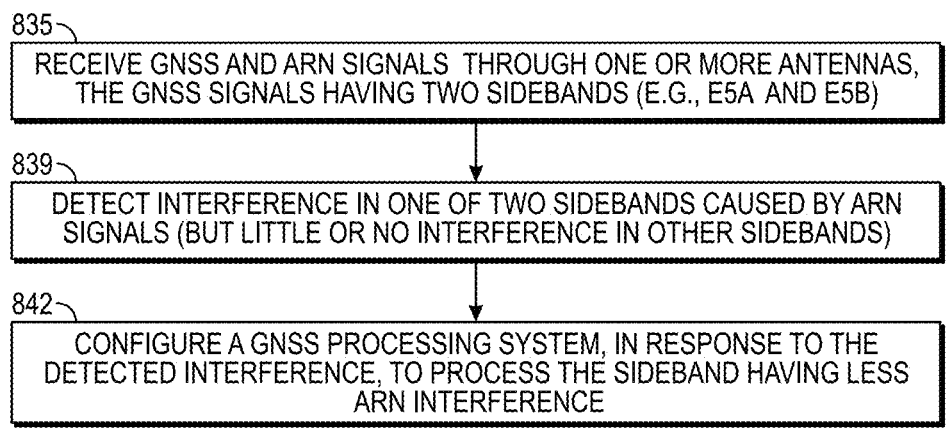
FIG. 15B is a flowchart that shows another method according to one embodiment to mitigate interference, such as ARN interference.

In the embodiment shown in FIG. 15B, the mitigation of known interfering signals, such as ARN signals, can be achieved by narrowing the bandwidth of the GNSS radio receiver. FIG. 15B shows an example of a method to narrow the bandwidth to one of two sidebands in the GNSS signals. In operation 835, the radio receiver can receive both GNSS signals and ARN signals through one or more antennas. The GNSS signals can include two sidebands such as the E5A sideband and the E5B sideband. In operation 839, the GNSS receiver can detect interference in one of the two sidebands caused by an interfering signal such as the ARN signal. In one embodiment, this detection can be performed by observing the input data spectrums as the spectrums are received and processed every millisecond at each of the upper and lower sidebands. The detection can involve detecting a difference in the level of interference, such that one sideband has little or no interference while the other sideband has considerable interference. In response to this detection, the GNSS processing system in the GNSS receiver can configure, in operation 842, the GNSS processing system to process the sideband having less interference, such as less ARN interference, and not process (e.g., no correlation processing) the sideband having more interference. In this situation, only one sideband is used to derive codephase measurements and to determine location data while the other sideband is not used to determine location of the GNSS receiver. In one embodiment, the GNSS receiver can continue to monitor the interference and switch between using the two sidebands in response to changes in the interference; for example, the GNSS receiver may initially use the lower sideband (such that GNSS signals from the lower sideband are processed while GNSS signals from the higher sideband are not processed to determine location) while the higher sideband experiences greater interference and then switch to the use of the higher sideband when the lower sideband experiences greater interference.

Single Hypothesis Memory

Another aspect of this disclosure involves the use of a single hypothesis memory to accumulate or sum amplitude for codephase hypotheses for multiple signal components from the same GNSS SV, such as a GNSS SV in the Galileo constellation of GNSS satellites. This technique can improve sensitivity by summing for example the codephase hypotheses for the E5BI, E5BQ, E5AI and E5AQ signal components from the same GNSS SV in the Galileo constellation of GNSS satellites. This accumulation can be done non-coherently when the time uncertainty is more than 0.5 millisecond (ms). This accumulation can also reduce the amount of memory used by the GNSS receiver.

Galileo E5 has four components: a data and pilot component on each of the two sidebands. GPS L5 has only two components, a data and pilot component but only one sideband. BDS B2A and B2B also have four components, a data and pilot component on each of the two sidebands. QZSS has two components: a data and pilot component but only one sideband.

In general, each component has its own primary and secondary code. With the multiple components, it is also assumed that the primary codes are the same number of bits and repeats at the same time on all components. It is assumed that the secondary codes can change at the completion of each primary code. The length of the secondary code does not need to the same on each component, and in general each system has different length secondary codes on each component. For modernized signals, the chipping rate is 10230 bits in one millisecond.

In general, the sample clock is chosen to be near twice the chipping rate so as to minimize the worst case loss in the case where the signal arrival time is midpoint between two adjacent samples. A faster sample rate, that is, greater than twice the chipping rate, reduces this loss but increases the number of correlations to be performed, and also increases the size of the integration memory. A slower rate, that is less than twice the chipping rate, increases the loss but also deceases the number of correlations to be performed and also reduced the size of the integration memory. In general, the average loss is considered more important to the worst case loss.

The preferred embodiment has a sample rate near twice the chipping rate, but also has a rate that can be expressed as the product of N1 and N2, where N2 is a large power of 2 so that the FFT can be employed to reduce computation with respect to a DFT. Here the sample rate is chosen to be 20480 samples per msec, so that N1=20 and N2=1024. Another option is N1=5 and N2=4096, as N1=10 and N2=2048.

For two samples per chip, the worst case loss is when the true arrival codephase is midway between two samples. The correlation function is +/−1 chip, and so there is 0.25 chips on either side of the true codephase. In this case, the correlations yield 75% of the correlation, yielding a loss of about 2.5 dB. (0.75=1−0.5/2=1−0.25)

Another embodiment is N1=1 and N2=16384. This arrangement uses the largest possible FFT size but undersamples with respect to the 2 samples per chip approach above. Here there are 10230/16384=0.6244 chips/sample, or 1.6 samples per chip. The worst case correlation is now 69% of the maximum: 0.69=(1−0.624/2), for a worst case loss of 3.25 dB, or an increase in the loss of only 0.75 dB. This configuration reduces the number of correlations by 25% and reduces integration memory by 25%.

Modernized satellite broadcast additional power spread across multiple components. One method to improve sensitivity is to correlate more than one component in parallel from the same input sample data signal and then to sum up all the single component amplitudes or powers at each correlation hypothesis into the signal detection test. The signal information at each codephase hypothesis for all components is compressed by summing into a single value, that is integrated for each codephase hypothesis. At each frequency bin to be searched, the number of codephase hypotheses equals the number of correlations per primary codephase, which is 20480 for a sample clock 20.48 Mhz and 10230 chip primary code in one millisecond.

At each codephase, each primary code sequence is tested at all possibly candidate phases for each component. This is done optimally with the DFT implemented at the N1 and N2 point FFTs; see for example the embodiments shown in FIGS. 6-8. This produces the 20480 amplitudes for each component.

There are two ways to combine: coherently or non-coherently.

The preferred embodiment is to combine non-coherently as in general, the time uncertainty is larger than a 1% millisecond, and thus, it is impossible to predict the secondary code phase. Furthermore, the random data bit phase makes it difficult to predict the phase between the data and pilot channels even if the secondary codephase is known.

The amplitude of the complex correlation at the same codephase hypothesis is computed for each component and is added into a single value, that is integrated into a single memory bin. FIG. 14N shows an example of an arrangement of hypothesis memory with multiple bins; each of these bins can store an accumulated sum of a codephase hypothesis across several signal components. The power could also be computed, but amplitude is preferred as requires fewer bits.

In general, the hypothesis memory is an integration memory. For each primary codephase hypothesis, the new sum of the amplitude for all components from the same GNSS SV for the current millisecond is added to the previous sum in integration memory and this running sum overwrites the previous sum.

Summarizing,
1) At msec (k), and at each primary codephase hypothesis (j), form the correlation amplitude of the primary code (i) for each component:
   a. $AMP(i,j,k)=real(i,j,k)^2+imaginary(i,j,k)^2$ for i=1,4 and j=1,20480, and k=current msec
2) Form sum of the amplitude (AMP) at each component for each codephase a. AMP_ALL(j,k)=sum {AMP(i,j,k)}, for i=1,4 at k-th msec. That is, AMP_ALL(j,k)=AMP(1,j,k)+AMP(2,j,k)+AMP(3,j,k)+AMP(4,j,k), where i=1 is E5A data channel component, i=2 is the E5A pilot channel component, i=3 is E5B data channel component, i=4 is the E5B pilot channel component 3) Retrieve integration bin for previous msec (k−1) for the (j-th) codephase hypotheses
   a. X(j,k−1)=INT_MEM(j,k−1)
4) Add in the new amplitude from all 4 components
   a. X(j,k)=X(j,k−1)+AMP_ALL(j,k)

Store back the updated and current integration sum X(j,k) to the hypothesis memory for the j-th codephase hypothesis.

In this above method, the number of memory bins is equal to number of codephase hypotheses, which is less than having a similar sized integration memory for each component.

The signal detection then uses the single integration memory so that there is not an individual signal detection on each component. The test is generally:

Obtain the maximum integration memory value from the integration memory across the 20480 hypotheses and remember its memory index X that corresponds to a specific phase, where each bin holds the running sum of the amplitude of all primary code components at that codephase.

Estimate the noise floor mean and standard deviation from the 20480−Y hypotheses, where Y are the integration memory values adjacent to the maximum value at codephase X. Here Y=7 which includes is the maximum at X, and the 3 integration memory sample before and after. In this way, a total of 7 removed samples are ignored so that the noise floor statistics are not affected by the peak hypothesis.

Test that Signal to noise ratio estimate is above a threshold to set the false alarm rate.

Test:
If SNR=10*log 10(($X^2$−noiseFloor$^2$)/noiseVariance)>K, a predetermined threshold to set the false alarm rate acceptably small, then declare signal found and the integration is stopped. Else, declare signal not found and the integration continues.

It should be noted that the carrier frequency produces a code Doppler according the to the well-known relationship between the number of carrier cycles in one chip of the primary code sequency. For E5a at 1176.45 Mhz, there are exactly 116 carrier cycles for each chip. The phase also has a negative rate. Thus, the long integration requires shifting the locally generated code at the rate of the carrier frequency hypothesis divided by −116 chips per second so that the code is maintained to correspond to the initial codephase hypothesis at the start of the integration.

Coherent integration of multiple components into a single hypothesis memory is also possible in case the secondary code phase is known and the data bit phase is known. This is true when fine time assistance is available, and the data bit stream is observed from a second receiver and communicated promptly. This is only possible when the data is repeated or when the known data is made available, which is possible with a communication like the internet.

In addition to the phase reversals from the secondary code sequence and data sequence, signals in the same sideband have a different but known phase offset of 90 degrees between the data and pilot channels. Signals in different sidebands have a different phase offset due to the different carrier frequencies. The frequency offsets of each sideband from the center channel are known however, as the Doppler offsets have the same magnitude but different sign with respect to the center frequency. For example, if the E5 frequency Doppler is 1000 Hz, the E5A Doppler is 992 Hz and the E5B doppler is 1008 Hz. The carrier phase difference rotates with opposite sign, but of equal magnitude between the A and B sidebands. The known phase offsets are applied to the complex correlations by multiplying by the complex exponential with the known phase. In this way, the real and complex components of all adjusted components can be added into a single complex correlation value. The amplitude or power is then integrated into a single hypothesis memory bin for each codephase hypothesis.

Frequency Domain Doppler Compensation

GNSS (Global Navigation Satellite System) signals typically incorporate pseudorandomly modulated (PRN) waveforms in order to achieve precise time of arrival measurement at receiving terminals. Normally a PRN waveform incorporates a repeated code whose duration is called the frame length. Received waveforms are processed using signal processing structures such as a bank of correlators, matched filters, and the like. This invention focuses on GNSS signal acquisition based upon use of fast Fourier transform (FFT) methods that effectively implement a matched filter corresponding to a received signal. This method is particularly attractive when the spreading ratio (SR) of the PRN waveforms is large, that is, the ratio of the signal bandwidth to the frame length is large. In many modern GNSS systems this spreading ratio may exceed 10,000. The FFT is a very efficient algorithm for computing a discrete Fourier transform (DFT) and even though we use the terminology "FFT" throughout we mean by FFT any method for computing a DFT including a large variety of FFT algorithms, including Cooley-Tukey algorithms, prime factor algorithms, chirp z-transform algorithms, etc.

Acquiring a GNSS signal with high SR is made difficult since the time of arrival of the signal must be tested over a large set of time instants (e.g. over 10,000 in the above example) and, moreover, over a large set of potential frequency offsets from a nominal hypothesized carrier frequency, the latter due to Doppler effects and local clock errors. In addition, tests must be done over the set of possible satellite signals present. These sets of time instants, frequency offsets, and satellite signals numbers are termed "hypotheses." As can be seen from the above, the acquisition of GNSS signals requires search over a large three-dimensional space of hypotheses. The use of FFT methods is very efficient for performing the time hypothesis search since it may process in parallel each possible time hypothesis over the frame length. The FFT approach performs a matched filter operation on a set of incoming time samples by (1) performing a forward FFT on a set of incoming time samples to produce a set of "signal frequency samples", (2) multiplying the signal frequency samples by frequency samples of a PRN reference signal (termed "reference frequency samples"), and (3) performing an inverse FFT on the result. The set of output samples is then either further accumulated with prior sets of outputs to perform "coherent processing" or the output samples are detected (typically via magnitude or magnitude-squared operations) and accumulated with similarly processed prior sets of data. Such accumulated sets of processed data are observed for the occurrence of large peaks above background noise samples, wherein the location of such peaks are indicative of the time-of arrival of the incoming signal.

As indicated above, in the acquisition process the incoming signal may have associated with it a carrier frequency offset, which must also be determined. Traditional methods for such determination involve hypothesizing a Doppler frequency, compensating the Doppler in the time domain by multiplying the set of incoming samples by a complex sinusoid with a hypothesized frequency to remove the Doppler component and then proceeding with the three steps as above. This process is done for each of a set of hypothesized Doppler frequencies. The problem with this approach with FFT implementation is that it requires one forward and one inverse FFT for each Doppler hypothesized frequency. In many cases one must search over a set of such hypothesized frequencies that is 20 or larger. These embodiments of the invention reduce the number of such FFTs to a number that is approximately half or less than that required in the above prior art approach, thus reducing overall processing time by a factor of approximately one-half or less.

In the following discussion we refer to frequency uncertainties as "Doppler" but the frequency uncertainty can also be due to local oscillator frequency errors. For simplicity of discussion we refer to either frequency uncertainty as "Dopplers" but when doing so we actually mean any source of frequency uncertainty, including perhaps errors on the part of a GNSS transmitter. Also, in the following initial discussion, for simplicity, we ignore the multiplication of the forward FFT data by the reference frequency samples (as discussed above). This is done just before performing the inverse FFT operation in the first example of the following discussion.

It may be helpful to refer to FIG. 16A in the following discussion. Following a forward FFT (1101) considering the FFT output as a vector, if one rotates the vector by m positions (1102) then this is equivalent to a frequency shift equal to the m×bin spacing, where the bin spacing equals the sample rate divided by the number of samples per FFT. Here m is an integer which may be positive, to shift positively and negative to shift negatively. If the input signal is positively Doppler shifted, then to compensate one would typically rotate the vector negatively, and vice versa. This has the effect of translating the signal to near 0 frequency or some other desired frequency. The advantage of this approach is that following one forward FFT, one could test a multiplicity of Dopplers, by a series of inverse FFTs, each of which follows a frequency shift via a rotation operation. Data in the frequency domain is considered circular in the sense that the data sample following the last frequency sample is that of the first frequency sample. Hence instead of a shift, this is normally referred to as a rotation. This invention also applies to a normal shift in which zeros are appended to data as needed. For example, if 20 Doppler frequencies were tested in this manner, only one forward FFT would be required and 20 inverse FFTs would be needed, one for each Doppler to be tested. In this example only 21 FFT operations need be performed vs. 40 in the standard method. Operation 1102 is performed multiple times to provide a series of Doppler compensated frequency vectors, each of which is for one of the Doppler bins being tested.

In many cases, examining Doppler uncertainty regions in increments of integer bin spacing is coarse, resulting in a worst-case loss of sinc(0.5) or 3.9 dB. In order to reduce this loss, one would like to perform a rotation of the above vector by 1⁄2 bin spacing, that is, one would like to test for Doppler equal to m+1⁄2 bin frequency offset. This can be done in one of three ways.

In the first method, two forward FFTs are performed, one with no modification, and the second with a time domain implemented frequency shift equal to one-half bin spacing, that is a frequency offset of sample rate/(2'no_FFT_samples). This frequency offset would done in the time domain by multiplying by a complex sinusoid in the usual manner (or using an equivalent algorithm (e.g. CORDIC rotation). Each of these forward FFTs are stored. In order to test for Dopplers errors of integral number of bins, one rotates the first forward FFT vector by the required number of bins. In order to test for Doppler errors incorporating a one-half bin spacing, one selects the second forward FFT vector and rotates by an appropriate integral number of bins. For example, if one wanted to test for Doppler error of m+1⁄2 bins (m and integer), i.e. we wish an overall compensating shift of −m−1⁄2 bins, one would rotate the second forward FFT vector by −m−1 positions. Here we are note that the second FFT data set incorporates a shift of +1⁄2 bin (by assumption) so that the total shift is −m−1+1⁄2=−m−1⁄2. Of course, the above technique also works if the data used prior to the second forward FFT were first frequency offset by minus one-half bin, or in fact by one-half bin plus a positive or negative integer multiple of bins. In that case the data vector, following the second forward FFT, would need to be rotated by an appropriate integer amount to achieve the overall desired Doppler compensation.

The above first approach is extremely accurate but, of course, doubles the number of forward FFT operations. In the prior example, a total of 22 forward FFTs are required vs. the 40 FFTS in the standard approach, still a good savings. However, another disadvantage is that twice as many forward FFT vectors need to be retained, which may be costly in memory, especially if a number of parallel FFTs are required to achieve an overall acquisition time.

Figure 16A:
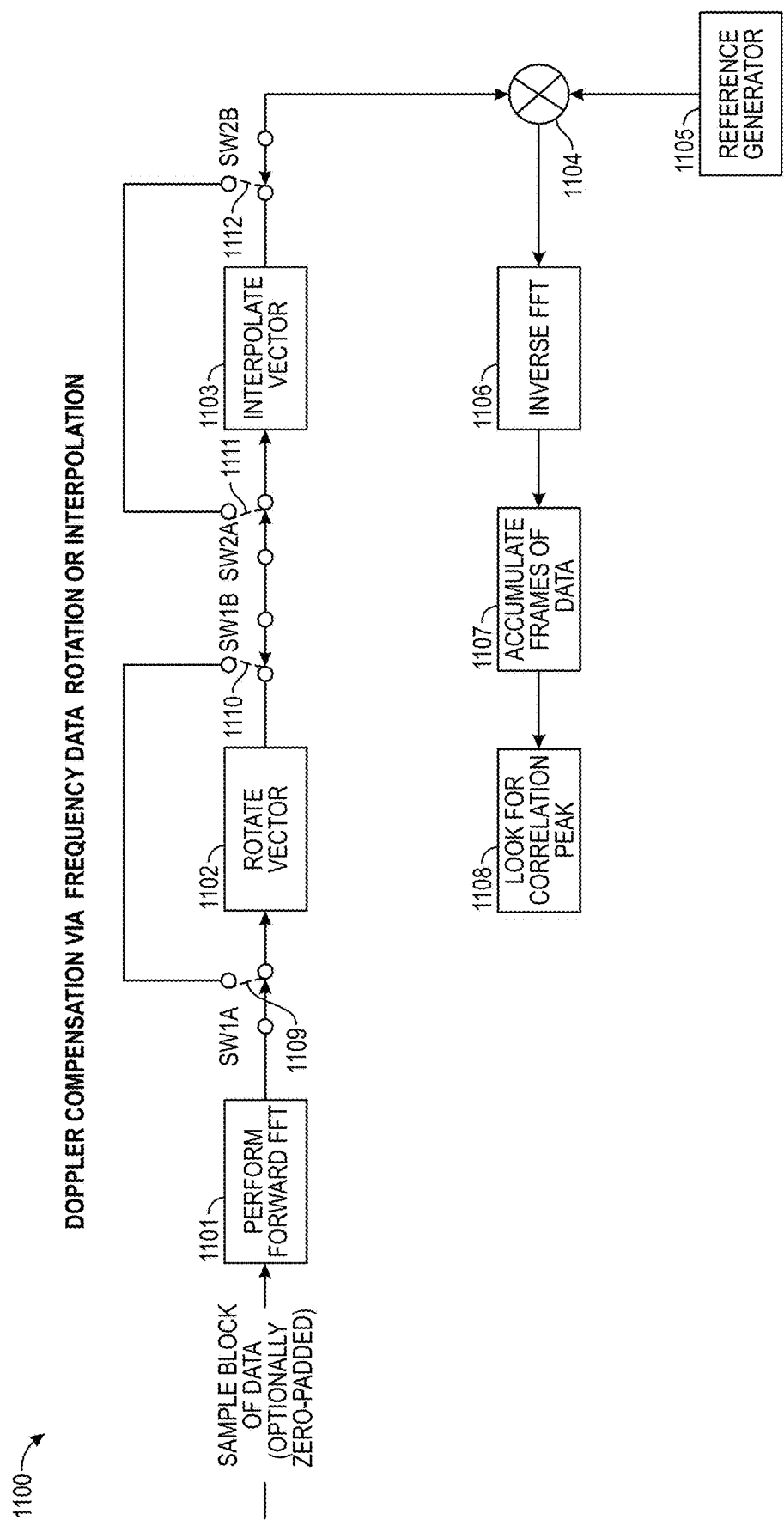
FIG. 16A shows a processing flow according to one embodiment that uses rotation or interpolation with DFTs to acquire GNSS signals.

Referring to FIG. 16A, in the above discussion, the switches (1109,1110) pass the data from the forward FFT through the processing block 1102, but the switches (1111, 1112) bypass the block 1103 (interpolation operation). The switches are put in other positions for alternative methods of these embodiments. Note that these "switches" are not necessarily hardware elements but may be viewed as flow-chart decision paths.

The second approach to achieve an offset incorporating 1%2 bin spacing is to use an interpolation technique in the frequency domain upon the forward FFT samples to construct the intermediate samples at 1% bin spacing from each of the original frequency samples. The vector of intermediate samples then takes the place of the second forward FFT as discussed above. This vector of intermediate samples is also rotated by the required number of positions to implement a Doppler shift of 2 bin spacing plus the requisite number of integer bins. Many different interpolation functions may be used to determine the intermediate samples, depending upon complexity and accuracy required. For example, a sinc interpolator, i.e. $\sin(2\pi f)/(2\pi f)$ may be used where f is in units of bin spacing. Alternatives include polynomial interpolators, splines, etc. In general, the most appropriate interpolator may be determined empirically since it depends upon the frequency response of the time samples as well as the maximum complexity of the interpolator. With 1⁄2 bin spacing achieved by either method the worst-case loss due to Doppler error becomes −0.91 dB. This does not include any additional implementation errors (e.g. interpolation errors).

The above interpolation method may be viewed in FIG. 16A in which the switches 1111,1112 allow the data to be passed through the interpolate vector block 103. The switches 1109 and 1110 may in addition be used if the frequency shift is other than +/−1⁄2 bin.

In yet a third method, an interpolation is done but instead of performing it in the frequency domain, the input set of data samples is augmented, or "zero-padded", with additional frequency samples of value zero that are appended at the beginning or end of the sample set. If the set of zero-valued samples equals that of the original set of samples, then the FFT of the resulting augmented sample set has an FFT which now has 12 bin spacing, relative to that of the nonaugmented set. Hence a simple rotation of the FFT vector now provides a frequency translation in either the positive or negative direction, in a manner similar to that discussed above. Spacing with less than 1%2 bin can be achieved by augmenting the original set with even more zero-valued samples (e.g. adding twice as many zero valued samples provides ⅓ bin spacing, etc.). This third method has the disadvantage that an FFT of twice the size, or larger, is required together with twice the storage required for the performance of this processing. This is probably less efficient that methods 1 and 2, although it may be competitive in some situations, particularly for relatively small FFT sizes. The zero-padding can be seen in FIG. 16A as an optional step at the input of the perform FFT block 1101.

The choice of the first versus the second approaches toward testing the Doppler with m+½ bin spacing depends upon the complexity of the interpolation vs. the storage requirements of the first approach. In terms of computational speed, one desires that the interpolator approach uses less operations per frequency sample than does the FFT. Although it may seem that an interpolation procedure is more computationally efficient, a little further examination shows that this is not so clear, particularly if only a few different Doppler frequencies are to be searched. FFT operations are extremely efficient in terms of operations per data sample. A radix-2 FFT of length N requires only approximately 2 log 2(N) real multiplies per data sample. For example, an FFT of size 1024 required only about 20 real multiplies per data sample. An equivalent complexity interpolator would have interpolation filter of length (number of taps) equal to 10, since two real multiplies are required per frequency sample. Since the frequency data tends to be very noisy, it is not clear that such a short length would be adequate for required accuracy. Note that even if one uses the first method, one would still advantageously employ the rotate vector block 1102 to reduce processing time when searching over a large range of Doppler frequencies.

The above approaches may be further generalized to offsets other than m+½ bin spacing to m+e bin spacing, where e is any number between 0 and 1. One could compute an additional forward FFT following frequency translation of input data by an amount corresponding to e bins and store this for use later, where this vector is used together with an appropriate number of vector position shifts. Alternatively, one could use interpolation methods to determine the intermediate samples from any of the precomputed FFT data sets (e.g. the set with 0 frequency offset and 1% bin offset). Again, there is the tradeoff of more forward FFTs being required and consequential storage increase, vs. the computational complexity of an acceptable interpolation method.

It should be clear from the above discussion that the three methods discussed above may be combined in a variety of ways, for example the third method may be combined with the second method to achieve very small bin spacing without requiring additional FFT operations.

In another aspect of these embodiments, tests of a set of Doppler frequencies can be done for more than one PRN, corresponding to more than one received GNSS satellite signal, without performing additional forward FFTs. That is, in the previous discussion a forward FFT, or a few forward FFTs, were performed on the data and then a set of inverse FFTs are performed to test for a variety of Doppler shifts and these all correspond to one particular satellite signal, i.e. one particular PRN. As indicated above as part of the overall processing there occurs a multiplication of the frequency samples by frequency samples of a PRN reference signal. This would occur following the Doppler shifting operating described above. This is because the PRN frequency samples are assumed to have zero frequency offset. A similar set of inverse FFTs can be performed for other PRNs, by using the corresponding frequency samples of these other PRNs, and additional Doppler frequencies can be tested, again without having to perform another forward FFT corresponding to these additional PRNs. In all the above methods the frequency altered data is multiplied by the reference data from 1105 in the multiplication block 1104, then processed by an inverse transform procedure 1106. The outputs from this may be accumulated in 1107, either predetected, or detected. Finally, the accumulated data is examined for strong correlation peaks indicative of the time of arrival of the GNSS signal with the specified Doppler and PN sequence. It is of course the case that the reference generator 1105 produces Fourier transformed PRN sequences. Such transformed sequences may be stored in memory for later use or computed on the fly.

Figure 16B:
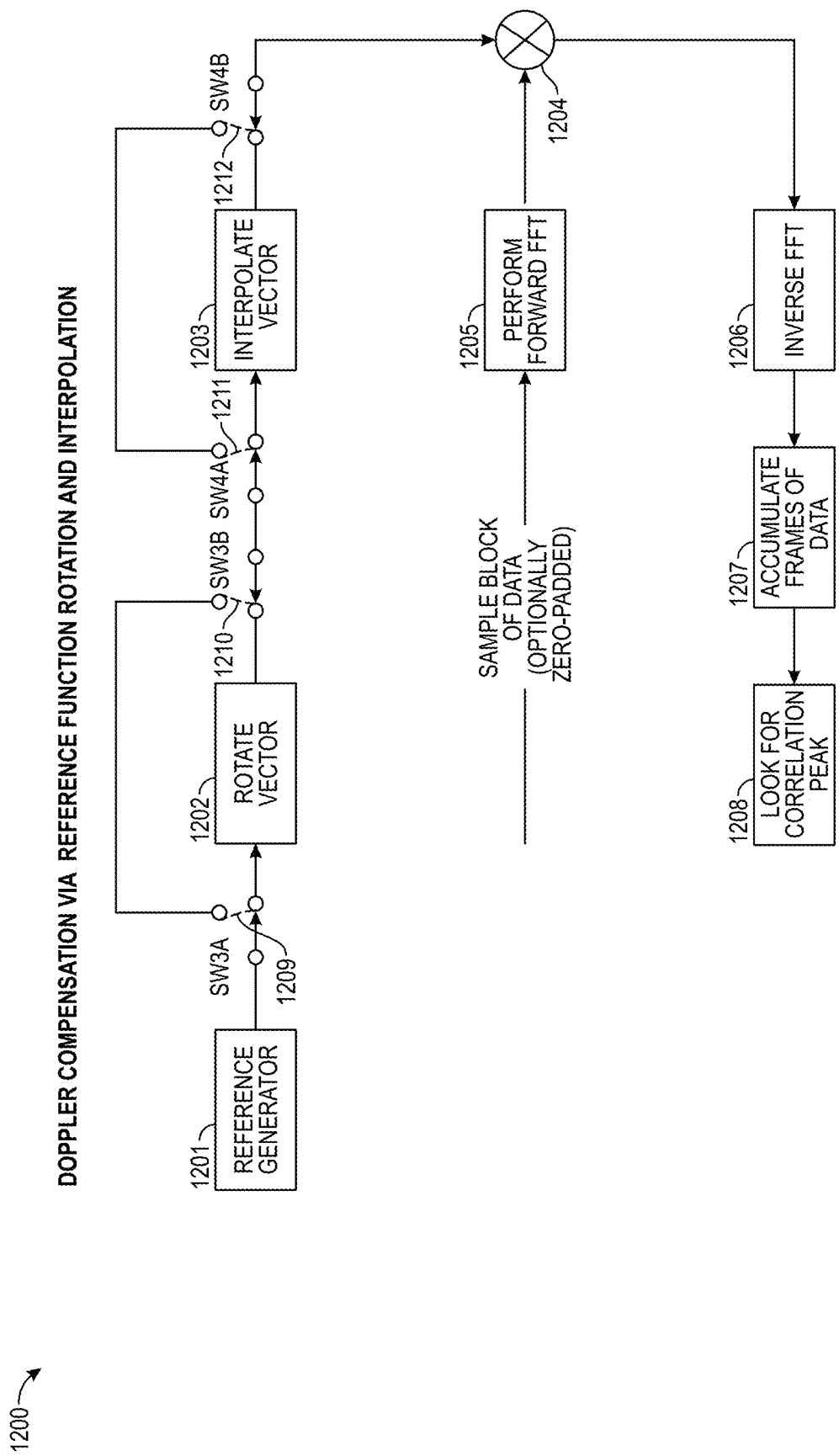
FIG. 16B shows a processing flow according to another embodiment that uses rotation or interpolation with DFTs to acquire GNSS signals.

In yet another aspect of the invention, instead of rotating or shifting the vector of frequency samples provided by the forward FFT of the signal samples, a similar operation may be done to the frequency samples of the PRN reference signal. That is, one does a Doppler compensation on the PRN frequency samples rather than on the signal frequency samples. This is illustrated in FIG. 16B. The switches 1209, 1210, 1211, 1212 allow the rotation or interpolation or both in a manner similar to the discussion of FIG. 16A.

A problem with this approach is that the resulting product of the signal frequency samples and the Doppler compensated PRN samples will no longer be at zero frequency even when the hypothesized Doppler is exactly that associated with the signal. Hence, the inverse FFT will contain a frequency offset. In order to perform multiple coherent summations of these inverse FFT vectors, one may have to first compensate the frequency offsets by a multiplication with a complex sinusoid to translate such vectors to zero frequency. However, taking the magnitude of the inverse FFT will remove the frequency offset component. Hence for applications in which one only performs noncoherent summations of these inverse FFT vectors, this approach works well. An advantage of this approach is that the Doppler shifted PRN frequency samples may be precomputed, hence eliminating any additional forward FFTs of signal data, as may be indicated with the prior mentioned approach (using Doppler shifted signal frequency samples). Of course, there is a penalty to be paid for such precomputation in terms of memory storage.

In the above description we describe the Doppler shifting as a vector rotation or a circular rotation. For small amounts of rotation, there is little loss if one can replace the rotation by a shift operation in which instead of a rotation of samples at the end of the vector to the beginning (or vice versa), one would replace the samples near the beginning (or end) with zero-valued or other value samples. The above approach still works in this case with little change in the resulting performance of the GNSS acquisition performance. As an example, if one rotated the frequency vector by 5 bins in positive direction, then such a rotation would move the last 5 elements of the vector to the first 5 elements of the vector, which would be at the most negative 5 frequency bins. If instead a shift were used, these first 5 bins would be typically replaced by zero valued data. In all cases we refer to "rotation", or "circular rotation", it also includes such shifting operations. Typical Doppler shifts due to GNSS satellite motion are normally in the range of +/5 kHz and typical PRN frame rates are 1 kHz. Hence the Doppler shifts due to satellite motion are normally in the range of +/−5 FFT bins. Since the FFT sizes correspond to the PRN lengths, which are typically in excess of 1000, it is the case that a frequency shift and a rotate produce similar results. We should also note that the band edges of the FFT data tend to be low in amplitude due to filtering of input data so that edge effects associated with rotation or shifting are normally minimal.

One or more embodiments can combine the approaches of frequency rotation/interpolation with reference signal rotation/interpolation. For example, the embodiments in FIGS. 16A and 16B may be combined, as illustrated in FIG. 16C with the use of the switches to facilitate the manner and type of rotation and/or interpolation.

Of course in all the above approaches one may be able to process a block of data with more than one PN reference, corresponding to more than one satellite signal, without having to perform multiple forward FFT operations. After the forward FFT operation, different PN sequences and different frequency hypotheses may be utilized upon the transformed data, each then undergoing an inverse transform without the necessity for additional forward FFT operations.

Figure 16C:
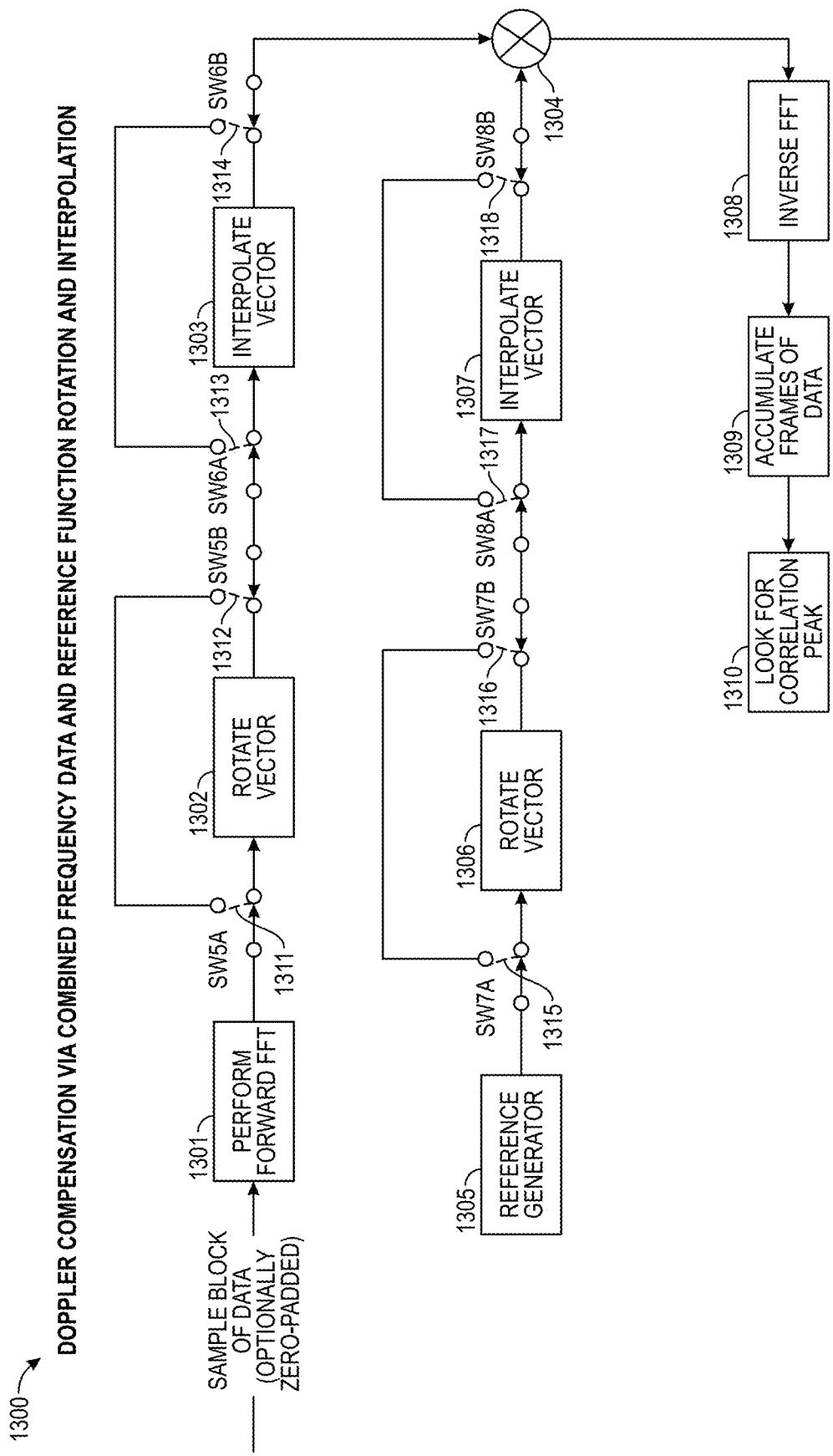
FIG. 16C shows a processing flow according to another embodiment that uses rotation or interpolation with DFTs to acquire GNSS signals.

All the prior cases incorporate a term by term multiplication of the frequency data by the reference data, an inverse FFT, accumulation operation and peak detection operation, as exemplified by blocks 1104,1106,1107,1108 of FIG. 16A, 1204, 1206, 1207, 1208 of FIG. 16B and 1304, 1308, 1309, and 1310 of FIG. 16C.

For terminology clarity, we often refer to a collection of samples, whether signal samples or reference samples, as a vector, with the usual notation. When we say multiplication of vectors, where the output is a vector of similar size, the multiplication is term by term of the two vectors, sometimes called a "Hadamard" product. We sometimes used the terminology a set of function samples, which also may be considered as a vector. This multiplication may also involve a complex operation upon either the frequency samples or the reference samples.

Embodiments of Receiver Architectures

To enable flexible and power efficient sideband A or sideband B processing, a number of GNSS radio architectures are proposed, in which the overall frequency plan, the filtering, the ADC clocking and the subsequent decimation plan is modified. This configuration allows for optimum performance vs power consumption trade-offs. These architectures utilize varying degrees of digital circuit content and are described below.

Figure 4A:
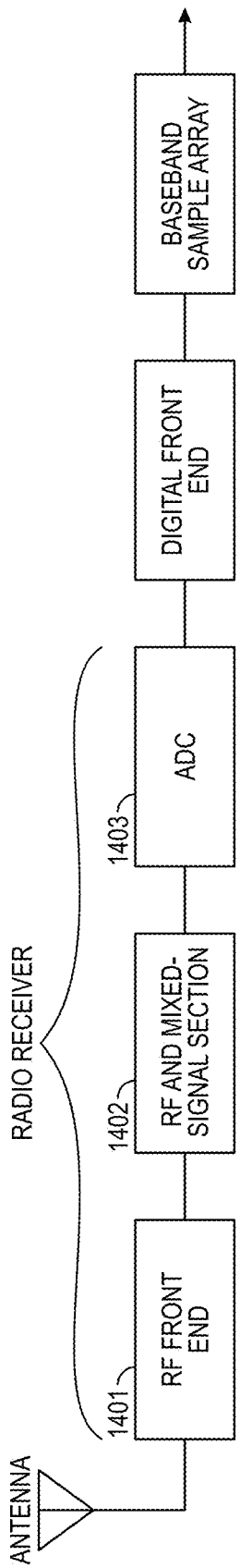
FIG. 4A shows an example of a convention or nomenclature that is used to describe a radio portion of a GNSS receiver.

FIG. 4A shows the convention used to describe the radio portion of the GNSS Receiver. This convention relates to the description of the radio architectures below and distinguishes among the RF front end components 1401 that tend to be external to the integrated circuit, the mixed-signal section 1402 that can include switches, mixers, filters, amplifiers and Local Oscillator circuits and the Analog to Digital Converter (ADC) 1403 block that provides signal sampling and quantization functionality. Any additional subsequent processing blocks are beyond the scope of the Radio Receiver as defined in FIG. 4A.

Figure 4B:
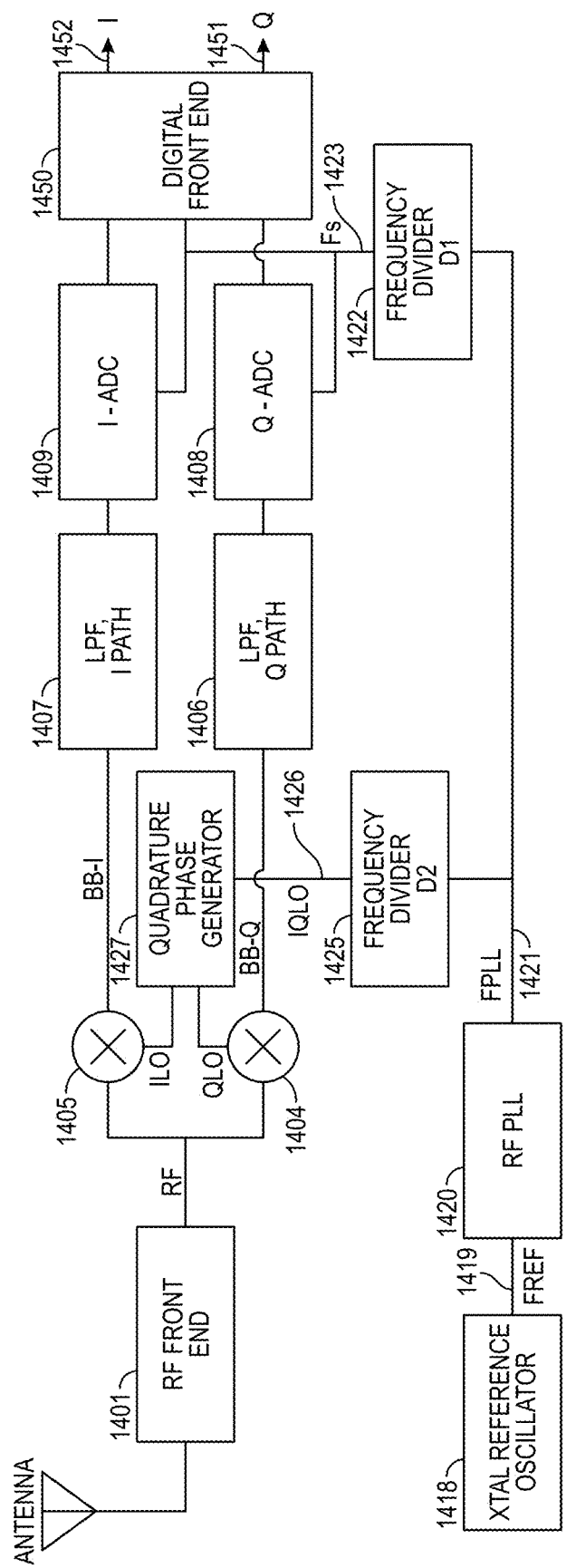
FIG. 4B shows an example of a conventional IQ receiver architecture that can be used in a GNSS receiver.

FIG. 4B shows a conventional IQ quadrature receiver architecture requiring significant analog circuit content. The signal as received by the Antenna is passed through the RF Front End 1401 which provides low noise amplification and filtering. The RF signal is then downconverted to baseband (Zero IF, or Very-Low IF) through a set of quadrature passive or active mixers 1404 and 1405, then low-pass filtered by a set of active low-pass filters (LPF) 1406 and 1407 and quantized at a given sample rate Fs by a set of quadrature ADCs 1408 and 1409. The quadrature local oscillator signal IQLO 1426 provides an I-path local oscillator signal ILO and a Q-path local oscillator signal QLO at 90-degree phase difference and each of them drives a branch of the quadrature mixer 1405 and 1406. The IQLO frequency is derived by frequency division in Frequency Divider D2 1425 of the output frequency fPLL 1421 of the RF Phase Locked Loop (RF PLL) 1420. The RF PLL 1420 synthesizes output frequency fPLL 1421 based on a reference frequency fREF 1419 obtained by a Crystal Reference Oscillator 1418. fREF 1419 is usually shared with other radio circuits on board a given device. Note that the value of D2 can be 1 or higher. In this diagram the frequency division function 1425 and the quadrature generation function 1427 are shown as two distinct blocks. Depending on the actual design they can be performed in the same block (e.g. with quadrature binary clock dividers). The signals ILO and QLO as indicated in FIG. 4B are essentially the same signal but with 90 degree phase difference. The sampling clock of frequency Fs 1423 is also derived from the RF PLL 1420 by frequency division in 1422. Clock signal 1423 is also fed to the Digital Front End block 1450 to aid further processing of the digitized signals.

Figure 4C:
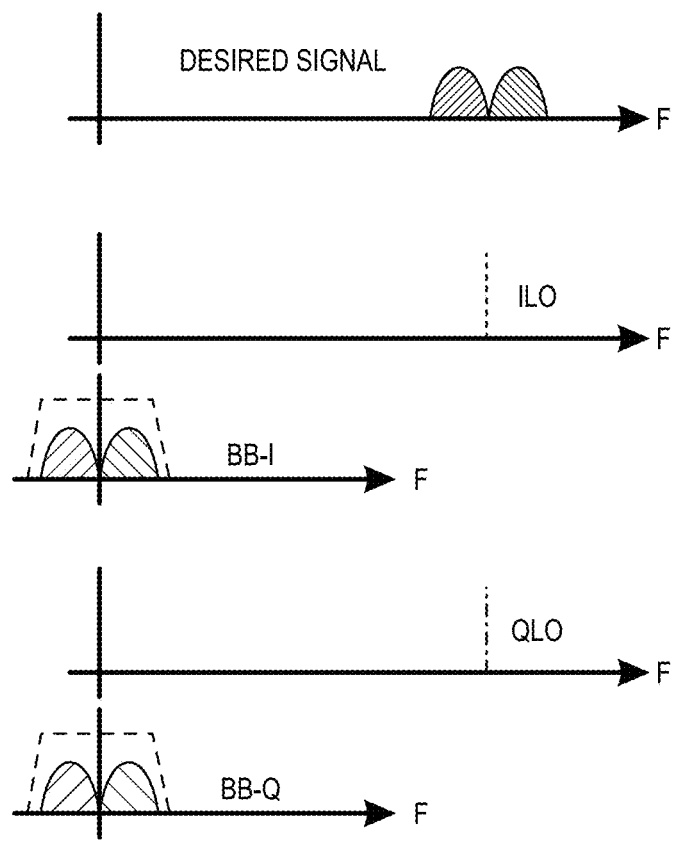
FIG. 4C shows an example of the frequency plan of the receiver architecture shown in FIG. 4B.

The frequency plan of the IQ quadrature receiver is also illustrated in FIG. 4C. Each graph is a frequency domain representation of a signal with the horizontal axis being in frequency units while the vertical axis shows power spectral density or discrete spectral components. The first graph shows the spectrum of the desired signal at RF. The next plot down shows the location of the ILO and the Low-Pass downconverted BB-I signal with the low pass filter response indicated with a dotted line. Similarly, the QLO and downconverted low-pass Q-path signal BB-Q is also shown below.

Figure 4D:
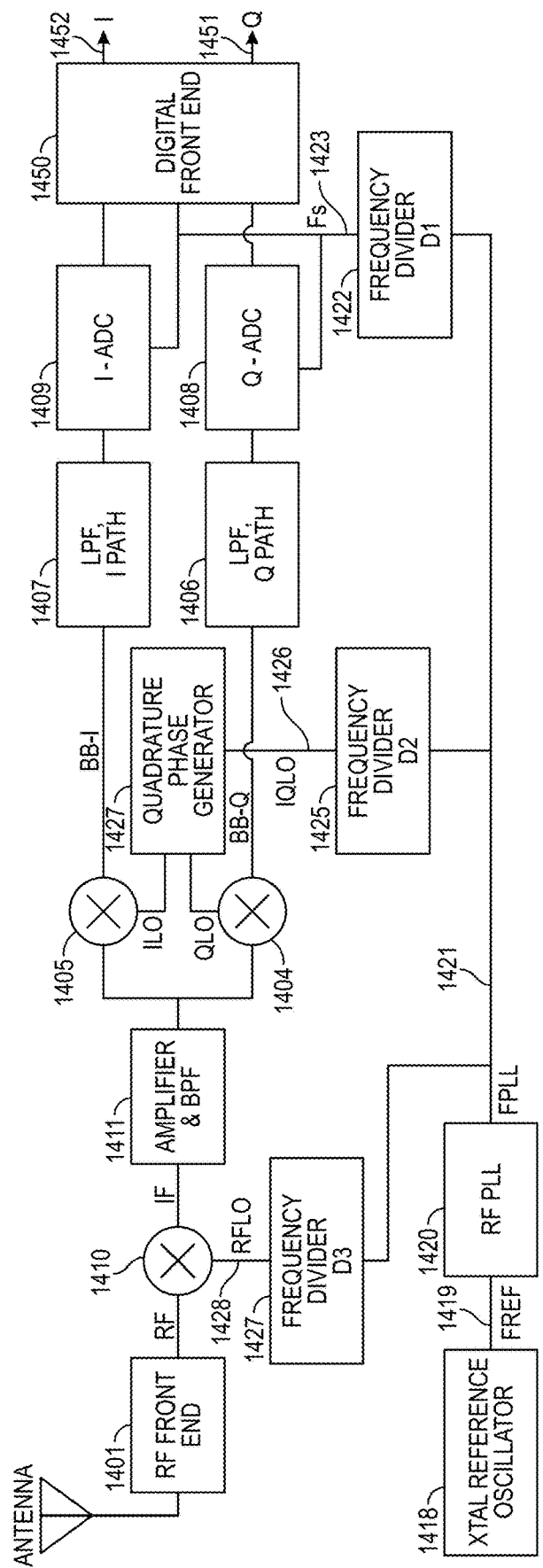
FIG. 4D shows an example of a GNSS receiver according to one embodiment.

FIG. 4D illustrates a modification in the architecture of FIG. 4B, where a switching mixer 1410 converts the RF signal at the output of the RF Front End 1401 to an intermediate frequency (IF) signal. The IF signal is then amplified and filtered with a continuous or discrete time Band Pass Filter (such as N-path) 1411 and then downconverted to low-pass baseband with a set of quadrature mixers 1404 and 1405. It is subsequently passed to a set of antialiasing active LPFs 1406 and 1407 which provide Low-Pass I and Q signals centered at Low-IF or Zero-IF to the quadrature ADCs 1408 and 1409 as described above. The receiver is time-synchronized by a single RF PLL 1420 and all clock and LO frequencies are derived by division of the fPLL 1421 signal. The RF PLL 1420 synthesizes output frequency PLL 1421 based on a reference frequency fREF 1419 obtained by a Crystal Reference Oscillator 1418. fREF 1419 is usually shared with other radio circuits on board a given device. To add flexibility, but at the cost of complexity and area, the RF-PLL 1420 can be implemented with a fractional-N divider. The Frequency Divider D1 1422 provides the sampling clock Fs 1423, the Frequency Divider D2 1425 provides the IQLO signal 1426 to the quadrature phase generator 1427. As described above the quadrature generation functionality 1427 can also be integrated with the frequency divider 1425. Alternative quadrature phase generation techniques include passive Resistor-Capacitor or Inductor-Capacitor circuits on either the IQLO path or the RF path and are well known to those skilled in the art. The RF mixer 1410 is driven by local oscillator signal RFLO 1428 which is generated by Frequency Divider D3 1427. Note that D3 can take values of 1 or higher.

The frequency plan of the architecture in FIG. 4D works around the following relationships:
1) Intermediate frequency: IF=RFLO−RF (for high-side injection)
   IF=RF−RFLO (for low-side injection)
2) Baseband center frequency: fcBB=IF−IQLO (minimize for Very Low IF, Zero IF)
3) RF Local Oscillator frequency: RFLO=fPLL/D3
4) IQ Local Oscillator frequency: IQLO=fPLL/D2
5) Sampling Clock frequency: Fs=fPLL/D1
6) Harmonic Relationship of RF and IF:IF=RF×M/L
7) RF PLL frequency: fPLL=(N+J/K)×fREF (assuming Fractional-N division)
   fPLL=N×fREF (assuming integer-N division)

Figure 4E:
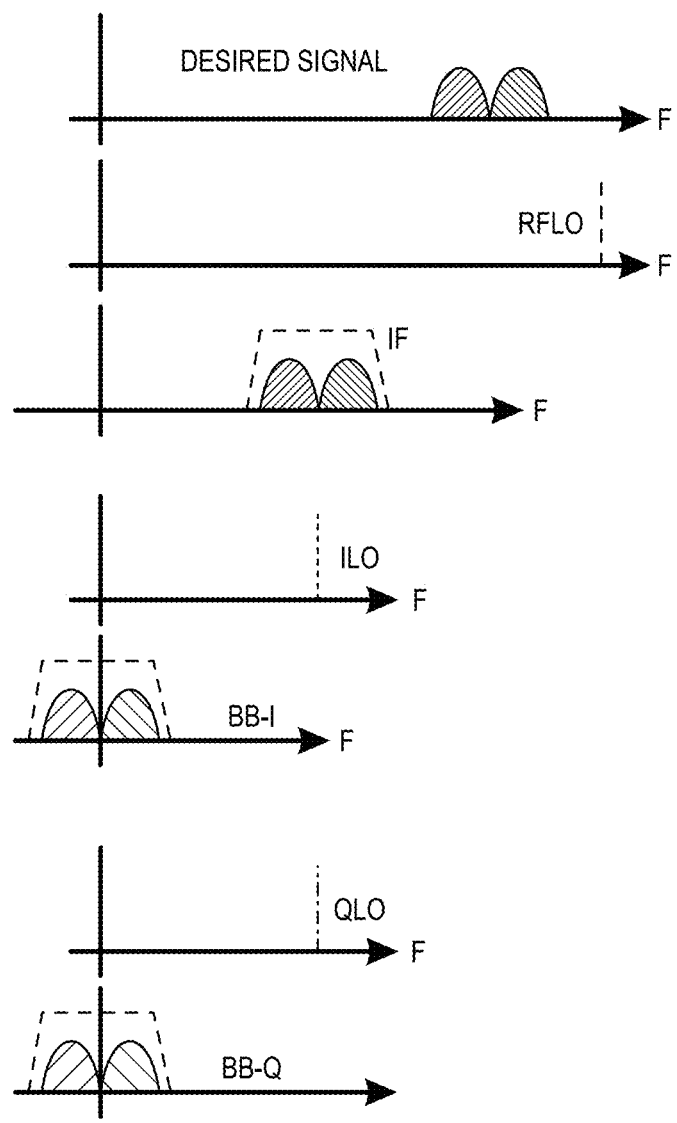
FIG. 4E shows an example of the frequency plan of the receiver architecture shown in FIG. 4D.

If RF is related to IF via a M/L factor, then with algebraic manipulation the following relationship can be derived: RFLO=RF (1+M/L) for high-side injection and RFLO=RF (1−M/L) for low-side injection. Furthermore, since fPLL=(N+J/K)×fREF=RFLO×D3, and thus RFLO=(N+J/K)×D3×fREF. Also, in the case where a Zero-IF receiver frequency plan is pursued, IF=IQLO and since RFLO, IQLO and Fs are harmonically related via integer division to fPLL, the following relationships can be derived between D2 and D3: D2=D3×(L/M+1) for high-side injection and D2=D3×(L/M−1) for low-side injection. The frequency plan of the architecture in FIG. 4D is illustrated in FIG. 4E. As an example, a high-sided RFLO injection is illustrated.

Figure 4F:
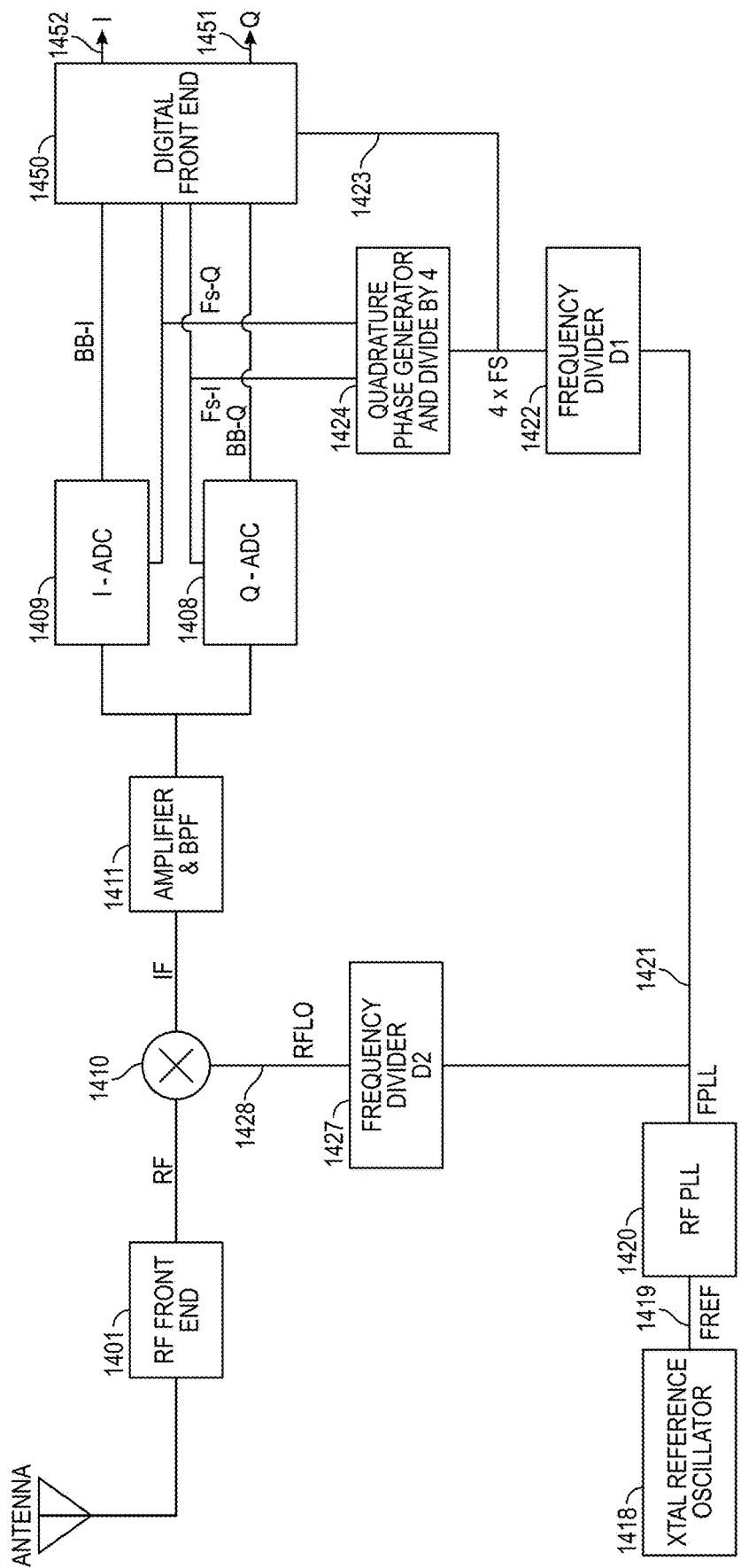
FIG. 4F illustrates a variation of the GNSS receiver shown in FIG. 4D.

The following table describes four frequency plan scenarios relating to a desired signal centered at 1191.795 MHz. Each scenario has different positioning of the RFLO, IF and IQLO. For example, Scenario A features a PLL frequency of 4×RFLO at 5952 MHz and places the IF at 296.2 MHz or ¼ of the desired RF center frequency. Similarly, Scenario B places the fPLL at 4×RFLO and the IF at ⅓ of RF. Scenario C places the fPLL at 2×RFLO and the IF at 14 of RF, while Scenario D has the fPLL at 2×RFLO and the IF at ⅓ of RF. For each scenario, the table also lists the D2 and D1 divider values, the sampling frequency fS and the baseband signal center frequency fcBB. The location of fcBB indicates how close to a Zero-IF condition the receiver operates. In the below scenarios, an integer-N RF PLL was used with a reference frequency fREF of 19.2 MHz. Using an integer-N PLL results in slight offsets in fcBB which can be eliminated of by de-rotating the final digitally down-converted baseband signal in the Digital Front End.

with a fractional-N divider. The IF signal obtained at the output of Mixer 1410 is then amplified and filtered by a Band Pass Filter 1411 which is acting as an anti-aliasing filter. The amplified and filtered IF signal is then sampled by a quadrature ADC composed of an I-path ADC 1409 and a Q-path ADC 1408. The quadrature sampling function is achieved by a 90-degree phase difference between the two sampling clocks Fs-I and Fs-Q. This phase difference is obtained by a Quadrature Phase Generator 1424 which is implemented as a Divider-by-4 which can provide 4 distinct phases of the Fs signal. Note that the effective sampling frequency Fs is derived from signal fPLL 1421 by combining the Frequency Divider D1 with the Quadrature Phase Generator and Frequency Divider-by-4 1424. Fs is thus derived as fPLL/[D1×4]. The two quadrature sampling clocks Fs-I and Fs-Q are also provided to the Digital Front End 1450 and the two clocks are synchronized to each other by also utilizing the 4× Fs clock signal 1423. The architecture of FIG. 4F is more amenable to digital implementation since the RF mixer can be realized as a passive block with switches and resistors and the BPF can be realized as a discrete time block (e.g. N-path filter) with switches, resistors and capacitors. Larger division ratios of D1×4 (e.g. 8 or 12) also provide larger numbers of distinct phase states and can thus yield better N-path filter resolution and rejection characteristics. The quadrature ADCs are effectively sub-sampling the signal at the IF location.

The frequency plan of the architecture in FIG. 4F works around the following relationships:
1) Intermediate frequency: IF=RFLO−RF (for high-side injection)
   IF=RF−RFLO (for low-side injection)
2) RF Local Oscillator frequency: RFLO=fPLL/D2
3) Quadrature Sampling frequency: Fs-I=Fs-Q=fPLL/(D1×4)
4) Harmonic Relationship of RF and IF:IF=RF×M/L
5) RF PLL frequency: fPLL=(N+J/K)×fREF (fractional-N divider)
   fPLL=N×fREF (integer-N divider)

If RF is related to IF via an integer N, then with algebraic manipulation the following relationship can be derived: RFLO=RF (1+M/L) for high-side injection and RFLO=RF (1−M/L) for low-side injection. Furthermore, since fPLL=(N+J/K)×fREF=RFLO×D2, and thus RFLO=(N+J/K)×D2×fREF. Also, since in this case a true Zero-IF receiver

| Scenario | fDes MHz | fPLL MHz | D3 - | fRFLO MHz | IF/RF - | fIF MHz | D2 - | fIQLO MHz | D1 - | fS MHz | fcBB MHz |
|---|---|---|---|---|---|---|---|---|---|---|---|
| A | 1191.795 | 5952.00 | 4 | 1488.00 | ¼ | 296.205 | 20 | 297.6 | 42 | 141.7143 | −1.395 |
| B | 1191.795 | 6355.20 | 4 | 1588.80 | ⅓ | 397.01 | 16 | 397.2 | 48 | 132.4 | −0.195 |
| C | 1191.795 | 2976.00 | 2 | 1488.00 | ¼ | 296.21 | 10 | 297.6 | 24 | 124 | −1.395 |
| D | 1191.795 | 3187.20 | 2 | 1593.60 | ⅓ | 401.81 | 8 | 398.4 | 24 | 132.8 | 3.405 |

FIG. 4F illustrates a variation of the architecture shown in FIG. 4D where the analog LPF and mixers are replaced by a quadrature sampling arrangement. The RF signal at the output of the RF Front End 1401 is down-converted by Mixer 1410 with the aid of the RFLO signal 1428 which is derived by frequency division of the fPLL signal 1421 by the Frequency Divider D2 1427. The RF PLL 1420 synthesizes output frequency fPLL 1421 based on a reference frequency fREF 1419 obtained by a Crystal Reference Oscillator 418. fREF 1419 is usually shared with other radio circuits on board a given device. To add flexibility, but at the cost of complexity and area, the RF-PLL 1420 can be implemented frequency plan is preferred, a fractional PLL shall provide needed flexibility in the synthesis of fPLL. Noting that IF=Fs-I=Fs-Q and since RFLO, Fs-I, Fs-Q are harmonically related via integer division to fPLL, after some algebraic manipulation the following relationships can be derived between D1 and D2: D1=D2 (L/M+1)/4 for high-side injection and D1=D2×(L/M−1)/4.

Figure 4G:
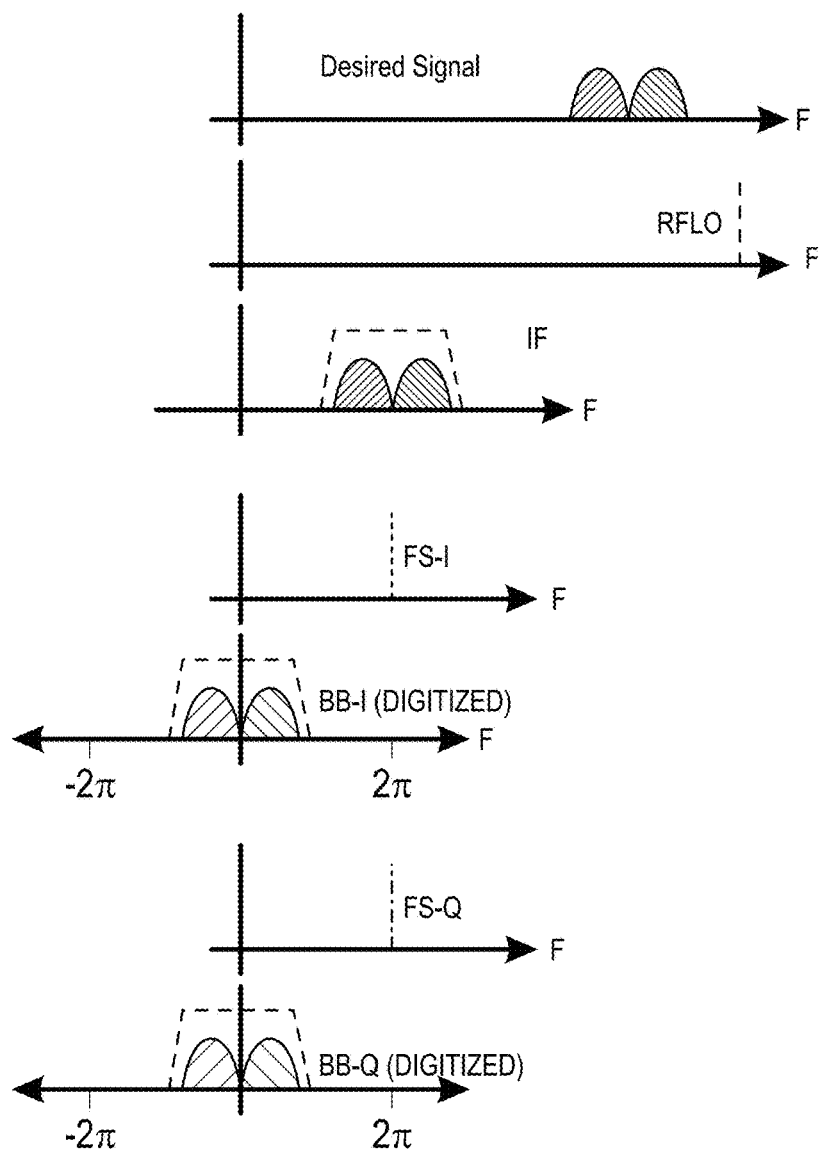
FIG. 4G shows an example of the frequency plan of the receiver architecture shown in FIG. 4F.

A sketch of the frequency domain processing in the above arrangement is also shown in FIG. 4G. A high-side RFLO injection is used as an example since it offers larger image rejection through Low pass Filtering of the input signal at the RF Front End. The IF signal is Anti-Alias Filtered and the sampling clocks Fs-I and Fs-Q result in digital baseband signals BB-I and BB-Q. Note that, in contrast to signals before digitization, the BB-I and BB-Q signals are in discrete time, and as such their frequency axis is defined in radian frequency from −2pi to +2pi radians.

The following table describes four frequency plan scenarios relating to a desired signal centered at 1191.795 MHz. Each scenario has different positioning of the RFLO and IQLO. For example, Scenario A features a PLL frequency of 4×RFLO at 5958.975 MHz and places the IF at 297.949 MHz or ¼ of the desired RF center frequency. Similarly, Scenario B places the fPLL at 4×RFLO and the IF at ⅓ of RF. Scenario C places the fPLL at 2×RFLO and the IF at ⅕ of RF, while Scenario D has the fPLL at 2×RFLO and the IF at ⅓ of RF. Note that all of the below scenarios utilize a fractional-N PLL which ensures the baseband frequency offset is zero, i.e. the receiver down-converts to Zero-IF. In the case where an integer PLL needs to be used with a given Crystal Oscillator Frequency fREF, slight baseband conversion frequency offsets may be observed. As mentioned above, these can be digitally down-converted to zero offset from DC.

| Scenario | fDes MHz | fPLL MHz | D2 - | RFLO MHz | IF/RF - | IF MHz | D1 - | fS MHz |
|---|---|---|---|---|---|---|---|---|
| A | 1191.795 | 5958.975 | 4 | 1489.7438 | ¼ | 297.949 | 20 | 297.949 |
| B | 1191.795 | 5720.616 | 4 | 1430.154 | ⅓ | 238.359 | 24 | 238.359 |
| C | 1191.795 | 2860.308 | 2 | 1430.154 | ⅕ | 238.359 | 12 | 238.359 |
| D | 1191.795 | 3178.12 | 2 | 1589.06 | ⅓ | 397.265 | 8 | 397.265 |

Figure 4H:
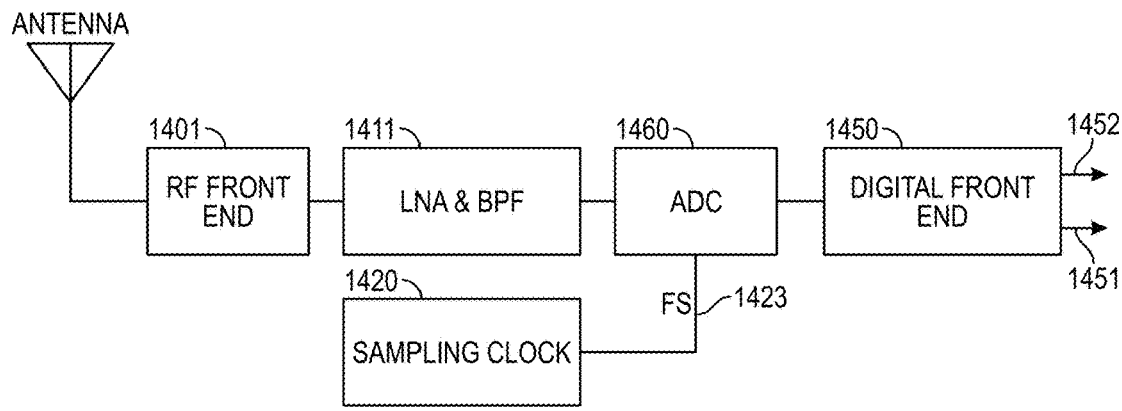
FIG. 4H shows an example of a subsampling arrangement that can be used in one or more embodiments of the inventions described herein.
Figure 4I:
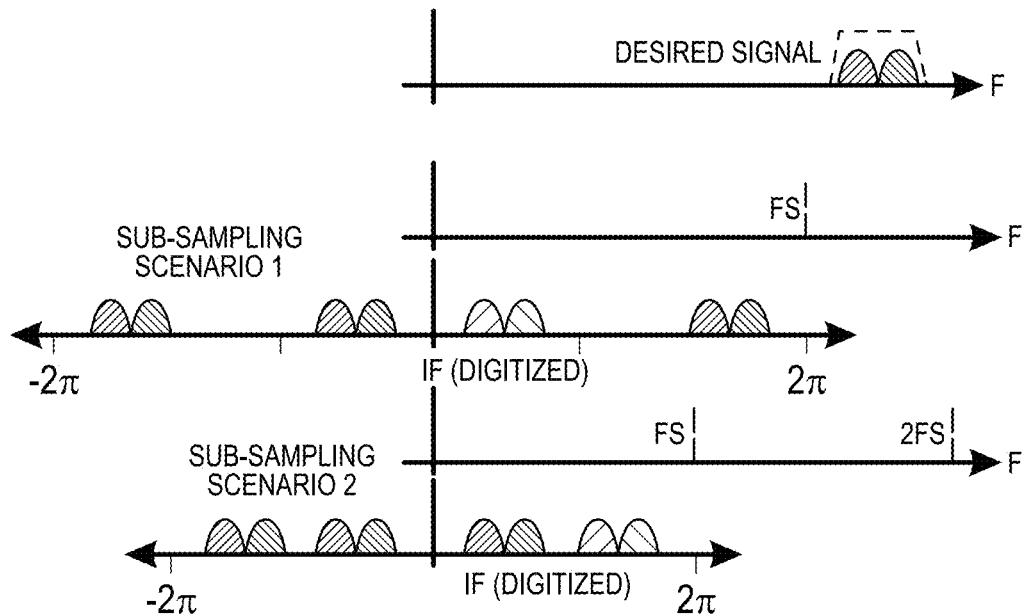
FIG. 4I shows an example of a frequency plan that can be used in the subsampling architecture shown in example shown in FIG. 4H.

In yet another implementation, FIG. 4H shows a sampling architecture as realized for the GNSS system described herein. As mentioned earlier, the RF Front End 1401 is typically composed of discrete RF components (low noise amplifiers and filters) and provides a filtered and amplified signal to the Amplifier & BPF block 1411 which can be integrated in the SOC. Low noise amplifiers and selective filters often require inductors which are expensive to integrate onto the SOC and are typically located off-chip, especially if a fully digital fabrication process is utilized. After the RF signal has been sufficiently Anti-Alias Filtered through blocks 1401 and 1411, it is sampled by an RF ADC 1460. The sampled signal is down-converted/mixed by the closest sampling clock harmonic and processed by the Digital Front End 1450, which includes complex down-conversion with complex multipliers, de-rotators and similar blocks to finally yield digital complex quadrature baseband 11451 and Q 1452 signals. Although the architecture of FIG. 4H seems more amenable to integration in digital CMOS processes, it suffers from linearity and noise immunity problems. The Anti-Aliasing Filtering is achieved by the BPF in block 1411 which can be better integrated if implemented in discrete time (i.e. with some form of sampling and hold circuitry ahead of it). It is also possible to use mixed-signal technology such as N-path filters, albeit operating at very high radio frequencies and at a cost of power consumption. One approach that can save power but requires a spectrally clean clock is subsampling, where a lower frequency sampling clock creates a number of aliased bands thus downconverting a multitude of signals aliased through the various sampling harmonics. The anti-aliasing filtering function in the Amplifier & BPF 1411 is designed to ensure the unwanted aliased components (including noise) are sufficiently rejected. FIG. 4I illustrates the frequency plan of a subsampling arrangement. Two subsampling scenarios are considered. Scenario 1, uses a fundamental band-pass sampling which down-converts the RF signal to the lowest digital Nyquist band, while Scenario 2, uses a second sampling harmonic to band-pass sample the RF signal and convert it to the first image band, or to the lowest digital Nyquist band but with inverted spectrum. Note that again, the digitized IF signals are defined in discrete time and as such their frequency axis is referred to radian frequency from −2pi to 2pi.

Figure 4J:
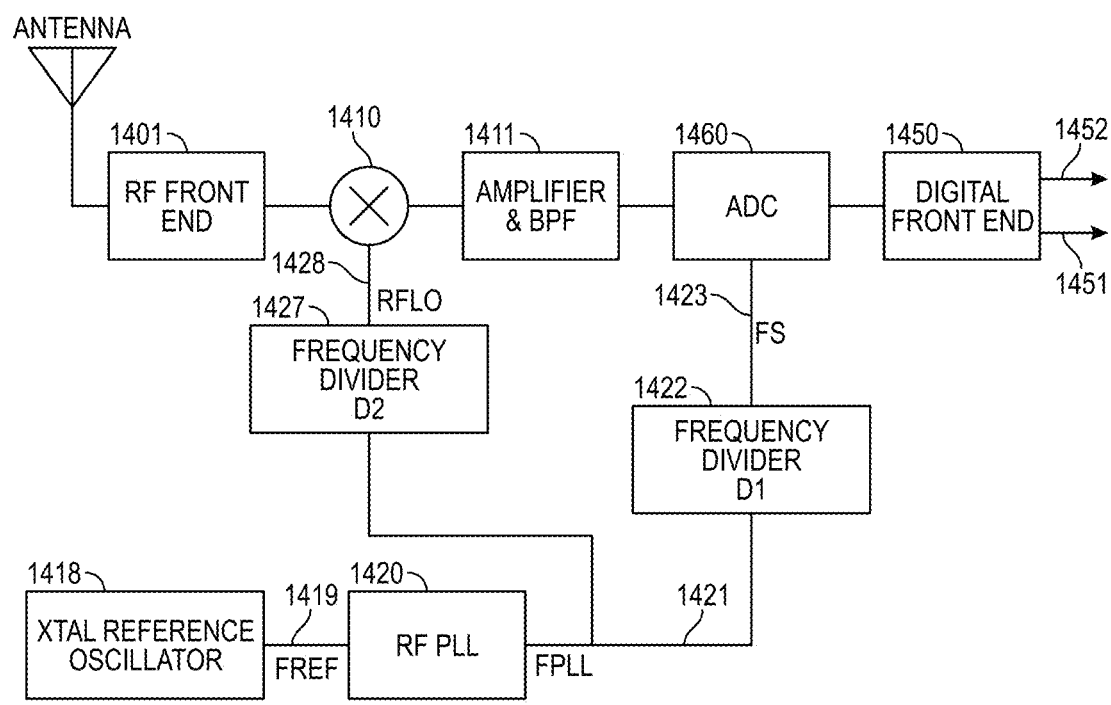
FIG. 4J shows an example of an architecture of a GNSS receiver that can use aspects of the arrangement in FIG. 4H.
Figure 4K:
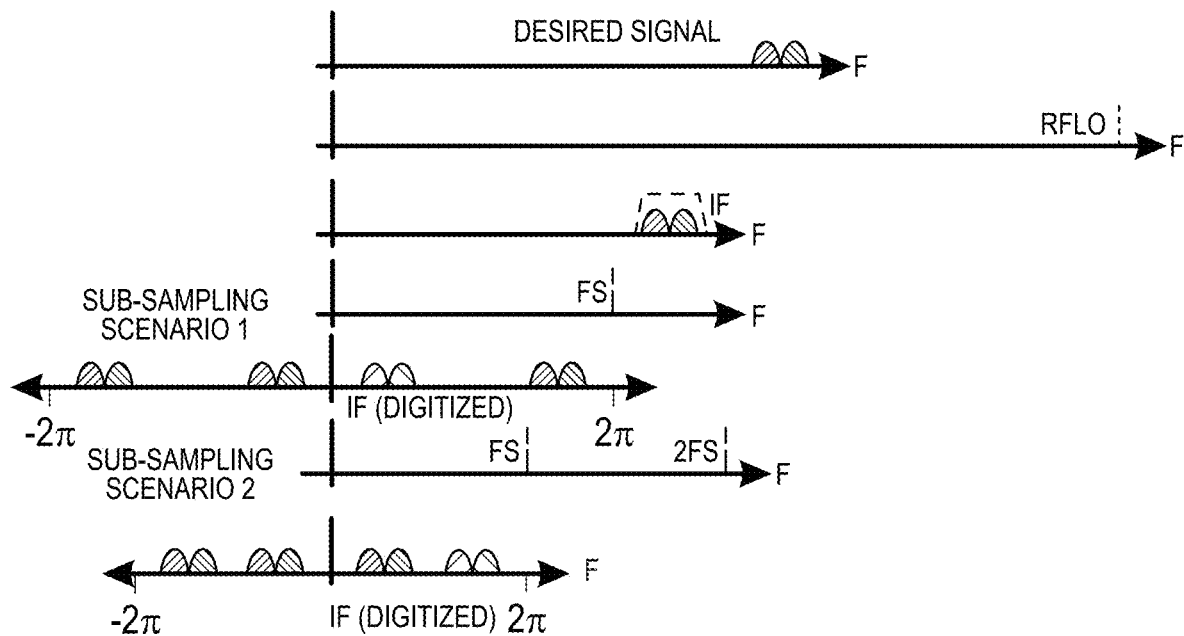
FIG. 4K shows an example of the frequency plan of the receiver architecture shown in FIG. 4J.

In yet another implementation, FIG. 4J illustrates an improvement on the architecture of FIG. 4H, which suffers from low aliasing immunity due to limited selectivity and higher power consumption due to higher quality clock requirements. In a fashion similar to the architecture described in FIG. 4D, the RF signal from the Antenna passes through an external RF Front End 1401 with the appropriate amplification and band filtering, then enters a passive mixer 1410 that downconverts the signal to an intermediate frequency based on the RFLO signal which is again derived by frequency division (in Frequency Divider D2) of the fPLL signal 1421 originating at the RF PLL 1420. The IF signal at the output of the mixer 1410 is fed to an arrangement of amplification and band pass filtering in the Amplifier & BPF block 1411. The Amplifier & BPF block 1411 ensures sufficient low-noise anti-aliasing filtering is provided. It can also take advantage of discrete time signal processing techniques such as N-path filtering which can easily be realized in all-digital IC fabrication processes. The filtered output IF signal is then subsampled at the ADC 1460 which is operating at the Fs 1423 rate. This, again eases the filtering implementation requirements and also the ADC clocking requirements. By filtering an IF signal a favorable power versus performance trade-off can be obtained on the Anti-Aliasing filtering performance of the LNA & BPF block 1411 with lower clock rates and power consumption and better rejection characteristics. In addition, subsampling an IF signal, the ADC 1460 can now operate at a lower sampling rate while also ensuring less aliasing and allowing higher resolution and lower power consumption. Note that larger numbers of clock phases obtained by divisors including a factor of 4 can result in further performance improvements in an N-path filter integrated in the Amplifier & BPF block 1411. The frequency plan of the architecture in FIG. 4J is shown in FIG. 4K. Again, two scenarios are considered. In Scenario 1 the sampling and down-conversion employs the mechanism of subsampling through the higher Nyquist band of the fundamental. In Scenario 2 the sampling and down-conversion employs the mechanism of subsampling through the lower Image band of the $2^{nd}$ sampling harmonic. Note that the constraint of the frequency fPLL 1421 being divisible by divisor D1 1422 and also by divisor D2 1427 requires optimization of the IF placement. For hardware-efficient IF downconversion to baseband in the Digital Front End 1450, it is preferable to locate the IF at Fs/4, 3Fs/4, 5Fs/4, 7Fs/4 etc. Other locations such as Fs/8, 7Fs/8, 9Fs/8, 15Fs/8 can also work out efficiently.

The 52 MHz-wide Galileo E5 signal (frequency spectrum shown in FIG. 4O) poses interference immunity and power consumption challenges to GNSS receivers operating in this band. To mitigate interference and reduce power consumption three general possibilities are identified for the radio receiver:

(1) Selection of E5a+E5b or E5a or E5b signal processing by time-division with adaptable duty cycle for optimum power consumption (i.e. a form of time duplexing/multiplexing)

(2) Selection of E5a+E5b or E5a or E5b by RF or mixed signal filtering (i.e. a form of frequency multiplexing)

(3) Intentional folding of E5a on E5b, (i.e. Code-domain multiplexing) or E5a on itself or E5b on itself by using real mixing and appropriate Local Oscillator frequency location.

Figure 4L:
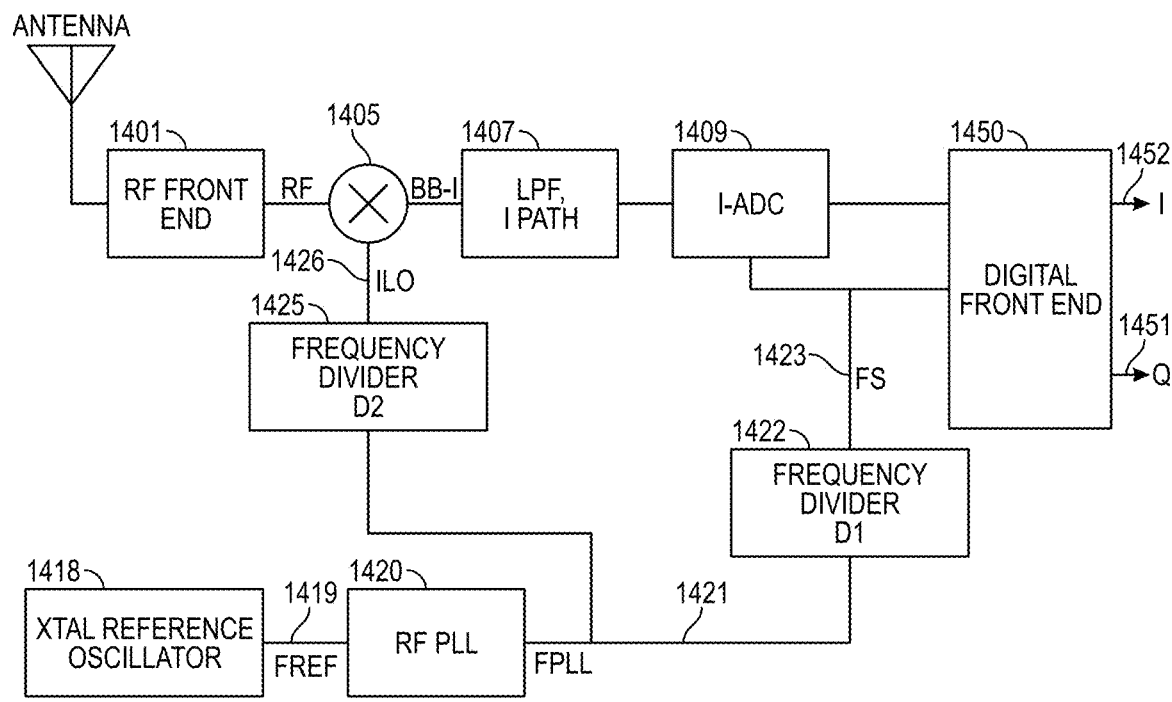
FIG. 4L shows an example of an embodiment of a GSSS receiver that is configured to fold sidebands of GNSS signal onto each other.
Figure 4M:
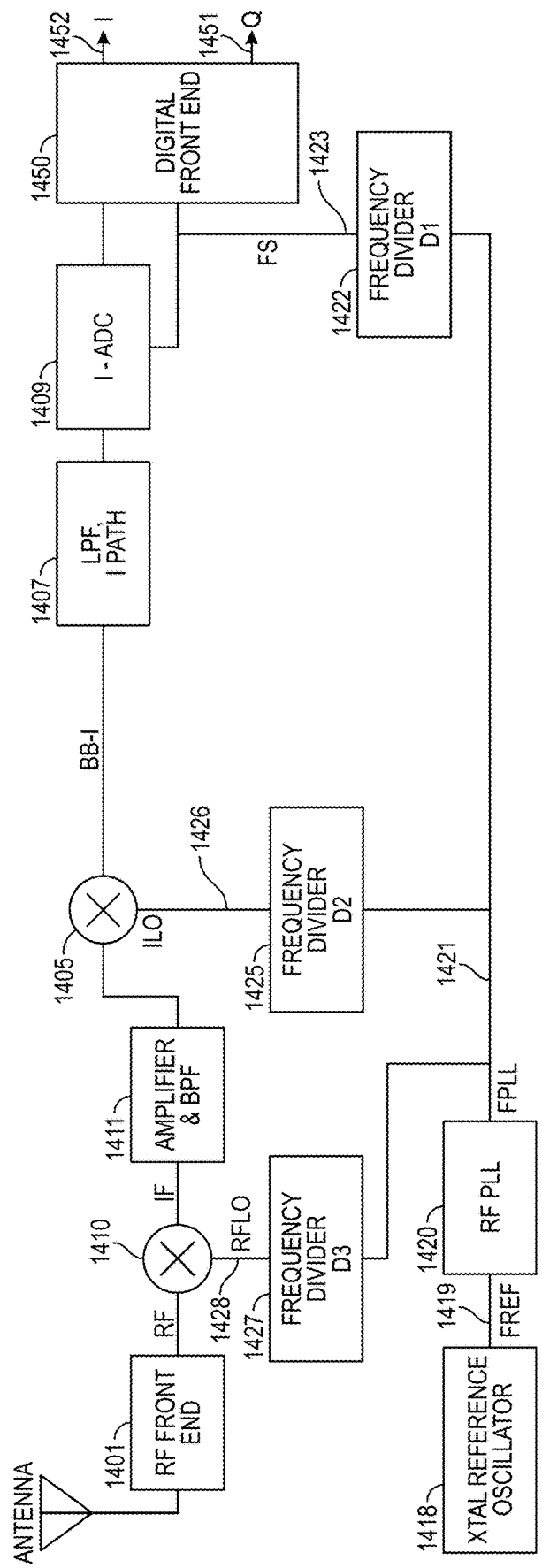
FIG. 4M shows another example of an embodiment of a GSSS receiver that is configured to fold sidebands of GNSS signal onto each other.
Figure 4N:
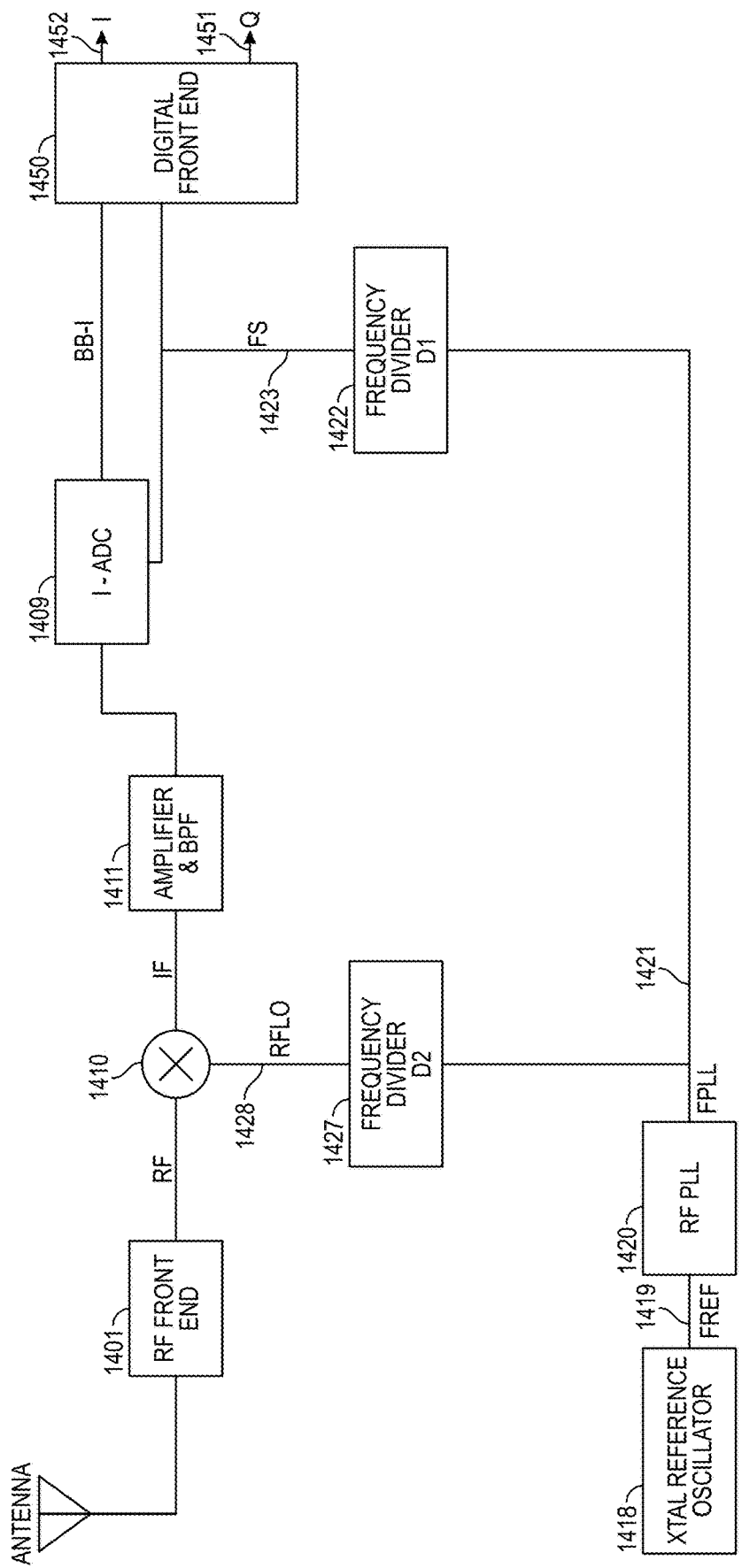
FIG. 4N shows an example of another embodiment of a GSSS receiver that is configured to fold sidebands of GNSS signals onto each other.
Figure 4O:
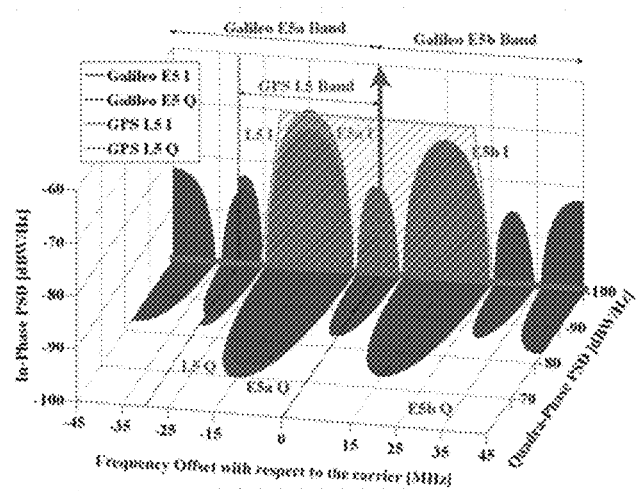
FIG. 4O shows a Galileo E5 signal frequency spectrum.
Figure 4P:
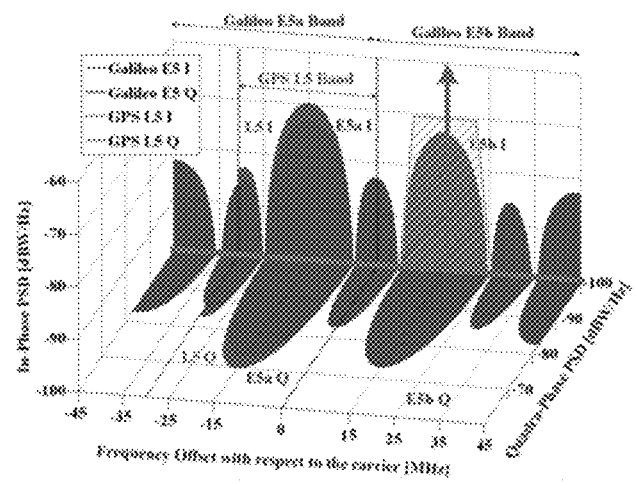
FIG. 4P shows a Galileo E5B signal frequency spectrum.

Aside from duty-cycling the receiver based on interference rejection, the use of different portions of the signal spectrum by selection or by folding can also reduce power consumption on the analog/RF and digital front-end in various degrees and depending on the given architecture. Since the receiver is capable of tuning to any of the two sidebands it can be operated in the following ways:

(1) The upper (E5b) or lower (E5a) sideband is selected and processed at half rate (20×1.023 MHz) compared to the full 52 MHz band. As an example, the selection of the E5B sideband is shown in FIG. 4P.

(2) The upper (E5b) or lower (E5a) sideband is selected and processed. In addition, the processing can be duty-cycled for optimum power consumption.

(3) The upper (E5b) sideband is selected and if excessive DME/TACAN interference is detected the receiver switches to the lower (E5a) sideband. The converse can also happen.

(4) Both sidebands are folded on each-other by using a real mixing operation as explained below.

(5) The upper (E5b) or lower (E5a) sideband is selected and processed at half rate (20×1.023 MHz) also at half the low-pass bandwidth (e.g. 12 MHz) by folding the sideband on itself and by using a real mixing operation as explained below.

The E5a vs E5b selection can happen in real time or in predetermined fashion as described above. Radio receiver architectures such as the ones shown in FIGS. 4B, 4D and 4F allow flexible processing by switching between a double sideband and a single sideband signal, while making performance and power trade-offs. The receiver configuration includes changing the RFLO and IQLO frequencies appropriately and if applicable, modifying the pass-band of the filters.

Real mixing results in folding a bandpass desired signal on itself by using a single mixer and by placing the local oscillator frequency within the operating bandwidth of the desired signal. In the case of folding the two sidebands E5a and E5b on each other, real mixing results in a form of code domain multiplexing. To illustrate this concept the radio architecture of FIG. 4B is configured as shown in FIG. 4L, where the Q-path of the quadrature mixer, LPF and ADC are shut down. The Local Oscillator ILO 426 frequency remains at 1191.795 MHz. Referring to the analysis shown in Appendix 3, at the output of the mixer 405, the two sidebands, E5a and E5b are converted to baseband and folded over each other, furthermore E5a is spectrally reversed. The Low-Pass bandwidth of the folded signal in the single real-path is still the same as before, namely 26 MHz. Also the corner frequency of the anti-aliasing LPF 407, as well as the sampling rate of the ADC 409 remain the same as in the double-sideband case. Although it carries both sidebands folded on each other, the resulting signal is not fully at baseband, but is centered at a frequency offset of 15.345 MHz. At the Digital Front End further processing down-converts the signal at zero-frequency and de-spreads one or the other sideband. The processing gain is assumed to hold well over inversed codes. Since the mixer output noise is increased by 3 dB this implementation assumes reasonable SNR margins. This technique can also reduce the receiver processing load and power consumption, especially in the architectures of FIGS. 4B, 4D, 4F as they are re-configured to operate respectively as in FIGS. 4L, 4M, 4N.

Real mixing in the case of folding a given sideband (E5a or E5b) on itself, the local oscillator is placed close to the center of the sideband (1176.450 MHz for E5a, 1207.140 MHz for E5b), while also reducing the low pass bandwidth to much less than 26 MHz (since due to the folding to the negative frequency axis the effective bandwidth is now double-sided). The folding results in a 3 dB SNR degradation, but since each sideband is spread by a pseudorandom code with sufficient coding gain, the spread signal can still be retrieved. Depending on the frequency tracking loop bandwidth, a small frequency offset (e.g. 10 kHz or more) may need to be applied to the local oscillator signal so that the negative folded spectrum does not interfere with receiver synchronization. This technique results in significant radio power reduction, especially in the architectures of FIG. 4B, 4D, 4F as they are re-configured to operate respectively as in FIGS. 4L, 4M, 4N. In addition, further interference immunity is achieved by reducing the effective receiver bandwidth, compared to full double-sideband operation.

One way to save power consumption during tracking, is to use a single sideband as this reduces the clock rate requirements in the Digital Front End and subsequent stages. In one particular implementation, during acquisition the full double sideband signal (E5a and E5b sidebands) is processed by operating the full complex radio receiver (as shown in FIG. 4B) and a complex 52 MHz bandwidth is processed (2× real 26 MHz bandwidth). The Low pass filter bandwidth, ADC clock and decimation plan are accommodating a wideband signal as shown in the frequency spectrum of the E5A or E5B signals. When the receiver enters tracking mode the radio receiver is configured according to FIG. 4L in which the 2×real 26 MHz bandwidth is processed by a single mixer resulting 26 MHz complex signal bandwidth offset to a 15.345 MHz IF but also carrying the two sidebands folded on each other. As mentioned above, although the architecture in FIG. 4B is especially suitable for this feature, other architectures are also applicable. In particular, the radio architecture described in FIG. 4D can be configured as in FIG. 4M. In addition, the radio architecture described in FIG. 4F can be configured as in FIG. 4N.

Figure 17:
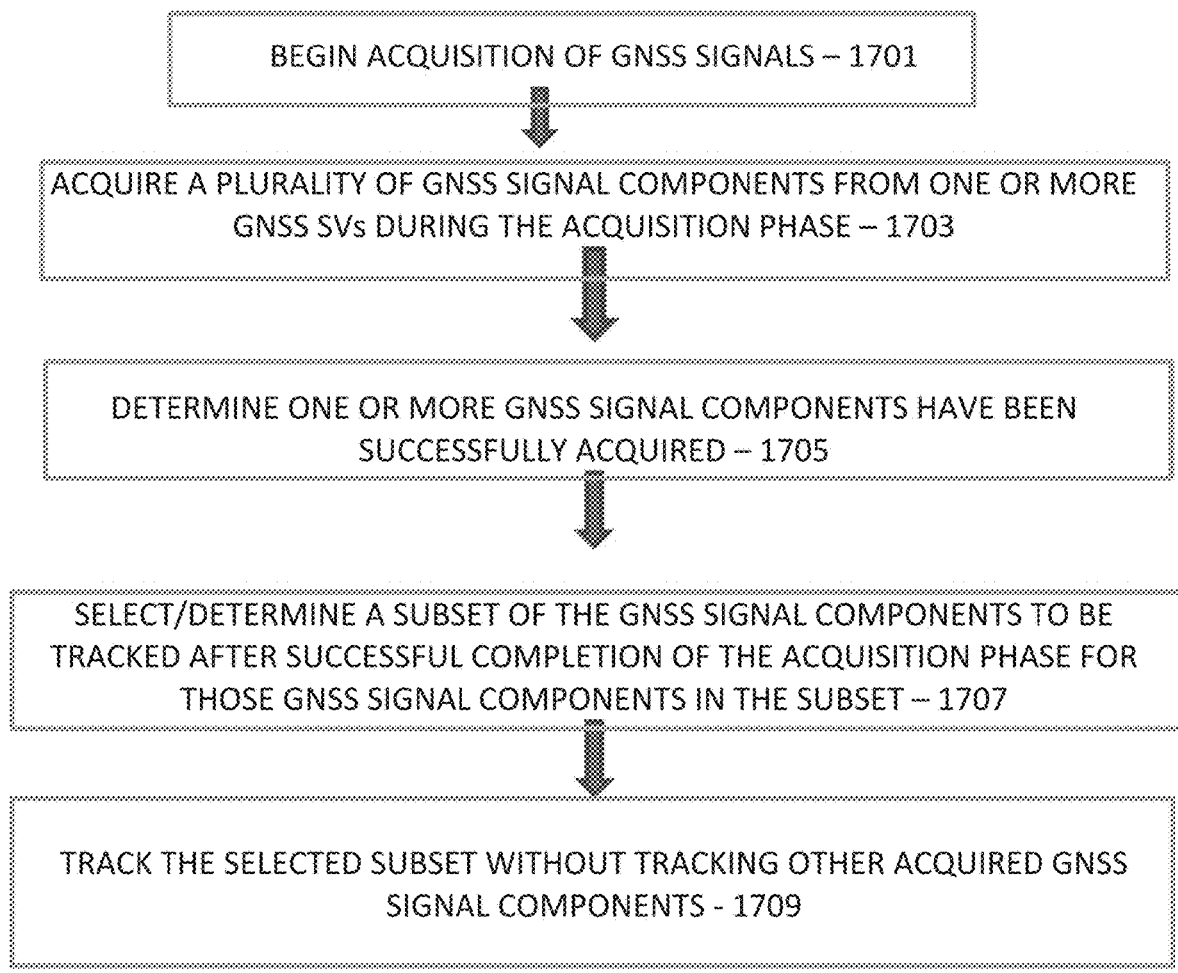
FIG. 17 shows an example of a method that can reduce power consumption by acquiring a set of GNSS signal components during an acquisition phase and then tracking with only a subset of those acquired components.

FIG. 17 shows an example of a method that switches between use of a plurality of signal components during acquisition and use of a subset of those acquired signal components during tracking after successfully acquiring at least one signal component from a GNSS SV. This method can save power by reducing power consumption in the digital processing of received GNSS signals and potentially (depending on the implementation) in the RF portion of the GNSS receiver. It is often the case that the acquisition phase lasts only a short period of time while the tracking phase lasts a much longer period of time; reducing power consumption during tracking can significantly improve the performance of the GNSS receiver (at least with regard to its power consumption specifications). Referring now to the method in FIG. 17. in operation 1701 the GNSS receiver can begin acquiring GNSS signals; for example, the GNSS receiver can use one of the receiver architectures described above (e.g., FIG. 4M or 4N) to acquire GNSS signals using, for example, the acquisition array processor described herein (e.g., see FIGS. 6-8). In operation 1703, the GNSS receiver can attempt to acquire a plurality of GNSS signal components from one or more GNSS SVs during the acquisition phase. For example, during the acquisition phase in operation 1703 the GNSS receiver can attempt to acquire 4 signal components from a GNSS SV in the Galileo constellation (e. g., the E5AI, E5AQ, E5BI, and the E5BQ signal components from a particular SV in the Galileo constellation). Normally, the GNSS receiver (at least in a "cold start" case) will attempt to acquire, in operation 1703, a plurality of signal components from a sufficient number of GNSS SVs (e.g., at least 4 or 5 SVs) to permit a position to be determined. After one or more signal components have been acquired, as determined in operation 1705, the GNSS receiver can select or determine, in operation 1707, a subset of the successfully acquired signal components to be tracked; hence, rather than tracking all of the successfully acquired signal components (that were determined in operation 1705 to have been successfully acquired), the GNSS receiver selects a subset of the successfully acquired signal components and tracks, in operation 1709, only those in the subset. For example, in a case where the GNSS receiver has acquired all 4 signal components from a first SV in the Galileo constellation (e. g., the E5AI, E5AQ, E5BI, and the E5BQ signal components from the first SV in the Galileo constellation) and has acquired 2 signal components from a second SV in the Galileo constellation (e. g., the E5BI and the E5BQ signal components from the second SV in the Galileo constellation), the GNSS receiver can select to track only one or the four signal components from the first SV and one of the two signal components from the second SV during the tracking phase. Those signal components that were not selected will not be tracked, thereby reducing power consumption in the GNSS receiver. The selection in operation 1707 can attempt to select the "best" signal component to be tracked, and some examples of possible selection criteria or algorithms are provided below. In one embodiment, "best" may be near optimal instead of truly optimal because near optimal can still reduce power consumption while still providing acceptable tracking.

The best sideband can be chosen with one or more of the following algorithms:
1) The sideband with the least interference. Often the DME/TACAN will be seen in only one sideband. The best sideband is the one without the current DME interference. Later in a different area, the interference may be dominant in a different sideband.
2) The sideband with the most launched satellites. Currently the lower sideband centered at 1176.45 Mhz has the most satellites: namely US L5, China B2a, Japan QZSS L5, and Europe E5a. Thus, the upper sideband can be disabled after acquisition.
3) The sideband with the most visible satellites at the current time and location as determined by computing the elevation angle of all launched satellites. The visible satellites have a positive elevation angle above the horizon and secondly above a non-zero mask angle, such as 10 degrees. It is possible that at a given time, one sideband may contain more satellites than the other.
4) The sideband with the fast data rate when the receiver has not yet determined fine time. For example, the upper sideband of B2 has a 1 kHz data rate vs 200 Hz on the lower sideband, the upper sideband of E5 has a data rate of 250 Hz vs a 50 Hz on the lower sideband. The faster decode of a time stamp allows a gain in accuracy by learning fine time.
5) A plurality of these "best" sidebands can change dynamically, for example, start with the data decode, then transition to most visible, and then modulate in case of interference.
6) The sideband that contains the satellites of a chosen constellation that is required in a particular country based on import restrictions. For example, if Russia requires use of Russian L5 satellites, and they are placed exclusively in one sideband, then that sideband would be the best single tracking sideband based on import requirements.

Spoofing may be seen at one sideband and not at the other. If the receiver is able to process each system independently, identify spoofing, where an independent fix with one constellation identifies spoofing, and the best sideband for the non-spoofed constellations is identified.

To reduced power consumption, tracking can be performed on a best sideband rather than multiple sidebands from the same GNSS SV. This implies that the RF and digital processing for the non-best sideband can be turned off, reducing power consumption. For example, RF mixer, filters, A2D, digital front end can be disabled for this other sideband. The baseband correlation can also be disabled.

After acquisition of enough SVs and determination of at least one secondary code, a fix allows determination of the remaining secondary codes and thus, a nearly direct acquisition of the remaining satellites with a significantly narrower code search. In this case, the acquisition engine can be turned off. Tracking can recover from system loss by coherent tracking of the pilot channel. Thus, the extra sideband (that is not tracked) is less critical.

Exemplary Embodiments

The following text presents numbered embodiments in claim like format, and it will be understood that these embodiments may be presented as claims in one or more future filings, such as one or more continuation or divisional applications. Although separate embodiments are described in detail below, however, it is appreciated that these embodiments may be combined or modified, in part or in whole. At least some of these numbered embodiments were presented as claims in a prior provisional application.

Embodiment 1. A system comprising:
  a set of one or more application processors (APs) configured to execute an operating system (OS) and one or more application programs, the set of one or more application processors implemented in an integrated circuit (IC);
  a set of one or more buses coupled to the set of one or more APs, the one or more buses on the IC;
  a cache memory on the IC and coupled to the set of one or more buses and coupled to the set of one or more APs to store data for use by the OS and for use by the one or more application programs;
  a bus interface coupled to the set of one or more buses, the bus interface to couple the set of one or more APs to dynamic random access memory (DRAM) which is external to the IC;
  a GNSS processing system implemented on the IC, the GNSS processing system comprising an acquisition engine (AE) and a tracking engine (TE), the GNSS processing system coupled to a shared memory through the one or more buses, the shared memory being one or both of (a) the cache memory or (b) other memory on the IC;

a memory controller coupled to the shared memory and to the GNSS processing system, the memory controller to allocate a portion of the shared memory for use by the AE in response to one or more instructions from the operating system in order to allow GNSS signals to be acquired.

Embodiment 2. The system as in embodiment 1 wherein the shared memory comprises SRAM (static random access memory) and the AE includes ASIC hardware logic for performing fast Fourier transform (FFT) operations using a decimation in time method.

Embodiment 3. The system as in embodiment 2 wherein the GNSS processing system includes a dedicated memory that is separate from the shared memory and is dedicated for use by the GNSS processing system and wherein the other memory is a processor local storage for a processor that is not one of the one or more APs.

Embodiment 4. The system as in embodiment 1 wherein the memory controller includes a first port controller to control reading from and writing to the portion for the AE and a second port controller to control reading from and writing to a remaining portion of the shared memory.

Embodiment 5. The system as in embodiment 3 wherein the AE performs an acquisition of GNSS signals from GNSS space vehicle(s) (SVs) and the acquisition comprises determining frequencies of received GNSS signals containing pseudorandom codes to enable tracking of the GNSS signals to produce, as a result of the tracking, pseudoranges to the GNSS SVs.

Embodiment 6. The system as in embodiment 5 wherein the shared memory has a first port for use when the portion is allocated for use by the AE and a second port for use by either the processor or the one or more APs when the portion is allocated.

Embodiment 7. The system as in embodiment 5 wherein the allocated portion is to store one or more of: (1) pseudorandom codes of GNSS SVs or (2) hypotheses of identifiers of potentially acquired GNSS signals and hypotheses of their frequencies.

Embodiment 8. The system of embodiment 7 wherein the memory controller is to deallocate the portion after the GNSS processing system begins to track GNSS signals that have been acquired from at least three (3) GNSS SVs.

Embodiment 9. The system of embodiment 8 further comprising:

an antenna input to receive GNSS signals in an L5 WB frequency band;

a low noise amplifier (LNA) coupled to the antenna input to amplify the GNSS signals;

a radiofrequency analog to digital converter (ADC) coupled to an output of the LNA, the radiofrequency ADC and the LNA to receive and process GNSS signals in the L5 WB frequency band and wherein the GNSS processing system is configured to process only GNSS signals in the L5 WB frequency band.

Embodiment 10. The system as in embodiment 1 wherein the one or more APs, prior to or during an acquisition phase, generate GNSS pseudorandom codes for at least GNSS SVs that are in view of the system, the generated GNSS pseudorandom codes initially stored in the DRAM which is external to the IC and then copied into the shared memory during the acquisition phase or at the beginning of the acquisition phase.

Embodiment 11. The system as in embodiment 10 wherein the one or more APs generate the GNSS pseudorandom codes in a background operation only for healthy GNSS SVs that are in view or will be in view within a period of time, and wherein the OS reserves a portion of the shared memory for use by the AE in response to the one or more APs receiving a request to provide location data.

Embodiment 12. A method for operating a system, the method comprising:

receiving, from one or more application processors (APs) on an integrated circuit (IC), a request to generate location data through use of a GNSS processing system on the IC, the GNSS processing system including an acquisition engine (AE) that is configured to acquire a plurality of GNSS signals, each of the GNSS signals transmitted from one of a constellation of GNSS space vehicles (SVs);

identifying a portion of a shared memory on the IC and allocating, in response to the request, the portion for use by the AE while one or more other processors are allocated a remaining portion of the shared memory, the allocating performed by an operating system that executes on the one or more APs or by firmware executing on the IC;

storing, by the AE or the one or more APs, data related to GNSS signal acquisition processing in the allocated portion.

Embodiment 13. The method as in embodiment 12 wherein the shared memory comprises SRAM (static random access memory) on the IC and the AE includes ASIC hardware logic for performing fast Fourier transform (FFT) operations using a decimation in time method.

Embodiment 14. The method as in embodiment 13, wherein the method further comprises:

deallocating the allocated portion after the GNSS processing system begins to track GNSS signals that have been acquired from at least three (3) GNSS SVs, the deallocating in response to acquiring, before a tracking phase, the GNSS signals from the at least three (3) GNSS SVs.

Embodiment 15. The method as in embodiment 14 wherein the GNSS processing system includes a dedicated memory that is separate from the shared memory and is dedicated for use by the GNSS processing system.

Embodiment 16. The method as in embodiment 14 wherein a memory controller, coupled to the shared memory, includes a first port controller to control access to the allocated portion for the AE and a second port controller to control access to a remaining portion of the shared memory.

Embodiment 17. The method as in embodiment 14, wherein the AE performs an acquisition of GNSS signals from GNSS SVs and the acquisition comprises determining frequencies of received GNSS signals containing pseudorandom codes to enable tracking of the GNSS signals to produce, as a result of the tracking, primary code phases to the GNSS SVs.

Embodiment 18. The method as in embodiment 17 wherein the allocated portion is to store one or more of: (1) pseudorandom codes of GNSS SVs or (2) hypotheses of identifiers of potentially acquired GNSS signals and hypotheses of their frequencies.

Embodiment 19. The method as in embodiment 13 wherein the one or more APs generate, prior to or during an acquisition phase, GNSS pseudorandom codes for at least GNSS SVs that are in view of the system, the generated GNSS pseudorandom codes initially stored in the system's DRAM memory which is external to the IC and then copied into the shared memory during the acquisition phase or in response to a request for location.

Embodiment 20. The method as in embodiment 19 wherein the one or more APs generate the GNSS pseudorandom codes in a background operation only for healthy GNSS SVs that are in view or will be in view within a period of time and wherein the system reserves the portion of the shared memory for use by the AE by determining data in the cache memory that is stored in non-volatile memory.

Embodiment 21. A non-transitory machine readable medium storing executable program instructions which when executed by a data processing system cause the data processing system to perform a method as in any one of embodiments 12-20.

Embodiment 22. A data processing system comprising:
- a set of one or more application processors APs to execute an operating system and one or more application programs;
- a set of one or more buses coupled to the set of one or more application processors; a dynamic random access memory (DRAM) coupled to the set of one or more application processors through the set of one or more buses;
- a GNSS processing system on an integrated circuit (IC) which includes a cache memory that is on the IC and is coupled to the GNSS processing system, the GNSS processing system coupled to the set of one or more application processors, the GNSS processing system comprising an acquisition engine (AE) and a tracking engine (TE);
- the set of one or more application processors to receive a request for location data and, generate GNSS pseudorandom codes for GNSS Space Vehicles (SVs) for use by the AE, the generated GNSS pseudorandom codes stored in the DRAM and then copied to the cache memory for use by the AE during an acquisition phase.

Embodiment 23. The data processing system as in embodiment 22 wherein the generated GNSS pseudorandom codes are generated in response to the request.

Embodiment 24. The data processing system as in embodiment 22 wherein the cache memory comprises SRAM (static random access memory) and the AE includes ASIC hardware logic for performing fast Fourier transform (FFT) operations using a decimation in time method.

Embodiment 25. The data processing system as in embodiment 24 wherein the one or more APs generate, prior to or during an acquisition phase, the GNSS pseudorandom codes for at least GNSS SVs that are in view of the data processing system.

Embodiment 26. The data processing system as in embodiment 25 wherein the one or more APs generate the GNSS pseudorandom codes only for healthy GNSS SVs that are in view or will be in view within a period of time.

Embodiment 27. The data processing system as in embodiment 26, the data processing system further comprising:
- an antenna input to receive GNSS signals in an E5 frequency band;
- a low noise amplifier (LNA) coupled to the antenna input to amplify the GNSS signals;
- a radiofrequency analog to digital converter (ADC) coupled to an output of the LNA, the radiofrequency ADC and the LNA to receive and process GNSS signals in the E5 frequency band, and wherein the data processing system is configured to process only GNSS signals in the E5 frequency band.

Embodiment 28. The data processing system as in embodiment 27 wherein the AE performs an acquisition of GNSS signals from GNSS SVs and the acquisition comprises determining frequencies of received GNSS signals containing pseudorandom codes to enable tracking of the GNSS signals to produce, as a result of the tracking, pseudoranges to the GNSS SVs and wherein the generated GNSS pseudorandom codes comprise GNSS pseudorandom codes that are shifted in frequency or time or both to generate a code spectrum for use by the AE during the acquisition phase.

Embodiment 29. The date processing system as in embodiment 28 wherein an allocated portion of the cache memory, during the acquisition by the AE, stores hypotheses of identifiers of potentially acquired GNSS signals and hypotheses of their frequencies.

Embodiment 30. A GNSS processing system comprising:
- an antenna input to receive GNSS signals in an E5 frequency band;
- a low noise amplifier (LNA) coupled to the antenna input to amplify the GNSS signals,
- a radiofrequency (RF) analog to digital converter (ADC) coupled to an output of the LNA, the RF ADC and the LNA to receive and process GNSS signals in the E5 frequency band;
- a circular memory buffer coupled to an output of RF ADC to receive and store digitized GNSS sample data, the circular memory buffer storing more than 1 millisecond of digitized GNSS sample data and less than 2 milliseconds of digitized GNSS sample data.

Embodiment 31. The GNSS processing system as in embodiment 30 wherein the circular memory buffer stores the digitized GNSS sample data in an array of rows and columns, and the sample data is in rows order which is also in time order, where 1 millisecond is the frame duration of the primary codes of a modernized GNSS signal, which is further covered by a secondary code at a 1 KHz rate.

Embodiment 32. The GNSS processing system as in embodiment 31 further comprising:
- a GNSS processor that comprises an acquisition engine and a tracking engine, the acquisition engine comprising a set of DFT ALUs that process the digitized GNSS sample data in the array and produces an intermediate output that requires no transposing of data in the array.

Embodiment 33. The GNSS processing system as in embodiment 32 wherein a first group of DFT ALUs in the set of DFT ALUs use a decimation in time method to produce the intermediate output stored in a variable memory and a second group of DFT ALUs in the set of DFT ALUs use the intermediate output to produce an output stored in FFT result memory.

Embodiment 34. The GNSS processing system as in embodiment 33 wherein the circular memory buffer comprises a first circular memory buffer to store an A sideband in an E5 frequency band and a second circular memory buffer to store a B sideband in the E5 frequency band.

Embodiment 35. A method for processing GNSS signals in a GNSS receiver, the method comprising:
- determining an initial set of information that includes at least two of: (a) a code phase of a received primary or secondary code signal from at least one GNSS Space Vehicle (SV), (b) an estimated GNSS time based on one or more sources of time, the estimated GNSS time being estimated or known to be within less than +/−0.5 milliseconds of actual GNSS time; and (c) an approximate location of the GNSS receiver;

estimating, based on the initial set of information, an expected fractional primary code phase for GNSS signals to be received;

performing a first DFT correlation using at least a first full primary code epoch of digitized GNSS sample data received over a period of time that is comparable to a time period of a code epoch of the GNSS signals, the first FFT based correlation using digitized GNSS sample data that begins at a first time;

performing a second DFT correlation using at least a second full code epoch of received digitized GNSS sample data which include at least some of the received GNSS sample data in the first full code epoch, the second DFT correlation using digitized GNSS sample data that begins at a second time that is after the first time and is offset from the first time by less than the time period of the code epoch;

removing a secondary code from results of the first DFT correlation and the second DFT correlation to provide inputs for coherent integration operation;

integrating at least one of these inputs into coherent hypothesis memory;

squaring or taking the magnitude of the results from the coherent hypothesis memory to acquire a GNSS signal from at least one GNSS SV.

Embodiment 36. The method as in embodiment 35 wherein I and Q data are summed within each of the first full code epoch and the second full code epoch.

Embodiment 37. The method as in embodiment 35 further comprising: summing the squared results in non-coherent hypothesis memory and wherein the summing of the squared results occurs several milliseconds after the first time.

Embodiment 38. The method as in embodiment 35 wherein the method further comprises:

establishing a search order for GNSS signals from GNSS SVs, the search order based, at least in part, on the expected fractional primary code phase.

Embodiment 39. The method as in embodiment 35 wherein the method further comprises:

selecting a subset of the correlation hypotheses within a window including the expected fractional code phase for saving in coherent hypothesis memory.

Embodiment 40. The method as in embodiment 35 wherein the method further comprises:

assigning each SV to an input sample offset group according to, among several factors, that SV's expected primary code phase.

Embodiment 41. The method as in embodiment 40 wherein the method further comprises:

assigning one SV to one estimated code epoch and assigning another SV to another estimated code epoch, wherein each SV is assigned to a code epoch that is nearer in time to the code epoch for that SV.

Embodiment 42. A method for processing GNSS signals, the method comprising: receiving GNSS signals;

digitizing the received GNSS signals and providing an output, from an analog to digital converter (ADC), of GNSS sample data which includes at least one of (1) GNSS sideband A sample data for a received GNSS signal and (2) GNSS sideband B sample data for the received GNSS signal;

computing at least one of (1) a first set of DFTs of the GNSS sideband A sample data to provide a first set of results and (2) a second set of DFTs of the GNSS sideband B sample data to provide a second set of results;

computing at least one of (1) a third set of DFTs of GNSS sideband A primary PRN code data which is adjusted for code Doppler and carrier Doppler prior to the third set of DFTs, the GNSS sideband A primary PRN code data including at least one of two components in the GNSS sideband A, the third set of DFTs providing a third set of results and (2) a fourth set of DFTs of GNSS sideband B primary PRN code data which is adjusted for code Doppler and carrier Doppler prior to the fourth set of DFTs, the GNSS sideband B primary PRN code data including at least one of two components in the GNSS sideband B, the fourth set of DFTs providing a fourth set of results;

computing at least one of (1) a first set of correlations using a DFT of the complex conjugate of a product of the first set of results and the complex conjugate of the third set of results to provide a fifth set of results and (2) a second set of correlations using a DFT of the complex conjugate of a product of the second set of results and the complex conjugate of the fourth set of results to provide a sixth set of results;

integrating at least one of (1) the fifth set of results with at least one prior sum for the GNSS sideband A and (2) the sixth set of results with at least one prior sum for the GNSS sideband B, wherein the integrating includes at least one of (1) storing at least one new sum for GNSS sideband A components in a single hypothesis memory and (2) storing at least one new sum for GNSS sideband B components in the single hypothesis memory.

Embodiment 43. The method as in embodiment 42 wherein the fourth set of results include IDFT results for both components of the GNSS sideband A and the sixth set of results include IDFT results for both components of the GNSS sideband B.

Embodiment 44. The method as in embodiment 43 wherein the GNSS sideband A sample data is stored in a first circular memory buffer and the GNSS sideband B sample data is stored in a second circular memory buffer.

Embodiment 45. The method as in embodiment 44 wherein the GNSS sideband A sample data is stored in the first circular memory buffer in a format of an array of rows and columns and the GNSS sideband B sample data is stored in the second circular memory buffer in the format of the array of rows and columns.

Embodiment 46. The method of embodiment 45 wherein the GNSS sample data is processed to separate the GNSS sideband A sample data from the GNSS sideband B sample data by: (1) for the GNSS sideband A, shifting samples centered at a first frequency up by a first offset frequency and performing a low pass filter to capture a first bandwidth of data and decimating the output of the low pass filter to a lower sample rate; and (2) for the GNSS sideband B, shifting samples centered at the first frequency down by the first offset frequency and performing a low pass filter to capture a second bandwidth of data and decimating the output of the low pass filter to a lower sample rate.

Embodiment 47. The method as in embodiment 45 wherein the computing operations require no separate operations to transpose or rearrange the sample data or the generated code spectrum data at inputs to the first and second sets of correlations.

Embodiment 48. The method as in embodiment 45 wherein a code generator generates at least one of (1) the GNSS sideband A primary PRN code data every millisecond while GNSS signals are being acquired and tracked and the GNSS sideband A primary PRN code date is not stored after Fourier transformation is completed, and (2) the GNSS sideband B primary PRN code data every millisecond while the GNSS signals are being acquired and tracked and the GNSS sideband B primary PRN code data is not stored after Fourier transformation is completed.

Embodiment 49. The method as in embodiment 48 wherein the integrating is non-coherent during at least a portion of an acquisition phase while the GNSS signals are received.

Embodiment 50. A system for processing GNSS signals, said system comprising:
  a radiofrequency analog to digital converter (ADC) to generate a digital representation of received GNSS signals;
  a baseband sample memory to store the digital representation of the received GNSS signals as digitized GNSS sample data, the baseboard sample memory configured to store an array of the digitized GNSS sample data in N2 rows and N1 columns, the digitized GNSS sample data in the array being stored in row order in the baseband sample memory and N2 being larger than N1, the row order containing the digitized GNSS sample data that was received over a time period that includes a first time period and a second time period such that a first row in the row order contains digitized GNSS sample data received during the first time period and a second row, which follows the first row in the row order, contains digitized GNSS sample data received during the second time period that follows, in time, the first time period, the baseband sample memory coupled to the radiofrequency ADC;
  a set of arithmetic logic units (ALU) configured to perform discrete Fourier transform (DFT) operations, the set of ALUs coupled to the baseband sample memory, the set of ALUs configured to perform, in parallel and concurrently in time, N1 DFTs, wherein each of the N1 DFTs contains N2 points in the DFT and the outputs of the N1 DFTs are stored in a partial result sample array, and wherein the set of ALUs are configured to then perform N2 DFTs, each of the N2 DFTs containing N1 points from the partial result sample array, the N2 DFTs providing an output stored in an DFT result array that is arranged in column order.

Embodiment 51. The system as in embodiment 50 wherein the baseband sample memory is configured as a circular memory buffer that stores the array.

Embodiment 52. The system as in embodiment 51 wherein the N1 DFTs use the same operations and same program control instructions for the set of ALUs to operate on different data.

Embodiment 53. The system as in embodiment 52 wherein the N2 DFTs are performed consecutively over time and wherein the circular memory buffer stores more than one frame of pseudorandom GNSS codes which is more than 1 millisecond.

Embodiment 54. The system as in embodiment 52 wherein the N1 DFTs and the N2 DFTs use a decimation in time method and wherein N1 is one of the integer values: 5 or 10 or 20 or 40.

Embodiment 55. The system as in embodiment 52 wherein a change from row order to column order avoids a re-ordering algorithm, the change produced by a combination of the N1 DFTs followed by the N2 DFTs.

Embodiment 56. The system as in embodiment 52 wherein a GNSS code generator is configured to generate a GNSS code, and the set of ALUs performs a set of DFTs on the GNSS code to provide a code spectrum result data stored in a code spectrum memory in a column order, the code spectrum result data including GNSS PRN code data that is frequency and/or time shifted.

Embodiment 57. The system as in embodiment 56 wherein the set of ALUs is configured to multiply the code spectrum result data by the output stored in the DFT result array to produce a product array.

Embodiment 58. The system as in embodiment 57 wherein the set of ALUs is configured to perform an inverse DFT on the product array using a decimation in frequency method.

Embodiment 59. The system as in embodiment 58 wherein the inverse DFT comprises: (1) in a first stage, N2 DFTs with conjugated inputs, each of the N2 DFTs containing N1 points, and (2) in a second stage that follows the first stage, N1 DFTs, each of the N1 DFTs containing N2 points.

Embodiment 60. The system as in embodiment 51 wherein the baseband sample memory is a dual port memory.

Embodiment 61. The system as in embodiment 56 wherein the GNSS code generator generates a pseudorandom code for each GNSS SV in view every millisecond when it is needed during an acquisition phase and does not store a generated pseudorandom code after it is used, and the generated pseudorandom code is used to generate the GNSS code spectrum.

Embodiment 62. The system as in embodiment 61 wherein the GNSS code spectrum is aligned in place in memory in both frequency and phase to match code phase and frequency shift hypotheses associated with the received GNSS signals.

Embodiment 63. The system as in embodiment 62 wherein the alignment is performed by CORDIC hardware.

Embodiment 64. A system as in embodiment 50 in which the digitized GNSS sample data is stored in column order rather than row order.

Embodiment 65. A system for processing GNSS L5 band signals, the system comprising:
  a radiofrequency analog to digital converter (ADC) to generate a digital representation of received GNSS signals;
  a baseband sample memory to store the digital representation of the received GNSS signals, the baseband sample memory coupled to the ADC;
  a GNSS processing system coupled to the baseband sample memory to process the digital representation of the received GNSS signals, the GNSS processing system configured to process four (4) GNSS signal components of a GNSS signal to non-coherently integrate all four GNSS signal components to generate and store the non-coherent integration data for each of the four GNSS signal components into a single hypothesis memory to acquire GNSS signals.

Embodiment 66. The system as in embodiment 65 wherein the single hypothesis memory is less than 2 megabytes of memory and wherein the four GNSS signal components include a Galileo E5AI signal component, a Galileo E5BI signal component, a Galileo E5BQ signal component, and a Galileo E5AQ signal component or four GNSS signal components used in a Beidou/Compass B2 system or both of the Galileo E5 and Beidou/Compass B2 signal components.

Embodiment 67. The system as in embodiment 66 wherein the GNSS processing system processes received GNSS signal from at least two GNSS constellations including: the Galileo E5 constellation of GNSS SVs; an L5 GPS constellation of GNSS SVs, a Glonass K2 constellation of GNSS SVs, a QZSS constellation of GNSS SVs, and a Beidou B2 constellation of GNSS SVs.

Embodiment 68. The system as in embodiment 65 further comprising:
a code generator to generate GNSS PRN codes during acquisition and tracking of GNSS signals without storing the GNSS PRN codes after tracking is completed.

Embodiment 69. The system as in embodiment 68 wherein the code generator generates more than two primary PRN code bits in a clock cycle during the acquisition and tracking.

Embodiment 70. The system as in embodiment 69 wherein the code generator generates the more than two primary PRN code bits in a clock cycle by a computation that uses a computed code advance matrix derived from an N times multiplication of a code polynomial matrix for a given GNSS constellation and GNSS signal component in that GNSS constellation, N representing a number of primary PRN code bits generated in a clock cycle.

Embodiment 71. The system as in embodiment 70 wherein the GNSS processing system shares a memory with one or more processors, and the GNSS processing system, the cache memory and the one or more application processors are all disposed on a same single integrated circuit.

Embodiment 72. The system as in embodiment 71 wherein the GNSS processing system includes an acquisition engine and a tracking engine, and the acquisition engine includes processing logic to receive an array of GNSS sample data, arranged, according to time of receipt, in either row order or column order, and the processing logic to perform DFTs using a decimation in time algorithm on the array of GNSS sample data to produce frequency domain results that are multiplied by a code spectrum of GNSS PRN codes for GNSS SVs in view, and the resulting product of the frequency domain results and the code spectrum is then processed in the processing logic by IDFTs using a decimation in frequency algorithm to produce hypotheses of possible acquired GNSS signals that are accumulated non-coherently in the single hypothesis memory.

Embodiment 73. The system as in embodiment 72 wherein the array of GNSS sample data is stored in two circular memory buffers that comprise a first circular memory buffer to store A-band GNSS sample data and a second circular memory buffer to store B-band GNSS sample data, wherein a plurality of GNSS constellations may be received in at least one said band.

Embodiment 74. The system as in embodiment 70 wherein a GNSS primary PRN code from an output of the code generator is shifted in frequency and is shifted in time before applying a set of DFTs using a decimation in time algorithm to generate a code spectrum that is multiplied by frequency domain results from a set of DFTs, using a decimation in time algorithm, on a received GNSS signal.

Embodiment 75. The system as in embodiment 73 wherein a GNSS primary PRN code from an output of the code generator is shifted in frequency and is shifted in time to generate the code spectrum.

Embodiment 76. The system as in embodiment 72 wherein an order in the array changes through a sequence of the DFTs such that no transposing or rearranging of data is required when the IDFTs are performed.

Embodiment 77. The system as in embodiment 76 wherein the sequence of DFTs avoids using memory or processing resources that would be used for the transposing or rearranging.

Embodiment 78. A system for processing GNSS signals; the system comprising:
an analog to digital converter (ADC) to generate a digital representation of received GNSS signals;
a baseband sample memory to store the digital representation of the received GNSS signals, the baseband memory coupled to the ADC;
a GNSS processing system coupled to the baseband sample memory to process the digital representation of the received GNSS signals, the GNSS processing system to acquire up to four GNSS signal components of a GNSS signal by non-coherently integrating, over a period of time in an array processing system, up to four GNSS signal components, the array processing system being in an acquisition engine in the GNSS processing system and the array processing system receiving GNSS sample data from the baseband memory and the GNSS sample data being formatted in a row and column array having a plurality of rows and a plurality of columns.

Embodiment 79. The system as in embodiment 78 wherein the array processing system comprises processing logic that performs a set of DFTs using a decimation in time algorithm followed by a set of inverse DFTs using a decimation in frequency algorithm.

Embodiment 80. The system as in embodiment 79 wherein an output from the array processing system provides frequency and GNSS SV identifiers for storage in hypothesis memory to integrate hypotheses for GNSS signals.

Embodiment 81. The system as in embodiment 78 wherein the array processing system receives the GNSS sample data in a first order and produces an output in a second order that is different than the first order, and wherein the first order is one of a row order or a column order in the row and column array and the second order is one of the row order or the column order, and wherein the first order and the second order are based on the time of receipt of the GNSS sample data.

Embodiment 82. The system as in embodiment 81 wherein the GNSS sample data is stored in the row and column array in two circular memory buffers that comprise a first circular memory buffer to store a first GNSS signal component from a GNSS SV sample data and a second circular memory buffer to store a second GNSS signal component from the GNSS SV sample data, the first circular memory buffer and the second circular memory buffer coupled to the array processing system.

Embodiment 83. A system for processing GNSS signals, the system comprising:
a memory to store primary code seeds for GNSS signals from GNSS SVs of one or more GNSS constellations and to store a representation of primary code polynomial data for use in generating primary PRN codes for the GNSS signals;
a code generator coupled to the memory to receive the primary code seeds and the primary code polynomial data and to generate more than two primary PRN code bits in a single clock cycle during an acquisition and tracking of the GNSS signals using the primary code seeds and the primary code polynomial data.

Embodiment 84. The system as in embodiment 83 wherein the code generator generates more than two primary PRN code bits in a single clock cycle by a computation that uses a computed code advance matrix derived from an N time multiplication of a primary code polynomial matrix for a given GNSS constellation and a GNSS signal component in that GNSS constellation, wherein N represents a number of primary PRN code bits generated in a clock cycle.

Embodiment 85. The system as in embodiment 84 wherein the system generates the primary PRN code bits without storing the primary PRN code bits after tracking is completed or after DFT transformation for the present primary code epoch is completed.

Embodiment 86. The system as in embodiment 84 wherein the computed code advance matrix is precomputed before acquisition begins and is stored in the memory, and wherein N represents the amount of code advance provided by the code generator between clock cycles.

Embodiment 87. The system as in embodiment 84, the system further comprising: a GNSS processing system coupled to the code generator, the GNSS processing system to acquire at least two of four GNSS signal components of GNSS signal by non-coherently integrating, over a period of time in an array processing system, the at least two of four GNSS signal components, the array processing system receiving GNSS sample data from a baseband memory and the GNSS sample data being formatted in a row and column array having a plurality of rows and columns.

Embodiment 88. The system as in embodiment 87 wherein the generation of GNSS PRN codes by the code generator is dynamic based on GNSS SVs in view during the acquisition and tracking of GNSS signals.

Embodiment 89. The system as in embodiment 88 wherein a GNSS primary PRN code from an output of the code generator is shifted in frequency and in time to generate a code spectrum for use in DFTs with frequency results of DFTs of received GNSS signals.

Embodiment 90. A GNSS receiver comprising:
a radiofrequency (RF) receiver that comprises at least a first RF filter and a low noise amplifier (LNA) that is tuned to only an L5 WB frequency band to receive L5 WB GNSS signals;
an analog to digital converter (ADC) coupled to the LNA to generate GNSS sample data which is stored in a baseband sample memory, wherein the RF receiver is the sole GNSS receiver in the GNSS receiver.

Embodiment 91. The GNSS receiver as in embodiment 90 wherein the RF receiver includes no amplifier for other GNSS signals outside of the L5 WB frequency band and wherein the RF receiver includes the first RF filter coupled to a GNSS antenna, and the output of the first RF filter coupled to an input of the LNA and an output of the LNA is coupled to a second RF filter.

Embodiment 92. The GNSS receiver as in embodiment 91 wherein an input of a first amplifier is coupled to an output of the second RF filter and an output of the first amplifier is coupled to the ADC and wherein the LNA and the first RF filter are disposed on a first IC and the ADC and the first amplifier are disposed on a second IC.

Embodiment 93. The GNSS receiver as in embodiment 92 wherein the GNSS receiver further comprises:
a sideband split down converter that separates a GNSS sideband A sample data from a GNSS sideband B sample data; and wherein the second RF filter is disposed in the first IC.

Embodiment 94. The GNSS receiver as in embodiment 93 further comprising:
a first circular memory buffer to store the GNSS sideband A sample data; and
a second circular memory buffer to store the GNSS sideband B sample data.

Embodiment 95. The GNSS receiver as in embodiment 94 wherein the RF receiver includes no RF mixers.

Embodiment 96. The GNSS receiver as in embodiment 95 wherein the RF receiver includes no RF reference local oscillator, and wherein the GNSS antenna is tuned to only the L5 WB frequency band.

Embodiment 97. The GNSS receiver as in embodiment 95 wherein the sideband split down converter produces the GNSS sideband A sample data arranged in a first array of rows and columns and produces the GNSS sideband B sample arranged in a second array at rows and columns.

Embodiment 98. The GNSS receiver as in embodiment 95 wherein the RF receiver is tuned to receive GNSS signals centered at 1191.795 MHz and the L5 WB GNSS signals have a chipping rate of 10.23 MHz.

Embodiment 99. The GNSS receiver as in embodiment 97 wherein the GNSS antenna is the sole GNSS antenna in the GNSS receiver and wherein the RF receiver is tuned to receive GNSS signals centered at 1191.795 MHz and the L5 WB GNSS signals have a chipping rate of 10.23 MHz.

Embodiment 100. A system for processing GNSS signals, the system comprising:
an analog to digital converter (ADC) to generate a digital representation of received GNSS signals in an L5 WB GNSS frequency band;
a baseband sample memory to store the digital representation of the received GNSS signals, the baseband sample memory coupled to the ADC;
a GNSS processing system coupled to the baseband sample memory to process the digital representation of the received GNSS signals, the GNSS processing system configured to receive and process at least one of the (4) GNSS signal components of an L5 WB band GNSS signal without using L1 GNSS signals.

Embodiment 101. The system as in embodiment 100 wherein the system includes only a single GNSS antenna tuned to the L5 WB frequency band centered at 1191.795 MHz and the received GNSS signals have a chipping rate of 10.23 MHz or a chipping rate that is significantly higher (e.g., 2 times more) than the L1 GPS chipping rate of 1.023 MHz.

Embodiment 102. The system as in embodiment 101 wherein baseband sample memory stores the digital representation in an array of rows and columns arranged by rows according to a time of receipt.

Embodiment 103. The system as in embodiment 101 wherein baseband sample memory stores the digital representation in an array of rows and columns arranged by columns according to a time of receipt.

Embodiment 104. The system as in embodiment 102 wherein the GNSS processing system processes the received GNSS signals by a sequence of DFTs that includes a first set of DFTs using a decimation in time method and then a second of DFTs using a decimation in frequency method without requiring a transposition or rearrangement of data in an array containing the data.

Embodiment 105. The system as in embodiment 100 wherein an initial signal is acquired in coarse-time acquisition mode, further signals are acquired in precise-time acquisition mode, and all signals are tracked in a tracking mode.

Embodiment 106. the system as in embodiment 105 wherein acquisition-specific hardware usage is reduced while in a coherent tracking mode.

Embodiment 107. The system as in embodiment 65 wherein the GNSS processing system does not receive and acquire L1 GNSS signals.

Embodiment 108. The system as in embodiment 78 wherein the GNSS processing system does not receive and acquire L1 GNSS signals.

Embodiment 109. A GNSS receiver comprising:
an input to couple to an antenna;
an RF front end coupled to the input;
an ADC converter coupled to the RF front end;
a GNSS processing system coupled to the ADC converter, the GNSS processing system to receive GNSS signals from the ADC converter, wherein the GNSS processing system during an initial acquisition phase acquires only a selected component in the GNSS signals, the selected component having a low probability of signal change based on a coding scheme used in the selected component relative to probability of signal change for other components in the GNSS signals.

Embodiment 110. The GNSS receiver as in embodiment 109, wherein after the initial acquisition phase, the GNSS processing system acquires other components of the GNSS signals.

Embodiment 111. The GNSS receiver as in embodiment 110, wherein the selected component is an E5BI component from an SV in the Galileo constellation of GNSS satellites and the other components comprise one or more of: an E5BQ component, an E5AI component, and an E5AQ component from the same SV.

Embodiment 112. The GNSS receiver as in embodiment 110, wherein the signal change is a sign reversal in the coding scheme in the selected component.

Embodiment 113. The GNSS receiver as in embodiment 110, wherein the initial acquisition phase is one of an acquisition using coarse time or an acquisition using precise time.

Embodiment 114. The GNSS receiver as in embodiment 110, wherein the initial acquisition phase is performed after failing, for a predetermined period of time, to acquire a set of the other components of the GNSS signals.

Embodiment 115. A method of operating a GNSS receiver, the method comprising:
switching to a reduced acquisition mode in which only a selected component in GNSS signals from an SV in a GNSS constellation is acquired in an initial acquisition phase;
acquiring the selected component which has a low probability of signal change based on a coding scheme used in the selected component relative to probability of signal change for other components in the GNSS signals from the SV;
acquiring the other components after acquiring the selected component.

Embodiment 116. The method as in embodiment 115, wherein the selected component is an E5BI component from an SV in the Galileo constellation of GNSS satellites and the other components comprise one or more of: an E5BQ component, an E5AI component, and an E5AQ component from the same SV.

Embodiment 117. The method as in embodiment 116, wherein the switching occurs in response to failing, for a predetermined period of time, to acquire the other components.

Embodiment 118. A method for mitigating interference from aeronautical radio navigation (ARN) signals, the method comprising:
receiving GNSS signals and ARN signals through one or more antennas;
detecting an interference signal source having a signal strength above a noise floor, the signal source comprising ARN signals;
removing the detected interference signal source before correlation processing of the GNSS signals.

Embodiment 119. The method as in embodiment 118, wherein a predetermined threshold above the noise floor is used in the detecting of the signal source.

Embodiment 120. The method as in embodiment 118, wherein the detected signal source is removed by a Finite Impulse Response (RF) filter or an Infinite Impulse Response (IIR) filter in the frequency domain.

Embodiment 121. The method as in embodiment 118, wherein the signal source is detected by an array processor that computes discrete Fourier transforms of the GNSS signals.

Embodiment 122. A method for mitigating interference from aeronautical radio navigation (ARN) signals, the method comprising:
receiving GNSS signals from a GNSS SV and ARN signals through one or more antennas, the received GNSS signals having a first GNSS signal component in a first sideband and a second GNSS signal component in a second sideband;
detecting interference from a signal source from the ARN signals, the interference interfering with the first sideband but not materially interfering with the second sideband;
configuring a GNSS processing system, in response to the detected interference, to process the second sideband from the GNSS SV and not process the first sideband in order to acquire or track GNSS signals from the GNSS SV.

Embodiment 123. The method as in embodiment 122, wherein the first sideband is a higher frequency sideband and the second sideband is a lower frequency sideband.

Embodiment 124. The method as in embodiment 122, wherein the interference is detected when (1) the strength of the signal source is higher than a threshold value above a noise floor or (2) the post correlation signal to noise ratio for a particular sideband is lower than a given threshold.

Embodiment 125. The method as in embodiment 124, wherein the GNSS processing system processes the second sideband and not the first sideband during the duration of the detected interference and reverts to processing both after the interference diminishes below the noise floor.

Embodiment 126. A GNSS receiver comprising:
an input to receive GNSS signals from an antenna;
an RF front end coupled to the input to receive GNSS signals;
an RF switching mixer coupled to the RF front end;
a discrete time filter coupled to the RF switching mixer, the discrete time filter including a band pass response to select the desired GNSS signals and reject out-of-band interference and noise;
a local oscillator signal, originating at a phase lock loop (PLL) circuit, coupled to the RF switching mixer to provide a local reference signal.

Embodiment 127. The GNS receiver as in embodiment 126, wherein the discrete time filter is configured with a notch response to reject interference from aeronautical radio navigation (ARN) signals in specific locations.

Embodiment 128. The GNSS receiver as in embodiment 126, wherein the GNSS receiver further comprises:
one or more direct sampling or subsampling analog to digital converters (ADCs) coupled to the discrete time filter.

Embodiment 129. The GNSS receiver as in embodiment 128, wherein a bandwidth of the discrete time filter is dynamically adjustable to switch between single or double sideband signal processing.

Embodiment 130. The GNSS receiver as in embodiment 128, wherein a clock signal, which is operatively received by the RF switching mixer and the discrete time filter, is adjustable to position a high or low sideband at baseband or at a low intermediate frequency (IF) or to position a center between the high and low sidebands at baseband or at a low intermediate frequency (IF).

Embodiment 131. The GNSS receiver as in embodiment 128, wherein the local reference signal from the PLL local oscillator is harmonically related to a sampling clock of the ADC and to the discrete time filter.

Embodiment 132. A GNSS receiver comprising:
an input to receive GNSS signals from an antenna;
an RF switching mixer coupled to the input to receive GNSS signals;
a discrete time filter coupled to the RF switching mixer;
one or more analog to digital converters (ADCs) coupled to the discrete time filter;
a phase lock loop (PLL) circuit coupled to the RF switching mixer to provide a local oscillator signal, an output of the PLL circuit being harmonically related to a sampling clock of the one or more ADCs and to a clock signal of the discrete time filter.

Embodiment 133. The GNSS receiver as in embodiment 132, wherein the one or more ADCs downconvert and provide digitalized GNSS signals.

Embodiment 134. The GNSS receiver as in embodiment 132, wherein a bandwidth of the discrete time filter is dynamically adjustable to switch between single or double sideband signal processing.

Embodiment 135. The GNSS receiver as in embodiment 132, wherein the clock signal, which is operatively received by the discrete time filter, is adjustable to position a high or low sideband at baseband or at a low intermediate frequency (IF) or to position a center between the high and low sidebands at baseband or at a low intermediate frequency (IF).

Embodiment 136. The GNSS receiver as in embodiment 132, wherein the one or more ADCs comprise an in-phase branch portion and a quadrature-phase branch portion, and wherein the quadrature-phase branch portion can be disabled, thus folding a received modulated signal on itself, and wherein dispreading operations at later stages recover original signals that existed before the folding.

Embodiment 137. A method of operating a GNSS receiver, the method comprising:
receiving GNSS signals from a GNSS SV, the GNSS signals comprising a first GNSS signal component in a first sideband and a second GNSS signal component in a second sideband;
selecting a first mode or a second mode of operation based upon a desired power state of the GNSS receiver;
processing, in response to selecting the first mode and while in the first mode, the first GNSS signal component in the first sideband and not processing the second GNSS signal component in the second sideband in order to acquire or track GNSS signals from the GNSS SV;
processing, in response to selecting the second mode and while in the second mode, the first GNSS signal component in the first sideband and processing the second GNSS signal component in the second sideband in order to acquire GNSS signals from the GNSS SV.

Embodiment 138. The method as in embodiment 137, wherein in the first mode, at least a portion of the GNSS receiver operates with a reduced processing rate.

Embodiment 139. The method as in embodiment 138, wherein the first mode reduces power consumption in the GNSS receiver and wherein the GNSS receiver operates in the second mode while acquiring GNSS signals and then is configured to operate in the first mode when tracking GNSS signals.

Embodiment 140. A method of operating a GNSS receiver, the method comprising:
receiving GNSS signals from a GNSS SV, the GNSS signals comprising a first GNSS signal component in a first sideband and a second GNSS signal component in a second sideband;
mixing the first GNSS signal component and the second GNSS signal component in a mixer to fold the first signal component and the second GNSS signal component on each other;
obtaining GNSS signals from the first GNSS signal component and the second GNSS signal component after the mixing.

Embodiment 141. A method of operating a GNSS receiver, the method comprising:
acquiring a plurality of GNSS signal components from one or more GNSS SVs during an acquisition phase;
tracking a subset of the plurality of GNSS signal components after the acquisition phase is completed.

Embodiment 142. The method as in embodiment 141, wherein the method further comprises:
selecting the subset based on one or more criteria or algorithms for selecting the subset, the selecting occurring before a position of the GNSS receiver is determined.

Embodiment 143. The method as in embodiment 142, wherein the one or more criteria or algorithms provide adequate signals for tracking while reducing power consumption.

Embodiment 144. The method as in embodiment 142, wherein the one or more criteria or algorithms provide sufficient GNSS signals in order to determine a position of the GNSS receiver while reducing power consumption.

Embodiment 145. The method as in embodiment 142, wherein the plurality of GNSS signal components from one or more GNSS SVs comprise upper and lower sideband signals and wherein the subset is limited to one of the upper and lower sidebands.

Embodiment 146. A method for determining the time of arrival of a GNSS signal in which more than one Doppler hypothesis upon the received signal is required to be made, the method comprising:
performing a forward fast Fourier transform operation upon a block of signal samples to construct a frequency vector,
performing at least one of (A) circularly rotating said frequency vector by a non-zero integer amount or (B) performing an interpolation operation upon said frequency vector
to provide a first Doppler compensated frequency vector, multiplying said first Doppler compensated frequency vector by a first reference function vector to form a first weighted Doppler compensated frequency vector, and performing an inverse fast Fourier transform operation upon the first weighted Doppler compensated frequency vector to produce a first output time vector used to determine the time of arrival of said GNSS signal.

Embodiment 147. The method of embodiment 146 wherein the block of signal samples is first multiplied by a complex sinusoid to frequency shifted said block of signal samples prior to performing said fast Fourier transform operation.

Embodiment 148. The method of embodiment 146 wherein the block of signal samples is first augmented with a set of zero-valued samples prior to performing said fast Fourier transform operation.

Embodiment 149. The method of embodiment 146 further comprising
performing at least one of (A) circularly rotating said frequency vector by a non-zero integer amount or (B) performing an interpolation operation upon said frequency vector
to provide a second Doppler compensated frequency vector wherein second Doppler compensated frequency vector differs from said first Doppler compensated frequency vector, multiplying said second Doppler compensated frequency vector by the first reference function vector to form a second weighted Doppler compensated frequency vector, and performing an inverse fast Fourier transform operation upon the second weighted Doppler compensated frequency vector to produce a second output time vector used to determine the time of arrival of said GNSS signal.

Embodiment 150. The method of embodiment 146 further comprising
multiplying said first Doppler compensated frequency vector by a second reference function vector to form a second weighted Doppler compensated frequency vector, wherein said second reference function vector differs from said first reference function vector,
and performing an inverse fast Fourier transform operation upon the second weighted Doppler compensated frequency vector to produce a second output time vector used to determine the time of arrival of a GNSS signal.

Embodiment 151. The method of embodiment 146 further comprising
performing at least one of (A) circularly rotating said frequency vector by a non-zero integer amount or (B) performing an interpolation operation upon said frequency vector
to provide a second Doppler compensated frequency vector wherein second Doppler compensated frequency vector differs from said first Doppler compensated frequency vector,
multiplying said second Doppler compensated frequency vector by a second reference function vector to form a second weighted Doppler compensated frequency vector, wherein said second reference function vector differs from said first reference function vector,
and performing an inverse fast Fourier transform operation upon the second weighted Doppler compensated frequency vector to produce a second output time vector used to determine the time of arrival of said GNSS signal.

Embodiment 152. A method for determining the time of arrival of a GNSS signal in which more than one Doppler hypothesis upon the received signal is required to be made, the method comprising:
performing a forward fast Fourier transform operation upon a block of signal samples to construct a frequency vector,
performing at least one of (A) circularly rotating a first reference function vector by a non-zero integer amount or (B) performing an interpolation operation upon said reference function vector, to provide a first Doppler compensated reference function vector, multiplying said first Doppler compensated reference function vector by said frequency vector to form a first weighted Doppler compensated frequency vector, and performing an inverse fast Fourier transform operation upon the first weighted Doppler compensated frequency vector to produce a first output time vector used to determine the time of arrival of said GNSS signal.

Embodiment 153. The method of embodiment 152 wherein the block of signal samples is first multiplied by a complex sinusoid to frequency shifted said block of signal samples prior to performing said fast Fourier transform operation.

Embodiment 154. The method of embodiment 152 wherein the block of signal samples is first augmented with a set of zero-valued samples prior to performing said fast Fourier transform operation.

Embodiment 155. The method of embodiment 152 further comprising performing at least one of (A) circularly rotating said first reference function vector by a non-zero integer amount or (B) performing an interpolation operation upon said reference function vector,
to provide a second Doppler compensated reference function vector, wherein said second Doppler compensated reference function vector differs from said first Doppler compensated reference function vector;
multiplying said second Doppler compensated reference function vector by said frequency vector to form a second weighted Doppler compensated frequency vector,
and performing an inverse fast Fourier transform operation upon the second weighted Doppler compensated frequency vector to produce a second output time vector used to determine the time of arrival of said GNSS signal.

Embodiment 156. The method of embodiment 152 further comprising
performing at least one of (A) circularly rotating a second reference function vector by a non-zero integer amount or (B) performing an interpolation operation upon a second reference function vector to provide a second Doppler compensated reference function vector wherein said second reference function vector differs from said first reference function vector;
multiplying said second Doppler compensated reference function vector by said frequency vector to form a second weighted Doppler compensated frequency vector, and performing an inverse fast Fourier transform operation upon the second weighted Doppler compensated frequency vector to produce a second output time vector used to determine the time of arrival of a GNSS signal.

Embodiment 157. The method of embodiment 152 further comprising
performing at least one of (A) circularly rotating a second reference function vector by a non-zero integer amount or (B) performing an interpolation operation upon said reference function vector, to provide a second Doppler compensated reference function vector,
wherein said second Doppler compensated reference function vector differs from said first Doppler compensated frequency vector, wherein said second reference function vector differs from said first reference function vector,
multiplying said second Doppler compensated reference function vector by said frequency vector to form a second weighted Doppler compensated frequency vector, and performing an inverse fast Fourier transform operation upon the second weighted Doppler compensated frequency vector to produce a second output time vector used to determine the time of arrival of said GNSS signal.

Embodiment 158. A method for determining the time of arrival of a GNSS signal in which more than one Doppler hypothesis upon the received signal is required to be made, the method comprising:

performing a forward fast Fourier transform operation upon a block of signal samples to construct a frequency vector;

performing at least one of (A) circularly rotating said frequency vector by a non-zero integer amount or (B) performing an interpolation operation upon said frequency vector to provide a first Doppler compensated frequency vector;

performing at least one of (A) circularly rotating a first reference function vector by a non-zero integer amount or (B) performing an interpolation operation upon said reference function vector, to provide a first Doppler compensated reference function vector;

multiplying said first Doppler compensated frequency vector by a said first Doppler compensated reference function vector to form a first weighted Doppler compensated frequency vector;

and performing an inverse fast Fourier transform operation upon the first weighted Doppler compensated frequency vector to produce a first output time vector used to determine the time of arrival of said GNSS signal.

Embodiment 159. The method of Embodiment 158 further comprising performing at least one of (A) circularly rotating said frequency vector by a non-zero integer amount or (B) performing an interpolation operation upon said frequency vector to provide a second Doppler compensated frequency vector;

performing at least one of (A) circularly rotating a second reference function vector by a non-zero integer amount or (B) performing an interpolation operation upon said second reference function vector, to provide a second Doppler compensated reference function vector;

multiplying said first Doppler compensated frequency vector by a said first Doppler compensated reference function vector to form a second weighted Doppler compensated frequency vector, wherein the second weighted Doppler compensated frequency vector differs from said first weighted Doppler compensated frequency vector; and performing an inverse fast Fourier transform operation upon the second weighted Doppler compensated frequency vector to produce a second output time vector used to determine the time of arrival of said GNSS signal.

A machine readable medium includes any mechanism for storing information in a form readable by a machine (e.g., a computer or processing logic implemented in hardware). For example, a machine readable medium includes read only memory ("ROM"); random access memory ("RAM") such as Dynamic Random Access Memory; magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)). Processing logic, such as one or more hardware processing systems (e. g., a microprocessor or microcontroller, etc.) can execute the program code to cause a data processing system to perform a method of one or more of the embodiments described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

APPENDIX

The following appendix provides further information about certain embodiments. These embodiments are non-limiting examples of GNSS receivers, portions of GNSS receivers, methods for operating such receivers or portions and non-transitory machine readable media that can cause the performance of such methods. There are three parts to this appendix. The first part (Appendix 1) provides further details regarding various embodiments. A "Matlab" code appendix is also attached and provides examples, in the well known form of Matlab code, of the implementation of various components described herein. Appendix 3 provides further information about an embodiment in which two sidebands are folded onto each other.

Appendix

This appendix provides further information about various embodiments and aspects of this disclosure but is not intended to limit the scope of any claims in the main body of the attached application.

An All-Digital Receiver Architecture for Commercially Viable Modernized GNSS Signal Tracking Inventors: Paul Conflitti, Paul McBurney, Mark Moeglein and Greg Turetzky

Background

Assisted GPS, pioneered by SnapTrack in the 1995-1999 time-frame (see for example US patent Nos. 5,663,734 and 5,812,087), brought GNSS tracking to mobile phones around the world. At the time, GPS was the only operational GNSS constellation, and the L1 C/A signal was the only signal open for civil use. The simplicity of the L1 C/A signal, with a 1MHz chipping rate and a 50BPS navigation message, and aspects of CDMA2000 cellular systems, made a combination of the two receiver strategies appropriate to a mobile phone, where they could share an oscillator, and the synchronous nature of the network made it possible to transfer time and frequency with great accuracy from base station to mobile device. It also made it possible to provide assistance data to the mobile device, so that it was not required to read it directly from the satellites, thus saving substantial time and processing power, as well as dramatically increasing sensitivity. These same factors enabled advanced forward link trilateration (AFLT), as well, effectively creating a network of pseudolites from the base stations of the synchronous CDMA2000 cellular network.

Modern cellular networks, including 4G and 5G, have evolved in complexity, as have modern GNSS systems, with a proliferation of GNSS constellations, including Galileo (Europe), Beidou/Compass (China) and a modernized GPS. These three constellations all meet and share spectrum at the L5 frequency band. GPS L5 is a 10.23MHz spreading bandwidth signal centered at 1176.45MHz. Galileo and Beidou both use an altBOC code to spread the signal energy into two side-bands. Galileo's two side-bands (A and B) are centered +/- 15.345MHz from their center frequency (1191.795MHZ) at 1176.45MHz and 1207.14MHz. They are similarly modulated with a 10.23MHz code. Finally, Beidou has signals on effectively the same frequencies as Galileo, with the same length spreading codes. India and Japan also have regional systems that are growing and transmitting in this band. The Japanese system, QZSS, uses a very GPS-like signal. The Indian system has BOC modulation, as well as a regular center frequency, but it also has a narrow-band signal centered at 1176.45MHz. Thus, GPS, Beidou, Galileo, QZSS and IRNSS all have signals at the 1176.45MHz L5A band. Further, Galileo and Beidou have signals not far away at what we will call L5B band, centered at 1207.14MHz. Glonass also has similar proposed signals at 1176.45MHz and 1202.025MHz.

There are really two sets of modernized signals that have some properties in common, some at L1 like E1B and E1C, and those at L5 like E5 and B2. They are differentiated mainly by the chipping rate and code length.

Some key advantages to these modernized broadband GNSS signals at L5 vs. legacy signals or those in other frequency bands are listed here:

1. Code lengths increased by a factor of 10 vs. GPS L1 C/A, to further mitigate cross-correlation and the up-to-4 different signals broadcast by each SV are designed to be orthogonal to each other. Unfortunately, most of these signals use the same 10,230 chip code length and 10.23MHz chipping rate, so there is still some potential for cross correlation between signals where one signal is directly received and another is relatively weak/indirect.
2. All signals in the same band, making it possible to track all with a single RF front end.
3. Pilot codes make it possible to enhance sensitivity, for tracking in obstructed signal environments.
4. The AltBOC(15,10) signals of Galileo and Beidou provide transmit diversity for improved resistance to fading and improved multipath resistance.
5. Data and pilot channels in quadrature. This yields the following advantages:
    a. An SNR improvement when combining the signals, particularly non-coherently.
    b. Ability to coherently track the pilot channel limited primarily by the oscillator stability and user dynamics.
    c. Can track with a pure PLL rather than a Costas loop. This avoids the squaring loss of removing data bit reversals and allows use of the full discriminator range +/-180 degrees.
6. Advanced coding of data on the data channel that reduce the bit error rate. This allows data to be extracted at a lower SNR, improving the ability to determine fine time with weaker signals.
7. Secondary coding with overlay codes that change the primary code frames. This reduces cross correlation between codes by removing constant phase sequences. The secondary coding also allows GNSS time to be determined precisely from the secondary code phase and, when the receiver clock uncertainty is less than the time duration of the secondary code, to set the clock with great absolute accuracy.
8. High chipping rate. The higher chipping rate narrows the correlation peak to reduce multipath and cross-correlation.
9. Codes that complete in 1msec. This allows a faster acquisition and enables realizable FFT methods that use circular convolution. This enables the Commercially Viable Modernized-Only GNSSS Receiver (COVIMOGR). Much longer codes are more costly to acquire. The modernized codes at L1 are often much longer and therefore more difficult to directly acquire.

The key advantage of these modernized GNSS signals (the extended codes and higher chipping rates) also presents a greater challenge than those faced by legacy receivers, although these challenges are readily met by modern correlator hardware, as we will describe in another embodiment herein. Receiver manufacturers plan to first acquire L1-band signals (GPS C/A Code, Galileo E1, Beidou B1 or B1C or Glonass FDMA) and then transition to L5 tracking because the computational burden of tracking the much-longer codes when time uncertainty is on the order of 1ms can be daunting.

Some have proposed frequency domain correlation to solve this problem of direct acquisition of broadband 10.23MHz signals. However, the strategies for doing so rely upon substantial FFT hardware, including dramatically more memory than is commercially feasible for consumer applications such as mobile phone, wrist-band, and even vehicle navigation.

Mobile Phone Network Synchronization

While the embodiments described herein are suitable for a stand-alone GNSS receiver, we recognize that the most significant market for GNSS receivers is actually as a component of a larger mobile device, such as a cellular phone. The complexity and data carrying capacities of mobile networks has increased substantially, but the reliably available time and even frequency synchronization of these networks associated with Qualcomm's 2G and 3G technology, while supported, is no longer guaranteed for 4G and 5G systems. Thus Qualcomm's AFLT technology for ranging from base stations is no longer generally supported, somewhat supplanted by multi-constellation GNSS tracking. And furthermore, the fine timing assistance that was meant to help synchronize these networks has not come into general use at the time of this writing. Thus, any commercially viable direct L5 acquisition strategy (that does not use L1 GPS) must allow for significant time and even frequency uncertainty, and also for the possibility that fine time and frequency assistance will not be available. Bounding this time uncertainty is the general availability of time transfer protocols such as NTP and SNTP in situations where cellular data (e.g., the internet) is available. Bounding the frequency uncertainty is the cellular carrier frequency, itself, again, subject to availability and variation by type of network and network implementation. Thus, any modernized AGNSS-capable design must allow for varying initial time and frequency uncertainty.

Benefits of Direct L5Aacquisition

Some key benefits of L5-only tracking over L1 transitioning to L5 include:

1. Reduction of one RF front end, including costly antenna, LNA and SAW filter. This also substantially reduces integration challenges.

2. Availability of signals with enhanced sensitivity and fading resistance.
3. Substantially reduced near-far cross-correlation acquisition problems.
4. Reduced jamming and spoofing susceptibility.

Some disadvantages include:

1. Fewer SVs supporting modernized signals, so far. We anticipate that this gap will close rapidly in the coming years.
2. Increased complexity, especially in acquisition.

Fading

Define $P_{fL1}$ as the probability that there is a fade on the L1 frequency significant enough to cause a loss of carrier tracking, and likewise $P_{fL5}$ as the probability of a loss of carrier tracking on L5.

$P_{fL1}$ and $P_{fL5}$ are related by signal path, but independent with different expected C/No. In general, when combining the data and pilot energies at L5 synchronously, the L5 signal is expected to be up to 3dB stronger, thus making $P_{fL5} < P_{fL1}$.

Acquiring at L1 in a fading environment will be inherently unreliable, such that if the receiver antenna is in a local null, the signal cannot be acquired, much less tracked, at L5.

$P_{acq}$ becomes $1-P_{fL1}$ at any given moment in time. Ptrack is then, initially and for reacquisition, $(1-P_{fL1})*(1-P_{fL5})$.

In the direct acquisition case, $P_{acq}$ is simply $(1-P_{fL5})$. However, direct acquisition is about an order of magnitude more complex, both in terms of signal processing and memory, and maintaining carrier tracking without aiding from the L1 carrier can be similarly more difficult.

Therefore, direct acquisition reliability is measurably greater across all Rician and Rayleigh fading scenarios, particularly an issue for consumer applications with substantial body blockage, linear antennas and cluttered environments. There is, however, a transmit diversity gain from tracking the L1 and L5 signal in the poorest of environments. However, given the relative inaccuracy of code tracking at L5 and the weakness of the L1 signal, the loss is not significant, particularly once the L5-band signals of the major GNSS constellations reach full operational availability.

Diversity gains associated with tracking a plurality of separable signals at L5 make L1 tracking less important, as well. While there is some performance gain from the additional carrier, it is substantially less than the gain from an additional carrier at L5.

Take, for example, the Galileo E5 altBoc signal, with a plurality of separable lobes. If a receiver tracked just E5$_A$ and E5$_B$, but needed only one or the other to maintain continuity of its carrier smoothing and delta position solutions, then we can define P$_{slipE5AB}$ as P$_{slipE5A}$*P$_{slipE5B}$. In cases where, for example, P$_{slipE5A}$=P$_{slipE5B}$=0.001, P$_{slipE5AB}$ would be 0.000001. While it is true that tracking E1 would provide even greater carrier tracking reliability, that gain is somewhat nullified by constraining acquisition and reacquisition to E1, as well as the weaker signal and lower precision code at E1. The E5 signal includes 3 additional lobes that are approximately 10dB down from the two primary lobes, providing an additional form of diversity that further obviates the need for E1 acquisition or tracking.

Obviously, for the L5-I and L5-Q signals, there is less transmit diversity available, and so L1 or L2C tracking still might make a lot of sense, particularly until the L5-capable satellite constellation expands. This could provide a better local measure of ionospheric TEC along the ray path, as well. Beidou, with its expected B2B signals available, is more similar to Galileo in the long term.

Description of embodiments of the Inventions

Figure 14A:
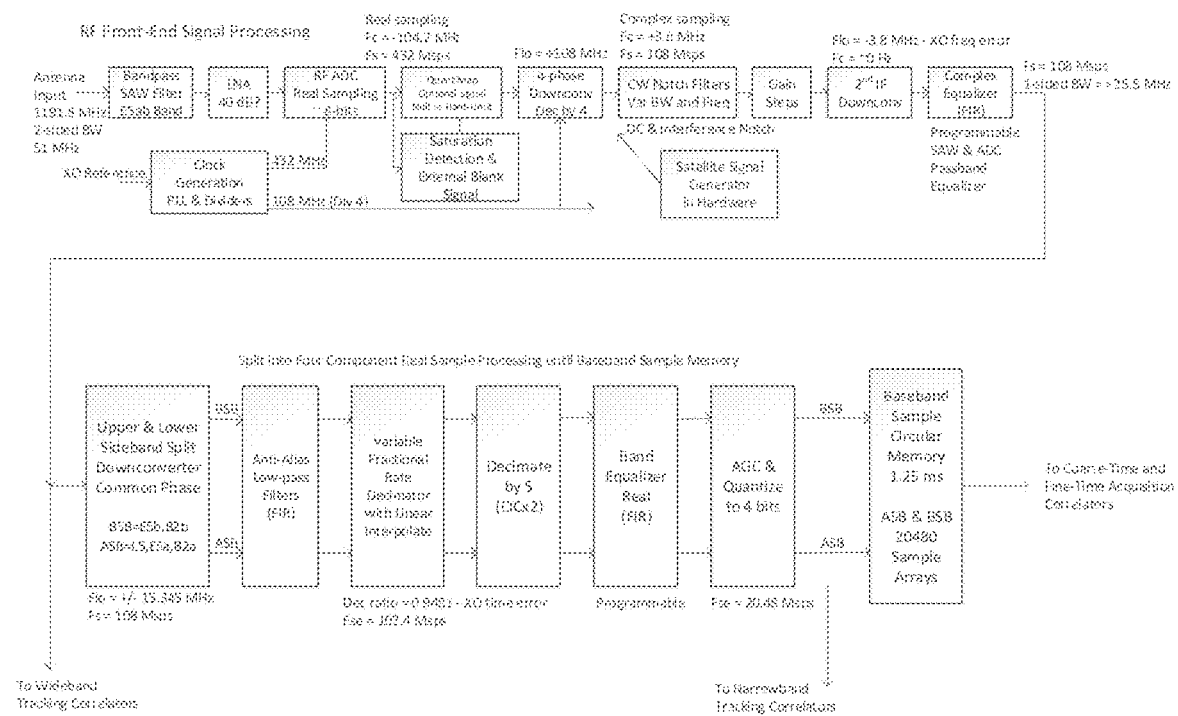
FIG. 14A shows an example of an embodiment of the front end processing flow in a GNSS receiver.

Figure 14A describes one possible digital signal handling front end according to one embodiment of an aspect of the inventions described herein.

Antenna –> filter –> LNA –> RF downcoverter from 1189MHz to DC with +/-54MHz BW. Sample at 108Mhz to produce in-phase (realC = cosine) and quadrature (imagC – sine) samples. The bandwidth stretches from+/-54Mhz of the L5 center frequency, 1191.795MHz.

Sideband A is centered down 15*1.023Mhz and Sideband B is centered up 15*1.023Mhz. So generate a 15*1.023Mhz digital local oscillator. Call it the sideband SB.
Shift the lower sideband A at -15*1.023MHz to DC by doing a frequency shift:

Ai = real * cos(SB) – imag * sin(SB)
Aq = imag * cos(SB) + real * sin (SB)
Then low pass filter the signal and decimate from 100Mhz to 16.384Mz with a clock divider.
Similarly , Shift the upper sideband B at 15*1.023MHz to DC by doing a frequency shift:
Bi = real * cos(SB) + imag * sin(SB)
Bq = imag * cos(SB) - real * sin (SB)
Then low pass filter the signal and decimate from 108Mhz to 20.46MHz with a clock divider. The decimate is simply a clock divider that produces 20,460 clocks from 108,000 samples for one msec.

Acquisition and Tracking Modes

A direct-acquisition broadband GNSS receiver, to be commercially viable, should effective use of its limited resources, depending upon the status of the acquisition and tracking process. A "search the sky" mode must be available for applications that do not have minimal data connectivity, but the more interesting case is when aiding data are available and need not be derived from the satellite signals. These pieces of aiding information can be loosely categorized into receiver clock setting (time), oscillator training (frequency), initial position, satellite position and satellite clock information (ephemeris). Depending upon the quality of all of these forms of assistance, the commercially viable modernized-only GNSS Receiver (COVIMOGR) described herein should, in one embodiment be capable of acquiring the signals and deriving what assistance information it requires as expeditiously as possible.

To that end, for acquisition, we describe three distinct modes:

1. Search the sky: One of the key components of aiding described above is effectively missing and so the receiver must "search the sky" for all signals of all known constellations. This is the least interesting case, because it has fallen in use cases in the connected world. In a sense, it is a slowed down, broadened version of mode 2.
2. Coarse Time: The receiver clock time is known to within a few seconds, but not as well as 0.5ms (the more accurate the better) and there is a reasonably accurate initial position available. In this mode, direct acquisition is somewhat challenging in that most signals at L5 are broadband, with millisecond-long codes that are an order of magnitude longer than L1-C/A. Attempting to directly correlate with these signals using banks of time domain correlators is computationally untenable for the COVIMOGR, particularly for receivers that must acquire in obstructed environments and with less-than-optimal antennae typical to commercial applications.
3. Precise Time: In situations where sufficiently accurate assistance information is available, once a first satellite signal is acquired or fine time assistance is received, the uncertainty in the millisecond code phase for each satellite can often drop to on the order of 100 microseconds or less. In such cases, we describe signal processing for a precise time mode for maximum sensitivity and minimal resource allocation. The source of the precise time may be an initial one or more signals already acquired and/or tracked, or it may be network-based assistance, or some combination thereof.

Once the signal from each SV is acquired, it is handed off to a tracking engine which is responsible for reading navigation message data and providing ongoing pseudorange, Doppler and carrier phase measurements. In addition, it can read the phase of the secondary codes, making it possible to extend millisecond code phase to pseudoranges for all SVs, a key benefit for precise time acquisition mode.

Signal Processing in Coarse Time Mode

For the most complex case, we will describe herein acquisition of the Galileo E5 dual sideband altBOC code. Alternatives for processing single-band Beidou and GPS signals will be noted, as well. Each msec, we now have 20,460 samples, I and Q at each A and B sidebands per SV supporting altBOC.

With E5, a 1PPM oscillator, and acquisition assistance information, we want to cover 1PPM = 1191Hz, say 1200Hz of oscillator frequency uncertainty. Because of the modernized signal secondary coding on both data and pilot channels, in one embodiment only non-coherent integration is used with coarse time. A longer coherent integration would observe phase reversals that cancel the integration energy beyond one millisecond. For 1 msec integrations, a frequency step of 500Hz would lead to sinX/X loss of 2dB. Also, the codes on A and B bands, after shifting to a low IF, are misaligned by 116.5 carrier cycles per code chip. So this misalignment should be corrected for long correlation. Typically, the integration time is limited by the time it takes to integrate ½ time/frequency search cell with a frequency error that is half the frequency search step. Integration longer than this time means the energy smears from one code search bin to the next, limiting the effectiveness of the integration.

Code smear = carrier frequency error / carrier cycles per chip / cells per chip * dt (seconds)
Solving for frequency error for a given dt that is needed to recover a number of dBs, and limiting the smear to ½ cell we get for 250msec,
Freq error = ½ * carrier cycles per chip / 20460 cells / 10230 chips / dt
= ½ * 116.5 *10230 / 20460 / 0.25 = 116.5Hz

[Note: math redone using 20460 cells vs. old 16384 assumption]
The frequency step then becomes twice the frequency error, so the frequency step is about 233Hz.

To cover +/-1PPM = 1191*2 = 2383Hz with steps of ~233Hz, requires about 10 frequency bins. We assume, for purposes of this example, that frequency uncertainty associated with unknown user motion, user position and user clock are negligible.

Note: the word mixer is used to represent a channel that effectively performs time domain correlation of the input signal with up to four codes per modernized satellite that is being searched for. It performs the correlation using FFTs. Correlation = Inverse FFT ( sample FFT * complex conjugate of code FFT) . The amplitude from each correlation hypothesis is integrated in hypothesis memory. Each of these mixers has limited frequency sensitivity, so multiple frequency "bin" hypotheses are arranged to cover the entire frequency uncertainty range.

To search all SVS in view in 1 second, means ~24*10 frequencies, each for 0.25 seconds of integration time. This would require 60 separate mixers. This number is thought to be too high for at least some embodiments. So we can reduce the integration time to 0.1 seconds in one embodiment. This only requires 24 mixers. However, each mixer must mix each of the four components of the E5 signals. This means there are 96 FFTs in parallel in one embodiment. Each FFT must have nominally 20480(cells)*16bits(I or Q word size)*2(for each I,Q) = 0.625Mbit. Multiplying by 96 gives 60 Mbit = 7.5 Mbyte. In addition to the FFT memory, each mixer needs a memory to integrate the non-coherent or coherent code hypothesis memory. In one embodiment, we assume a very compact representation of 8 bits per cell. This requires, in one embodiment, a method to shift out the linearly increasing noise floor average associated with non-coherent integration of the amplitude each msec. Conveniently, the power of all 4 codes for the 20460 cell hypotheses at each mixer can be integrated into the same memory for non-coherent integration. So each mixer needs 20460 bytes, and a total hypothesis memory can be: Hypothesis memory = 20460 cells / mixer *24 mixers * 8 bits per cell = 3.74 Mbit = 0.468 M Byte.

Figure 14B:
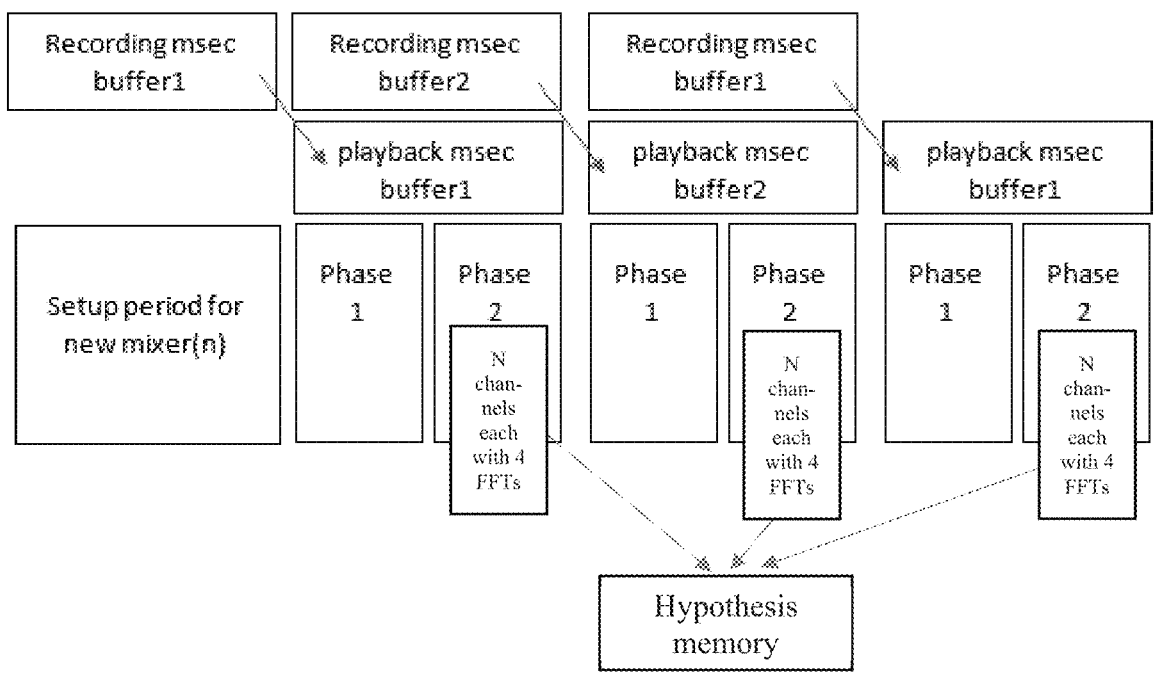
FIG. 14B shows a timing diagram for an embodiment that uses a series of captured GNSS signals that are stored in a buffer and then processed to accumulate a codephase hypothesis.

In one embodiment, which we will refer to as double-buffering, each msec, the sampled data is copied into each mixer and processed in two phases as shown in Figure 14B.

In another embodiment, a circular buffer may be used to decrease signal buffer memory by nearly a factor of two. However, it would require substantially faster signal processing than simply completing in 1MS.
The preferred embodiment of our invention performs correlations with FFTs, where Correlation=Inverse FFT(Sample FFT*complex conjugate of code FFT). The amplitude from each correlation hypothesis is integrated in hypothesis memory.
In phase 1 of the first embodiment described above, the FFTs of the samples are computed. These FFTs can be used across all mixers. Power can be saved in phase 1 as a reduced number of FFTs are running at this time. Effectively, the channels are not active in phase 1 although some of their FFT resources are borrowed to generate the FFTs of the samples. Typically 8 FFTs are performed in phase 1: an FFT for each of a 0Hz, 250Hz, 500Hz, and 750Hz carrier wipe version the input samples for both channel A and channel B.
In phase 2, sample FFTs (FFTs of received GNSS sample data) and code FFFTs (FFTs of locally generated GNSS SV PRN codes) are complex multiplied and then the Inverse FFT (IFFT) is performed. The IFFT is effectively equivalent to an FFT. The FFTs of the codes are either computed on the fly in the setup period, or are precomputed and stored in non-volatile RAM or ROM.

To minimize calculations, the following improvements can be used in some embodiments.

1) The samples are first carrier wiped at 3 incremental frequencies: 250, 500, and 750Hz to produce 4 sets of samples including the original at 0Hz. Then the FFT of these 4 samples sequences is performed to produce 4 FFTs. In phase 2, when a particular Doppler must be applied to the sample sequence to wipe the Doppler, a trick of FFTs is applied. That is, another increment frequency shift of +/-N*1kHz is obtained by shifting the FFT by +/-N bins. For example, for a search frequency of 4321 Hz, the two incremental frequency methods are combined to approximate the total desired doppler. The 250Hz FFT is chosen first as it is closest as the sub-kHz portion. Then this FFT is shifted by 4 frequency bins to get a total shift of 4250Hz. A negative frequency of -4321 is constructed using the 750Hz with a shift of -5 frequency bins: -5000+750=-4250. In this way, for phase 1, all mixers does not need to compute the FFT of the particular Doppler at the frequency mix. As the number of mixers is high, this reduces the total number of FFTs in nearly in half.
   a. In another method, the FFTs for the 250Hz and 750Hz dopplers are interpolated from the 0 and 500Hz FFTs.

2) The Code FFTS are precomputed either before the long integration, or from memory. These codes can be used throughout the long non-coherent integration process. The code is generated by starting with zero code phase offset. A divider is produced that generates 10230 code clocks in 20360 samples clocks. The code is held constant at samples between a change in the code clock. To account for the code Doppler, which has a rate of the carrier doppler divided by 116.5 cycles (when sidebands A and B are shifted to the center of 1191.795Hz), there are a few options:

a. The simplest is an integrator of code cells, which is the related to the number of chips moved times the ratio of number of code hypotheses to chips per millisecond. (20460/10230=2 for example). In this way, the target hypothesis memory address of each one millisecond integration shifts according to the rate. For example, if the doppler is 4321Hz, the number of cells in 100msec is (4321/116.5)*(20460/10230)*0.1 = 7.418 cells. It means the offset between the one msec correlation and integration will go from zero to nearly 7.5 cells evenly spread over 100msec. Also, the same code zero phase FFT is used each time.
   b. The worst-case option is to re-do the 20360 code sequence each millisecond where the starting code phase for the 20360 to 10230 code clock divider has a steadily increasing phase. Then the code FFT is updated each millisecond.
   c. Another relatively simple approach is to use another FFT property where a time shift T in the time domain is equivalent to multiplying a zero phase FFT with a complex exponential $e^{(-jwT)}$, where w is the frequency at each bin and T is the time shift in chips converted to second by dividing by the number of chips per second. This complex multiply can be lumped into the multiplication step of the sample FFT times the complex conjugate of the code FFT.
   d. Another approach is to use the fractional code offset from the first method to interpolate the adjacent amplitudes to account for the fractional code offset between when the code offset changes by integer values.

Even with these multiple improvements, the number of clocks required to perform a 16384 or 20480 sample FFT is high. Even with dual port memory, an efficient implementation can take about 115k clocks which is more than the about 100,000 clocks in one millisecond for a 100Mhz initial sample clock. Without a speedup, it means that 96 FFTs are needed to run in parallel, and the memory required for that is huge and can be intractable for the COVIMOGR. In general, the lower limit for instructions is the number of clocks per stage times the number of stages. For a radix N FFT, the number of clocks per stage is the sample size divided by N. The number of stages is the log of the sample size base N. For example, a radix 2 and sample size of 16384, the clocks per stage is 8192 and the number of stages is 14. So the minimal number of clocks is 14*8182=114666. For a radix 4, the clocks per stage is 4096 and the stages is 7 for a total of 28672.

This lower bound also assumes that the radix operation itself, which includes a complex combination of memory elements times a set of complex twiddle factors, can be cascaded into a single instruction. This is a reasonable assumption as integrated circuits can perform a number of operations in a single clock based on the speed of the transistors and the predictability of the propagation at a certain voltage and clock rate.

Thus, increasing the radix has the potential to reduce the clocks. The limitation however is the capability of the memory addressing circuitry to fetch and write. For a dual port memory which is quite common, the radix 4 implementation cannot fetch the 4 complex elements in parallel, rather it takes 4 clocks. In a sense, the advantage of the higher radix is lost.

To achieve a realizable design where modernized acquisition of modernized signals only can compete with legacy acquisition methods, some embodiments can use the following breakthroughs:

1) Realizing that the FFT based approach is memory intensive,
    a. a capability to use system memory rather than dedicated memory should be considered. In this way, the memory is not a sunk cost, as it can be allocated to the acquisition and then re-used for other purposes when the acquisition is complete or when the GNSS receiver is not running. Thus, sharing a memory between a GNSS processing system and another system that can be on the same integrated circuit (IC) so that the shared memory and the GNSS receiver and the another system are all on the same IC which can be a System On a Chip (SOC).
    b. Methods for reducing memory use by effectively pipelining FFT data should be considered. This embodiment is described below in the Very Fast Frequency Domain Correlation (VFFDC) section.

2) Realizing, in one embodiment, that a high number of effective FFTs are required to achieve a fast acquisition in a mass market GNSS receiver where there is high system loss (from high NF, high antenna loss, signal fading or blockage), a fast FFT engine can be re-used many times in one millisecond and can use generic system memory so that only a low number of physical FFT engines is used leading to a small memory requirement. Such a fast FFT is re-factored from a generic FFT architecture so that the FFT can be further parallelized, and each parallel sub FFT can update with its own memory a. Alternatively, a custom memory design that can fetch a high number of words in parallel can be employed. In this way, several radices can be performed in parallel. For example, suppose 32 sets of I,Q can be fetched in a single clock cycle. This allows 8 radix-4 computations to be parallelized. In this way, the clocks per stage is divided by 8. So, the complete, say, 20460 FFT can be performed in 4096(clocks per stage)/8 (parallel radix-4)*7 (stage) = 3584 clocks. With a 100Mhz system clock, there are 100,000 clocks per millisecond, and this allows the FFT to be re-used 27 times in a millisecond. For a mixer requirement of 88 FFTS, only 4 physical FFTs would be required. Notice, that such a low clock rate allows a low power system as the maximum memory and DSP clock is quite low by today's standards.

b. Alternatively, a high clock can be used. A 4 times higher clock would enable reducing to a single FFT. This carries with it the disadvantage of a mix of clocking rates in the design and therefore increased buffering and staging overhead.

c. Finally, a pipelined VFFDC design, which is our preferred embodiment, can be used which minimizes the need for copying and maximizes parallel operations at each stage.

3) Whereas the FFT memory can be reduced and re-used, the remaining hypothesis memory dominates the remaining design.

a. Whereas the full E5 signal is more than 6dB stronger than the legacy L1 CA signal, non-coherent integration is the most efficient method to improve the SNR without resorting to multiple hypotheses about the secondary coding and data bits that produce random phase reversals each millisecond. Conversely, L1 C/A has similar random phase reversals due to data bits but at a significantly longer 20msec interval. This feature is what enables a faster SNR improvement with coherent integration on L1 C/A. Non-coherent integration only on the legacy signal is not enough from some mass market devices because it cannot integrate long enough practically.
        i. Consider a target device that needs 16dB of SNR improvement to overcome system losses.
            1. With E5, combining the 4 components of the signal: A data (Ai), A pilot (Aq), B data (Bi), and B pilot (Bq), the signal is nearly 6.5dB stronger than L1 C/A in 1msec. Integrating for 1msec integrations non-coherently for 100msec, produces a gain of (over 1MS C/A) 6.5dB + 1.5dB*log(100,base2) =

6.5+(1.5*6.64)=10dB + 6.5=16.5dB. Accounting for some phase reversals within the 1msec sample buffer forming a loss of approximately 1dB, we get a gain of 16.5dB - 1dB=15.5dB, relative to GPS L1-C/A for 1ms. [ (there are some losses associated with the phase of the sigma inside the 1msec sample buffer and the phase reversals of < 2dB).] Combining means keeping a separate sample buffer for the A and B sidebands since adding these together will double the noise and wipe out the 3dB gain associated with each sideband. This computation does not account for advantages of transmit diversity provided by a dual-sideband signal. In the typical Rayleigh fading environment found indoors and in urban canyons, particularly for the direct signal path, this transmit diversity may improve fade resistance by on the order of 10dB or more, making signal acquisition, tracking and reading of the navigation data symbol stream substantially more reliable.

2. With L1 C/A, the general case acquisition with coarse time means that the longest coherent interval is near 10msec (which is half the data bit interval of 20msec). In this case, one 10msec sample can avoid the phase reversal perfectly, whereas the adjacent 10msec samples can be nearly lost with worst case phase alignment.

a. With 10msec coherent, the frequency step now is reduced to nearly 50Hz. To reduce the frequency loss to the same level as described with the E5 method a 25Hz step is assumed. This means the number of frequencies required to cover the same +/- 1PPM is 2 *1575/25 + 1 = 127 per SV. Notice only 9 are needed with E5 (the difference is a factor of 10 for integration time, 10=10msec/1msec and also a factor of 1.3 = 1575/1192 giving the advantage to E5 being lower in frequency).

b. To achieve the same sensitivity, of 16dB after losses, the sensitivity gain model of the L1 C/A search with 10msec coherent windows, is 10dB for the $1^{st}$ 10msec, then with non-coherent integration of these 10msec integrations, the sensitivity improves by 1.5 each doubling. Keeping the integration time at 100 msec, means the integration time doubles at 20,40,80, and then 20/160=.125. The number of doublings is 5.56 and the non-coherent gain is 1.5*3.125 = 4.69dB, so the total SNR gain is 10dB + 4.49 − 1.5dB (average loss of 2dB for phase reversal loss of one of the 10msec windows) = 13.2dB, which is similar but less than E5 case.

c. This demonstrates that the perception that L1 C/A is more sensitive with coherent integration is not true, as the simpler non-coherent approach and acquiring the whole signal can be of equivalent or better sensitivity.

d. Now to examine the size of hypothesis memory and how it compares between E5 and L1 C/A. With E5, there were 24 channels running in parallel. So, the size of hypothesis memory is 20*20460*8 bits = 3.12Mbit at two samples per chip. Note that all 4 components of E5 are integrated into the same hypothesis memory as they all have the same code phase hypothesis.

i. Note: while the signal is traveling through space, there is a phase dispersion between sidebands A and B due to the fact the number of carrier cycles per chip is different (115 cycles at A, and 118 cycles at B, and 116.5 cycles in the center corresponding to 1191.795MHz). The relative phase difference in chips is 1. delChips = codeDoppler B − codeDoppler A = (Satellite Doppler) *dt * [1/115 − 1/118]
        = Doppler * dt * (118 − 115) / (115*118)
        = 3*Doppler*dt / 13570. Note that there is also a small relative ionospheric dispersion, on the order of one carrier cycle.

2. Since the travel time is on average about 80msec, and with a maximum Doppler of 5kHz due to satellite motion the delta chips is:

delChips = 3*5000*0.08/13570=0.088 chips

3. Thus, the code mapping from one msec amplitude to the amplitude sum in hypothesis memory in can apply a special offset for the A channel that is .14 cells (assuming 16384 cells per 10230 chips) earlier as the codeDoppler is larger for A than B.
4. Since both sidebands are shifted to center, they have same code rate for the dt that stands for the processing time.
5. Note: if the oscillator offset is very high, then the Doppler can be much larger. In this case, the difference between the two sidebands for the travel time is much larger and needs to be compensated.
    a. One solution is to compensate the oscillator in HW. A SW table is maintained with for the offset verses temperature that is learned with the receiver is fixing and can measure the error in the velocity fix like how the time offset is learned in position fix. In that case, the frequency offset can be removed with a hardware-based frequency shift so that the frequency error is removed from the sample data. In this way, the only the satellite doppler can be observed in the code doppler difference between the two sidebands.
6. Note: if the two sidebands are generated with a separate IF, then the code doppler difference is not common for the time integration for the SNR improvement. In that case, the code doppler difference needs to be compensated.

ii. Now to the hypothesis memory for L1 C/A: if the same search power is achieved, it means there are 127 frequencies per SV and with the same 24 satellites in one second, meaning there are 3048 frequency bins per second. Assuming that each frequency is also searched 100msec, it means there are 305 concurrent frequencies being searched. Assume the typical sampling is near twice the chipping rate, and so is around 2046 samples per millisecond. Thus, the total number of hypotheses is 2046*305 and at 8 bits = 4.875Mbit which is actually higher than the E5 case. This number could be reduced a few ways. First consider the same ratio of code cells to chips. This would put the sample clock at 1.6384MHz instead of 2.046Mhz. This reduces the hypothesis memory to 3.904Mbit which is still larger. The next step is to reduce the frequency step from 25Hz to 50Hz, and accept another 1.5dB of frequency step loss to 13.2-1.5=11.7dB. This cuts the memory in half. Using the original 2.046Mhz sampling clock with 50Hz leads to half the frequencies and therefor 2.4375Mbit which is now a bit smaller than the 2.816Mbit for the E5 and the L1 C/A is now less sensitive by almost 5dB. (16.5-11.7 = 4.8dB). This does not account for the additional advantage of Galileo signal transmit diversity, leading to a substantially more fade-resistant signal acquisition with E5 A+B. If we conservatively estimate this improvement at 6dB, the COVIMOGR has an at-least 11dB advantage over L1 coarse acquisition codes in coarse acquisition mode. The COVIMOGR advantage expands in precise time acquisition mode, where coherent integration further improves modernized signal tracking sensitivity.

iii. This example shows that E5 with a very efficient FFT engine, can have better sensitivity than an L1 C/A based receiver and with similar hypothesis memory, even in the coarse time acquisition case.

Preferred Embodiment – VFFDC

Figure 14C:
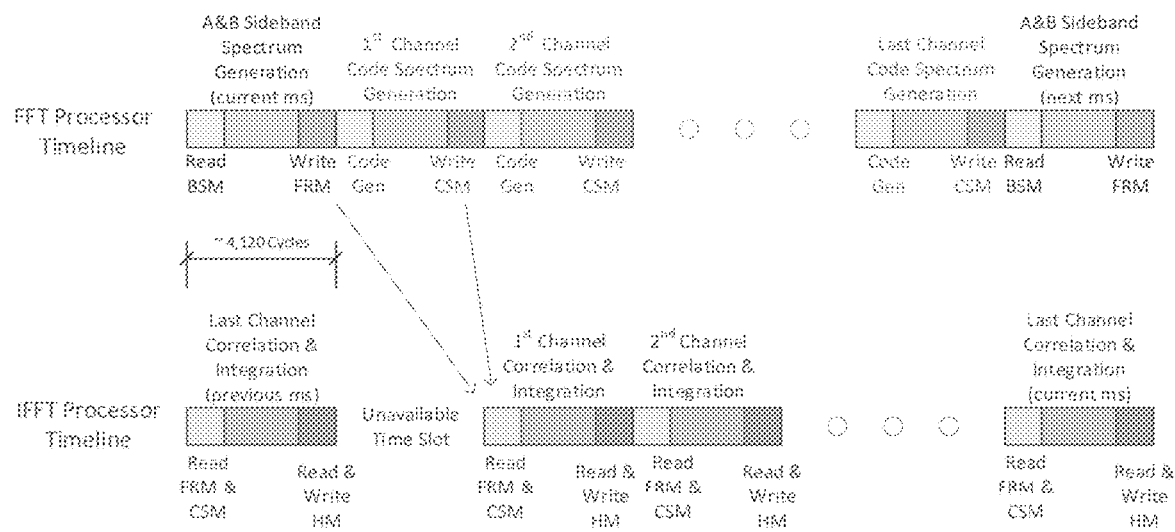
FIG. 14C shows a coarse time acquisition processing timeline according to one embodiment.
Figure 14D:
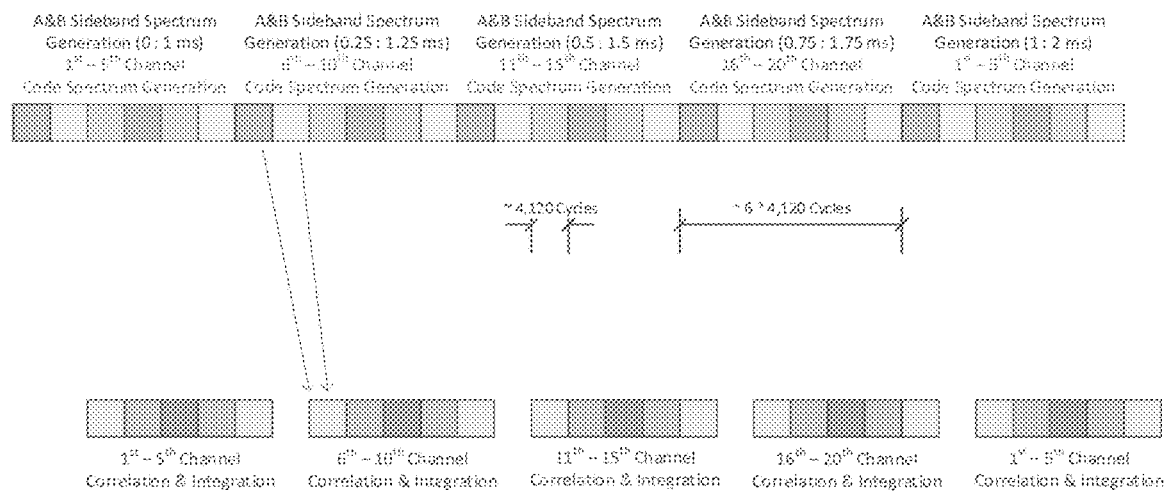
FIG. 14D shows a precise time acquisition processing timeline according to one embodiment.

The pipeline-oriented architecture described in the figures 14C and 14D allows a dramatic speed-up of FFT throughput as well as a reduction in memory usage, both in working memory and signal memory, leaving hypothesis memory as the single largest memory use. In practice, the flow will be slightly different between coarse time and precise time acquisition modes, as illustrated in the above figures.
The speed-up and memory reduction in VFFDC performance vs. typical FFT techniques comes from a combination of appropriate staging, attention to detail in memory management and application of more recent "decimation in time" (DIT) and "decimation in frequency" (DIF) FFTs.

Figure 14E:
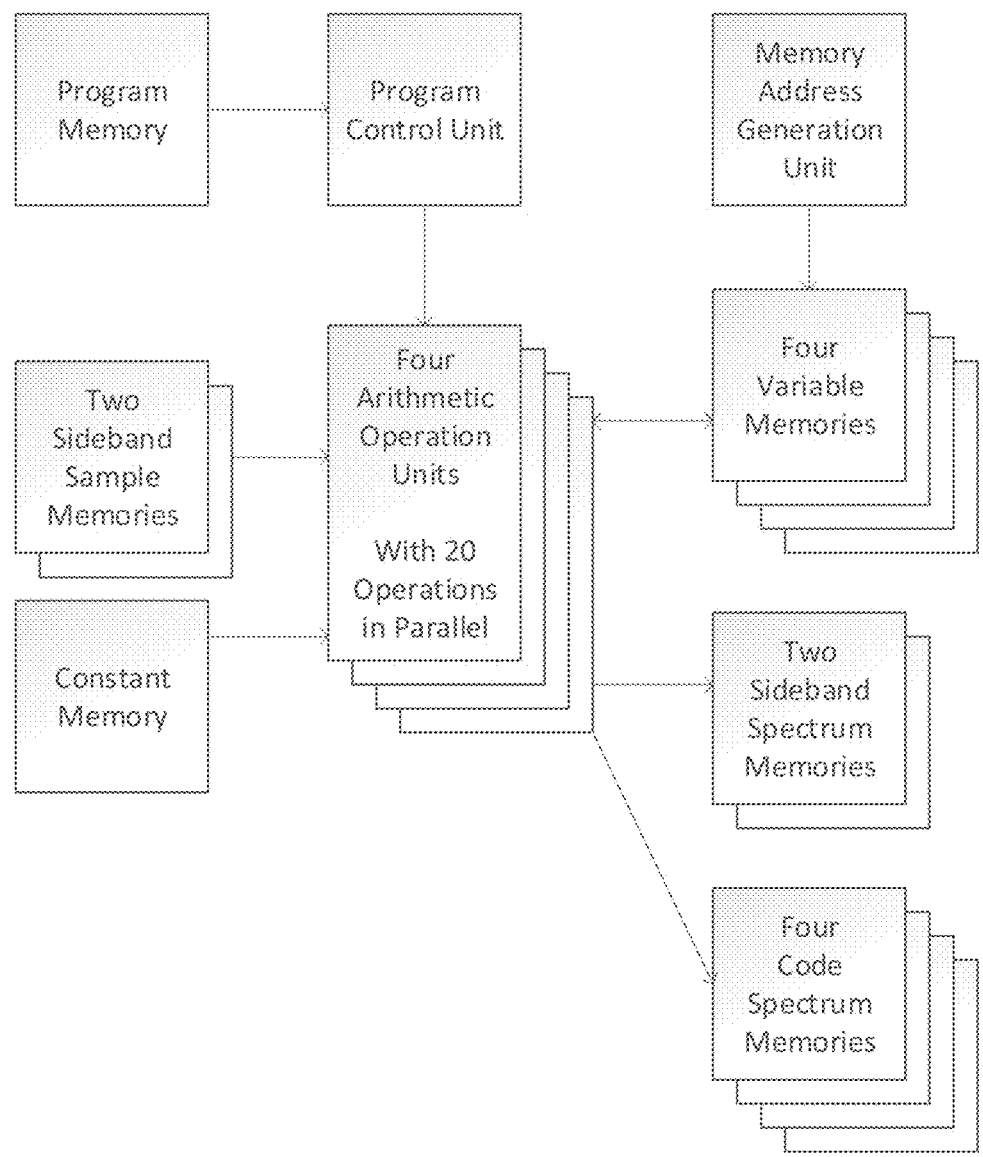
FIGS. 14E and 14F show examples of FFT processor architectures according to one embodiment.
Figure 14F:
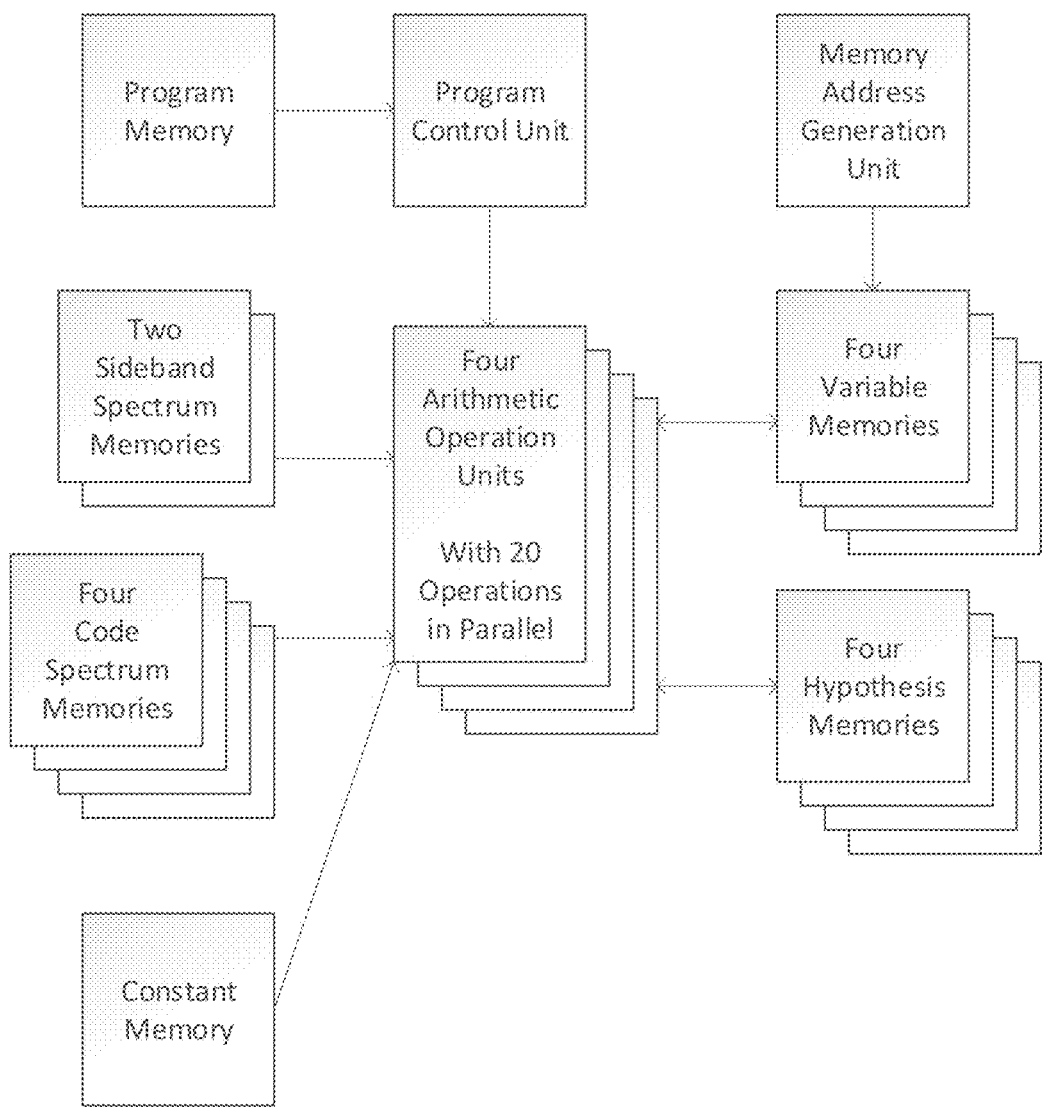
Figure 14G:
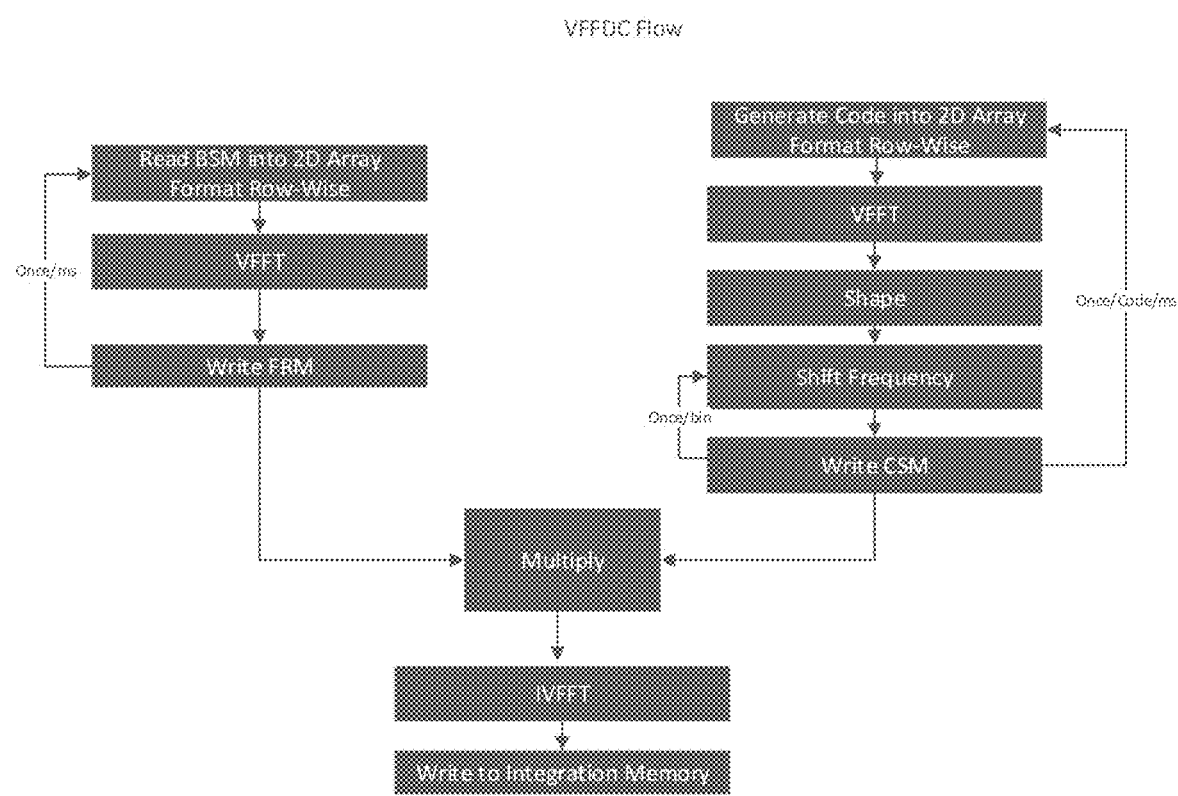
FIG. 14G is a flowchart that shows a method that can be used in a frequency domain correlator, particularly a correlator that uses an array processor.
Figure 14H:
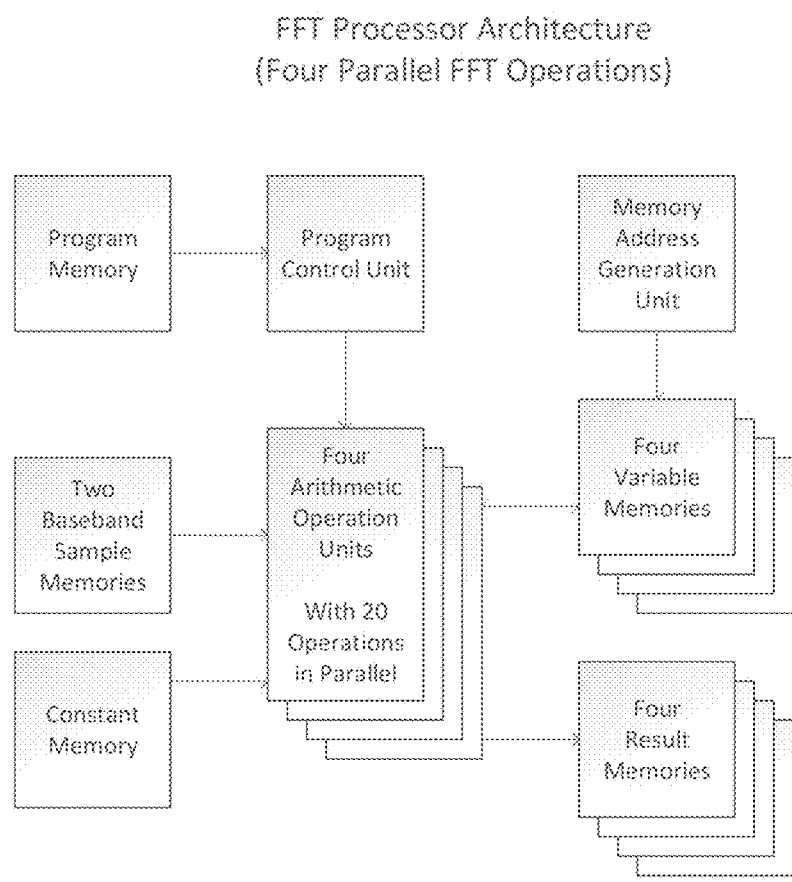
FIG. 14H shows another example of an FFT processor architecture according to one embodiment.
Figure 14I:
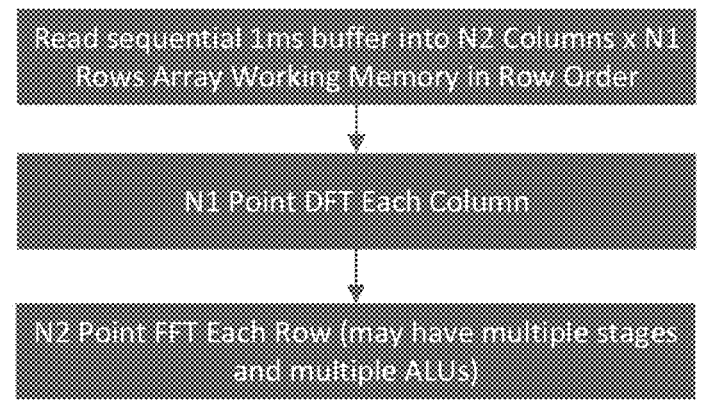
FIG. 14I is a flowchart that shows a method that can be used in a frequency domain correlator, particularly a correlator that uses an array processor.
Figure 14J:
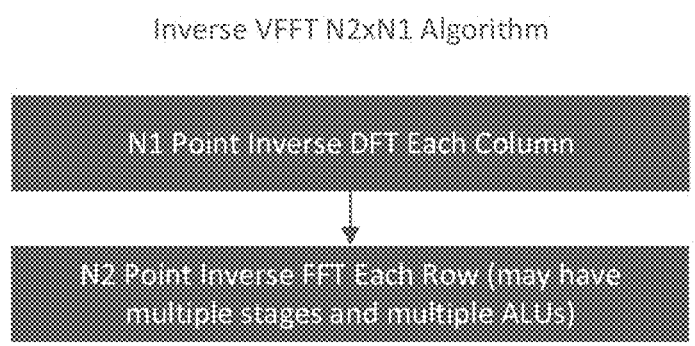
FIG. 14J is a flowchart that shows a method that can be used in a frequency domain correlator, particularly a correlator that uses an array processor.

Figure 6 depicts the high-level view of the Very Fast Frequency Domain Correlator (VFFDC) Architecture. Several of the blocks in this figure will be described in further detail. Figure 14E shows an example of an FFT processor architecture that can be used in one or more embodiments. Figure 14F shows an example of an inverse FFT processor architecture that can be used in one or more embodiments. Figure 14G is a flowchart that shows a method according to one embodiment, such as the embodiment shown in Figures 6-8. Figure 14H shows another example of an FFT processor architecture that can be used in one or more embodiments. Figure 14I is a flowchart that shows a method according to one embodiment such as the embodiment shown in Figure 7. Figure 14J is a flowchart that shows a method for an inverse FFT algorithm that can be used in an embodiment such as in the embodiment of Figure 8.

Figures 7 and 8 provide a detailed end-to-end timeline view of the acquisition correlator processing.

The GNSS code generator is further described in the figure 9D. The preferred embodiment is to generate each code from its underlying polynomial representation, appropriately shift and shape it and then transform it to frequency domain each ms. However, there are several possible implementations which might accomplish many of the memory reduction goals without resorting to a full regeneration of the code spectrum each millisecond. For example, the time-domain code may be generated just once per tracking session. In another example, the code spectrum memory may be stored and slightly adjusted as needed. In another embodiment, these caching approaches may be used when storage resources are available, but not otherwise.

Note that the FFTs of both the signal data and the code data in this embodiment are performed on-the-fly in two working memory buffers which are reused for all mixers. The signal data is kept in a circular buffer that is just longer in duration than 1 ms so that the FFT process can be performed before the write pointer of the buffer catches up to the read pointer of the FFTs, thus saving almost a factor of two over the earlier-described double buffering embodiment, in baseband sample memory. Further to that, the GNSS codes in this embodiment are generated on-the-fly, thus saving a factor of approximately 100 on pre-stored GNSS code spectrum memory. These 10,230 bit codes may be stored compactly in time domain, with 10,230 bits, but once transformed into frequency domain their size expands to include a complex non-binary representation. Note that there are, in effect, four codes per SV. Some of these codes may be more simply stored, but they are most simply stored as their polynomial representations. So that is the preferred embodiment for the sake of memory efficiency. While transforming each code needed every millisecond is an intrinsic increase in the amount of FFT processing of almost a factor of two (only the in-phase leg of the code spectrum undergoes the first stage of FFT processing), in this embodiment it is well worth it for the inherent memory and I/O reduction. A further gain is produced when a DIF conjugated FFT is used for the inverse FFT, such that the same buffer in which the results of the multiplication process are stored is used to perform the inverse DIF process in row order (time domain data is kept in row order and frequency domain data in column order).

Note that these FFTs are, in keeping with the Nyquist criteria, proposed to be done on N=20,460 samples, broken down into a set of N1=20 first stage DFTs. (10 or 40 could be used for N1, as well. 20 was chosen as a design decision.) This leaves the next stage of N2=1024 point DIT/DIF FFTs, which can be implemented with great speed in three further stages using integer arithmetic, two Radix8 and one final Radix 16.
Because of the pipelined nature of this processing, it can all be done comfortably with a processing clock only slightly faster than the sampling clock, at 100MHz for all frequency bins for all SVs in view within about 50microseconds, meaning that said circular buffer need only be approximately 1.05ms long (21483 samples, stored as 4 bits for I and 4 bits for q), saving power and, most-importantly, on-chip RAM.

VFFT Details of one embodiment
- a. Decomposition of an N-point DFT into an $N_1$-point DFT and $N_1$ parallel FFTs of $N_2$-points
    - i. The total number of FFT points is $N = N_1 * N_2$, with $N_1 \ll N_2$
    - ii. The N-point VFFT-DIT algorithm-architecture is speed optimized by decomposing the FFT processing into $N_1$ parallel FFTs of $N_2$-points, followed by a combining stage with $N_1$-point DFTs. The $N_1$ parallel FFTs are performed concurrently using array processing method to speed up FFT processing time by a factor of $N_1$ times.
    - iii. The N-point VFFT-DIF algorithm-architecture is speed optimized by decomposing the FFT processing into a first stage with $N_1$-point DFTs, followed by $N_1$ parallel FFTs of $N_2$-points. The $N_1$ parallel FFTs are performed concurrently using array processing method to speed up FFT processing time by a factor of up to $N_1$ times.
    - iv. An inverse VFFT-DIF can be done by conjugating the input array before VFFT and conjugating the output array after VFFT.

b. Use array processing method to concurrently process $N_1$ parallel FFTs. All the FFTs do the same processing, use the same program control instructions, but use a different data set (a vector) from the array.
c. A DFT of non-power-of-2 points is possible for the re/decomposition stage. This DFT is done in 1 instruction cycle with $N_1$ parallel constant cross-multipliers and adders. Thus, $N_2$ cycles are required to complete the first/last stage of the VFFT.
d. Use 3 stages to perform the $N_2$-point FFTs, with radix-8 in 2 stages and radix-16 on first/last stage.
   i. The $W_N$ phase shifts are not required for the radix-16 stage, which reduces complexity and allows time for pre/post VFFT operations.
   ii. Only the radix-8 stages require phase shift factors. Given that the firmware only selects 1 element from memory per instruction cycle, only 1 phase shifter hardware is needed per $N_2$-point FFT. Since there are $N_1$ parallel FFTs operating concurrently, we need $N_1$ phase shifters in hardware and all share the same phase shift amount.
   iii. Each stage of the FFT requires $N_2$ cycles to complete, thus $3 * N_2$ cycles for the 3 stages.
   iv. The processing rate on each stage is limited by the read and write access to the dual-port variable memory. Every processing cycle includes a read and write access, which allows a firmware loop of 8 or 16 instructions for radix-8 or radix-16 stages, respectively. This design utilizes nearly 100% of the available read and write memory bandwidth, and therefore is the most efficient possible for the given practical hardware limitation.
   v. Dual-port memories are commonly available in ASIC library, but higher port memories may not be; thus for design portability, this embodiment uses single and dual port memories, and so far there is no need for byte access capability (not always supported in every ASIC libraries).
e. The correlation post processing operations are performed in real-time, without storage, and possibly pipelined over a few extra processing cycles, but no extra cycles within the firmware loop. These operations are performed on full row vectors in 1 instruction cycle.
f. The variable memory can have reduced precision up to the last stage of the VFFT. Then the correlation post processing operations can be performed with higher precision within registers of the processor. The results may be scaled back to lower precision before storage in hypothesis memory. Thus, the variable memory doesn't need high precision (the goal is 8-bits per I/Q-component).
g. Block floating point can be used on the integration magnitude values to reduce precision to 8-bits unsigned. The magnitude value compression may also include subtraction of the minimum value in the block before the block floating point conversion is applied.
h. Cordic based phase shifters can be used throughout the design instead of complex multipliers and sin/cos tables in at least some embodiments.

i. Cordic hardware is about 1/4 th the area (cost) of a complex multiplier, and the Cordic phase map table is typically lower precision than a sin/cos table.
ii. The Cordic algorithm produces several small phase modulated spurs (PM) near the noise floor, instead of 1 or 2 dominate amplitude modulated harmonic spurs (AM) as with the quantized sin/cos table method. The spur free dynamic range of the Cordic is greatly increased, which allows reduced signal precision for the same performance.
iii. The only drawback of Cordic hardware is the long propagation delay through the serial stages. Arithmetic logic optimization is not possible across stages due to condition logic within each stage. Excessive delay beyond the timing budget may need to be handled with register pipeline stage(s), and any extra group delay must be factored into the signal processing algorithm.

It should be noted that while the description of the present design assumes reading data in row order to optimize addressing, it could readily be read in column order, as well, with very similar results.

Reduced complexity correlator for lower power acquisition of stronger signals.

Whereas using both components of both sidebands of E5 allows a SNR increase of up to 6dB compared to a single sideband component (I or Q), in some scenarios it is preferable to use a lower power configuration that can acquire a stronger signal in a reasonable amount of time. In another scenario, the receiver may need to read certain information from a navigation message that is available from only a subset of signal components. This information may be, for example, a time of week stamp or a particular phase transition interpreted as a time mark for a fractional synchronization. Or it might be integrity information. It may be, for example, almanac or ephemeris information, or differential correction information. In the case of needing to read a certain piece of information in order to speed further acquisition and tracking, those signals that are likely to provide such information the quickest are prioritized.

Consider an acquisition case when the receiver is turned on while inside a parking garage when all signals are blocked. The receiver is not aware of this garage condition and will likely enable a search strategy based on the case that the signals are very weak. Such a strategy requires longer integration with all components of the signal and provides the maximum sensitivity. While this method is good for acquiring weak signals, it is slower to recover stronger signals when the receiver finally exits the garage because it is spending more time at each search frequency. In this case, it is beneficial to have a second parallel search engine, or to allocate some of the search resources to look for stronger signals using a shorter integration period so that each frequency bin can be searched faster, allowing the receiver to cover more frequencies in a shorter time.

Consider, also, an acquisition with poorly known time. The typical network time protocol (NTP) accuracy on the Internet ranges from about 5ms to 100ms in accuracy. In some cases, the frame synchronization of a selected GNSS signal component, alone, might be able to provide fine time. In such a case, searching for that signal component would be the highest initial priority, until that signal is tracked and the clock is set with confidence. Once the clock is set with confidence, that signal may be de-prioritized, in favor of a signal component with less data on it, and therefore superior tracking sensitivity.

A flexible correlation method can be used to provide the fastest acquisition of strong signals. First, the correlation resources can be configurable so that a channel can search for from one to four signal components. If a single channel was not able to release unused resources, then the resources would be idle and increase the acquisition time. For example, if a channel was configured to be able to search four components, and only a single component was used, then the other three resources would be unavailable.

Thus, the first part of this embodiment is to identify that fundamental search unit is a correlation of one signal component, such as E5BI. With frequency domain methods, this means performing the FFT of the samples, the FFT of the code, a multiplication of the sample spectrum times the complex conjugate of the code spectrum, and an IFFT of the product. The total number of correlations is the number of times that the VFFDC resource can be re-used in the frame length of the code (nominally 1MS). Then, the concept of a channel contains the ability to choose one to four components to match the E5 and B2 signals that have four components. In this case, the number of channels should match the hardware's capability in terms of the number of correlations it can perform in one frame, in this case one millisecond.

If, for example, we have the capability to perform 88 full correlations in one millisecond, the maximum number of channels, should be 88 for the case when each channel uses on only one component. If for example, only 22 channels were defined with up to 4 components, then if only a single component was used, 3 components would be idled.

A second part of this embodiment is to choose the component that has the minimum search loss. With modernized signals that have 1 millisecond frame lengths and overlay codes, or secondary code, from 4 to 100msec that have bit changes synchronized with the frames, there can be a sign change from 1 to -1, or -1 to 1 with each frame. In general, the overlay codes produce phase reversals with a rate close to 50%. On two consecutive frames where the phase reversal does not occur, the process of performing non-coherent integration of one msec periods synchronized with a random millisecond input sample phase has no loss when frame point, or the epoch phase, or where the frame is restarted. Conversely, if the frame epoch is at the center of millisecond and a phase reversal occurs, then a cancellation will occur, resulting in very little correlation for that millisecond.

With FFT based correlation, it is not possible to break the millisecond correlation into two parts, that is, the part before the potential phase reversal epoch and the part after the epoch.

The receiver is operating on a whole millisecond of received signal with an arbitrarily selected start time. Each satellite signal has a distinctly different and unknown phase at this stage of the acquisition process. This is because the millisecond samples are correlated with a full millisecond of code samples starting from zero phase and it is not possible to apply a separation based on other phases. Conversely, with the traditional methods of time domain correlation, it is possible to choose a different combination of input samples for a different code phase estimate so that the epoch occurs at the edge of the millisecond buffer. In this way, the in-phase and quadrate sums have the same phase during the integration. However, with modernized signals, such a method of doing a separate correlation for each code phase hypothesis is not commercially viable as it would either require too much hardware, increasing power consumption and size, or conversely would be too slow with reduced hardware.

Thus, the penalty of non-coherent integration of one millisecond correlations is that there is a loss associated with the phase of the epoch in the millisecond samples. The loss is small when the phase is near the edge of the millisecond or when there is no phase reversal in the overlay code. The loss is higher when the phase is near the center of the millisecond and the phase reversal occurs. In the latter case the loss is effectively infinite. In the former case, the loss is smaller. In general, when integrating over the duration of the overlay code, the worst case loss is less than 3dB because with a probability of a phase reversal around 50%, then half the correlations are lost but the remaining correlations have no such phase loss. Losing half the power means losing 3dB.

It has been discovered that the E5BI, the data channel, has an overlay code of 0001. The secondary code repeats every 4 frames, 4 milliseconds. The data symbol produces an additional phase reversal at the boundary of the overlay code. Thus, consider an alternating data symbol sequence of 5 bits 0,1,0,1,0. The combination of overlay codes and data symbols would produce the following sequence of overlay code phase where 0 means phase 0 and 1 means phase 180 degrees.
0001 1110 0001 1110 0001
Now look at the phase reversals, that is, the derivative of the sequence:
0001 0001 0001 0001 0001
There are only 5 phase reversals over 20 symbols, so the probability of a phase reversal is 25%.
Conversely, consider B2AI, the data channel on Beidou. Its overlay code is 00010. Or perhaps we can provide a map to what phase transitions are specified by 00010.]
Now consider the same 5 data bits of 01010. The resulting combination of the overlay code and data symbols produces this sequence:

00010 11101 00010 11101 00010
Now look at the phase reversals, that is, the derivative
00011 10011 10011 10011 10011
There are 15 phase reversals out of 25 bits. Here the probability of change is 15/25 = 60%.
Thus, the maximum loss of dBs for B2AI is 3dB & 0.6 = 1.8dB, However, the maximum loss of dBs for E5BI is 3db * 0.25 = 0.75dB which limits the loss by 1.05dB, in comparison.

Thus, to improve real world acquisition time with a fixed amount of search resources, an embodiment can enable a single component search (searching only that single component by attempting to only acquire that single component for a period of time) and to pick the component on each system that has the lowest probability of a phase reversal. For Galileo E5, that optimal component is E5BI.

Shared memory

COVIMOGR = commercially viable modernized only GNSS receiver
Another method that can be used to achieve a commercially viable modernized only GNSS receiver (COVIMOGR) is to reduce the dedicated memory by re-using system memory. Consider the case where the COVIMOGR is integrated in a system on a chip (SOC) where there is already a large SRAM and DRAM and other processing systems.
The COVIMOGR SOC components include, but are not limited to such items as a Digital Front end (DFE), Acquisition Engine (AE) using frequency domain correlation, tracking engine (TE) using time domain, re-acquisition engine (RE) using time domain, plus a minimal CPU/RAM/ROM needed to control the AE,TE,RE.
The amount of memory required by the AE depends on its efficiency with respect to the frame period, which is generally one msec for the modernized signals in the L5 band: for example, if 88 complete frequencies (mixers) are required, and if the correlation engine requires, say, 4500 clock cycles, and 108000 clock cycles are available each msec, then each correlation engine can be used 24 times per msec. That means at least 4 correlation engines are required in the AE. In this case, memory for 4 engines are required. In general, this memory must be dedicated to AE as it must be available each clock cycle and not slowed down by any memory arbitration.

The SOC architecture can include such items as:
1. A set of application processors (AP) such as four. These often have variable speeds.
2. A general IO, input output interface to systems off-chip, as well as IO for on-chip communications.
3. A Hardware abstraction layer which contains the Hardware control, Operating system (OS), and communication bus with arbitration so that all blocks can be configured and communicate via the OS. This block contains its own CPU or runs on one AP in the system
4. A set of functions that are handled on the SOC and each of these functions can be performed by a processing system that includes a local processing memory which may be shared with a GNSS processing system.

5. A GNSS processing system (e.g., COVIMOGR) that itself is another function. It can have an acquisition engine, a tracking engine, a re-acquisition engine, a digital front end, a minimal CPU, a minimal SRAM, and a minimal NV-ROM.
6. A large block of SRAM that is available to the system via the communications bus and also to one or more other functions, in this case, it is connected to the COVIMOGR.
7. A DRAM, which is a general purpose non-volatile memory.

Figure 14K:
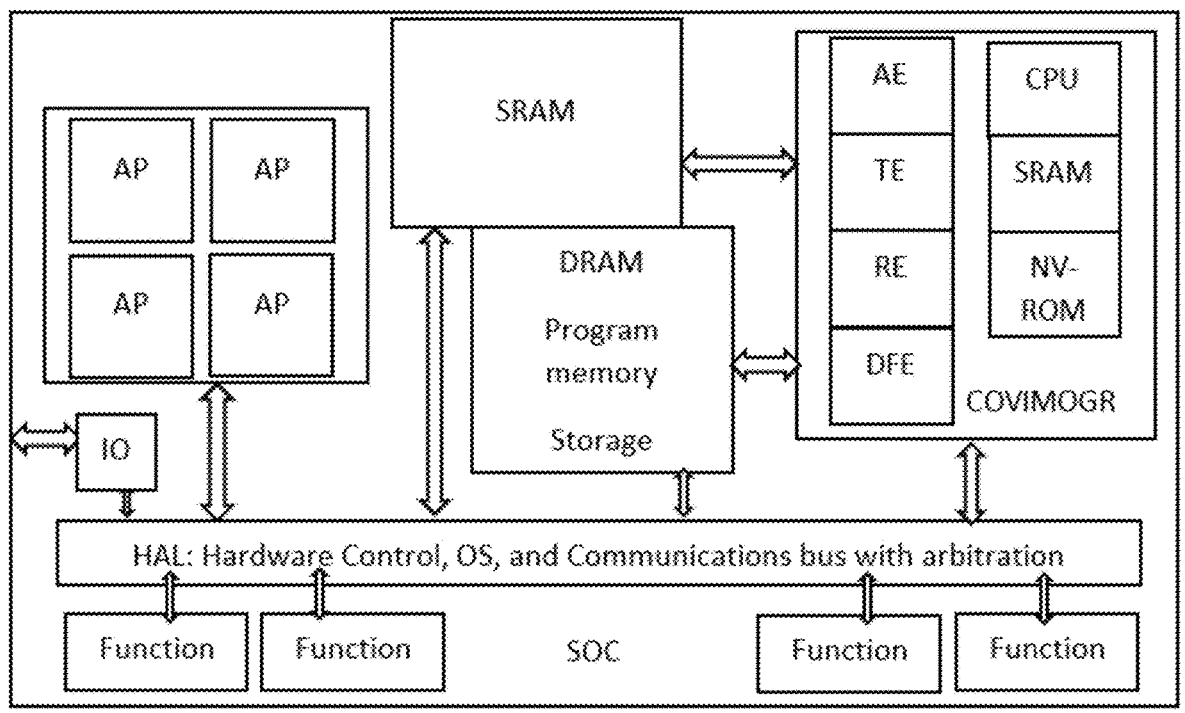
FIG. 14K is a block diagram of a system on a chip (SOC) that includes a GNSS receiver and one or more application processors according to one embodiment.

Consider the system on a chip (SOC) shown in Figure 14K. It can be a single monolithic die, or a system of multiple dies. Consider here that all elements except the DRAM are on the same die and the DRAM is second die connected via communication bus.

In order to reduce the size of the COVIMOGR, and especially the SRAM for the AE, it can use a combination of dedicated memory in the AE and the SOC SRAM. In a preferred embodiment, the hypothesis memory for non-coherent and/or coherent-integration is shared with the SOC via a direct bus so that some fraction of the SOC SRAM is addressable by the COVIMOGR and is not slowed down.
1. The AP gets a request from an application to determine a GNSS location.
2. The HAL identifies a set portion of the SRAM and allocates it to the COVIMOGR. The allocated memory must have a read/write controller that can operate independently of the other memory slices to enable use by the AE without frequent contention/arbitration.
3. The COVIMOGR uses the memory in the AE while the GNSS receiver is active.
4. The application that requested GNSS is terminated or becomes idle
5. The OS signals to the HAL to turn off the GNSS.
6. The HAL tells the COVIMOGR to turn off.
7. The slices (e.g., pages) of SRAM allocated to the COVIMOGR are returned to the system.

In this way, the total SRAM needed by the COVIMOGR can be reduced as the memory needed in the AE is shared rather than dedicated to the AE for the sole use by the AE. To further reduce memory in the AE, at least some of the memory in the AE or in the GNSS processing system can be shared with other processing systems on the SOC. Another option is when the GNSS code spectrums are stored in the SOC DRAM as a precomputed set of tables that are programmed into the DRAM when the system is updated. Alternatively, a program on the AP or even the COVIMOGR could compute the codes and/or code spectrums in the background, or even at the start of the GNSS session. As reference, the number of codes for L5 is 63, E5 is 50, and B2 is 63. Include 2 for QZSS and 2 for EGNOS. This is 180 PRNs. However, L5 has two code per PRN , E5 has 4 codes per PRN, B2 has 4 codes per PRN. Thus, the total number of codes is 586. Each code is 10230 bits. To store all codes requires 5,994,780 bits which is about 734kByte. In case the code spectrums are stored of the real codes, the storage depends on the sample rate used by the AE. Since each component is searched independently, the code is real for each component. The DFT of this code is a complex conjugate symmetric. This means the complex pairs that are reflected around the midpoint of DFT have the same real values but the minus if the imaginary values. The total values needed after reading the memory is 2N, however, N/2 are complex conjugate symmetric. So N unique values are needed the HW can construct all values from the N unique values. Assume further than the number of bits needed can be reduced with minimal loss. In a preferred embodiment, 8 bits, or 1 byte, is used to store the real part and 8 bits for the imaginary part.

For a sample rate of 20,480,000, which is just over two samples per chip at 10,230,000 chips per millisecond, the number of bytes to store all precomputed code spectrums is about 2 times the number of bits for the codes. Thus, 586 codes *20480 bytes/code = 11,632,640 bytes = 11.360Mbyte.

This amount can be reduced in a number of ways: the application can periodically assess which codes are currently active in healthy satellites in space. Then, a significant reduction of stored codes or code spectrums can be achieved. For example, there are more than 50 valid prns per satellite per system. However, at one time there are generally fewer than 30, and more likely only 24 allocated PRNs in space. This would allow a reduction by more than half of the memory.

In another scheme, the precomputed code spectrums are moved to a section of SRAM while the GNSS is active in this way:
1. The AP gets a request from an application to determine a GNSS location.
2. The HAL identifies a set portion of the SRAM for the storing the code spectrum and allocates it to the COVIMOGR. The allocated memory must have a read/write controller that can operate independently of the other memory slices to enable use by the AE without frequent contention/arbitration.
3. The HAL copies the codes into the SRAM allocated to code spectrums and give the COVIMOGR the base address of the precomputed code spectrums along with the system, PRN, and component for each code.
4. The COVIMOGR extracts the code spectrums from in the AE while the GNSS receiver is active and uses them in the step where the sample spectrum is multiplied by the complex conjugate of the code spectrum.
5. The application that requested GNSS is terminated
6. The OS signals to the HAL to turn off the GNSS.
7. The HAL tells the COVIMOGR to turn off.
8. The slices of SRAM allocated to the COVIMOGR are returned to the system.

In another embodiment, a background app that runs on the SOC AP is used to compute the active code spectrums based on the current PRNS in space.
1. A background app periodically computes the active PRNS for all systems and store them in the DRAM.
2. The AP gets a request from an application to determine a GNSS location.
3. The HAL identifies a set portion of the SRAM for the storing the code spectrum and allocates it to the COVIMOGR.

4. The HAL copies the codes into the SRAM allocated to code spectrums and give the COVIMOGR the base address of the precomputed code spectrums along with the system, PRN, and component for each code.
5. The COVIMOGR extracts the code spectrums from the SRAM in the AE while the GNSS receiver is active and uses them in the step where the sample spectrum is multiplied by the complex conjugate of the code spectrum.
6. The application that requested GNSS is terminated
7. The OS signals to the HAL to turn off the GNSS.
8. The HAL tells the COVIMOGR to turn off.
9. The slices of SRAM allocated to the COVIMOGR are returned to the system.

A method, in one embodiment, for further reducing the cost of the COVIMOGR is to compute as much of the GNSS functions on the AP. The CPU/RAM/ROM allocated to the COVIMOGR can be the minimum configuration to allow full control of the various HW engines/compoents: AE, TE, RE, DFE. These systems will require a reliable method to send control settings, request service, and read results. For example, the AE will have an interface to request searches for a specific PRN in a system. The results are available as fast as every one msec. However, systems are designed to buffer their results internally to allow a slower interrupt rate, such as once per block per 20 msec. The tracking engine will likely operate in a similar update rates: periodic writes and reads on the order of once per satellite per 20msec.

The job of the COVIMOGR, in this embodiment, is to service these interrupts, write the next updates, and then format the data and ship it to the allocated AP.
The process in one embodiment can be:

1. The AP gets a request from an application to determine a GNSS location.
2. The HAL identifies an AP for running the high level software for the COVIMOGR.
3. The GNSS application code for the COVIMOGR is copied from DRAM into an execution memory block, likely in the SRAM.
4. The HAL identifies other SRAM slices for the AE
5. The HAL identifies the code spectrums and copies them to SRAM slices for the AE
6. The app enables the COVIMOGR and indicates memory information for the AE.
7. The app tells the COVIMOGR CPU which satellites to search for.
8. The COVIMOGR controls the AE to begin searching.
9. The COVIMOGR CPU services the AE search results.
10. Signals found start tracking the TE.
11. Found signals in the TE that are lost are re-acquire in either the TE or the RE depending on the time since last tracking. Confident data lost recently is re-searched in the RE.
12. The COVIMOGR detect confident tracking and sums up code and frequency information over a configurable measurement interval such as one second to enable accurate measurements that are sent to the COVIMOGR SW running on the AP.

13. THE COVIMOGR strips data bits for tracking data, buffer the data in a configurable buffer size such as 50 to 100 bits and then sends the data to the COVIMOGR SW running on the AP.
14. Accurate time is learned from the decoded symbols that are turned into time stamps and ephemeris data.
15. The position/velocity clock offset and drift are determined on by the COVIMOGR SW on the AP.
16. The search data is refined, updating the observable PRNs and their expected codephase and frequency. The data is sent to the CPU on the COVIMGR.
17. The SW on the COVIMOGR removes satellites from the AE and transitions to searches in the TE for a lower power maintenance mode.
18. If the COVIMOGR loses satellites due to a signal blocking condition, a re-acquisition or initial acquisition is repeated to find the satellites as soon as any blocking condition is removed.
19. The application that requested GNSS is terminated
20. The OS signals to the HAL to turn off the GNSS.
21. The HAL tells the COVIMOGR to turn off.
22. The slices of SRAM allocated to the COVIMOGR are returned to the system.

It should be noted that, in another embodiment for power and SRAM savings, the COVIMOGR may also release a fraction of the SOC SRAM back to the SOC in cases where it is not required for on-going operation after initial acquisition and clock setting. In such a case, if the signal is lost and the clock setting degrades by on the order of 100 microseconds, the COVIMOGR may request the SRAM block needed for reacquisition, up to the full amount for initial acquisition.

Carrier and Code generation options:

Sensitivity for a COVIMOGR in one embodiment can be improved by using the following elements 1. Combining all components of the modernized signals in a way to achieve the best SNR.
    a. Sidebands A and sidebands B should be processed from separate channels rather than combined. It is tempting to try to combine the sidebands together to minimize the number of FFTs of the input samples. However, consider a PRN on one sideband with a received SNR. If it is combined with another sideband, the SNR will be reduced by nearly 3dB, thereby negating the benefit of using all the components.
    b. The data and pilot channels for a particular sideband can be correlated from the same channel in two distinct ways: separately or coherently. Correlating separately means multiplying a real-valued, i.e, not complex, code by both the in-phase and quadrature signal input components and both pilot and data codes are searched this way in parallel. Corelating coherently means multiplying a complex code with the data channel code in the real part and the pilot channel code in the imaginary part. However, due to the unknown relative phase of the pilot and data channels, a second hypothesis must be tested when the two codes are in a different phase. This can be done by changing the sign of one of the components. There are actually four possibilities, but if the one frame correlation result is squared, then there are only two. In practice, either the strongest power (or amplitude) is chosen at each code hypothesis, or both are summed together. For stronger signals, there is some benefit to the coherent method, but it requires that both hypotheses are computed at the same time and compared before integration into hypothesis memory. With weaker signals, the advantage is less, as it difficult to pick the correct hypothesis and this process raises the noise by choosing the larger estimate.
   c. The coherent method is more costly when the codes are precomputed as the coherent codes are not complex symmetric as the real codes and thus, require double the storage.
   d. A preferred embodiment is to mix the data and pilot code as real codes for both the sidebands and combine after squaring one frame.
   e.
2. Using coherent integration up to the frame length of the main code sequence and then integrating the power (or amplitude) non-coherently over multiple frames so that the SNR grows nearly linearly at each code hypothesis.

a. This process can use precise handling of the code slew due to carrier frequency alignment, which we will call code Doppler herein. During propagation from the satellite to the receiver, the code doppler for each sideband is different according the relationship between the carrier frequency and the chipping rate. For the lower sideband A at 1176.45Mhz, there are 116 cycles per chip. For the upper sideband at 1207.14Mhz, there are 118 cycles per chip. The preferred embodiment is to shift each sideband to the common center frequency of 1191.795MHz. A sideband A channel is found by shifting the baseband signal with a center corresponding to this original center frequency by the BOC frequency of 15*1.023MHz = 14.345Mhz, applying a low filter, and then decimating to a bandwidth around 20.48Mhz which contains the main lobe of sideband A. A sideband B channel is found with a similar process except by shifting down by 15.345Mhz.
   b. By shifting sidebands to a common frequency, the respective codes slew at a rate of 116.5 carrier cycles per chip relative to each other.
   c. The effect of the code Doppler during transmission and during integration are handled separately. The transmission part is approximated with an estimate of the transmission time, roughly 75 msec on average (as determined by computing the true transmission time from the satellite the known receiver position after fixing) times the code Doppler which the carrier doppler divided by the minus of the carrier cycles per chip. There will be a difference in arrival code phase of both channels according to the different cycles per chip. The effect is small however, and can be neglected when searching in large steps such as ½ chips. The worst case difference is about 0.08 chips for a satellite motion based Doppler of 5kHz and a transmission time of 80msec. In many cases, a reasonably accurate range estimate for each SV can be pre-calculated based upon an approximate receiver time and position, making this aspect of the compensation more accurate.

d. The effect of the code doppler during integration can be precisely calculated as Doppler estimate times the integration time with both sidebands using the 116.5 carrier cycles per chip.

e. There are several ways to do this compensation:
  i. The code samples prior to the DFT can be shifted in time so that the integrated amplitude corresponds to the code hypothesis at the start of the integration period. The shift is computed as dt * carrierDoppler / 116.5. The shift is broken into integer and fractional chips. This shift become the initial phase of the code generator that produces the code estimates at the sample times for one millisecond of the input samples. Call this method the shifted code samples method. This method is only possible when the code spectrums are computed each millisecond.
  ii. The code samples are generated with a zero initial phase and then the code spectrum is modified by multiplying the spectrum with a frequency dependent complex sequence. This method uses the property that the FFT of the time shifted sequence is equal to the FFT of unshifted sequence times a frequency dependent complex exponential with and argument of $e^{(jwT)}$, where w is the radian frequency at each element of the FFT and T is the time shift fixed amount. This is called the modified zero phase spectrum method. This method works fine for both precomputed and on-the-fly computed code spectrums that are based on zero initial phase code sequences.
  iii. The code Doppler shift can be compensated post correlation. The destination hypothesis of the correlation produced with a zero-initial phase code spectrum is shifted to compensate. A coarse and fine method are available.
    1. In the coarse method, the code Doppler shift in chips is converted to code hypothesis by multiplying by the input sample in one millisecond divided by the chips in one millisecond. For example, a code shift of 1.5 chips, with a samples per second of 20480, is converted to a hypothesis shift of 1.5*20480/1020 = 3.0 cells. Thus, the current correlation result at zero phase is added to the $3^{rd}$ code hypothesis when the carrier Doppler is negative, or to the final hypothesis minus 3 cells when the Doppler is positive.
2. In a fine method, the same method as above is used to identify the integer code hypothesis offset. Then the fraction shift is used to scale the two adjacent results of the zero initial phase correlation. For example, if the fraction phase is 0.5 chips, then the correlation value added to the hypothesis memory at hypothesis zero is the half the value of the zero initial phase correlation at cell 3 and cell 4. The other updates would be equally shifted.
f. As a method to minimize hypothesis memory, all components are integrated into a single memory. The offset between sidebands during transmission can be compensated with a simple shift like the code Doppler applied to correlation results prior to being added to the hypothesis memory.
g. The code doppler effect during integration is common for each sideband because both sidebands are shifted to the common center frequency.

3. Applying the carrier Doppler with minimal frequency offset. The context here is that the correlation will be performed with frequency domain methods using the three DFT steps the to produce correlation = IFFT [ FFTsamples * FFTcode' ] where FFTsamples is the DFT of the input samples, FFTcode' is the complex conjugate of the DFT of the code samples, and IFFT is the inverse DFT of the product of the two FFTs. The IFFT is actually an FFT with a post divide by the number of samples in the IFFT. FFT means fast Fourier transform as an efficient method to implement the discrete Fourier transform (DFT). The VFFDC method performs the combination of the 3 FFTs plus the multiply and complex conjugation in a manner that exploits the symmetries of the FFT and IFFT process. The VFFDC can also account for the impact of the sideband process on the respective carrier frequencies, which we will call the carrier Doppler, by treating it either on the signal input samples or the code samples. The selection impacts the total number of DFT operations.

a. The range of the received frequency offset from nominal for each satellite, due to satellite motion relative to the receiver is about +/-5Khz plus the frequency offset of the oscillator. If a frequency offset versus temperature curve is known for the oscillator, most of its effect can be removed with a frequency shift applied to the input samples prior to correlation. However, even though in general the remaining satellite motion dependent frequency offset can be precomputed, there is not a common value across all satellites and a specific range of values must be searched for each satellite, depending upon receiver time and position uncertainty.
b. This satellite-specific Doppler can be handled in basically one of two ways
i. The Doppler is removed from the input samples with a frequency difference operation so that the resulting samples have a zero frequency offset. These modified samples are then correlated with code samples that also have zero frequency offset. This method is called the downshifted input samples method (DISM). It uses the trigonometric functions that perform a down frequency shift of the complex sequences A by the frequency source B: sin(a-b) = sinA cosB - cosA sinB, and cos(a-b) = cosA cosB + sinA sinB where A represents the frequency of input samples and B represents the carrier frequency to be removed. The sin and cos represent the imaginary and real parts respectively.

a. This method requires a unique set of input sample for each frequency to be searched. This increase the number of FFTs by the number of unique frequencies. When using components from both sidebands, the DFT of both sideband input samples must be formed, which also double the number of FFTs. Some optimization can be made here.

i. The DFT of both sidebands is performed at a set of discrete frequencies with a step size that is commensurate with the integration time. A longer integration time requires smaller steps whereas a shorter time can use larger steps. For a long integration time, the step size is set where the code doppler error for the maximum frequency error between two steps equals one half sample clock. For example, if the integration time is 100msec to get the desired SNR for a weak signal improvement of 10dB, the frequency error to get one sample clock of 20480000 is ½ = df / 116.5 * 0.1 * 20480 / 10230. Df = 0.5*116.5 / 0.1 * 10230/20480 = 291Hz. Thus, the search step can be twice this amount as the maximum error between a step of 582Hz is 291Hz. For a short integration time, the step size is chosen to minimize the loss associated with the sinX/X error for maximum frequency error between two steps. For a 1msec integration, the sinX/X is at 0.63 at X=500Hz for a loss of 4dB and 0.9 at X=250Hz for a loss of 0.9dB.

ii. To reduce the number of sample FFTs, a set of carrier downshifted input samples are produced with a frequency step related to the integration time.

1. For an integration time of say 10msec for a fast search of strong satellites, the sinX/X sets the step size. In this case, two frequencies at 0 and 500Hz are chosen to limit the frequency error at 250Hz. There are then 4 sample FFTS: 2 for A and 2 for B. If a channel desired a doppler of 2200Hz for example, the FFT of 0 Hz is chosen and the resulting FFT is shifted by 2 bins to produce a frequency shift of 2kHz. The frequency error is limited to 200Hz which has a loss of less that 0.9dB. for a 1msec integration has a loss of : 0H, 200Hz, 400Hz, 600Hz and 800Hz.
2. For an integration time of say 250msec that can gain 11.5dB, the df for ½ sample clock maximum code doppler error is 116Hz. Thus, a steps size is rounded to nearly twice this at 250Hz. The downshifted input sample method is used to produce input samples that remove 0, 250Hz, 500Hz and 750Hz. In this case, there are now 8 Sample FFTs, 4 for A and for B. For a channel that desires a 2200Hz carrier frequency, the 250Hz FFT is chosen and shifted by 2 bins to produce a carrier wipe off of 2250Hz.

ii. The Doppler is added to the code samples with a frequency addition operation so that the resulting code samples have the same frequency as the expected satellite Doppler frequency. This method is called the upshifted code samples method (UCSM). It uses the trigonometric functions that perform an up frequency shift the complex sequences A by the frequency generator B: $\sin(a+b) = \sin A \cos B + \cos A \sin B$, $\cos(a+b) = \cos A \cos B - \sin A \sin B$ where A represents the frequency of code samples and B represents the carrier frequency to be added. The sin and cos represent the imaginary and real parts respectively. Note that the code samples can either start with zero phase in case the code Doppler is handled by shifting the resulting code spectrum, or with a non-zero initial phase in case the code Doppler is handled in the time domain.

Summarizing the possibilities for performing frequency domain correlation with 22 channels where each channel can process 4 components: 2 for sideband A and 2 for sideband B:

Option 1: apply carrier Doppler to input samples with the downshift method and code Doppler to code samples: Correlation = IFFT [ FFT (samples * Doppler) * FFT (code samples with non-zero phase)' ].

When using all components this has per channel
- 2 sample FFTs, for A and B
- 4 code FFTs, one for each code
- 4 IFFTs, one for each code
- Total = 10 per frequency
- For all channels: 22 * 10 = 220 FFTs per msec
-

Option 2: apply carrier Doppler with the upshift method and code Doppler to code samples with non-zero initial condition: Correlation = IFFT [ FFT (samples) * FFT (code samples with non-zero phase upshifted by carrier Doppler)' ]. Now the sample FFT is common to all channels. So put this in a separate pool. When using all components this has per channel
- 4 code FFTs, one for each code
- 4 IFFTs, one for each code
- Total = 8 per frequency
- For all channels: 22 * 8 + 2 sample FFTs for A and B = 178 FFTs per msec Option 3: apply carrier Doppler to input samples for a default set of carrier dopplers with the downshift method and use precomputed code spectrums with and apply the frequency domain code Doppler method. Correlation = IFFT [ FFT (samples * Doppler) * FFT (code samples with zero phase)*e^(jwT) ]. Assume longest integration time requires Doppler step of 200Hz. So there are 10 sample FFTs, for A and B with 0,200,400,600,800Hz steps. When using all components this has per channel
- Read 4 precomputed code spectrums, one for each code
- 4 IFFTs, one for each code
- Total = 4 per frequency
- For all channels: 22 * 4 + 10 = 98 FFTs per msec The difficulty with option 3 is that correlation engine should have very fast access to the pre-computed code spectrums. It must read 22*4*20480 bytes per msec = 1.76MByte per millisecond. This is the motivation for using option 2 where the computation of the code spectrum power is traded off with the system complexity to retrieve the precomputed code spectrums at nearly 2GBytes/second.

Real-time Code Spectrum Generator (preferred embodiment, option 2)
  3. Real-time Code Spectrum Generator a. The VFFT is performed in real-time on each code sequence during the previous processing period before each acquisition correlator channel (note, VFFT on the code sequence may be performed in ~40 us with 108 MHz clock)
b. The code generator produces 10 code chips per cycle based on 14-bit code seed for the GNSS satellite of interest.
   i. There are 10-pairs of polynomials for the code generator.
   ii. The code generator polynomials are programmable to allow for changes in future GNSS signals.
c. The poly-phase pulse-shape filter is applied to the code sequence to allow an adjustable time shift with resolution in small fractions of a chip period.
   i. Higher pulse-shape accuracy is possible with simple implementation due to the bipolar (+|- 1) modulated code sequence. In addition, the bipolar modulated code sequence is noise-less, the pulse shaping filter coefficients can be higher accuracy and have more terms, and the coefficients can be programmable to allow for any changes to the impulse response in Digital Front-End.
   ii. Higher interpolation precision is possible with simple implementation. The up-sampling rate ($N_u$) can be higher for finer precision on the effective time shift. For example, with $N_u$=8 there is 1/8 chip resolution with 2 samples/chip; this is accomplished with a 4-phase filter. Higher values of $N_u$ are easy to implement.
   iii. Time shifts of an integer number of chips is performed in this pulse-shaper hardware
   iv. The time advance per millisecond is calculated and applied in hardware based on Doppler time shift hypothesis for the channel.
   v. An alternate approach is to apply the time shift in the frequency domain at the VFFT output with a phase shift on the frequency bins before storage into code spectrum memory. This approach can require an additional 20-point complex phase shifter in hardware as an extra processing pipeline stage after the VFFTs 20-point phase shifter and 20-point DFT; thus, a total of 3 processing pipelined operations in the last stage firmware loop.
   vi. Since the code spectrums for the upper and lower sidebands of BOC (15,10) signal are separately and independently generated in real-time, it is possible to apply a different time shift to each code spectrum for every millisecond over the dwell duration (dwell duration is the integration time). This design capability allows correction for different time shifts on the upper and lower sideband due to unequal Doppler time shifts, ionosphere dispersion and antenna phase instability. These time shift differences can be more aligned in the code spectrum generation, which then allow constructive combination during the coherent addition of the upper and lower sidebands in the correlation post processing.
d. The frequency shift is applied to the shaped code sequence before the VFFT
   i. The frequency shifter provides a wider frequency range and any frequency step without the need to rotate and interpolate frequency bin values post FFT. This provides maximum flexibility for the satellite search strategy
ii. The input from pulse-shape filter is noiseless and relatively low precision; thus, an ideal location for a frequency shifter.
iii. The frequency shifter has Cordic based phase rotators for 20 samples/cycle in parallel and a common phase accumulator; a different phase offset is applied to each of the 20 phase rotators
iv. It should be possible to combine the phase shift values for the frequency shifter with the phase shift values for the first stage of the VFFT-DIT. This will allow one Cordic phase shifter to do sum of phase shifts.
v. The phase advance per millisecond is calculated and applied in hardware to maintain phase continuity over several millisecond dwell duration.

e. An 20480-point VFFT-DIT is performed on the time and frequency shifted code sequence
i. Performed by the same processor as the baseband sample VFFT.
ii. The N=20480 resulting frequency bins for the code and baseband spectrums may be band symmetrically truncated to a smaller amount for the ultimate "brick wall" filter of the code spectrum (1 kHz transition band with no alias distortion).
1. We can offer a programmable option of say 20k, 18k, 16K, 14k, resulting in different options for samples/chip, correlation pulse width and hypothesis memory word size.
iii. Digital Front-end and baseband sample memory can be designed for 20,480 kHz sample rate and full main load processing, leading to simple and more accurate processing of GNSS signals. No need for brick wall non-linear filter.
iv. Only 25% more VFFT variable memory required, which is small portion of total Core area.

Figure 14L:
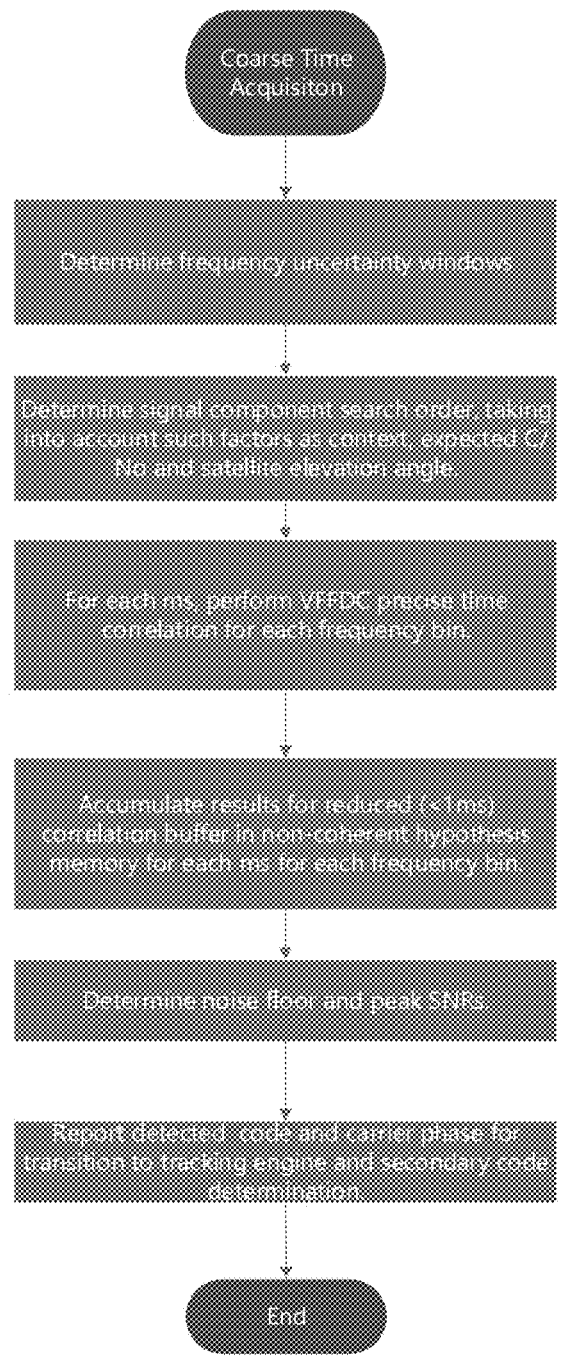
FIG. 14L is a flowchart that shows a method that can be used, during coarse time acquisition mode, in a frequency domain correlator, particularly a correlator that uses an array processor.

The coarse time acquisition mode shown in figure 14L is intended for cases where the code phase uncertainty of each SV to be acquired is > +/= 0.5ms. The final reporting step may report code phase and Doppler rather than code and carrier phase.

CORDIC (COordinate Rotation DIgital Computer) Algorithm

Figure 9D shows where the Cordic Phase Rotation would occur in the code spectrum generation process, in order to align the code spectrum with successive 1ms sample buffers over time.

Secondary Code Phase Determination

Once the primary sub-millisecond code phase is known, the acquisition process can gain more sensitivity by determining secondary code phase and shifting to coherent integration.

However, this can be done in the tracking loops, which is beyond the scope of this disclosure, using techniques that are generally well-known in the art. However, it should be noted that in this case, the secondary code phase boundaries for all SVs tracked are fed back into the acquisition engine to aid in the acquisition of subsequent satellites in precise time mode.

PAUL MCBURNEY 8

Organization of Coherent Integration Hypothesis Memory for Precise Time Acquisition Mode:

The table below shows the lengths of known secondary codes on all signal components for GPS, Beidou and Galileo at L5. In general, sensitivity can be improved by 3dB per doubling with coherent integration and 1.5dB per doubling for non-coherent integration. So the table below shows the theoretical gain associated with coherently integrating synchronous with the secondary code of each respective signal component, relative to integrating non-synchronously.

| Constellation | Signal | Secondary Code Length | Theoretical Coherent Gain Over Primary Code Epoch ($5\log10(length)$) |
|---|---|---|---|
| Galileo | E5Ai | 20 | 6.5dB |
| Galileo | E5Aq | 100 | 10dB |
| Galileo | E5Bi | 4 | 3dB |
| Galileo | E5Bq | 100 | 10dB |
| GPS | I5 | 10 | 5dB |
| GPS | Q5 | 20 | 6.5dB |
| Beidou | B2a data | 5 | 3.5dB |
| Beidou | B2a pilot | 100 | 10dB |

Once the receiver clock is effectively synchronized to the 100ms Galileo E5 and Beidou B2a secondary pilot codes, coherent integration can be extended to up to 100ms on those signal components in cases where the oscillator's phase stability allows it. (This is not to say that absolute GNSS time is known, but rather that the sub-100ms secondary code phase is known.) Although it is possible to predict and estimate the navigation data of each channel, in this embodiment, we assume that such predictions are not available. These theoretical gains are therefore something to approach in a COVIMOGR in precise time acquisition mode. It should also be appreciated that oscillator phase stability will impact the theoretical coherent integration gains. In practice, 40-80ms coherent integration is often used for L1 C/A receivers when the navigation message is modeled and predicted in advance, for example, because further coherent integration would largely narrow the effective Doppler bins, with diminishing returns due to oscillator phase instability. Similar concerns apply here to direct acquisition of wideband GNSS signals.

In one alternative embodiment, in cases where the expected primary ms code phase of a signal being searched for is well-bounded, but the secondary code phases are unknown, multiple coherent integration buffers are created, one for each millisecond ambiguity of the respective signal component's secondary code. Note that the average over the three constellations, including 100 ms secondary code pilot channels, would be about 45 1ms time-ambiguous bins if the secondary code phase is unknown. So this may not be practical for the Galileo and Beidou 100 ms secondary codes, but perhaps for the cases where code phase uncertainty is bounded to approximately 10 microseconds, such integration may be viable. Regardless, only that fraction of the full PN roll associated with each SV's narrowed code phase window is stored in hypothesis memory. In this case, I and Q must be stored, and A and B sidebands may be either combined or integrated separately for later optimal gain combining. Note that all 100 1-ms ambiguities must generally be considered in order to reliably coherently integrate the Galileo and Beidou pilot channels. GPS pilot channels, while not having as high of potential coherent gain, would also have $1/5^{th}$ of the hypothesis memory usage compared to Beidou and Galileo pilot channels because of their shorter secondary codes.

It may not be commercially viable to coherently integrate the full 1ms PN roll for all SVs during coarse time acquisition, given their level of time and Doppler uncertainty. However, once a first SV is found, given that the initial position uncertainty is already relatively low, that first SV signal can be used to help estimate the code phase of successive signals, bounding the timing error to twice the two-sided position certainty, and often less. The typical average code uncertainty associated with position uncertainty would simply be the two-sided position uncertainty.

In one embodiment (shown in Figure 11 of the main disclosure), the secondary code phase is estimated in the time-domain tracking engine and fed back into the acquisition engine for precise time coherent integration in the acquisition engine for those signals which have not yet been acquired.

If, for example, the receiver's initial position uncertainty is 1500 meters, the associated time uncertainty would average approximately 3000 meters/speed of light= 10 microseconds or less which is <=1% of the full 1MS PN roll. Given that the average total time ambiguity is approximately 45ms, it can be seen that CIM can be kept in balance with NIM, perhaps larger in cases of high-dynamic Doppler uncertainty, and certainly smaller in the static case.

The actual 2-sided SV-specific time uncertainty window size can be set with a simple equation once a reference signal is known. $\sigma_n = 2\sigma_p * \vec{u}_n.\vec{u}_r$, where $\sigma_p$ is the one-sided initial position uncertainty and $\vec{u}_n$ and $\vec{u}_r$ are the respective unit pointing vectors from the estimated position to the nth SV and the reference SV, respectively. Likewise, the expected ms code phase (at the center of the window) for the ith SV would be $\varphi_{ei=}\varphi_r + 1000 * mod(R_i - R_r, C/1000)/C$, where $\varphi_r$ is the known fractional phase (from 0 to 1) of the reference channel primary code, R is the calculated range between an initial position and the satellite and C is the speed of light. The modulus in this case would be signed, +/-0.5ms. Similarly, when a secondary code phase is known, the appropriate secondary code fractional phase for each signal component with less than or equal to the length of the greatest known secondary code can be determined. In most cases, the 100ms code phase will be readily determined, so we will show that equation here:

$\varphi'_{ei} = \varphi'_r + 10 * mod(R_i - R_r, C/10)/C$, where $\varphi'$ is secondary code phase.

Note that in cases where a longer coherent integration is simultaneously applied to the pilot and to the data channels, with their shorter secondary codes, each would have different Doppler bin widths and expected sensitivity. In such cases, in a pragmatic approach to E5 coherent integration for acquisition, our preferred embodiment simply uses the E5 AQ and BQ pilot signals and forgoes the AI and AQ while in precise time acquisition mode. This approach keeps the fade resistance of tracking both A and B side-bands while sacrificing relatively little sensitivity from the data channels, given that their coherent integration is limited to the length of their relatively short secondary codes. Some gain could still be accrued by using the data channels, particularly if their navigation messages are well-predicted and wiped, but for the sake of simplicity, tracking pilot channels while in this mode is our preferred embodiment.

In another embodiment, all four of the codes may be integrated coherently up to the length of their respective secondary codes. In such cases, their respective VFFDC outputs would be weighted appropriately and summed with a greater weight given to the pilot channel. It should be noted that in this case the effective Doppler bin width of data and pilot components will be up to a factor of 25 different in size. The wider Doppler bin sizes of the data channels may simply be mapped on to the more plentiful Doppler bins of the pilot channels when summing into each of the coherent integration memory bins associated with the pilot channels.

In another embodiment, navigation message data predictions for the data channels may be used to remove their respective bit transitions and therefore extend the coherent integration of the data channels to match that of the pilot channels.

Figure 14M:
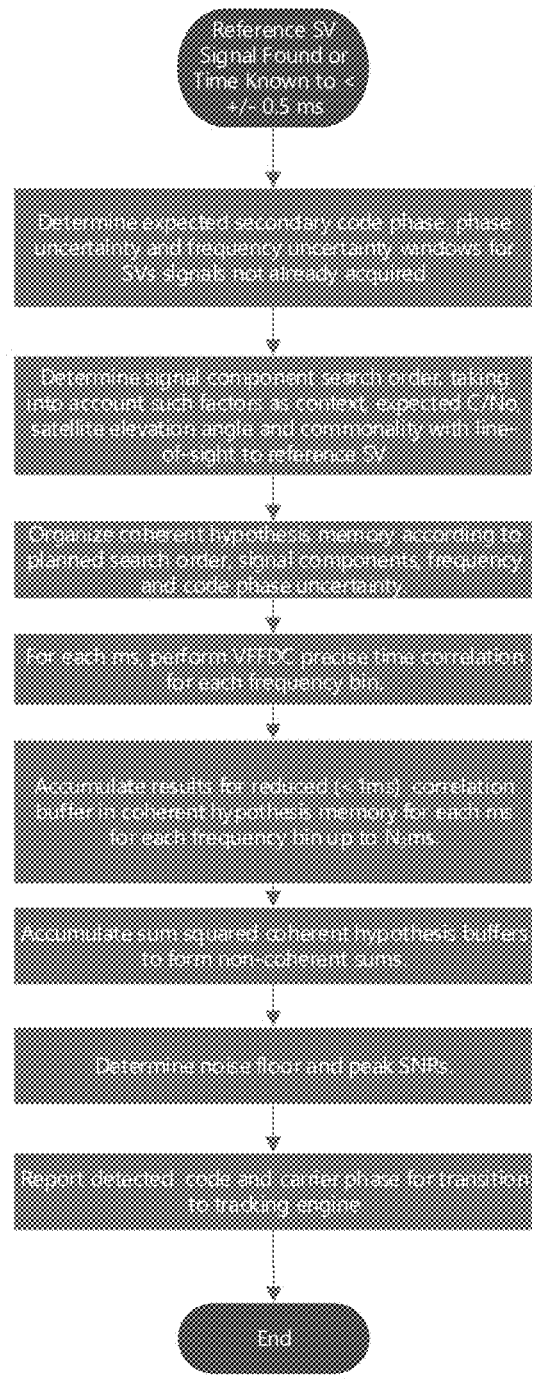
FIG. 14M is a flowchart that shows a method that can be used, during precise time acquisition mode, in a frequency domain correlator, particularly a correlator that uses an array processor.
Figure 14N:
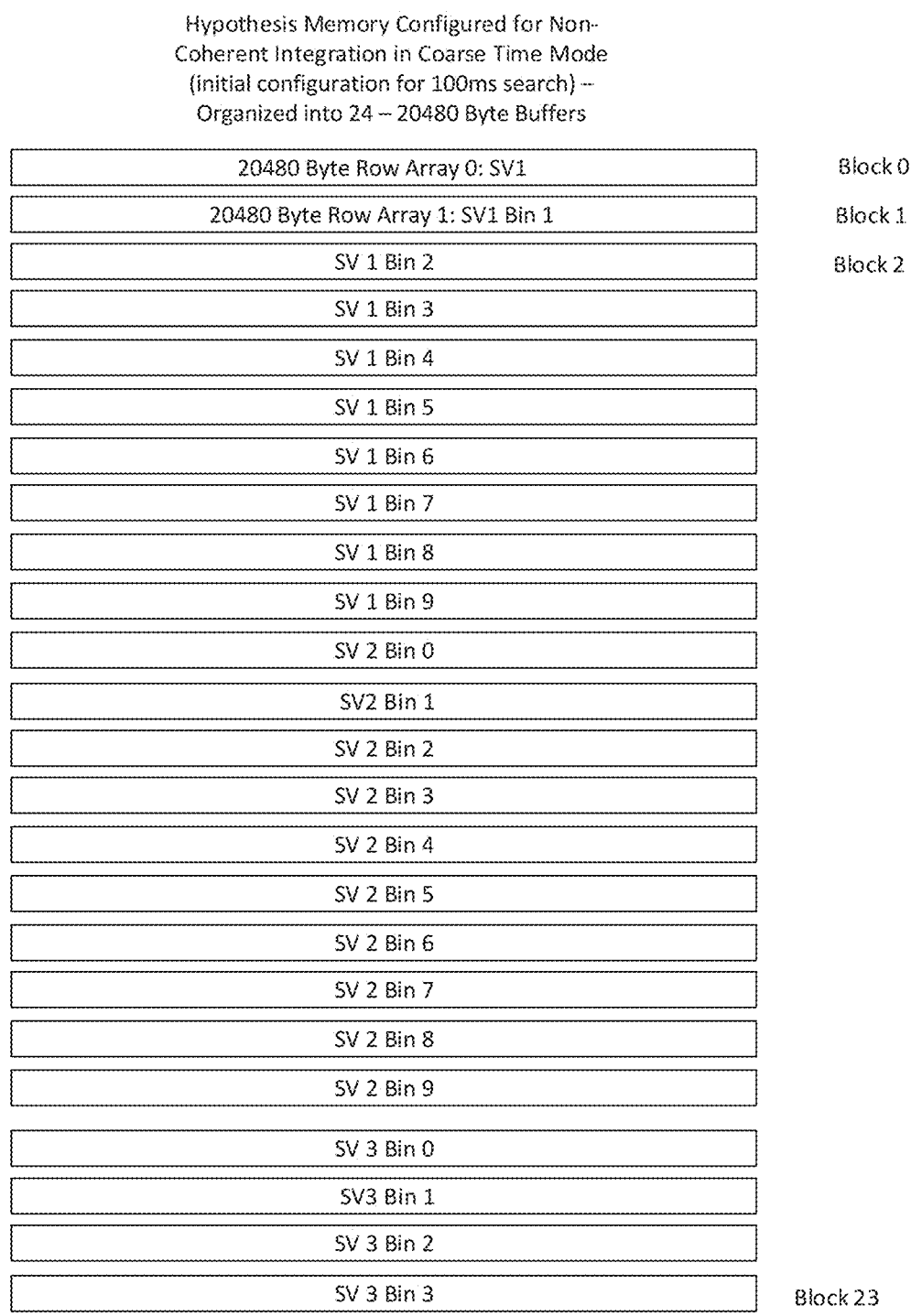
FIG. 14N shows an example of an arrangement of hypothesis memory for use in non-coherent integration in coarse time mode during code phase acquisition of GNSS signals.

Figure 14M: Precise time coherent and non-coherent integration processing.

Note that the reporting block may report code phase and Doppler rather than code and carrier phase, for transition to the tracking engine.

Hypothesis Memory

Figure 14N depicts an example embodiment of shared general-purpose non-coherent hypothesis (integration/accumulation) memory, organized in ~20KB size buffers. The non-coherent buffers each contain a single mixer result, the coherent memory map (on the same reusable buffers) contains a mix of in-phase and quadrature, multiple Doppler bins and multiple SVs per bin, according to the code phase uncertainty window of each SV of interest. The non-coherent hypothesis memory (and the coherent hypothesis memory) can be organized at run time using the method shown in Figure 14P.

Figure 14O:
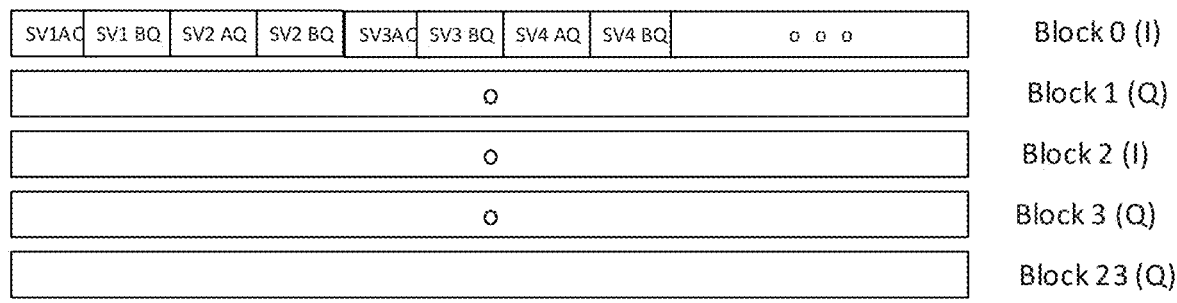
FIG. 14O shows an example of an example of an arrangement of hypothesis memory for use in coherent integration in precise time mode (when time is known within, for example, 0.5 ms) during code phase acquisition of GNSS signals.
Figure 14P:
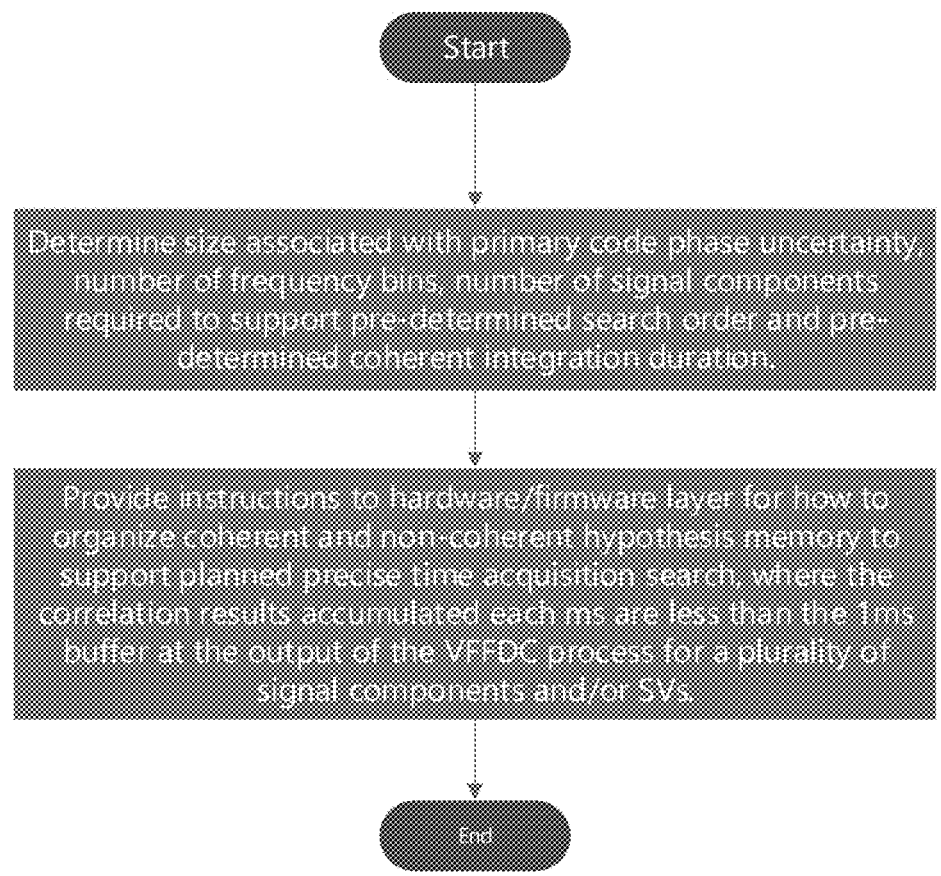
FIG. 14P is a flowchart that shows a method according to one embodiment to configure hypothesis memory.

Figure 14O depicts an example embodiment of the shared hypothesis memory in precise time coherent integration mode for a first integration period. Note that in this case, complex data must be stored, but with the narrowed code phase uncertainty, only a fraction of the full PN roll must be kept for each Doppler bin. In this embodiment, the two pilot signal components are kept in separate buffers. In another embodiment, they may be consolidated. In a further embodiment, the data channel's shorter coherent integration times may be integrated with appropriate weighting into their respective pilot counterparts (AI into AQ and BI into BQ) or the data may be wiped before coherent integration across secondary code boundaries using predicted navigation message data. Such an approach would require extra buffers for the I components, such that they could be added to the Q components at the end of their respective secondary code epochs. This would not have a significant impact on memory usage in the hybrid approach, given that there would be multiple pilot Doppler bins for every data Doppler bin, and the data and pilot components could be combined in the case of predicted and wiped navigation message data.

Summarizing, sensitivity can be improved in acquisition by one or more of (in one or more embodiments):

1. Direct broadband signal acquisition.
2. Keeping sidebands separate to avoid raising the noise level from the original level of each sideband.
3. Mixing all components to gain the maximum fade-resistant SNR while in coarse time acquisition.
4. Determining at least one pilot channel secondary code phase in the tracking engine and feeding that back into the acquisition engine at transition into precise time acquisition mode.
5. Mixing all frequency-diverse pilot channels to gain the maximum fade-resistant SNR while in fine time acquisition mode.
6. Integrating the correlation result into a single hypothesis memory where the results at each ms are compensated for code doppler
7. Handling the code Doppler with one of the three methods described above so the strongest signal power grows at only hypothesis memory location as opposed to being smeared across multiple locations if the code Doppler is not properly accounted for.
8. FFT-based 20,360 chip code correlation.
9. Coherent integration at least partially aligned with expected primary code phase in precise time acquisition mode.

To keep cost (memory, power, silicon area, RF chains) reasonable one or more embodiments can use:

1. Direct broadband signal acquisition of L5 wideband signals only.
2. VFFDC architecture enables working memory reuse and minimal signal input buffer size.
3. On-the-fly code spectrum generation minimizes code spectrum storage and I/O.

Consolidated and carefully managed non-coherent and coherent hypothesis memory buffers reduce memory usage, as well.

Matlab Appendix

This Matlab appendix contains content that is protected by copyrights. The owner, oneNav, hereby reserves its rights, including copyrights, in this content. The copyright owner has no objection to the facsimile reproduction by anyone of the patent document or patent disclosure as it appears in the U.S. Patent and Trademark Office files or records, but the owner otherwise reserves all copyrights whatsoever. Copyright oneNav.

Part 1
The following Matlab code provides an example, in Matlab, of the implementation of a GNSS code generator that uses the embodiment shown in figures 9A -9D.

```
function [code_array] = gnss_code_gen(code_bits_per_row,
code_gen_poly_set, code_gen_seed)
% Generates an array of code bits for all wideband GNSS signals
%
% Component       State Var Length   Shorten Code      Gen Poly Exponents
% L5I|Q           13                 x1=>8190          [9,10,12,13]
%                                    x2=>full          [1,3,4,6,7,8,12,13]
% E5AI|Q          14                 x1=>full          [1,6,8,14]
%                                    x2=>full          [4,5,7,8,12,14]
% E5BI|Q          14                 x1=>full          [4,11,13,14]
%                                    x2=>full          [2,5,8,9,12,14]
% B2AI (data)     13                 x1=>8190          [1,5,11,13]
%                                    x2=>full          [3,5,9,11,12,13]
% B2AQ (pilot)    13                 x1=>8190          [3,6,7,13]
%                                    x2=>full          [1,5,7,8,12,13]

% Code generator seed must be length 14, even for L5 & B2 with poly order 13.
% Append an extra zero bit if needed, and transpose into a column vector.
if (length(code_gen_seed) == 13),    code_gen_seed = [code_gen_seed 0]';
elseif (length(code_gen_seed) == 14), code_gen_seed = code_gen_seed';
end % Code generation polynomials in vector format
g1_L5IQ  = [0 0 0 0 0 0 0 1 1 0 1 1];         % [9,10,12,13]
g2_L5IQ  = [1 0 1 1 0 1 1 1 0 0 0 1 1];       % [1,3,4,6,7,8,12,13]
g1_E5AIQ = [1 0 0 0 0 1 0 1 0 0 0 0 0 1];     % [1,6,8,14]
g2_E5AIQ = [0 0 0 1 1 0 1 1 0 0 0 1 0 1];     % [4,5,7,8,12,14]
g1_E5BIQ = [0 0 0 1 0 0 0 0 0 0 1 0 1 1];     % [4,11,13,14]
g2_E5BIQ = [0 1 0 0 1 0 0 1 1 0 0 1 0 1];     % [2,5,8,9,12,14]
g1_B2AI  = [1 0 0 0 1 0 0 0 0 0 1 0 1];       % [1,5,11,13]
g2_B2AI  = [0 0 1 0 1 0 0 0 1 0 1 1 1];       % [3,5,9,11,12,13]
g1_B2AQ  = [0 0 1 0 0 1 1 0 0 0 0 0 1];       % [3,6,7,13]
g2_B2AQ  = [1 0 0 0 0 1 0 1 1 0 0 0 1 1];     % [1,5,7,8,12,13]
```

```
% Add B2B and Glonass when available. Offer 3 programmable options
for future % Select the configuration parameters for the code generator
switch (code_gen_poly_set)
  case 'L5IQ'
    g1_poly = g1_L5IQ;
    g2_poly = g2_L5IQ;
    poly_order = 13;
    x1_code_length = 8190;
  case 'E5AIQ'
    g1_poly = g1_E5AIQ;
    g2_poly = g2_E5AIQ;
    poly_order = 14;
    x1_code_length = 10230;
  case 'E5BIQ'
    g1_poly = g1_E5BIQ;
    g2_poly = g2_E5BIQ;
    poly_order = 14;
    x1_code_length = 10230;
  case 'B2AI'
    g1_poly = g1_B2AI;
    g2_poly = g2_B2AI;
    poly_order = 13;
    x1_code_length = 8190;
  case 'B2AQ'
    g1_poly = g1_B2AQ;
    g2_poly = g2_B2AQ;
    poly_order = 13;
    x1_code_length = 8190;
  otherwise
    disp('Unsupported Code Generator Mode')
end % switch % Form the generator polynomial vector into a 14 by 14 state
transition matrix with an identity sub-matrix
% The identity matrix behaves like a shift register.
if (poly_order == 14)
  G1 = [g1_poly ; eye(13,14)];
  G2 = [g2_poly ; eye(13,14)];
elseif (poly_order == 13)   %  Append 1 zero row and column to fill
14x14 array
  G1 = [g1_poly ; eye(12,13) ; zeros(1,13)];
  G2 = [g2_poly ; eye(12,13) ; zeros(1,13)];
  G1 = [G1 zeros(14,1)];
  G2 = [G2 zeros(14,1)];
end % if % Set the iteration where the G1*X1 code generator state must be re-
initialized to all ones.
x1_state_init_k = x1_code_length/code_bits_per_row;
```

```
% Initialize the X1 and X2 state variable vectors and the output array
X1 = ones(14,1);
X2 = code_gen_seed;
code_array = zeros(10230/code_bits_per_row, code_bits_per_row);

% Code generation with one code bit per iteration
if (code_bits_per_row == 1)
  for k = 1:10230
    code_array(k) = xor(X1(poly_order), X2(poly_order));
    X2 = mod(G2 * X2, 2);
    if (k == x1_state_init_k), X1 = ones(14,1);
    else,                      X1 = mod(G1 * X1, 2);    end
  end % for % Code generation with ten code bits per iteration
elseif (code_bits_per_row == 10)
  % Multiple the state transition matrix by 10 times to form a new matrix
  % that advances the state by 10 code bits on each iteration.
  G1_10 = mod(G1^10, 2);
  G2_10 = mod(G2^10, 2);

% Define generator output range for state variable bits in reverse order
  out_index = uint8(poly_order:-1:(poly_order-9));

for k = 1:1023
    code_array(k,:) = xor(X1(out_index), X2(out_index));
    X2 = mod(G2_10 * X2, 2);
    if (k == x1_state_init_k), X1 = ones(14,1);
    else,                      X1 = mod(G1_10 * X1, 2);   end
  end % for end  % if % Print state transition matrix
% G1 = uint8(G1)
% G2 = uint8(G2)
% G1_10 = uint8(G1_10)
% G2_10 = uint8(G2_10)

end % function
```

% Example of code seed values for first 2 SVs in each constellation
%    Seed value vector order =>[s21, s22, s23, ... s2r], where r is state variable size
%    First code bits output are ordered as c1, c2, c3 .., with c1 as MSB

```
%   Because g1 is initialized to all 1s, the first code bit vector is
inverted and bit-reversed from the seed vector
%
% Component        Initial State Seed       First code bits output
% L5I              sv1,I = 1010100011011    0010011101010
% L5Q              sv1,Q = 0110100110011    0011001101001

% L5I              sv2,I = 0011111001010    1010110000011
% L5Q              sv2,Q = 1011100001001    0110111100010

% E5AI             sv1,AI= 10100011000011   3CEA9D
% E5AQ             sv1,AQ= 01010101110101   515537
% E5BI             sv1,BI= 00001001011100   C5BEA1
% E5BQ             sv1,BQ= 10011011011000   E49AF0

% E5AI             sv2,AI= 00111001000110   9D8CF1
% E5AQ             sv2,AQ= 01000110010100   D67539
% E5BI             sv2,BI= 11100100001101   4F6248
% E5BQ             sv2,BQ= 11000110001100   CE701F

% B2AI             sv1,I = 1000000100101    26771056
% B2AQ             sv1,Q = 1000000100101    26772435

% B2AI             sv2,I = 1000000110100    64771737
% B2AQ             sv2,Q = 1000000110100    64771100

% Notes:
%   L5 seed values are inverted, and first code bits are bit-reversed
from ICD
%   E5 seed values are bit reversed from ICD
%   B2 is correct in ICD % secondary code - pilot
% L5 at 1 kHz rate => nh20(t) = 0 0 0 0 0 1 0 0 1 1 0 1 0 1 0 0 1 1 1
0
```

Part 2
The following Matlab code provides an example, in Matlab, of the implementation of a GNSS code sample generation script that uses the embodiment shown in figures 9A -9D.

```
clear
sc_cmd.code_gen_poly_set = 'E5AIQ';
sc_cmd.code_gen_seed = [1 0 1 0 0 0 1 1 0 0 0 0 1 1];
sc_cmd.freq_shift = -20480;
sc_cmd.freq_shift_phase = 0;
sc_cmd.code_advance = 11.125;
sc_cmd.code_phase_step = 0.01;
```

```
sc_cmd.second_code_length = 20;
sc_cmd.second_code_seq = ones(sc_cmd.second_code_length, 1);
sc_cmd.second_code_phase = 0;
ms_nr = 1;

% function [code_sample_array, csg_state_var] =
code_sample_gen(ms_nr, sc_cmd, csg_state_var)
% Code Sample Generator - Generate GNSS code, secondary code, shift
code phase, upsample, filter and shift frequency % First unpack the command and state variable structures
% and translate values for the hardware operations % --- Commands that are fixed for dwell duration ---
% Frequency shift is specified in Hz and converted to a signed
fraction of the sample rate.
freq_gen_shift = sc_cmd.freq_shift / 20480000;

% Code generator polynomial set selection and initial state variable
(seed)
code_gen_poly_set = sc_cmd.code_gen_poly_set;
code_gen_seed     = sc_cmd.code_gen_seed;

% Frequency shifter phase step per ms is defined as signed fraction
of cycles advanced/declined per ms.
freq_gen_phase_step_ms = rem(sc_cmd.freq_shift / 1000, 1);

% Code phase step per ms is defined as signed fraction of the code-
bit period advanced/declined per ms.
code_gen_phase_step_ms = sc_cmd.code_phase_step;

% --- Variables set to command values on first ms, and updated every
ms over dwell duration ---
if (ms_nr == 1)
  % Initial phase of freq gen is specified in degrees and converted
to positive fraction of a cycle
  freq_gen_phase = mod(sc_cmd.freq_shift_phase, 360) / 360;

% Initial phase of code gen is specified in positive code-bit
periods with 0.125 resolution, 0 to 63.875 range
  code_gen_phase = sc_cmd.code_advance;
else
  % When not first ms, load state variables from last ms
  freq_gen_phase = csg_state_var.freq_gen_phase;
  code_gen_phase = csg_state_var.code_gen_phase;
end % Update and save state variables for the next ms time when this
function is called again
csg_state_var.freq_gen_phase = freq_gen_phase +
freq_gen_phase_step_ms;
```

```
csg_state_var.code_gen_phase = code_gen_phase +
code_gen_phase_step_ms;

% Factor the code phase advance into tens, ones and 1/8th fractions
of code bits.
% Hardware will apply these in 3 separate stages of cycle advancing
and shifting.
code_advance_rnd  = round(8*code_gen_phase)/8;  % round to 1/8
resolution
code_advance_tens = uint32(floor(code_advance_rnd/10));
code_advance_ones = uint32(floor(code_advance_rnd/1)) -
10*code_advance_tens;
code_advance_frac = uint32(8*rem(code_advance_rnd,1));

% Secondary Code-bit Selection
second_code_bit = sc_cmd.second_code_seq(
mod((sc_cmd.second_code_phase+ms_nr-1), sc_cmd.second_code_length) +
1);

%  --- Now generate 20480 samples for the code sequence

% Generate a length 10230 code sequence for a GNSS satellite signal
component.
% Reshape into a column vector for easier math in subsequent lines,
% although hardware will process 10 bits in parallel per cycle
code_array = gnss_code_gen(10, code_gen_poly_set, code_gen_seed);
code_vector = reshape(code_array', [10230 1]);

% Apply the secondary code to the primary code sequence
second_code_vector = xor(code_vector, second_code_bit*ones(10230,1));
% not exactly right! another secondary code bit is needed on
extension % Extend the code sequence by 20 code bits by appending the first 20
code bits to the end of the sequence.
% Advance the code phase in increments of 10 code bits
% (like the hardware will do in multiple clock cycles)
code_ext_adv10 = [second_code_vector((10*code_advance_tens+1) :
10230) ; second_code_vector(1 : (10*code_advance_tens+20))];

% Advance the code phase by 0 to 9 code bits. Append NaN to fill
vector to same size
code_adv1 = [code_ext_adv10(code_advance_ones+1 :
length(code_ext_adv10)) ; NaN(code_advance_ones, 1)];

% Upsample 8x by stretching each code-bit value over 8 consecutive
samples
code_sample_8x = reshape([code_adv1 code_adv1 code_adv1 code_adv1
code_adv1 code_adv1 code_adv1 code_adv1]', [8*length(code_adv1), 1]);

% Further advance the code phase with 1/8 th chip resolution. Append
NaN to fill vector to same size
```

```
code_adv_frac = [code_sample_8x(code_advance_frac+1 :
length(code_sample_8x)) ; NaN(code_advance_frac, 1)];

% Reshape into array of 1025 rows by 80 columns in column-order (just
for easy sample insertion)
% Insert repeated sample at the Nr row index in each of the 80
columns.
% Reshape back into 1 column vector
code_sample_array = reshape(code_adv_frac, [1025 80]);     Nr = 512;
code_insert_array = [code_sample_array(1:Nr, 1:80) ;
                     code_sample_array(Nr, 1:80) ;
                     code_sample_array((Nr+1):1025, 1:80)];
code_upsample = reshape(code_insert_array, [80*1026, 1]);

% Lowpass filter and decimating by 4 to 80*1024 sample vector
h_aa = 1/64 * [5  -2  -4  -3  -1  5  9  15  16  15  9  5  -1  -3  -4
-2   5];   % plot(h_aa)
Ni = length(h_aa) - 1;
lpf = zeros(20480, 1);
for n = 1:20480
   lpf(n) = sum(h_aa' .* code_upsample(4*n-3 : 4*n-3+Ni));
end % Frequency shifter (typical range less than +/- 10 kHz). Complex
output
% Set phase accumulator to initial phase command, then advance by
frequency shift command
% Limit to 1024 phase shifts/cycle to match with capabilites of the
CORDIC in 1st stage of 20 by 1024-point FFTs
freq_gen_phase_accum = zeros(20480, 1);
freq_gen_phase_accum(1) = freq_gen_phase;
for n = 2:20480
  freq_gen_phase_accum(n) = rem((freq_gen_phase_accum(n-1) +
freq_gen_shift), 1);
end
freq_gen_phase_1024 = round(freq_gen_phase_accum * 1024) / 1024;
code_sample_vector  = lpf .* exp(1j*2*pi * freq_gen_phase_1024);

% Reshape sample vector into array of 1024 rows by 20 columns in row
order.
code_sample_array = reshape(code_sample_vector, [20 1024])';

% end

% Alt method
% Lowpass filter and decimating by 4
% Sum 8 consecutive 1-bit code values and step 4 samples every
iteration.
% Equivalent to h = [1 1 1 1 1 1 1 1] with post decimation by 4
% y1 = zeros(20480+2, 1);
```

```
% for k = 1:(20480+2)
%    y1(k) = sum(code_upsample(4*k-3 : 4*k+4)) - 4;
% end % Equalization filter for sinc shape LPF spectrum (try 3-tap or may
need 5-tap)
% Note, LPF+EQ combined filtering has an effectively group delay of 8
samples => 1024/1023 chip periods
% c = 0.3;   h_eq = [1-c  1  1-c];  % Just place holder!!!!
% y2 = zeros(20480, 1);
% for k = 1:20480
%    y2(k) = sum(h_eq' .* y1(k : k+2));
% end
```

Part 3
The following Matlab code provides an example, in Matlab, of the implementation of a GNSS signal acquisition engine that uses the embodiment shown in figure 6.

```
% Acquisition Engine Signal Processing

% Frequency Plan
fs_adc = 432000;   % Plan A
rf_upsample_rate = 8;
fs_rf = rf_upsample_rate * fs_adc;
fs_if = fs_adc/4;

% Satellite Parameters
ssg_param.sample_rate = 432000; % kHz
ssg_param.sv_type = 'E5';
ssg_param.sv_number = 1;
ssg_param.doppler_freq = 200;  % Hz  time shift per ms = -freq_shift
/ 116500
ssg_param.snr = 0;   % dB
ssg_param.chip_code_phase = 0; %  apply as decline
ssg_param.pilot_code_phase = 0; %

% Digital Front End Commands
dfe_cmd.first_if_upconv      = 1;   % Upconv neg IF, downconv pos IF
dfe_cmd.gain_step            = 1;   % - 3dB steps
dfe_cmd.ifd2_init_phase      = 0;
dfe_cmd.ifd2_freq_shift      = -3795/fs_if;
dfe_cmd.ab_init_phase        = 0;
dfe_cmd.ab_freq_shift        = 15345/fs_if;
dfe_cmd.int_dec_rate         = floor(fs_if/20480);
dfe_cmd.frd_init_phase       = 0;
dfe_cmd.frac_dec_phase_step  = fs_if / (dfe_cmd.int_dec_rate*20480) - 1;

% AE Channel Commands for 4 sub-channels, 1 channel only
dwell_duration = 10;  % ms
```

```
integration_mode = 'Non_Coh';
comp_combining_mode = [2 2]; % 4 [2 2] [1 1 1 1]

sc1_cmd.sideband_select = 'ASB'; % ASB or BSB
sc2_cmd.sideband_select = 'ASB';
sc3_cmd.sideband_select = 'BSB';
sc4_cmd.sideband_select = 'BSB';

sc1_cmd.freq_shift = 200; % Hz
sc2_cmd.freq_shift = 200;
sc3_cmd.freq_shift = 200;
sc4_cmd.freq_shift = 200;

sc1_cmd.freq_shift_phase = 0; % Degrees
sc2_cmd.freq_shift_phase = 90;
sc3_cmd.freq_shift_phase = 0;
sc4_cmd.freq_shift_phase = 90;

sc1_cmd.code_advance = 11.125; % Code sequence start position (1/8
chip resolution)
sc2_cmd.code_advance = 11.125;
sc3_cmd.code_advance = 11.125;
sc4_cmd.code_advance = 11.125;

sc1_cmd.code_phase_step = 0.01; % added/subtracted from code phase
every ms
sc2_cmd.code_phase_step = 0.01; % set to -freq_shift / 116500
sc3_cmd.code_phase_step = 0.01;
sc4_cmd.code_phase_step = 0.01;

sc1_cmd.code_gen_poly_set = 'E5AIQ';
sc2_cmd.code_gen_poly_set = 'E5AIQ';
sc3_cmd.code_gen_poly_set = 'E5BIQ';
sc4_cmd.code_gen_poly_set = 'E5BIQ';

sc1_cmd.code_gen_seed = [1 0 1 0 0 0 1 1 0 0 0 0 1 1]; % for Galileo
SV #1
sc2_cmd.code_gen_seed = [0 1 0 1 0 1 0 1 1 1 0 1 0 1];
sc3_cmd.code_gen_seed = [0 0 0 0 1 0 0 1 0 1 1 1 0 0];
sc4_cmd.code_gen_seed = [1 0 0 1 1 0 1 1 0 1 1 0 0 0];

sc1_cmd.second_code_length = 20;  % L5 => 10,20 ; E5 => 4,20,100 ; B2
=> 5, 100
sc2_cmd.second_code_length = 100;
sc3_cmd.second_code_length = 4;
sc4_cmd.second_code_length = 100;

sc1_cmd.second_code_seq = zeros(sc1_cmd.second_code_length, 1);  %
create function based on SV number and type
sc2_cmd.second_code_seq = zeros(sc2_cmd.second_code_length, 1);  % or
just write down first 2 SV of each GNSS
sc3_cmd.second_code_seq = zeros(sc3_cmd.second_code_length, 1);
```

```
sc4_cmd.second_code_seq = zeros(sc4_cmd.second_code_length, 1);

sc1_cmd.second_code_phase = 0;   % Index offset advance of first code
bit within sequence at start of dwell.
sc2_cmd.second_code_phase = 0;   % All secondary codes have 1 ms bit
period
sc3_cmd.second_code_phase = 0;
sc4_cmd.second_code_phase = 0;

% Dwell Loop for 1 channel with up to 4 sub-channels
for ms_nr = 1 : dwell_duration % GNSS Satellite Signal Generator => Length 432,000 column vector,
Load/save state variables every ms
[ssg_signal, ssg_state_var] = gnss_signal_gen(ms_nr, ssg_param,
ssg_state_var);

% Digital Front End => 1024 by 20 in row order, Load/save state
variables every ms
[ASB_sample, BSB_sample, dfe_state_var] = dig_front_end(ms_nr,
ssg_signal, dfe_cmd, dfe_state_var);

% GNSS Code Sample Generators => 1024 by 20 in row order
[code_sample_1, csg1_state_var] = code_sample_gen(ms_nr, sc1_cmd,
csg1_state_var);
[code_sample_2, csg2_state_var] = code_sample_gen(ms_nr, sc2_cmd,
csg2_state_var);
[code_sample_3, csg3_state_var] = code_sample_gen(ms_nr, sc3_cmd,
csg3_state_var);
[code_sample_4, csg4_state_var] = code_sample_gen(ms_nr, sc4_cmd,
csg4_state_var);

% Sideband Signal Spectrum Transform => 1024 by 20 in column order
ASB_spec = vfft_dit(ASB_sample);
BSB_spec = vfft_dit(BSB_sample);

% Select Sideband Spectrum for each Sub-channel
if (sc1_cmd.sideband_select == 'ASB'), sc1_SB = ASB_spec; else,
sc1_SB = BSB_spec; end
if (sc2_cmd.sideband_select == 'ASB'), sc2_SB = ASB_spec; else,
sc2_SB = BSB_spec; end
if (sc3_cmd.sideband_select == 'ASB'), sc3_SB = ASB_spec; else,
sc3_SB = BSB_spec; end
if (sc4_cmd.sideband_select == 'ASB'), sc4_SB = ASB_spec; else,
sc4_SB = BSB_spec; end % Code Spectrum Transform => 1024 by 20 in column order
code_spec_1 = vfft_dit(code_sample_1);
code_spec_2 = vfft_dit(code_sample_2);
code_spec_3 = vfft_dit(code_sample_3);
code_spec_4 = vfft_dit(code_sample_4);
```

```
% Signal and Code Spectrum Multiple => Conjugate the code spectrum
and result before IFFT
mult_spec_1 = conj(sc1_SB .* conj(code_spec_1));
mult_spec_2 = conj(sc2_SB .* conj(code_spec_2));
mult_spec_3 = conj(sc3_SB .* conj(code_spec_3));
mult_spec_4 = conj(sc4_SB .* conj(code_spec_4));

% Correlation (Inverse) Fourier Transform => 1024 by 20 in row order
corr_result_1 = vfft_dif(mult_spec_1);
corr_result_2 = vfft_dif(mult_spec_2);
corr_result_3 = vfft_dif(mult_spec_3);
corr_result_4 = vfft_dif(mult_spec_4);

% Correlation Post Processing

% Integration

% Correlation Plot - update every ms

% Print out status

% Save results to file end % ms_nr loop
```

Part 4
The following Matlab code provides an example, in Matlab, of the implementation of a GNSS signal acquisition engine that uses DFTs with a decimation in time method in the embodiment shown in figure 6.

```
function [Y] = vfft_dit(X)
% Very Fast Fourier Transform by Decimation in Time Algorithm
%
% X is the time domain input array of N2 rows by N1 columns with
array
% elements in row order.
%
% Y is the frequency domain output array of N2 rows by N1 columns
with array
% elements in column order.
%
% The N-point VFFT-DIT algorithm-architecture is speed optimized by
decomposing
% the FFT processing into N1 parallel FFTs of N2-points, followed by
a
% combining stage with N1-point DFTs. The N1 parallel FFTs are
performed
% concurrently using array processing to speed up FFT processing time
by a
% factor of N1 times.
```

```
% The total number of FFT points is N = N1 * N2, with N1 << N2
% An inverse VFFT-DIT can be done by conjugating the input and output
arrays.

% Find the dimensions for the X array input
[N2, N1] = size(X);

% Total number of FFT points
N = N1 * N2;

% Calculate N2-point FFTs for all columns of X array
H = fft(X, N2, 1);

% Define an N2 by N1 array of n2*k1 exponent values for the WN phase
shift factors
P = [0:1:(N2-1)]' * [0:1:(N1-1)];

% Define the N2 by N1 array of WN phase shift factors
WN = exp(-1j*2*pi/N * P);

% Array element multiply of the N2-point FFT results and the WN phase
shift factors
H_WN = H .* WN;

% Calculate N1-point DFTs on all rows
Y = fft(H_WN, N1, 2);

end
```

Part 5
The following Matlab code provides an example, in Matlab, of the implementation of a GNSS signal acquisition engine that uses DFTs with a decimation in frequence method in the embodiment shown in figure 6.

```
function [Y] = vfft_dif(X)
% Very Fast Fourier Transform by Decimation in Frequency Algorithm
%
% X is the time domain input array of N2 rows by N1 columns with
array
% elements in column order.
%
% Y is the frequency domain output array of N2 rows by N1 columns
with array
% elements in row order.
%
% The N-point VFFT-DIF algorithm-architecture is speed optimized by
decomposing
% the FFT processing into a first stage with N1-point DFTs, followed
by
% N1 parallel FFTs of N2-points. The N1 parallel FFTs are performed
concurrently
```

```
% using array processing to speed up FFT processing time by a factor
of N1 times.
% The total number of FFT points is N = N1 * N2, with N1 << N2
% An inverse VFFT-DIF can be done by conjugating the input and output
arrays.

% Find the dimensions for the X array input
[N2, N1] = size(X);

% Total number of FFT points
N = N1 * N2;

% Calculate N1-point DFTs on all rows of X
G = fft(X, N1, 2);

% Define an N2 by N1 array of n2*k1 exponent values for the WN phase
shift factors
P = [0:1:(N2-1)]' * [0:1:(N1-1)];

% Define the N2 by N1 array of WN phase shift factors
WN = exp(-1j*2*pi/N * P);

% Array element multiply of the first stage DFT results and the WN
phase shift factors
G_WN = G .* WN;

% Calculate N2-point FFTs for all columns of G .* WN
Y = fft(G_WN, N2, 1);

end
```

Appendix 3

Sideband Folding

The following analysis describes the complex and real mixing approaches

E5a and E5b modulated signals are as follows:

$$s_{RF}(t) = A_a(t)\cos[\omega_a t + \varphi_a(t)] + A_b(t)\cos[\omega_b t + \varphi_b(t)]$$
$$= Re\{A_a(t)e^{j[\omega_a t + \varphi_a(t)]} + A_b(t)e^{j[\omega_b t + \varphi_b(t)]}\}$$
$$= A_a(t)\frac{1}{2}\left(e^{j[\omega_a t + \varphi_a(t)]} + e^{-j[\omega_a t + \varphi_a(t)]}\right) + A_b(t)\frac{1}{2}\left(e^{j[\omega_b t + \varphi_b(t)]} + e^{-j[\omega_b t + \varphi_b(t)]}\right)$$

Where $\omega_a = 2\pi\, 1176.450E6\, rad/sec$ and $\omega_{ab} = 2\pi\, 1207.140E6\, rad/sec$ respectively for the E5a and E5b sidebands.

In conventional IQ dual band ZIF demodulation,

LO signals are as follows:

$$s_{ILO}(t) = \cos[\omega_{LO} t] = \cos[\omega_c t] = \frac{1}{2}\left(e^{j\omega_c t} + e^{-j\omega_c t}\right)$$

Where $\omega_c = 2\pi\, 1191.795E6\, rad/sec$ which is the E5 band center frequency $$s_{QLO}(t) = \sin[\omega_{LO} t] = \sin[\omega_c t] = \frac{1}{2}j(e^{-j\omega_c t} - e^{j\omega_c t})$$

Then, baseband signals for the two paths are as follows:

$$s_{IBB}(t) = s_{RF}(t)\, s_{ILO}(t) = (A_a(t)\cos[\omega_a t + \varphi_a(t)] + A_b(t)\cos[\omega_b t + \varphi_b(t)])\, \cos[\omega_c t]$$
$$= \left[A_a(t)\frac{1}{2}\left(e^{j[\omega_a t + \varphi_a(t)]} + e^{-j[\omega_a t + \varphi_a(t)]}\right) + A_b(t)\frac{1}{2}\left(e^{j[\omega_b t + \varphi_b(t)]} + e^{-j[\omega_b t + \varphi_b(t)]}\right)\right]$$
$$\cdot \frac{1}{2}\left(e^{j\omega_c t} + e^{-j\omega_c t}\right)$$
$$= A_a(t)\frac{1}{4}\left(e^{j[\omega_a t + \varphi_a(t)]} + e^{-j[\omega_a t + \varphi_a(t)]}\right)\cdot \left(e^{j\omega_c t} + e^{-j\omega_c t}\right) +$$
$$+ A_b(t)\frac{1}{4}\left(e^{j[\omega_b t + \varphi_b(t)]} + e^{-j[\omega_b t + \varphi_b(t)]}\right)\cdot \left(e^{j\omega_c t} + e^{-j\omega_c t}\right)$$
$$= A_a(t)\frac{1}{4}\left(e^{j[\omega_a t + \omega_c t + \varphi_a(t)]} + e^{-j[\omega_a t - \omega_c t + \varphi_a(t)]} + e^{j[\omega_a t - \omega_c t + \varphi_a(t)]}\right.$$
$$\left. + e^{-j[\omega_a t + \omega_c t + \varphi_a(t)]}\right) +$$
$$+ A_b(t)\frac{1}{4}\left(e^{j[\omega_b t + \omega_c t + \varphi_b(t)]} + e^{-j[\omega_b t - \omega_c t + \varphi_b(t)]} + e^{j[\omega_b t - \omega_c t + \varphi_b(t)]} + e^{-j[\omega_b t + \omega_c t + \varphi_b(t)]}\right)$$

$$s_{QBB}(t) = s_{RF}(t)\, s_{QLO}(t) = (A_a(t)\cos[\omega_a t + \varphi_a(t)] + A_b(t)\cos[\omega_b t + \varphi_b(t)])\sin[\omega_c t]$$

$$= \left[A_a(t)\frac{1}{2}\left(e^{j[\omega_a t + \varphi_a(t)]} + e^{-j[\omega_a t + \varphi_a(t)]}\right) + A_b(t)\frac{1}{2}\left(e^{j[\omega_b t + \varphi_b(t)]} + e^{-j[\omega_b t + \varphi_b(t)]}\right)\right]$$

$$\cdot \frac{1}{2}j(e^{-j\omega_c t} - e^{j\omega_c t})$$

$$= A_a(t)\frac{1}{4}\left(e^{j[\omega_a t + \varphi_a(t)]} + e^{-j[\omega_a t + \varphi_a(t)]}\right)\cdot j(e^{-j\omega_c t} - e^{j\omega_c t}) +$$

$$+ A_b(t)\frac{1}{4}\left(e^{j[\omega_b t + \varphi_b(t)]} + e^{-j[\omega_b t + \varphi_b(t)]}\right)\cdot j(e^{-j\omega_c t} - e^{j\omega_c t})$$

$$= A_a(t)\frac{1}{4}j\left(e^{j[\omega_a t - \omega_c t + \varphi_a(t)]} - e^{-j[\omega_a t + \omega_c t + \varphi_a(t)]} - e^{j[\omega_a t + \omega_c t + \varphi_a(t)]}\right.$$
$$\left.- e^{-j[\omega_a t - \omega_c t + \varphi_a(t)]}\right) +$$

$$+ A_b(t)\frac{1}{4}j\left(e^{j[\omega_b t - \omega_c t + \varphi_b(t)]} + e^{-j[\omega_b t + \omega_c t + \varphi_b(t)]} - e^{j[\omega_b t + \omega_c t + \varphi_b(t)]} - e^{-j[\omega_b t - \omega_c t + \varphi_b(t)]}\right)$$

After Low Pass Filtering:

$$s_{IBBF}(t) = A_a(t)\frac{1}{4}\left(e^{j[\omega_a t - \omega_c t + \varphi_a(t)]} + e^{-j[\omega_a t - \omega_c t + \varphi_a(t)]}\right)$$

$$+ A_b(t)\frac{1}{4}\left(e^{j[\omega_b t - \omega_c t + \varphi_b(t)]} + e^{-j[\omega_b t - \omega_c t + \varphi_b(t)]}\right)$$

$$= A_a(t)\frac{1}{2}\cos(\omega_a t - \omega_c t + \varphi_a(t)) + A_b(t)\frac{1}{2}\cos(\omega_b t - \omega_c t + \varphi_b(t))$$

$$s_{QBBF}(t) = A_a(t)\frac{1}{4}j\left(e^{j[\omega_a t - \omega_c t + \varphi_a(t)]} - e^{-j[\omega_a t - \omega_c t + \varphi_a(t)]}\right)$$

$$+ A_b(t)\frac{1}{4}j\left(e^{j[\omega_b t - \omega_c t + \varphi_b(t)]} - e^{-j[\omega_b t - \omega_c t + \varphi_b(t)]}\right)$$

$$= -A_a(t)\frac{1}{2}\sin(\omega_a t - \omega_c t + \varphi_a(t)) - A_b(t)\frac{1}{2}\sin(\omega_b t - \omega_c t + \varphi_b(t))$$

In digital baseband, one path is rotated by 90deg:

$$s_{QBBR}(t) = s_{QBBF}(t) \otimes \frac{1}{\pi t} = j\cdot s_{QBBF}(t) \quad (90\text{deg phase shifter})$$

$$= j\cdot [A_a(t)\frac{1}{4}j\left(e^{j[\omega_a t - \omega_c t + \varphi_a(t)]} - e^{-j[\omega_a t - \omega_c t + \varphi_a(t)]}\right)$$

$$+ A_b(t)\frac{1}{4}j\left(e^{j[\omega_b t - \omega_c t + \varphi_b(t)]} - e^{-j[\omega_b t - \omega_c t + \varphi_b(t)]}\right)]$$

$$= [A_a(t)\frac{1}{4}\left(e^{-j[\omega_a t - \omega_c t + \varphi_a(t)]} - e^{j[\omega_a t - \omega_c t + \varphi_a(t)]}\right)$$

$$+ A_b(t)\frac{1}{4}\left(e^{-j[\omega_b t - \omega_c t + \varphi_b(t)]} - e^{j[\omega_b t - \omega_c t + \varphi_b(t)]}\right)]$$

..and the two paths are combined into a single signal by addition and cancellation
$$s_{IBBF}(t) + s_{QBBR}(t) =$$

$$= A_a(t)\frac{1}{4}\left(e^{j[\omega_a t - \omega_c t + \varphi_a(t)]} + e^{-j[\omega_a t - \omega_c t + \varphi_a(t)]}\right)$$

$$+ A_b(t)\frac{1}{4}\left(e^{j[\omega_b t - \omega_c + \varphi_b(t)]} + e^{-j[\omega_b t - \omega_c + \varphi_b(t)]}\right)$$

$$+ A_a(t)\frac{1}{4}\left(e^{-j[\omega_a t - \omega_c t + \varphi_a(t)]} - e^{j[\omega_a t - \omega_c t + \varphi_a(t)]}\right)$$

$$+ A_b(t)\frac{1}{4}\left(e^{-j[\omega_b t - \omega_c + \varphi_b(t)]} - e^{j[\omega_b t - \omega_c + \varphi_b(t)]}\right)$$

$$= A_a(t)\frac{1}{2}e^{-j[\omega_a t - \omega_c t + \varphi_a(t)]} + A_b(t)\frac{1}{2}e^{-j[\omega_b t - \omega_c + \varphi_b(t)]}$$

In a single mixer dual band demodulation (also referred to as "Real Mixing"), The <u>single</u> LO signal is as follows:

$$s_{LO}(t) = \cos[\omega_{LO} t] = \cos[\omega_c t] = \frac{1}{2}\left(e^{j\omega_c t} + e^{-j\omega_c t}\right)$$

Then, the single path baseband signal is as follows:

$$s_{BB}(t) = s_{RF}(t)\, s_{LO}(t) = (A_a(t)\cos[\omega_a t + \varphi_a(t)] + A_b(t)\cos[\omega_b t + \varphi_b(t)])\, \boldsymbol{\cos[\omega_c t]}$$

$$= \left[A_a(t)\frac{1}{2}\left(e^{j[\omega_a t + \varphi_a(t)]} + e^{-j[\omega_a t + \varphi_a(t)]}\right) + A_b(t)\frac{1}{2}\left(e^{j[\omega_b t + \varphi_b(t)]} + e^{-j[\omega_b t + \varphi_b(t)]}\right)\right]$$

$$\cdot \frac{1}{2}\left(e^{j\omega_c t} + e^{-j\omega_c t}\right)$$

$$= A_a(t)\frac{1}{4}\left(e^{j[\omega_a t + \varphi_a(t)]} + e^{-j[\omega_a t + \varphi_a(t)]}\right) \cdot \left(e^{j\omega_c t} + e^{-j\omega_c t}\right) +$$

$$+ A_b(t)\frac{1}{4}\left(e^{j[\omega_b t + \varphi_b(t)]} + e^{-j[\omega_b t + \varphi_b(t)]}\right) \cdot \left(e^{j\omega_c t} + e^{-j\omega_c t}\right)$$

$$= A_a(t)\frac{1}{4}\left(e^{j[\omega_a t + \omega_c t + \varphi_a(t)]} + e^{-j[\omega_a t - \omega_c t + \varphi_a(t)]} + e^{j[\omega_a t - \omega_c t + \varphi_a(t)]}\right.$$
$$\left. + e^{-j[\omega_a t + \omega_c t + \varphi_a(t)]}\right) +$$

$$+ A_b(t)\frac{1}{4}\left(e^{j[\omega_b t + \omega_c t + \varphi_b(t)]} + e^{-j[\omega_b t - \omega_c + \varphi_b(t)]} + e^{j[\omega_b t - \omega_c + \varphi_b(t)]} + e^{-j[\omega_b t + \omega_c + \varphi_b(t)]}\right)$$

After Low Pass Filtering:

$$s_{BBF}(t) = A_a(t)\frac{1}{4}\left(e^{j[\omega_a t - \omega_c t + \varphi_a(t)]} + e^{-j[\omega_a t - \omega_c t + \varphi_a(t)]}\right)$$

$$+ A_b(t)\frac{1}{4}\left(e^{j[\omega_b t - \omega_c + \varphi_b(t)]} + e^{-j[\omega_b t - \omega_c + \varphi_b(t)]}\right)$$

The terms $e^{j[\omega_a t - \omega_c t + \varphi_a(t)]}$ and $e^{j[\omega_b t - \omega_c + \varphi_b(t)]}$ overlap with each other
While the terms $e^{-j[\omega_a t - \omega_c t + \varphi_a(t)]}$ and $e^{-j[\omega_b t - \omega_c + \varphi_b(t)]}$ also overlap with each other.

The spreading codes of E5a and E5b being converted in reverse order present enough isolation to de-spread each of the signals independently.

Note that the spectrum reversal of E5a will also need to be accounted for.

What is claimed is:

1. A method for processing GNSS signals, the method comprising:
   receiving, by a GNSS receiver, GNSS signals;
   digitizing the received GNSS signals and providing an output, from an analog to digital converter (ADC) in the GNSS receiver, of GNSS sample data which includes one or more of (1) GNSS sideband A sample data from the received GNSS signals or (2) GNSS sideband B sample data from the received GNSS signals;
   computing a first set of discrete Fourier transforms (DFTs) of the GNSS sample data to provide a first set of results;
   computing a second set of DFTs of a first GNSS primary PRN code data which is adjusted for code Doppler and carrier Doppler prior to the second set of DFTs, the second set of DFTs providing a second set of results;
   computing a first set of correlations of the received GNSS signals and the first GNSS primary PRN code based on the first set of results and the second set of results to provide a third set of results;
   integrating the third set of results with at least one prior sum, wherein the integrating includes storing at least one new sum for the correlation of the first GNSS primary PRN code with the received GNSS signals.

2. The method as in claim 1, wherein the GNSS receiver receives and processes only GNSS signals in an L5 radio frequency (RF) band and does not use GNSS signals in an L1 RF band.

3. The method as in claim 1, wherein the second set of results provide a code spectrum for use in correlations of the first GNSS primary code data with the GNSS sample data.

4. The method as in claim 1, wherein the first GNSS primary PRN code data is either stored in the GNSS receiver or generated in the GNSS receiver during an acquisition phase in the GNSS receiver.

5. The method as in claim 3, wherein the GNSS receiver also receives and processes GNSS signals in an L1 RF band.

6. The method as in claim 3, wherein the GNSS sample data includes the GNSS sideband A sample data from the received GNSS signals, and the GNSS sideband A sample data includes one or more components.

7. The method as in claim 6, wherein the one or more components of the GNSS sideband A sample data include an E5AI component which includes a second GNSS primary PRN code data and an E5AQ component which includes the first GNSS primary PRN code data, and wherein the method further comprises:
   computing a third set of DFTs of the second GNSS primary PRN code data which is adjusted for code Doppler and carrier Doppler prior to the third set of DFTs, the third set of DFTs providing a fourth set of results;
   computing a second set of correlations of the received GNSS signals and the second GNSS primary PRN code based on the first set of results and the fourth set of results to provide a fifth set of results;
   integrating the fifth set of results with at least one prior sum, wherein the integrating of the fifth set of results includes storing at least one new sum for the correlation of the second GNSS primary PRN code data with the received GNSS signals.

8. The method as in claim 7, wherein the GNSS sample data includes the GNSS sideband B sample data from the received GNSS signals, and the GNSS sideband B sample data includes one or more components which include an E5BI component which includes a third GNSS primary PRN code data and an E5BQ component which includes a fourth GNSS primary PRN code data, and wherein the method further comprises:
   computing a fourth set of DFTs of the GNSS sideband B sample data to provide a sixth set of results;
   computing a fifth set of DFTs of the third GNSS primary PRN code data which is adjusted for code Doppler and carrier Doppler prior to the fifth set of DFTs, the fifth set of DFTs providing a seventh set of results;
   computing a third set of correlations of the received GNSS signals and the third GNSS primary PRN code based on the sixth set of results and the seventh set of results to provide an eighth set of results;
   integrating the eighth set of results with at least one prior sum, wherein the integrating of the eighth set of results includes storing at least one new sum for the correlation of the third GNSS primary PRN code data with the received GNSS signals;
   computing a sixth set of DFTs of the fourth GNSS primary PRN code data which is adjusted for code Doppler and carrier Doppler prior to the sixth set of DFTs, the sixth set of DFTs providing a ninth set of results;
   computing a fourth set of correlations of the received GNSS signals and the fourth GNSS primary PRN code based on the sixth set of results and the ninth set of results to provide a tenth set of results;
   integrating the tenth set of results with at least one prior sum, wherein the integrating of the tenth set of results includes storing at least one new sum for the correlation of the fourth GNSS primary PRN code data with the received GNSS signals.

9. The method as in claim 3, wherein the GNSS sample data includes the GNSS sideband B sample data from the received GNSS signals, and the GNSS sideband B sample data includes an E5BI component which includes a second GNSS primary PRN code data and an E5BQ component which includes the first GNSS primary PRN code data, and wherein the method further comprises:
   computing a third set of DFTs of the second GNSS primary PRN code data which is adjusted for code Doppler and carrier Doppler prior to the third set of DFTs, the third set of DFTs providing a fourth set of results;
   computing a second set of correlations of the received GNSS signals and the second GNSS primary PRN code based on the first set of results and the fourth set of results to provide a fifth set of results;
   integrating the fifth set of results with at least one prior sum, wherein the integrating of the fifth set of results includes storing at least one new sum for the correlation of the second GNSS primary PRN code data with the received GNSS signals.

10. The method as in claim 7, wherein the GNSS receiver includes time domain correlators, and the time domain correlators are used in a tracking mode after GNSS signals have been acquired by processing logic that computes DFTs.

11. The method as in claim 10, wherein the GNSS receiver includes a GNSS processing system that includes an acquisition engine and a tracking engine, and the acquisition engine includes the processing logic to receive an array of GNSS sample data, arranged, according to time of receipt, in either row order or column order and stored in one or more circular buffers.

12. The method as in claim 11, wherein a code spectrum data for each of the first GNSS primary PRN code data and the second GNSS primary PRN code data are generated repeatedly during a time period while acquiring GNSS signal components that include the first GNSS primary PRN code data and the second GNSS primary PRN code data and wherein the code spectrum data is generated in place in the acquisition engine.

13. The method as in claim 12, wherein the GNSS sample data is processed to separate the GNSS sideband A sample data from the GNSS sideband B sample data by: (1) for the GNSS sideband A, shifting samples centered at a first frequency up by a first offset frequency and performing a low pass filter to capture a first bandwidth of data and decimating the output of the low pass filter to a lower sample rate; and (2) for the GNSS sideband B, shifting samples centered at the first frequency down by the first offset frequency and performing a low pass filter to capture a second bandwidth of data and decimating the output of the low pass filter to a lower sample rate.

14. The method as in claim 7, wherein the computing operations require no separate operations to transpose or rearrange the sample data or the generated code spectrum data.

15. The method as in claim 7, wherein a code generator generates at least one of (1) the GNSS sideband A primary PRN code data every millisecond while GNSS signals are being acquired and tracked and the GNSS sideband A primary PRN code date is not stored after Fourier transformations are completed, and (2) the GNSS sideband B primary PRN code data every millisecond while the GNSS signals are being acquired and tracked and the GNSS sideband B primary PRN code data is not stored after Fourier transformations are completed.

16. The method as in claim 15, wherein the integrating is non-coherent during at least a portion of an acquisition phase while the GNSS signals are received.

17. A GNSS receiver comprising:
a radiofrequency analog to digital converter (ADC) to generate a digital representation of received GNSS signals;
a sample memory to store the digital representation of the received GNSS signals as digitized GNSS sample data, the sample memory configured to store the digitized GNSS sample data;
a GNSS processing system coupled to the sample memory, the GNSS processing system configured to process the GNSS sample data which includes one or more of (1) GNSS sideband A sample data from the received GNSS signals or (2) GNSS sideband B sample data from the received GNSS signals; and the GNSS processing system is configured to:
compute a first set of discrete Fourier transforms (DFTs) of the GNSS sample data to provide a first set of results;
compute a second set of DFTs of a first GNSS primary PRN code data which is adjusted for code Doppler and carrier Doppler prior to the second set of DFTs, the second set of DFTs providing a second set of results;
compute a first set of correlations of the received GNSS signals and the first GNSS primary PRN code based on the first set of results and the second set of results to provide a third set of results;
integrate the third set of results with at least one prior sum, wherein the integrating of the third set of results includes storing at least one new sum for the correlation of the first GNSS primary PRN code data with the received GNSS signals.

18. The GNSS receiver as in claim 17, wherein the GNSS receiver receives and processes only GNSS signals in an L5 radio frequency (RF) band and does not use GNSS signals in an L1 RF band, and wherein the second set of results provide a code spectrum for use in correlations of the first GNSS primary code data with the GNSS sample data, and wherein the first GNSS primary PRN code data is either stored in the GNSS receiver or generated in the GNSS receiver during an acquisition phase in the GNSS receiver.

19. The GNSS receiver as in claim 17, wherein the GNSS receiver also receives and processes GNSS signals in an L1 RF band.

20. The GNSS receiver as in claim 17, wherein the GNSS sample data includes the GNSS sideband A sample data from the received GNSS signals, and the GNSS sideband A sample data includes an E5AI component which includes a second GNSS primary PRN code data and an E5AQ component which includes the first GNSS primary PRN code data, and wherein the GNSS processing system is configured to:
compute a third set of DFTs of the second GNSS primary PRN code data which is adjusted for code Doppler and carrier Doppler prior to the third set of DFTs, the third set of DFTs providing a fourth set of results;
compute a second set of correlations of the received GNSS signals and the second GNSS primary PRN code based on the first set of results and the fourth set of results to provide a fifth set of results;
integrate the fifth set of results with at least one prior sum, wherein the integrating of the fifth set of results includes storing at least one new sum for the correlation of the second GNSS primary PRN code data with the received GNSS signals.

21. The GNSS receiver as in claim 17, wherein the GNSS sample data includes the GNSS sideband B sample data from the received GNSS signals, and the GNSS sideband B sample data includes an E5BI component which includes a second GNSS primary PRN code data and an E5BQ component which includes the first GNSS primary PRN code data, and wherein the GNSS processing system is configured to:
compute a third set of DFTs of the second GNSS primary PRN code data which is adjusted for code Doppler and carrier Doppler prior to the third set of DFTs, the third set of DFTs providing a fourth set of results;
compute a second set of correlations of the received GNSS signals and the second GNSS primary PRN code based on the first set of results and the fourth set of results to provide a fifth set of results;
integrate the fifth set of results with at least one prior sum, wherein the integrating of the fifth set of results includes storing at least one new sum for the correlation of the second GNSS primary PRN code data with the received GNSS signals.

22. The GNSS receiver as in claim 17, wherein the GNSS receiver includes time domain correlators, and the time domain correlators are used in a tracking mode after GNSS signals have been acquired by processing logic that computes DFTs.

23. The GNSS receiver as in claim 17, wherein a code spectrum data for each of the first GNSS primary PRN code data and the second GNSS primary PRN code data are generated repeatedly during a time period while acquiring GNSS signal components that include the first GNSS primary PRN code data and the second GNSS primary PRN code data.

24. The GNSS receiver as in claim 23, wherein a code generator in the GNSS receiver generates at least one of (1) the GNSS sideband A primary PRN code data every millisecond while GNSS signals are being acquired and the GNSS sideband A primary PRN code date is not stored after Fourier transformations are completed, and (2) the GNSS sideband B primary PRN code data every millisecond while the GNSS signals are being acquired and the GNSS sideband B primary PRN code data is not stored after Fourier transformations are completed.

25. The GNSS receiver as in claim 23, wherein the code spectrum data is generated in place in an acquisition engine.

26. A method for processing GNSS signals, the method comprising:
   receiving, by a GNSS receiver, GNSS signals;
   digitizing the received GNSS signals and providing an output, from an analog to digital converter (ADC) in the GNSS receiver, of GNSS sample data which includes one or more of (1) GNSS sideband A sample data from the received GNSS signals or (2) GNSS sideband B sample data from the received GNSS signals;
   computing a first set of discrete Fourier transforms (DFTs) of the GNSS sample data to provide a first set of results;
   computing a second set of DFTs of a first GNSS primary PRN code, the second set of DFTs providing a second set of results;
   computing a first set of correlations of the received GNSS signals and the first GNSS primary PRN code based on the first set of results and the second set of results to provide a third set of results;
   integrating the third set of results with at least one prior sum, wherein the integrating of the third set of results includes storing at least one new sum for the correlation of the first GNSS primary PRN code with the received GNSS signals in a single hypothesis memory;
   computing a third set of DFTs of a second GNSS primary PRN code data, the third set of DFTs providing a fourth set of results;
   computing a second set of correlations of the received GNSS signals and the second GNSS primary PRN code based on the first set of results and the fourth set of results to provide a fifth set of results;
   integrating the fifth set of results with at least one prior sum, wherein the integrating of the fifth set of results includes storing at least one new sum for the correlation of the second GNSS primary PRN code data with the received GNSS signals in the single hypothesis memory such that the single hypothesis memory contains the combined sums from the integrating of the fifth set of results and the third set of results.

27. The method as in claim 26, wherein the first GNSS primary PRN code and the second GNSS primary PRN code are contained in the GNSS sideband A sample data from the received GNSS signals.

28. The method as in claim 26, wherein the first GNSS primary PRN code and the second GNSS primary PRN code are contained in the GNSS sideband B sample data from the received GNSS signals.

29. The method as in claim 26, wherein the integrating of the third set of results and the fifth set of results comprises non-coherent integration.

30. The method as in claim 26, wherein the GNSS receiver receives and processes only GNSS signals in an L5 radio frequency (RF) band and does not use GNSS signals in an L1 RF band.

31. The method as in claim 26, wherein a code spectrum data for each of the first GNSS primary PRN code and the second GNSS primary PRN code are generated repeatedly during a time period while acquiring GNSS signal components that include the first GNSS primary PRN code data and the second GNSS primary PRN code data, and wherein the time period is more than two milliseconds.

* * * * *